United States Patent
Hirimai

(10) Patent No.: US 7,446,733 B1
(45) Date of Patent: Nov. 4, 2008

(54) THREE-DIMENSIONAL IMAGE DISPLAY

(75) Inventor: Hideyoshi Hirimai, Shiuoka (JP)

(73) Assignee: Hideyoshi Horimai, Shizhoka (JP)

( * ) Notice: Subject to any disclaimer, the term of this patent is extended or adjusted under 35 U.S.C. 154(b) by 0 days.

(21) Appl. No.: 09/646,228

(22) PCT Filed: Mar. 24, 1999

(86) PCT No.: PCT/JP99/01475

§ 371 (c)(1),
(2), (4) Date: Sep. 14, 2000

(87) PCT Pub. No.: WO99/50702

PCT Pub. Date: Oct. 7, 1999

(30) Foreign Application Priority Data

Mar. 27, 1998 (JP) .................................. 10-081686
Nov. 20, 1998 (JP) .................................. 10-331375

(51) Int. Cl.
G09G 3/00 (2006.01)
G09G 5/00 (2006.01)
G03B 21/00 (2006.01)

(52) U.S. Cl. .................................. 345/32; 345/7; 353/7

(58) Field of Classification Search .................. 359/23, 359/7; 345/7–9, 30–111; 349/74; 353/7, 353/10
See application file for complete search history.

(56) References Cited

U.S. PATENT DOCUMENTS

| | | | | |
|---|---|---|---|---|
| 4,429,946 A | * | 2/1984 | Haines | ........................ 359/22 |
| 5,132,839 A | * | 7/1992 | Travis | ........................ 359/462 |
| 5,519,533 A | | 5/1996 | Nomura et al. | |
| 5,689,316 A | * | 11/1997 | Hattori et al. | ................. 349/74 |
| 5,954,414 A | * | 9/1999 | Tsao | ............................. 353/7 |
| 6,108,029 A | * | 8/2000 | Lo | ............................... 348/43 |
| 6,157,474 A | * | 12/2000 | Orr et al. | ...................... 359/23 |
| 6,421,174 B1 | * | 7/2002 | Ooshima et al. | ............ 359/457 |
| 6,590,680 B2 | * | 7/2003 | Orr et al. | ...................... 359/23 |
| 6,600,600 B2 | * | 7/2003 | Chen | ......................... 359/459 |
| 6,650,396 B2 | * | 11/2003 | Li | ............................... 352/58 |
| 6,798,390 B1 | * | 9/2004 | Sudo et al. | ..................... 345/7 |

FOREIGN PATENT DOCUMENTS

| | | | |
|---|---|---|---|
| EP | 0 650 301 A2 | 4/1995 |
| JP | A 5-273675 | 10/1993 |
| JP | A 7-318858 | 12/1995 |
| JP | A 8-171074 | 7/1996 |
| JP | A 9-54281 | 2/1997 |
| JP | A 9-113846 | 5/1997 |

* cited by examiner

*Primary Examiner*—Sumati Lefkowitz
*Assistant Examiner*—Srilakshmi K Kumar
(74) *Attorney, Agent, or Firm*—Oliff & Berridge PLC

(57) ABSTRACT

The present invention provides a three-dimensional image display capable of presenting stereoscopic display in a true sense not only for a still image but also for a dynamic image without any need for a dedicated eyeglass or coherent light.

A multiplicity of screen dots (11) formed by LCDs which allows simple changes of the contents of an image are arranged on a three-dimensional display screen (10), and object images formed by the LCDs are projected in a space to form a multiplicity of point light source images (P) that form a three-dimensional image (R) to be displayed. A viewer (Q) can view the same as a stereoscopic image.

8 Claims, 82 Drawing Sheets

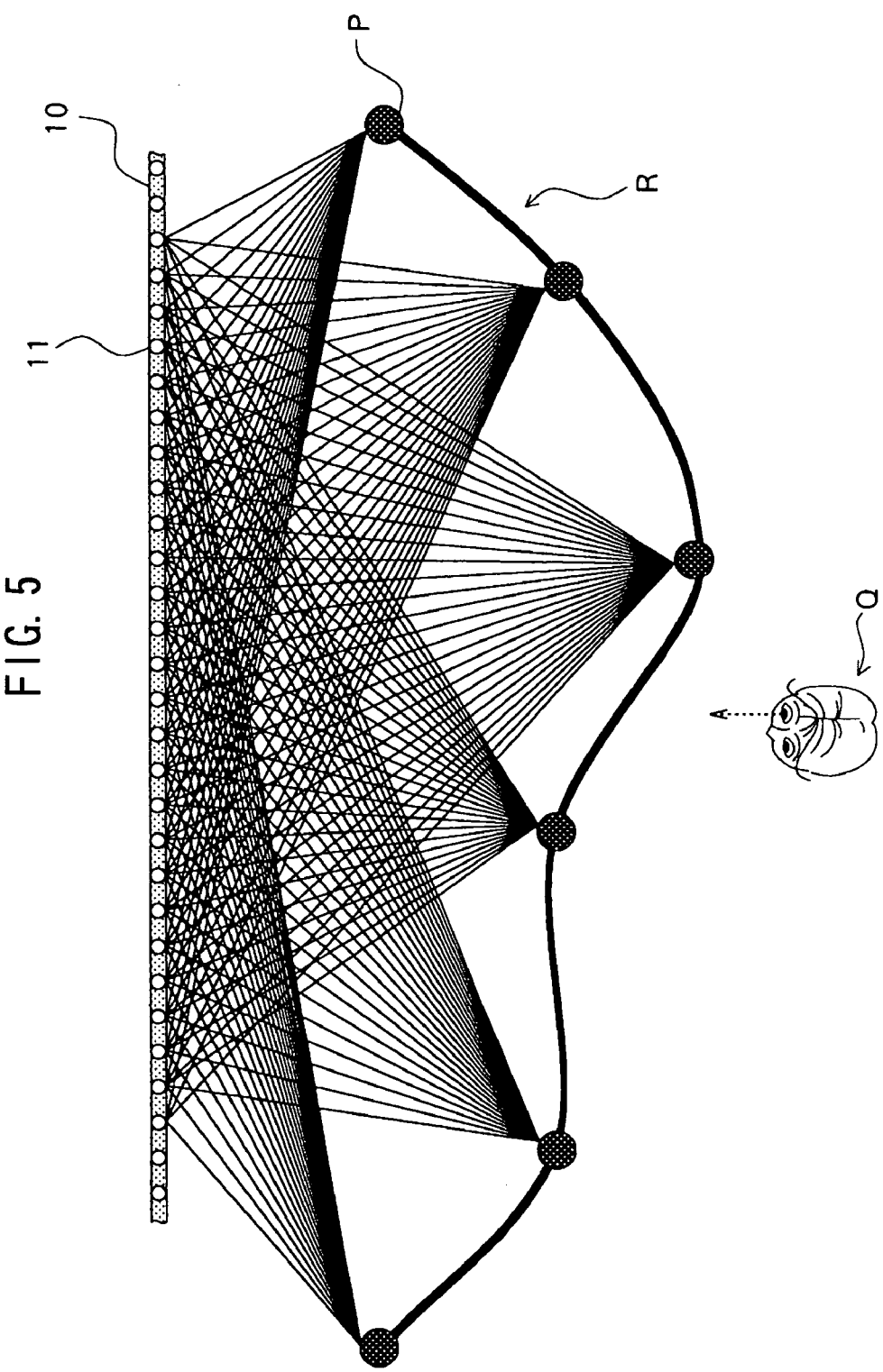

| slice number | sliced data |
|---|---|
| 1 | 0 0 0 0 0 0 0 0 0 0 0 0 0 0 |
| 2 | 0 0 0 0 0 0 0 0 0 0 0 0 0 1 |
| 3 | 0 0 0 0 0 0 0 0 0 0 0 0 1 1 |
| ⋮ | ⋮ |
| 15 | 0 1 1 1 0 1 1 1 0 1 0 0 0 1 |
| 16 | 1 1 1 0 1 1 1 0 1 0 0 0 1 0 |
| 17 | 1 1 0 1 1 1 0 1 0 0 0 1 0 1 |
| 18 | 1 0 1 1 1 0 1 0 0 0 1 0 1 1 |
| 19 | 0 1 1 1 0 1 0 0 0 1 0 1 1 1 |
| ⋮ | ⋮ |
| 42 | 0 1 1 1 0 0 0 0 0 0 0 0 0 0 |
| 43 | 1 1 1 0 0 0 0 0 0 0 0 0 0 0 |
| 44 | 1 1 0 0 0 0 0 0 0 0 0 0 0 0 |
| 45 | 1 0 0 0 0 0 0 0 0 0 0 0 0 0 |

FIG. 8

| screen dot number | inverted data |
|---|---|
| D1 | 0 0 0 0 0 0 0 0 0 0 0 0 0 0 |
| D2 | 1 0 0 0 0 0 0 0 0 0 0 0 0 0 |
| D3 | 1 1 0 0 0 0 0 0 0 0 0 0 0 0 |
| ⋮ | ⋮ |
| D15 | 1 0 0 0 1 0 1 1 1 1 0 1 1 0 |
| D16 | 0 1 0 0 0 1 0 1 1 1 1 0 1 1 1 |
| D17 | 1 0 1 0 0 0 1 0 1 1 1 1 0 1 1 |
| D18 | 1 1 0 1 0 0 0 1 0 1 1 1 1 0 1 |
| D19 | 1 1 1 0 1 0 0 0 1 0 1 1 1 1 0 |
| ⋮ | ⋮ |
| D42 | 0 0 0 0 0 0 0 0 0 0 1 1 1 0 |
| D43 | 0 0 0 0 0 0 0 0 0 0 0 1 1 1 |
| D44 | 0 0 0 0 0 0 0 0 0 0 0 0 1 1 |
| D45 | 0 0 0 0 0 0 0 0 0 0 0 0 0 1 |

FIG. 9

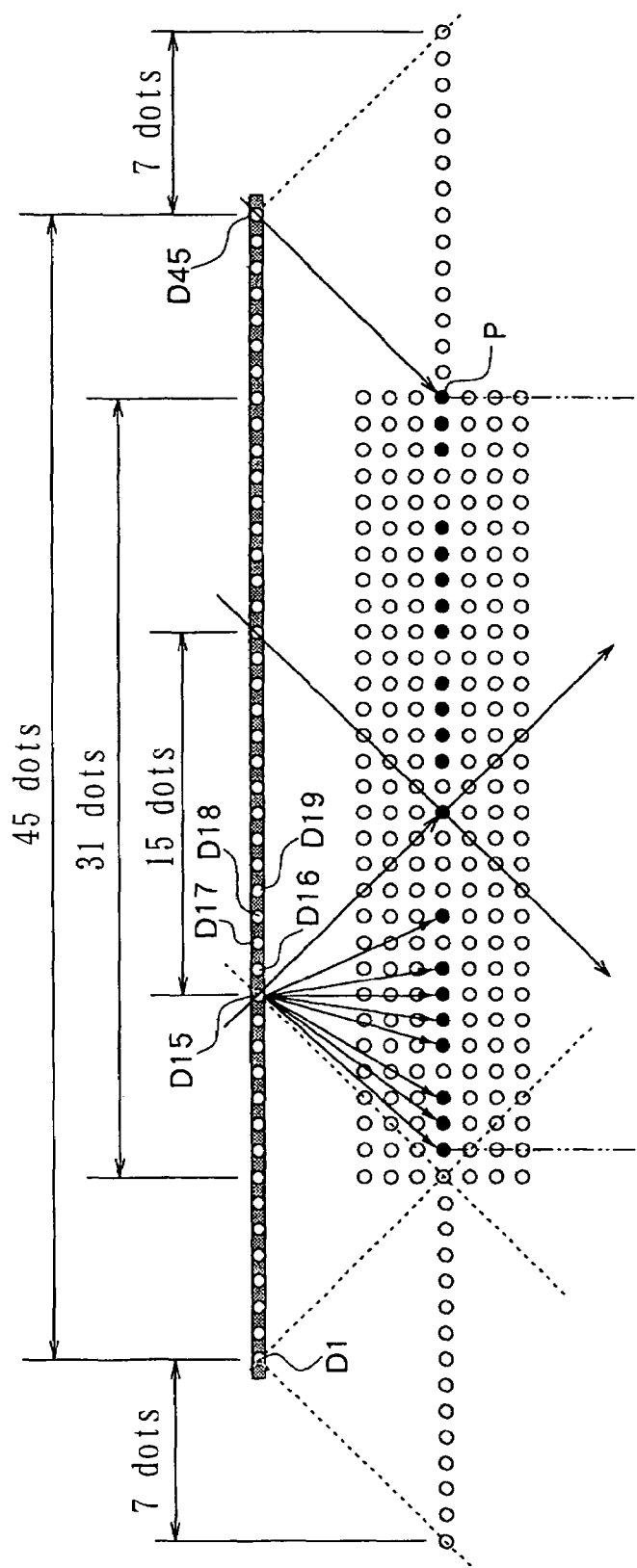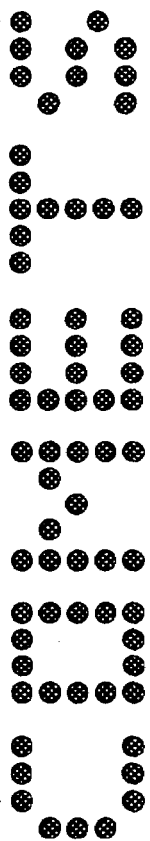

t1 [θ 1]         t30 [θ 30]        t60 [θ 60]

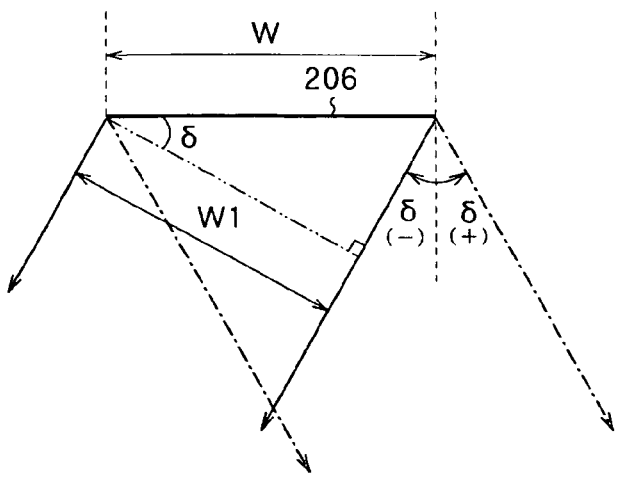
FIG. 44
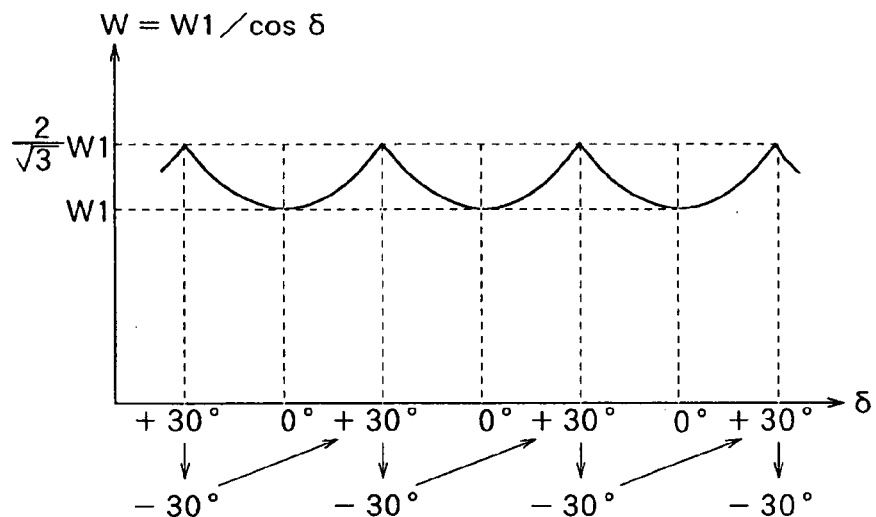
FIG. 45
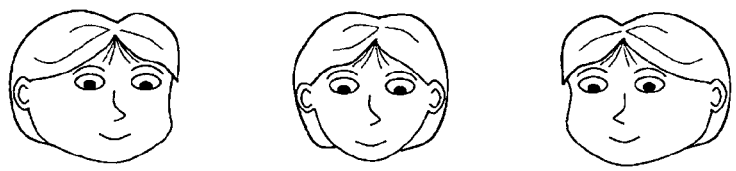
| $\delta = -30°$ | $\delta = 0°$ | $\delta = +30°$ |
| (t1[θ1]) | (t30[θ30]) | (t60[θ60]) |
| FIG. 46A | FIG. 46B | FIG. 46C |

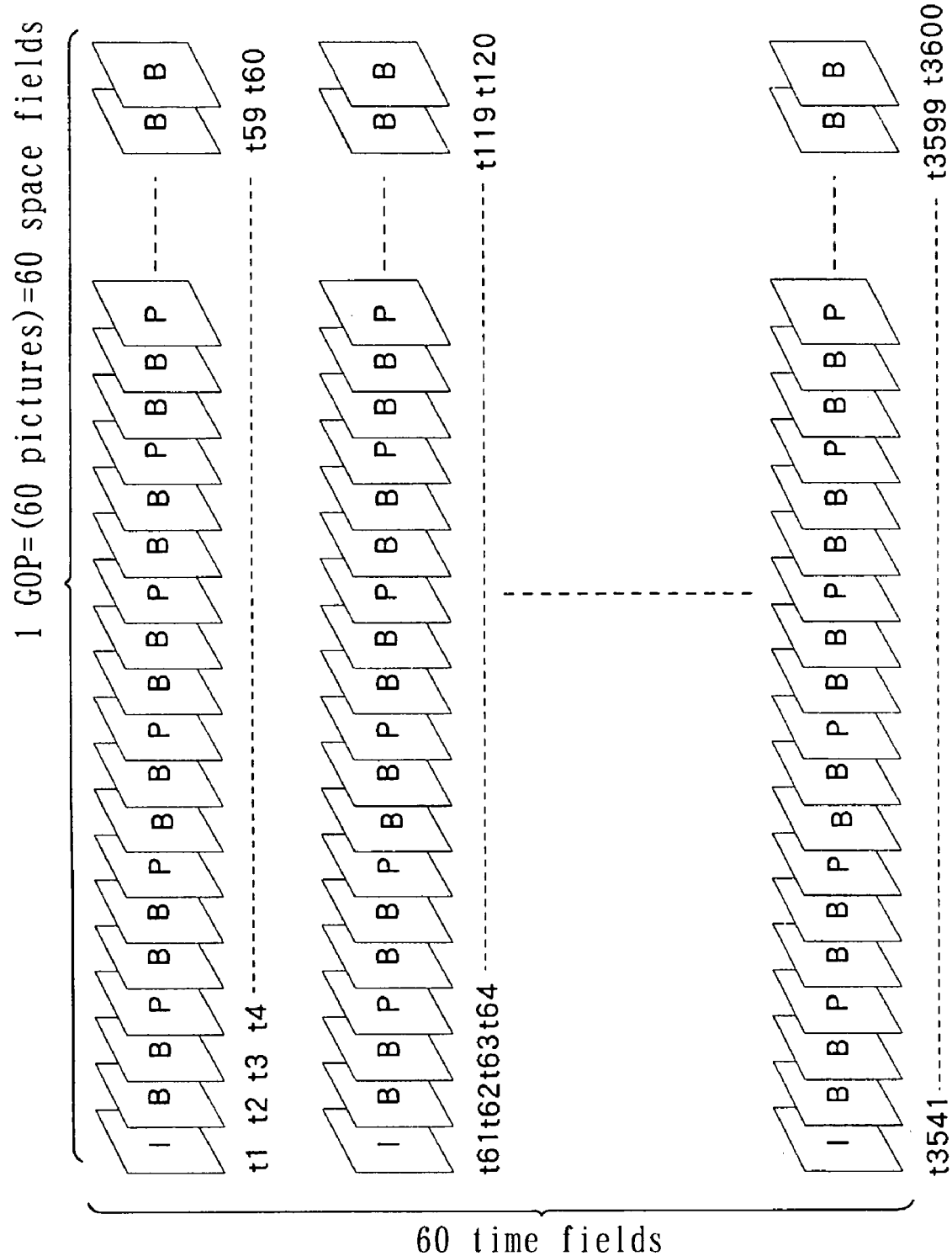

FIG. 63

THREE-DIMENSIONAL IMAGE DISPLAY

TECHNICAL FIELD

The present invention relates to a three-dimensional image display capable of displaying a stereoscopic image in a space.

BACKGROUND ART

Various proposals have recently been made on techniques for displaying a stereoscopic image as a result of the progress of optical technologies. One of such techniques is two-glass type three-dimensional viewers such as IMAX THEATER (trademark) capable of presenting stereoscopic display to a user who wears dedicated eyeglasses to see an image formed by an image for the left eye and an image for the right eye in an overlapping relationship. This apparatus can present stereoscopic display in the form of a stereogram utilizing parallax between left and right eyes.

Stereoscopic display is also performed with holography utilizing coherent light from a laser or the like. This technique is to display a stereoscopic image by forming a hologram on a dry plate or the like using object light and reference light in advance and by irradiating the hologram with the original reference light to obtain reproduction light.

Further, there are lens plate three-dimensional image display techniques represented by the so-called IP (integral photography) method. There is a proposal made by Lippmann in which a photographic dry plate is provided on a focal surface of a lens plate called "fly-eye lens" constituted by a multiplicity of small convex lenses; object light is exposed through the lens plate to record a multiplicity of small object images on the photographic dry plate; and the photographic dry plate is thereafter developed, placed in exactly the same position as its initial position and irradiated with light on the back surface thereof.

Among the above techniques, the above-described stereoscopic viewers are inconvenient for a viewer because he or she must wear dedicated eyeglasses and are not suitable for observation for a long time because they present unnatural images which are likely to give fatigue. In order to solve this problem, stereoscopic televisions have recently been proposed which do not require any dedicated eyeglasses. However, techniques for stereoscopic views of this type only present pseudo-stereoscopic display utilizing parallax between left and right eyes and do not allow three-dimensional display in a true sense. Therefore, although an image can be represented with a stereoscopic sense in the horizontal direction of a screen, it can not be represented with a stereoscopic sense in the vertical direction and, for example, can not be viewed by a person who is lying down. Further, since those are techniques utilizing parallax, a change of a view point only results in a view of the same image with a stereographic sense (a sense of depth), and a side of an object will not appear even if the viewer moves the head to look at the object from left and right sides thereof.

The above-described technique for presenting stereoscopic display utilizing holography involves a large scale apparatus at a high manufacturing cost because of the requirement for coherent light from a laser or the like and also results in a reduction of image quality attributable to speckle interference patterns which are characteristic of lasers. Further, holography is suitable for still images but unsuitable for three-dimensional display of dynamic images because it presents stereoscopic display of an object utilizing a hologram formed on a photographic dry plate in advance. This equally applies to the above-described IP method in that it is unsuitable for dynamic images because it involves a step of recording a multiplicity of small object images on a photographic dry plate in advance.

As described above, it has been difficult to provide televisions and very large displays installed in the street, stadiums or the like capable of presenting stereoscopic dynamic images in a true sense.

DISCLOSURE OF THE INVENTION

The present invention has been made taking such problems into consideration, and it is an object of the invention to provide a three-dimensional image display capable of presenting stereoscopic display in a true sense not only for a still image but also for a dynamic image without any need for a dedicated eyeglass or coherent light.

A three-dimensional image display according to a first aspect of the invention has: two-dimensional image forming means formed by arranging a plurality of pixels, capable of forming a two-dimensional image by driving each of the pixels; and three-dimensional image forming means for forming a three-dimensional image in a space based on the two-dimensional image formed by the two-dimensional image forming means.

In this three-dimensional image display, a three-dimensional image is formed in a space by the three-dimensional image forming means based on a two-dimensional image formed by driving the plurality of pixels of the two-dimensional image forming means.

A three-dimensional image display in a first mode according to the first aspect of the invention has a configuration wherein the two-dimensional image forming means includes a plurality of two-dimensional image forming elements each of which is formed by arranging a plurality of pixels and is capable of forming a two-dimensional image, and wherein the three-dimensional image forming means includes: a light diffusing element provided in a face-to-face relationship with each of the plurality of two-dimensional image forming elements, the light diffusing element allowing light which has exited the respective two-dimensional image forming elements and has impinged thereupon to exit to the space in a diffused state; and display control means for controlling the two-dimensional image forming elements such that the light which has exited the light diffusing elements forms a multiplicity of point light source images that form a three-dimensional image in the space.

In the three-dimensional image display in the first mode, light which has entered the light diffusing elements from the respective two-dimensional image display elements exits to the space in a diffused state. The multiplicity of point light source images that form a three-dimensional image to be displayed are formed by those beams of exit light.

In the three-dimensional image display in the first mode, the display control means may control the display operation of the two-dimensional image forming elements by supplying data of two-dimensional images two-dimensionally representing a three-dimensional image to be displayed as a whole or in part from view points different from each other to the respective two-dimensional image forming elements, thereby forming the multiplicity of point light source images in the space with the light which has exited the light diffusing elements.

In the three-dimensional image display in the first mode, the light diffusing element may be formed with a converging portion capable of converging incident light at one point and a planer exit surface located at the converging point defined by the converging portion. An entrance surface of the converging portion of the light diffusing element may include an aspherical surface having a convex configuration on the entrance side thereof or a spherical surface whose center of curvature is located at the converging point. Alternatively, the converging portion of the light diffusing element may include a Fresnel lens. The converging portion of the light diffusing element may have a configuration in which it converges light with an interference fringe formed on the entrance surface thereof. In the three-dimensional image display in the first mode, the light diffusing element may be formed as a plate-like body or film with an interference fringe in a predetermined pattern formed thereon and may be provided with a function of converging incident light at one point or diverging incident light as if it were diffused from one point.

In a three-dimensional image display in a second mode according to first aspect of the invention, the two-dimensional image forming means includes: a plurality of two-dimensional image forming elements each of which is formed by arranging a plurality of pixels and is capable of forming a two-dimensional image, and the three-dimensional image forming means includes: a microscopic opening provided in a face-to-face relationship with each of the plurality of two-dimensional image forming elements, the microscopic opening allowing light which has exited the respective two-dimensional image forming elements and has impinged thereupon to pass through as it is; and display control means for controlling the two-dimensional image forming elements such that the light which has exited the microscopic opening forms a multiplicity of point light source images that form a three-dimensional image in the space.

In the three-dimensional image display in the second mode, light which has exited the two-dimensional image forming elements exits to the space through the respective microscopic opening. The multiplicity of point light source images that form a three-dimensional image to be displayed are formed in the space by those beams of exit light.

In the three-dimensional image display in the second mode, the display control means may control the two-dimensional image forming elements by supplying data of two-dimensional images two-dimensionally representing a three-dimensional image to be displayed as a whole or in part from view points different from each other to the respective two-dimensional image forming elements, thereby forming the multiplicity of point light source images in the space with the light which has exited the microscopic opening.

A three-dimensional image display in a third mode according to the first aspect of the invention has a configuration wherein the two-dimensional image forming means includes: a two-dimensional image forming panel formed by arranging a plurality of pixels, capable of forming a two-dimensional image by driving each of the pixels, and wherein the three-dimensional image forming means includes: an optically opening/closing cell array formed by arranging a plurality of optically opening/closing cells, the optically opening/closing cell array being provided in a face-to-face relationship with the two dimensional image forming panel and allowing light which has exited the pixels of the two-dimensional image forming panel and has impinged thereupon to pass through as it is or blocking the same; optically opening/closing cell control means for scanning the optically opening/closing cell array to control the optically opening/closing cells such that they sequentially enter an open state; and display control means for controlling the two-dimensional image forming panel such that an image forming range of the two-dimensional image forming panel is sequentially shifted in synchronism with the scan of the optically opening/closing cell array by the optically opening/closing cell control means and such that light which has exited pixels in the image forming range and has passed through the optically opening/closing cells in the open state of the optically opening/closing cell array forms a multiplicity of point light source images that form a three-dimensional image in the space.

In the three-dimensional image display in the third mode, the optically opening/closing cell array is scanned and controlled such that the optically opening/closing cells sequentially enter the open state, and control is performed such that the image forming range of the two-dimensional image forming panel is sequentially shifted in synchronism with the scan. The multiplicity of point light source images that form a three-dimensional image to be displayed are formed in the space by light which has exited the pixels in the sequentially shifted image display range and which has passed through the optically opening/closing cells in the open state of the optically opening/closing cell array.

In the three-dimensional image display in the third mode, the display control means may control the two-dimensional image forming panel by supplying data of two-dimensional images two-dimensionally representing a three-dimensional image to be displayed as a whole or in part from view points different from each other to the respective pixels in the image forming range of the two-dimensional image forming panel, thereby forming the multiplicity of point light source images in the space with the light which has passed through the optically opening/closing cells in the open state.

The three-dimensional image display in the third mode may have a configuration wherein a plurality of basic units including a pair of the two-dimensional image forming panel and the optically opening/closing cell array are arranged and wherein the optically opening/closing cell control means is provided for the optically opening/closing cell array of each of the basic units, the optically opening/closing cell control means controlling scan of the optically opening/closing cell array such that the optically opening/closing cells of the optically opening/closing cell arrays in positions associated with each other enter the open state in synchronism with each other, the display control means controlling the two-dimensional image forming panel such that the image forming ranges of the two-dimensional image forming panels of the plurality of basic units are shifted in synchronism with the scan of the optically opening/closing cell array by the optically opening/closing cell control means and such that light which has exited pixels in the image forming ranges and has passed through the optically opening/closing cells in the open state of the optically opening cell arrays associated with each other forms a multiplicity of point light source images that form a three-dimensional image in the space.

In this three-dimensional image display, a plurality basic units having the two-dimensional image forming panel and optically opening/closing cell array are arranged. The optically opening/closing cell arrays of the plurality of basic units are scanned in parallel to perform control such that the optically opening/closing cells in positions associated with each other enter the open state in synchronism with each other. Control is performed such that the image forming ranges of the two-dimensional image forming panels of the plurality of basic units are shifted in parallel (simultaneously) in synchronism with the parallel scan of the plurality of optically opening/closing cell arrays. Light which has exited the pixels in the image forming ranges passes through the optically opening/closing cells in the open state of the respective optically opening/closing cell arrays, and the multiplicity of point light source images that form a three-dimensional image to be displayed are formed in the space by those beams of transmitted light.

In this three-dimensional image display, the display control means may control the two-dimensional image forming panel by supplying data of two-dimensional images two-dimensionally representing a three-dimensional image to be displayed as a whole or in part from view points different from each other to the respective pixels in the image forming ranges of the two-dimensional image forming panels of the plurality of basic units, thereby forming the multiplicity of point light source images in the space with the light which has passed through the optically opening/closing cells in the open state.

A three-dimensional image display in a fourth mode according to the first aspect has a configuration wherein the two-dimensional image forming means includes image formation control means for controlling an image forming operation such that a two-dimensional image formed thereby changes with time, and wherein the three-dimensional image forming means includes deflecting means for deflecting the projecting direction of the two-dimensional image such that the projecting direction of the two-dimensional image formed by the two-dimensional image forming means changes in accordance with time-dependent changes of the two-dimensional image.

In the three-dimensional image display in the fourth mode, the projecting direction of the two-dimensional image changing with time formed by the two-dimensional image forming means is deflected such that the projecting direction changes in accordance with the time-dependent changes of the two-dimensional image. As a result, after-images of the two-dimensional image projected in various directions provide a view of a three-dimensional image in the space.

In the three-dimensional image display in the fourth mode, the deflecting means may include a transmission direction variable type liquid crystal element in which liquid crystal molecules are aligned in the direction of an electric field to achieve a function of allowing light to be transmitted only in the direction of the electric field.

The three-dimensional image display may further have diffusing means for diffusing the projecting direction of a two-dimensional image in a direction which is different from the direction of deflection by the deflecting means. In the three-dimensional image display, the image formation control means may control the image forming operation such that the magnification of a two-dimensional image in the deflecting direction thereof in accordance with the projecting direction of the two-dimensional image deflected by the deflecting means.

In the three-dimensional image display in the fourth mode, the two-dimensional image forming means may further include: receiving means for receiving encoded two-dimensional image data; and decoding means for decoding the two-dimensional image data received by the receiving means. When the deflecting means periodically performs the operation of deflecting the projecting direction of a two-dimensional image, the encoded two-dimensional encoded data received by the receiving means may include: first compressed image data provided in a position in timing in synchronism with the period of the deflecting operation of the deflecting means and obtained by compressing and encoding two-dimensional still image data independently; and second compressed encoded data provided in a position adjacent to the first compressed encoded data and constituted by differential data representing the difference from the first compressed encoded data.

In the three-dimensional image display in the fourth mode, the image formation control means may be enabled to form a two-dimensional image in halftones by performing at least either pixel driving control on a time division basis or pixel driving control on a spatial basis. The deflecting means may deflect the projecting direction of light which is being transmitted thereby. Further, the deflecting means may deflect the projecting direction of incident light when it reflects the same. The deflecting means may be formed by arranging a plurality of rotatably disposed prisms or reflecting mirrors.

In the three-dimensional image display in the fourth mode, the deflecting means may be formed utilizing a hologram which can deflect incident light in a direction associated with the position of incidence. In this case, the deflecting means may sequentially deflect incident light by shifting the hologram in directions different from the direction of incidence of the light. The deflecting means may include a plurality of sets of the holograms which are regularly arranged.

In the three-dimensional image display in the fourth mode, the hologram may be formed on a plate-like member. In this case, the deflecting means may sequentially deflect incident light by reciprocating the plate-like member in a direction different from the direction of incidence of the light.

In the three-dimensional image display in the fourth mode, the hologram is formed on a film-like member. In this case, the deflecting means may sequentially deflect incident light by shifting the film-like member in one direction different from the direction of incidence of the light.

In the three-dimensional image display in the fourth mode, the hologram may be formed on a predetermined curved surface. For example, the curved surface may be a cylindrical surface.

In the three-dimensional image display in the fourth mode, the deflecting means may be formed using a light transmitting member whose thickness is locally changed in accordance with a signal voltage applied thereto to produce irregularities on the surface thereof.

In the three-dimensional image display in the fourth mode, the deflecting means may deflect the projecting direction of a two-dimensional image by deflecting light before it is subjected to image formation by the two-dimensional image forming means. In this case, the deflecting means may include a rotary reflecting body or refracting body. The deflecting means may include a light source which reciprocates and an optical system for guiding light emitted by the light source to the two-dimensional image forming means. The deflecting means may include a light source which can change the emitting direction of light in accordance with time-dependent change of a two-dimensional image formed by the two-dimensional image forming means.

In a three-dimensional image display in a fifth mode according to the first aspect of the invention, the two-dimensional image forming means includes: a plurality of two-dimensional image forming elements each of which is formed by arranging a plurality of pixels and is capable of forming a two-dimensional image, and the three-dimensional image forming means includes: a plurality of point light sources which are respectively provided in a face-to-face relationship with the plurality of two-dimensional image forming elements and which emit light having directivity such that the respective two-dimensional image forming elements are illuminated by light diffusing from one point; and display control means for controlling the two-dimensional image forming elements and the point light sources such that a three-dimensional image is formed by the light which has been emitted by the point light sources and has passed through the two-dimensional image forming elements.

In the three-dimensional image display in the fifth mode, a three-dimensional image is formed by the light which has been emitted by the point light sources and which has passed through the two-dimensional image forming elements.

In the three-dimensional image display in the fifth mode, the display control means may control the two-dimensional image forming elements by supplying data of two-dimensional images two-dimensionally representing three-dimensional image to be displayed as a whole or in part from view points different from each other to the respective two-dimensional image forming elements.

In a three-dimensional image display in a sixth mode according to the first aspect of the invention, the two-dimensional image forming means includes a two-dimensional image forming panel that is formed by arranging a plurality of pixels and is capable of forming a two-dimensional image by driving each of the pixels, and the three-dimensional image forming means includes: a plurality of point light sources which are provided in a face-to-face relationship with the two-dimensional image forming panel and which emit light having directivity such that respective predetermined ranges of the two-dimensional image forming panel are illuminated by light diffusing from one point; and display control means for controlling the two-dimensional image forming panel and the point light sources such that an image forming range of the two-dimensional image forming panel is sequentially shifted and such that the image forming range is illuminated by light emitted by the respective point light source to form a three-dimensional image with the light which has passed through the image forming range.

In the three-dimensional image display in the sixth mode, a three-dimensional image is formed by the light which has been emitted by the point light sources and which has passed through the image forming range of the two-dimensional image forming panel.

In the three-dimensional image display in the sixth mode, the display control means may control the two-dimensional image forming panel by supplying data of two-dimensional images two-dimensionally representing a three-dimensional image to be displayed as a whole or in part from view points different from each other to respective pixels in the image forming range of the two-dimensional image forming panel.

A three-dimensional image display according to a second aspect of the invention has: two-dimensional image forming means for forming a plurality of two-dimensional images with light which has been subjected to time-modulation based on information on a plurality of two-dimensional images; and three-dimensional image forming means for forming a three-dimensional image by projecting the plurality of two-dimensional images formed by the two-dimensional image forming means in directions different from each other.

In this three-dimensional image display, the two-dimensional image forming means forms a plurality of two-dimensional images with the light which has been subjected to time modulation based on information on a plurality of two-dimensional images, and the three-dimensional image forming means forms a three-dimensional image by projecting the plurality of two-dimensional images formed by the two-dimensional image forming means in directions different from each other.

In the three-dimensional image display according to the second aspect of the invention, the two-dimensional image forming means may form the two-dimensional images by scanning modulated light. In this case, the three-dimensional image forming means may project the plurality of two-dimensional images in directions different from each other by reflecting the light scanned by the two-dimensional image forming means in different directions in accordance with positions of incidence. The three-dimensional image forming means may have a region in which position information used for controlling the positions of incidence of the light scanned by the two-dimensional image forming means is recorded. The three-dimensional image forming means may further have a region in which synchronization information for synchronized control of the display as a whole is recorded.

A three-dimensional image display according to a third aspect of the invention has: two-dimensional image forming means for forming a plurality of two-dimensional images by emitting light carrying information on a plurality of two-dimensional images; and three-dimensional image forming means for forming a three-dimensional image by projecting the light emitted by the two-dimensional image forming means in different directions in accordance with positions of incidence to project the plurality of two-dimensional images in directions different from each other. The three-dimensional image forming means has a region in which position information used for controlling the positions of incidence of the light emitted by the two-dimensional image forming means is recorded.

In this three-dimensional image display, the two-dimensional image forming means emits light carrying information on a plurality of two-dimensional images to form a plurality of two-dimensional images, and the three-dimensional image forming means projects the light emitted by the two-dimensional image forming means in different directions in accordance with the positions of incidence, which results in projection of the plurality of two-dimensional images in directions different from each other to form a three-dimensional image. In this three-dimensional image display, since the three-dimensional image forming means has the region in which position information used for controlling the positions of incidence of the light emitted by the two-dimensional image forming means is recorded, it is possible to control the positions of incidence of light upon the three-dimensional image forming means.

In the three-dimensional image display according to the third aspect of the invention, the three-dimensional image forming means may further have a region in which synchronization information for synchronized control of the display as a whole is recorded.

The above and other objects, features and advantages of the invention will become sufficiently apparent from the following description.

BRIEF DESCRIPTION OF THE DRAWINGS

FIG. 5 is an illustration for explaining how a stereoscopic image is displayed by the three-dimensional image display.

FIG. 8 shows partial image data (sliced data) sliced according to the procedure shown in FIG. 7.

FIG. 9 shows inverted data obtained by inverting the sliced data shown in FIG. 8.

FIG. 11 is an illustration for explaining how point light source images are formed in a space by the three-dimensional image display.

FIG. 44 is an illustration for explaining a principle behind image width modulation.

FIG. 45 is an illustration for explaining the principle behind image width modulation.

FIGS. 46A through 46C are illustrations for explaining the principle behind image width modulation.

FIG. 47 illustrates a method of compressing image data according to the MPEG.

FIG. 63 illustrates the operation of the three-dimensional image display shown in FIG. 57.

BEST MODES FOR CARRYING OUT THE INVENTION

Preferred embodiments of the present invention will now be described with reference to the drawings.

First Embodiment

Figure 1:
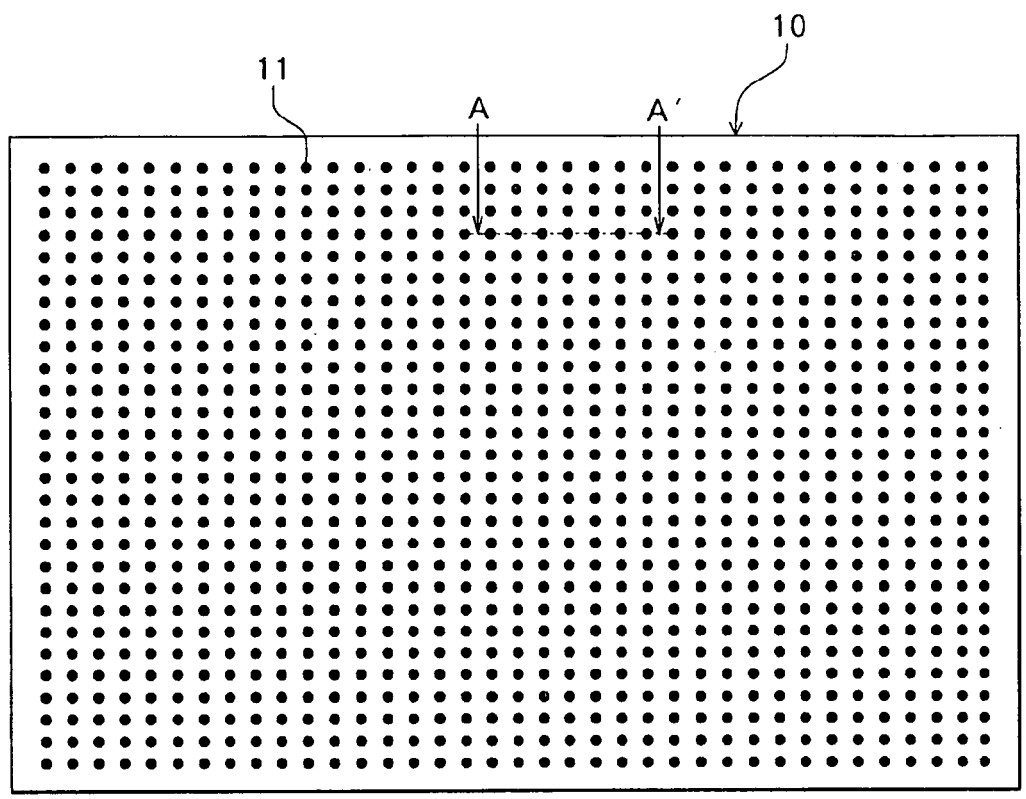
FIG. 1 is a front view of a three-dimensional image display according to a first embodiment of the invention showing a configuration of the same.
Figure 2:
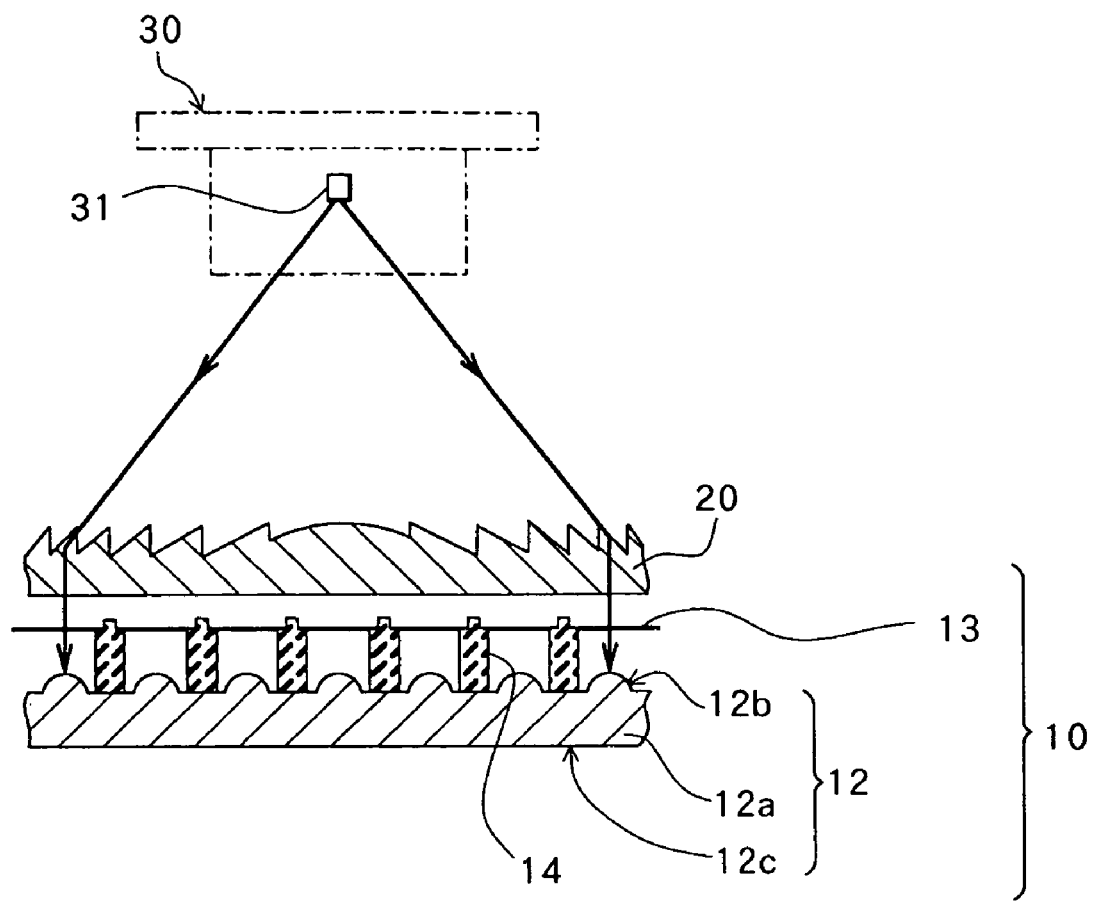
FIG. 2 is a sectional view of a major part of the three-dimensional image display.
Figure 3:
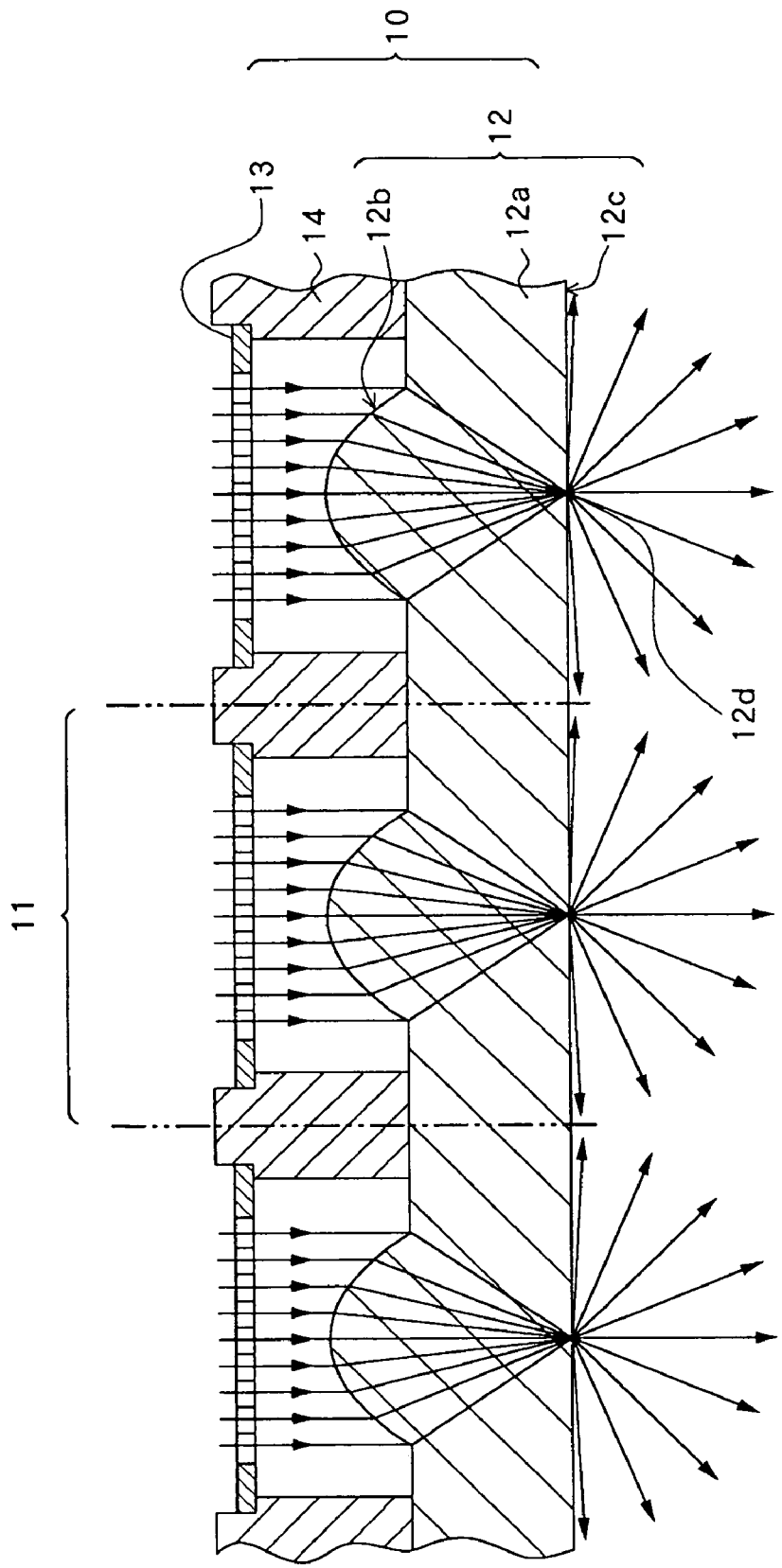
FIG. 3 is an enlarged sectional view of a major part of the three-dimensional image display.

FIG. 1 shows a frontal structure of a three-dimensional screen forming a part of a three-dimensional image display according to the present embodiment. FIG. 2 shows a sectional structure of the three-dimensional image display taken along the line A-A' in FIG. 1. FIG. 3 is an enlarged view of a part of the sectional structure of the three-dimensional display screen shown in FIG. 2. As shown in FIG. 1, the three-dimensional display screen 10 has screen dots 11 arranged in the form of a matrix at constant intervals in each of the horizontal direction (lateral direction of the figure) and the vertical direction (vertical direction of the figure). As shown in FIGS. 2 and 3, the three-dimensional display screen 10 has: a multiplicity of light diffusing elements 12 formed of a transparent material that allows visible light to pass through with substantially no loss and arranged in the form of a matrix; and liquid crystal display elements (hereinafter referred to as "LCDs") 13 provided in a face-to-face relationship with entrance surfaces 12b of the light diffusing elements 12 to be described later.

Each of the light diffusing elements 12 has a base portion 12a, an entrance surface 12b formed on one side of the base portion 12a in the form of an outward convexity and an exit surface 12c formed as a flat surface on another side of the base portion 12a. The entrance surface 12b is formed as an aspherical surface such as a parabolic surface having a convex configuration on the entrance side. It is preferable to form all of the light diffusing elements 12 integrally with each other. The entrance surfaces 12b correspond to the "converging portion" according to the invention, and the exit surfaces 12c correspond to the "exit surface" according to the invention.

Each of the LCDs 13 is configured like a matrix in which, for example, 15 pixels (liquid crystal cells) and 9 pixels are arranged in the horizontal and vertical directions, respectively and is secured to a light diffusing element 12 with a support member 14. FIG. 3 shows only 9 pixels in the horizontal direction and 9 beams of light for convenience. The invention is not limited to those numbers of pixels, and any modification may be made appropriately. Each pixel of an LCD 13 is driven in accordance with image data which represent the whole or each part of a three-dimensional image to be displayed as a two-dimensional still image from each of view points different from each other. One screen dot 11 is formed by a pair of a light diffusing element 12 and an LCD 13.

As shown in FIG. 2, one collimator lens 20 is provided behind the three-dimensional display screen 10 in association with each group of a plurality of screen dots 11, and a light source portion 30 having light emitting diodes 31 is provided behind the collimator lens 20. Light emitted by the light emitting diode 31 is transformed by the collimator lens 20 into parallel beams of light which impinge upon the LCDs 13. For example, the collimator lens 20 may be constituted by a Fresnel lens or the like as shown in FIG. 2.

As shown in FIG. 3, the parallel beams of light which have exited the collimator lens 20 are selectively modulated when passing through the liquid crystal cells forming the pixels of the LCD 13, incident upon the entrance surfaces 12b of the light diffusing elements 12, and refracted by the entrance surfaces 12b to converge at one point on the exit surface 12c (converging point 12d). The light converged at the converging point 12d is further refracted thereby to exit into the space in a substantially uniform diffused state. For example, let us assume here that the numerical aperture (NA) of the entrance surface 12b of the light diffusing element 12 is 0.55 and that the refractive index of the base portion 12a is 1.80. Then, an effective numerical aperture for light that is converged by the entrance surface 12a at the converging point 12d is 1.0, i.e., 0.55×1.80=1.0. Therefore, the light converged at the converging point 12d is diffused at an angle of 180 deg. when it is into the space from the exit surface 12c. That is, diffuse light exits to the space from the converging point 12d serving as a point light source. The LCDs 13 correspond to the "two-dimensional image forming element" according to the invention, and the light diffusing elements 12 correspond to the "light diffusing element" according to the invention.

Figure 4:
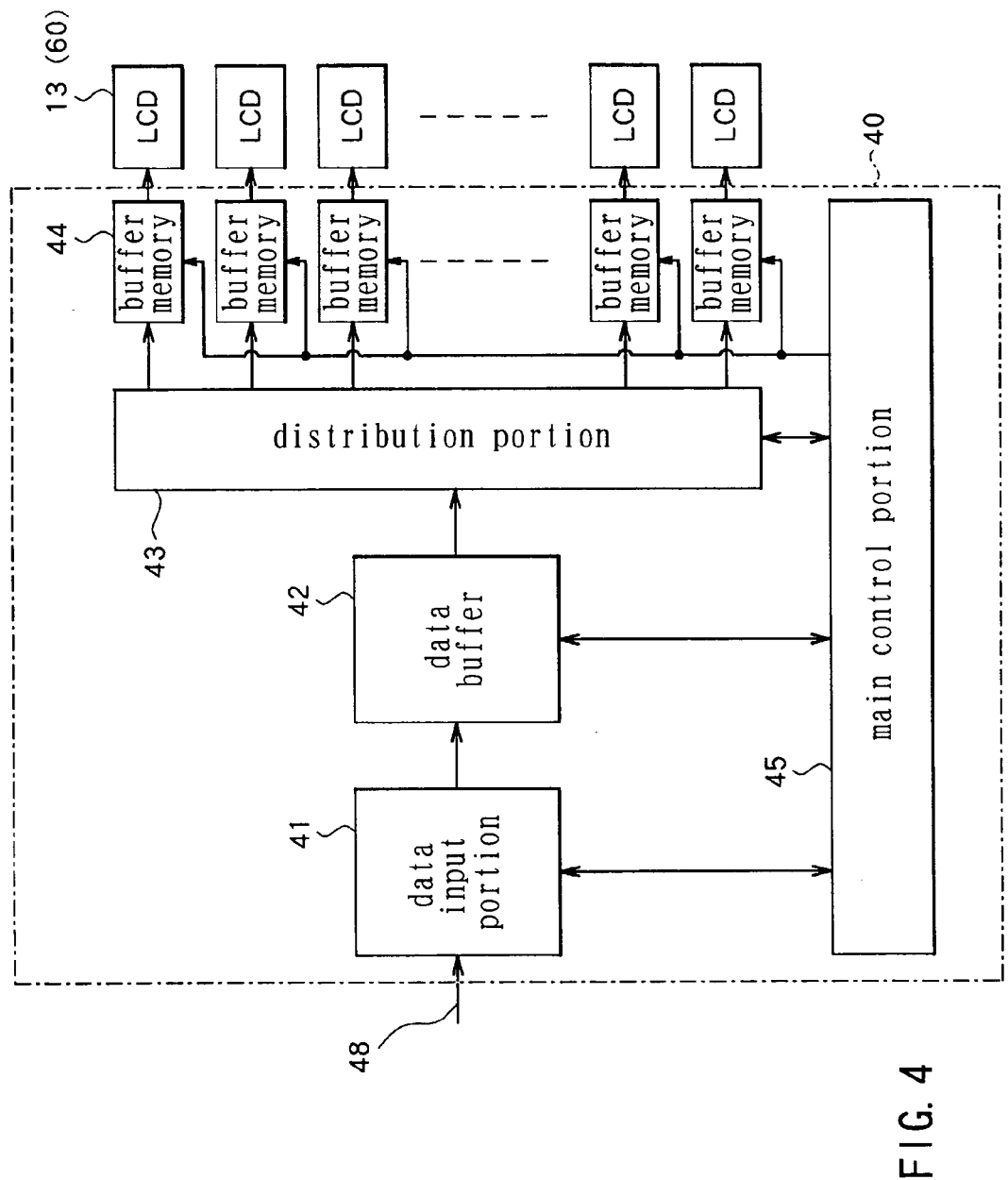
FIG. 4 is a block diagram showing a schematic configuration of a display control circuit for controlling a display operation of the three-dimensional image display.

FIG. 4 shows a display control circuit for controlling display on the three-dimensional display screen 10 having the above-described configuration. The display control circuit 40 has: a data input portion 41 for inputting two-dimensional still image data 48 constituted by a plurality of partial image data; a data buffer 42 for temporarily storing the input two-dimensional still image data 48; a distribution portion 43 for distributing and outputting the two-dimensional still image data 48 stored in the data buffer 42 as a plurality of partial image data; buffer memories 44 for temporarily storing the respective partial image data output by the distribution portion 43 and for outputting the partial image data to the respective LCDs 13 simultaneously at predetermined timing; and a main control portion 45 for controlling the above-described portions. As described in a specific example to follow, partial image data are data generated by inverting data which represent each part of a three-dimensional still image to be displayed on a two-dimensional basis from each of view points different from each other. The term "inversion" in this context means not only inversion of an image in the vertical and horizontal directions but also inversion in the direction of depth (i.e., a direction perpendicular to the three-dimensional display screen 10 in the case of display on the three-dimensional display screen 10). Such inversion is carried out in advance to prevent an ultimately obtained spatially stereoscopic image from coming with inverted convexities and concavities as seen on a death mask taking inversion of the original image (image supplied to the LCDs 13) by the light diffusing elements 12 into account. The above-mentioned predetermined timing is timing instructed by the main control portion 45. The display control circuit 40 corresponds to the "display control means" according to the invention.

A description will now be made with reference to FIGS. 1 through 5 on the operation of the three-dimensional image display having the above-described configuration. FIG. 5 illustrates a state in which the three-dimensional display screen 10 is viewed directly from above. FIG. 5 omits the light source portion 30 and collimator lens 20 shown in FIG. 2.

First, in an image processor which is not shown, a plurality of sets of partial image data are generated by inverting image data that represent each part of a three-dimensional image to be displayed from each of view points different from each other and are input to the data input portion 41 (FIG. 4) of the display control circuit 40 as two-dimensional still image data 48. For example, while the "partial image data" are obtained by photographing an object each time a constant distance is traveled by a camera which moves relative to the object (e.g., from the left side to the right side of the object), the data may be generated using computer graphics. Alternatively, the data may be a CT (computerized tomography) scan image or a roentgen image obtained using X-rays or even an image obtained using an ultrasonic diagnostic apparatus. To display a three-dimensional dynamic image, a plurality of sets of partial image data as described above are generated for each of three-dimensional images representing a continuous scene and are sequentially input to the data input portion 41.

The two-dimensional still image data 48 input to the data input portion 41 are temporarily stored in the data buffer 42 and are thereafter distributed and output by the distribution portion 43 to the respective buffer memories 44 as partial image data to be temporarily stored respectively. The partial image data stored in those buffer memories 44 are simultaneously output to the respective LCDs 13 in synchronism with an output timing signal from the main control portion 45.

As shown in FIG. 2, light emitted by the light emitting diodes 31 of the light source portion 30 is transformed by the collimator lenses 20 into parallel beams of light which in turn vertically impinge upon the LCDs 13. As shown in FIG. 3, light incident upon each pixel is subjected to intensity modulation in accordance with image data associated therewith among the partial image data and then exits as it is perpendicularly to the pixel. The intensity modulation performed at each pixel may be modulation into two levels, i.e., "0" and "1" or may alternatively be multi-level modulation into three or more levels.

As shown in FIG. 3, beams of light exiting the pixels of the LCDs 13 impinge upon the entrance surfaces 12b of the respective light diffusing elements 12 by which they are refracted to converge at the converging points 12d on the respective exit surface 12c and are thereafter diffused to exit into the space. As a result, as shown in FIG. 5, a multiplicity of point light source images P are formed by beams of light exiting the light diffusing elements 12 of the respective screen dots 11 in the space in front of the three-dimensional display screen 10. Those point light source images are distributed not only in the horizontal and vertical directions of the three-dimensional display screen 10 but also in the direction of the depth thereof to form a three-dimensional still image as a whole. It is therefore possible for a viewer Q located in front of the three-dimensional display screen 10 to view a stereoscopic spatial image R in that space.

At this time, when the magnitude of modulation at pixels of the LCDs 13 associated with each other is varied at each of the screen dots 11, the intensity of the point light source images P viewed by the viewer Q varies depending on the viewing direction. In this case, therefore, even variation of luminance depending on the movement of the view point can be represented. For example, it is possible to represent a state of reflection of light on a metal surface faithfully.

In the example shown in FIG. 5, since the diffusing angle of light exiting the light diffusing elements 12 of the screen dots 11 in the horizontal direction is substantially nearly 180 deg., the field angle is also nearly 180 deg. Therefore, the viewer Q can take a view of lateral sides of the spatial image R by moving to the left and right.

By performing the above-described process in a cycle at a high speed (e.g., about 1/30 of a second) for each of three-dimensional still images having a continuous content, a three-dimensional dynamic image can be rendered in a space in front of the three-dimensional display screen 10 (FIG. 5), and the viewer Q can view a realistic stereoscopic dynamic image as a result of an after-image phenomenon in his or her eyes.

A specific example of the present embodiment will now be described with reference to FIGS. 6 through 11.

Figures 6A, 6B:
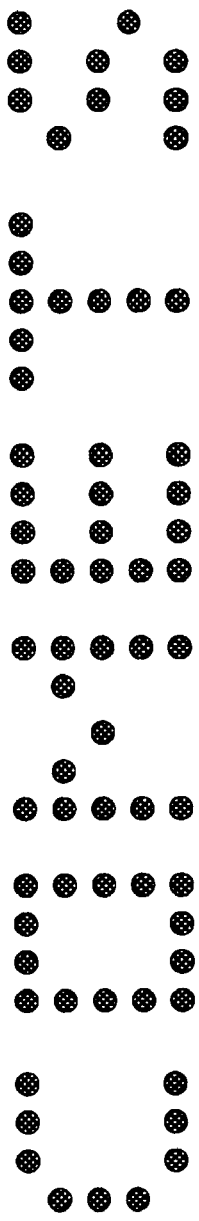
FIG. 6A shows an example of an image to be displayed by the three-dimensional image display.
FIG. 6B shows image data obtained by converting the image to be displayed into binary values.

For simplicity of the description, this specific example will describe display of planar characters "COMETS" as shown in FIG. 6A in a space. As shown in FIG. 6A, an image of the characters "COMETS" is divided into 31 pixels in the horizontal direction and 5 pixels in the vertical direction. Then, as shown in FIG. 6B, each pixel is represented by binary data "0" or "1". The data "1" represents a light point pixel, and the data "0" represents a dark point pixel. Numbers X1 through X31 are assigned to the pixels in the horizontal direction, and numbers Y1 through Y5 are assigned to the pixels in the vertical direction.

Figure 7:
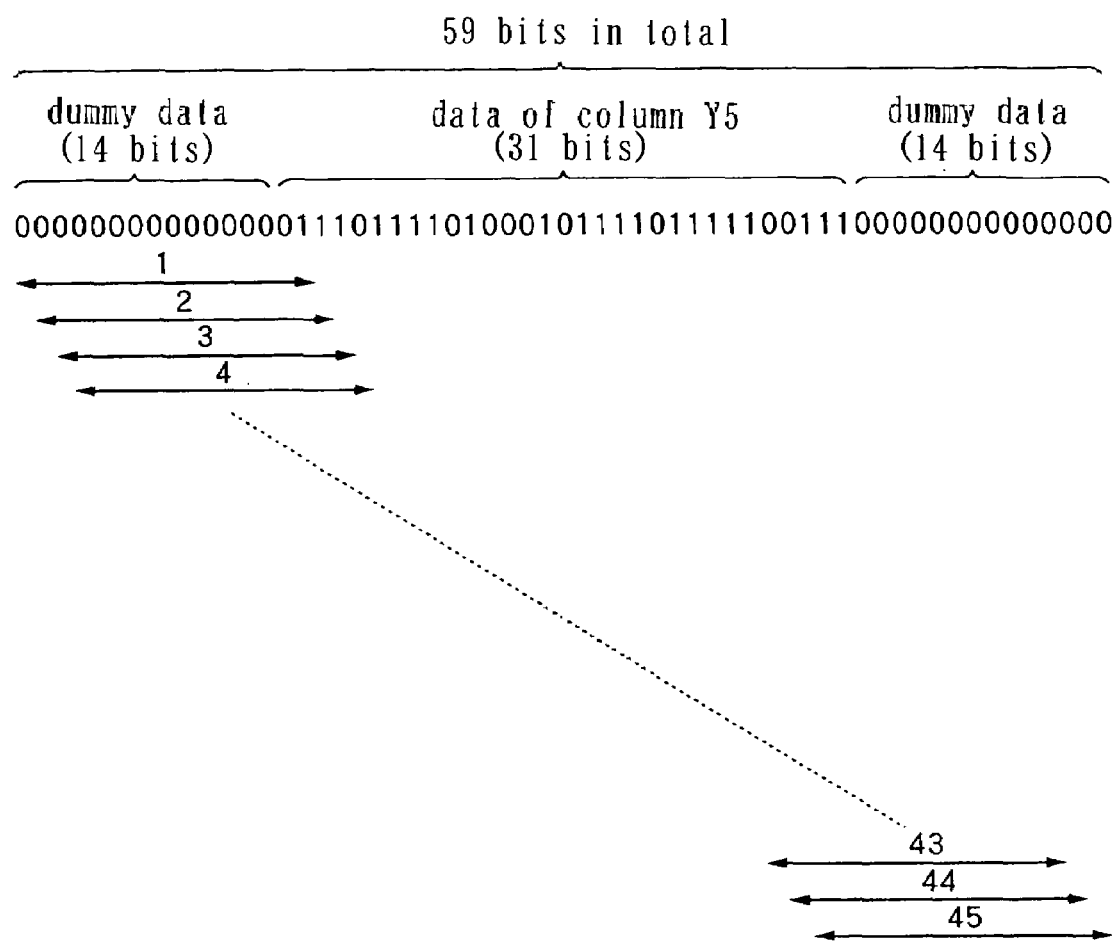
FIG. 7 is an illustration for explaining a procedure for slicing partial image data from image data.

Next, 15 bits of data are sliced off from each of the data in the horizontal direction. When the data in the row Y1 in FIG. 6B is considered by way of example, as shown in FIG. 7, 14 bits of dummy data are added on each of the left and right sides of 31 bits of original data to provide 59 bits of data in total, and 15 bits of data are sliced off by sequentially shifting it bit by bit from the left end.

The reason for adding the 14 bits of dummy data on each of the left and right sides of the original data is as follows. Specifically, as shown in part (a) of FIG. 11, in order to provide proper display of 7 dots on each of the left and right sides of the spatial image, too, additional 7 screen dots 11 are required in the horizontal direction of the three-dimensional display screen 10 on each of the left and right sides of 31 screen dots 11 corresponding to the number of horizontal pixels of the image "COMETS" to be displayed. Therefore, 45+14=59 spatial dots are formed in total when virtual spatial dots (14+14) which are not displayed in practice are considered, and 59 bits of data are required accordingly. Part (a) of FIG. 11 illustrates a positional relationship between the three-dimensional display screen 10 and each dot (point light source image) of the spatial image, and part (b) of FIG. 11 illustrates the spatial image which appears in front of the three-dimensional display screen 10. Part (a) of FIG. 11 shows a state of the three-dimensional display screen 10 as viewed from directly above the same, and part (b) of FIG. 11 shows the state as viewed at front ways. Part (a) of FIG. 11 omits the light source portion 30 and collimator lens 20 shown in FIG. 2. Part (a) of FIG. 11 shows only the uppermost row of dots of the spatial image in part (b) of FIG. 11 and represents dots which actually appear (point light source images) with black dots (•).

In this specific example, as shown in FIG. 8, 45 sets of 15 bit data are sliced off from the 59 bits of data in total.

Next, an inverting process is performed to replace high order and low order bits (left and right sides of FIG. 8) with each other for each of the 45 sets of sliced data shown in FIG. 8, which provides 45 sets of inverted data as shown in FIG. 9. The screen dot numbers in FIG. 9 are numbers assigned to the screen dots 11 of the three-dimensional display screen 10 shown in FIG. 11 in an ascending order starting with the dot at the left end.

The above-described process is similarly performed on the data in each of the rows Y2 through Y5 in FIG. 6B to obtain 45 sets of inverted data as shown in FIG. 9 for each of the rows. The inverted data obtained for the rows Y1 through Y5 are respectively supplied to the LCDs 13 of the screen dots 11 having numbers corresponding thereto. The inverted data for the row Y1 are sequentially supplied to the lowermost row of pixels of the LCDs 13 starting with the pixel at the left end as viewed from the front side of the three-dimensional display screen 10, and the inverted data for the row Y5 are sequentially supplied to the uppermost row of pixels of the LCDs 13 starting with the pixel at the left end. That is, the data supplied to the LCDs 13 are inverted not only in the horizontal direction but also in the vertical direction. More specifically, for example, the bits of the inverted data "000000000000000" for the screen dot D1 among the inverted data for the row Y1 shown in FIG. 9 are sequentially supplied to the lowermost row of pixels of the LCD 13 at the screen dot D1 (FIG. 11) starting with the pixel at the left end, and the bits of the inverted data "100000000000000" for the screen dot D2 are sequentially supplied to the lowermost row of pixels of the LCD 13 at the screen dot D2 starting with the pixel at the left end. This equally applies to the other screen dots D3 through D45.

Figure 10:
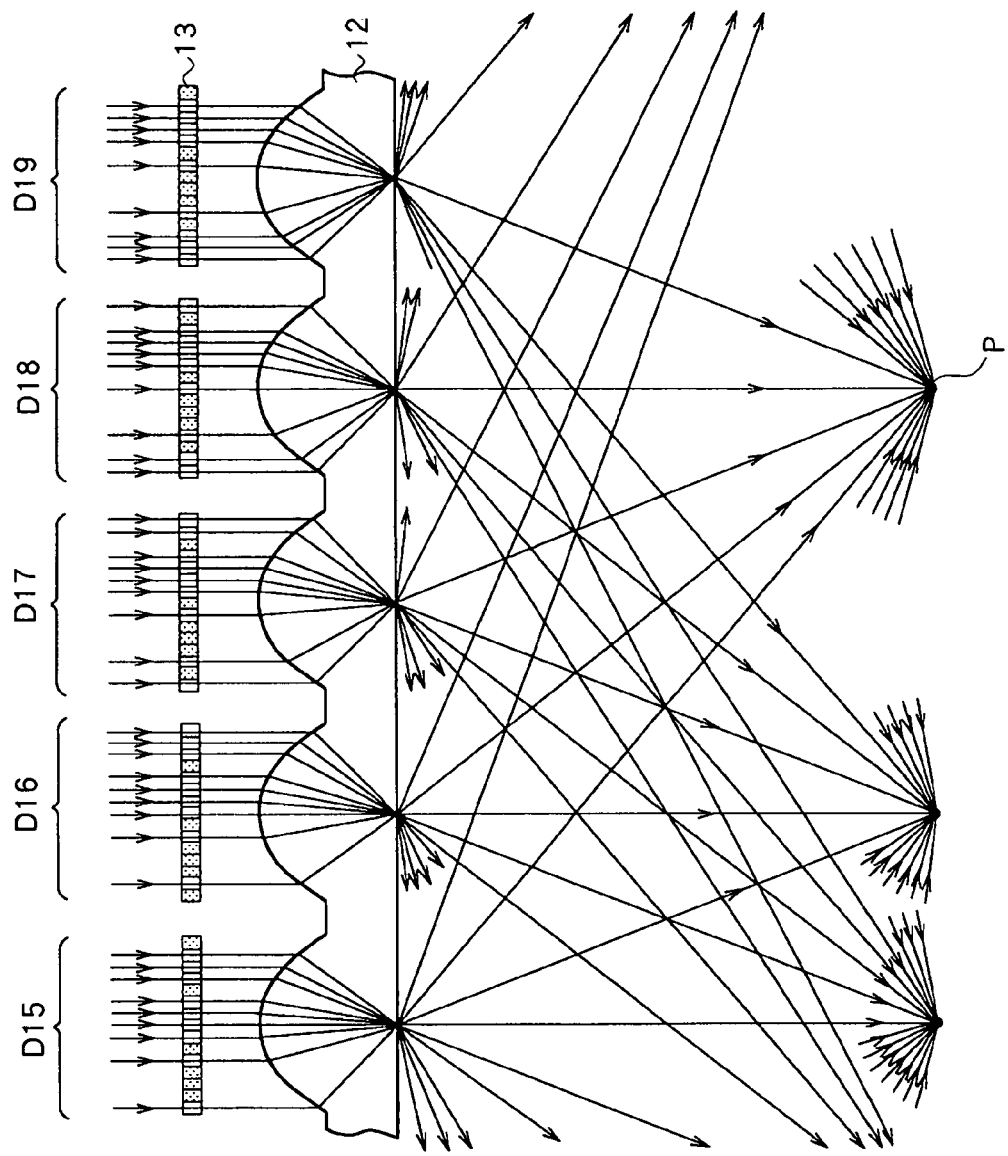
FIG. 10 is a sectional view for explaining operations of a major part of the three-dimensional image display.

FIG. 10 shows a state in which the inverted data for the row Y1 are supplied to the LCDs 13 at the screen dots D15 through D19 to drive the respective lowermost rows of pixels. In this figure, the shaded pixels are in a "0" state (closed state), and the unshaded pixels are in a "1" state (open state). As shown in the figure, beams of light that have passed through pixels in the open state of the LCD 13 of each of the screen dots 11 exit the light diffusing element 12 in respective predetermined directions to form a multiplicity of point light source images P in a space in front of the three-dimensional display screen 10. As shown in FIGS. 10 and 11, in this specific example, up to 15 beams of light exit each of the screen dots 11. In other words, each of the point light source images P is always formed by beams of light from 15 screen dots 11.

Figure 12:
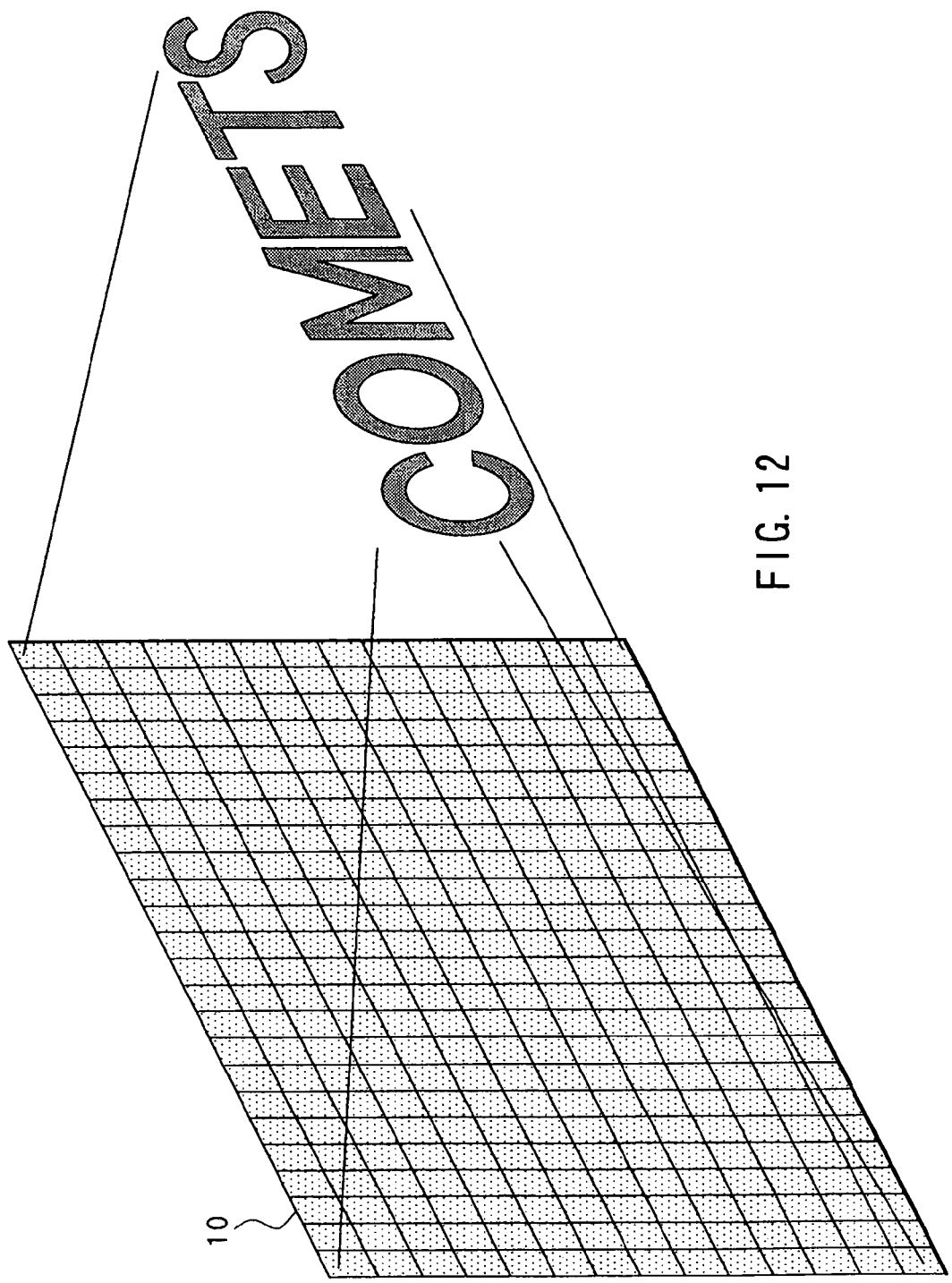
FIG. 12 shows a state in which a planar image is formed in a space by the three-dimensional image display.
Figure 13:
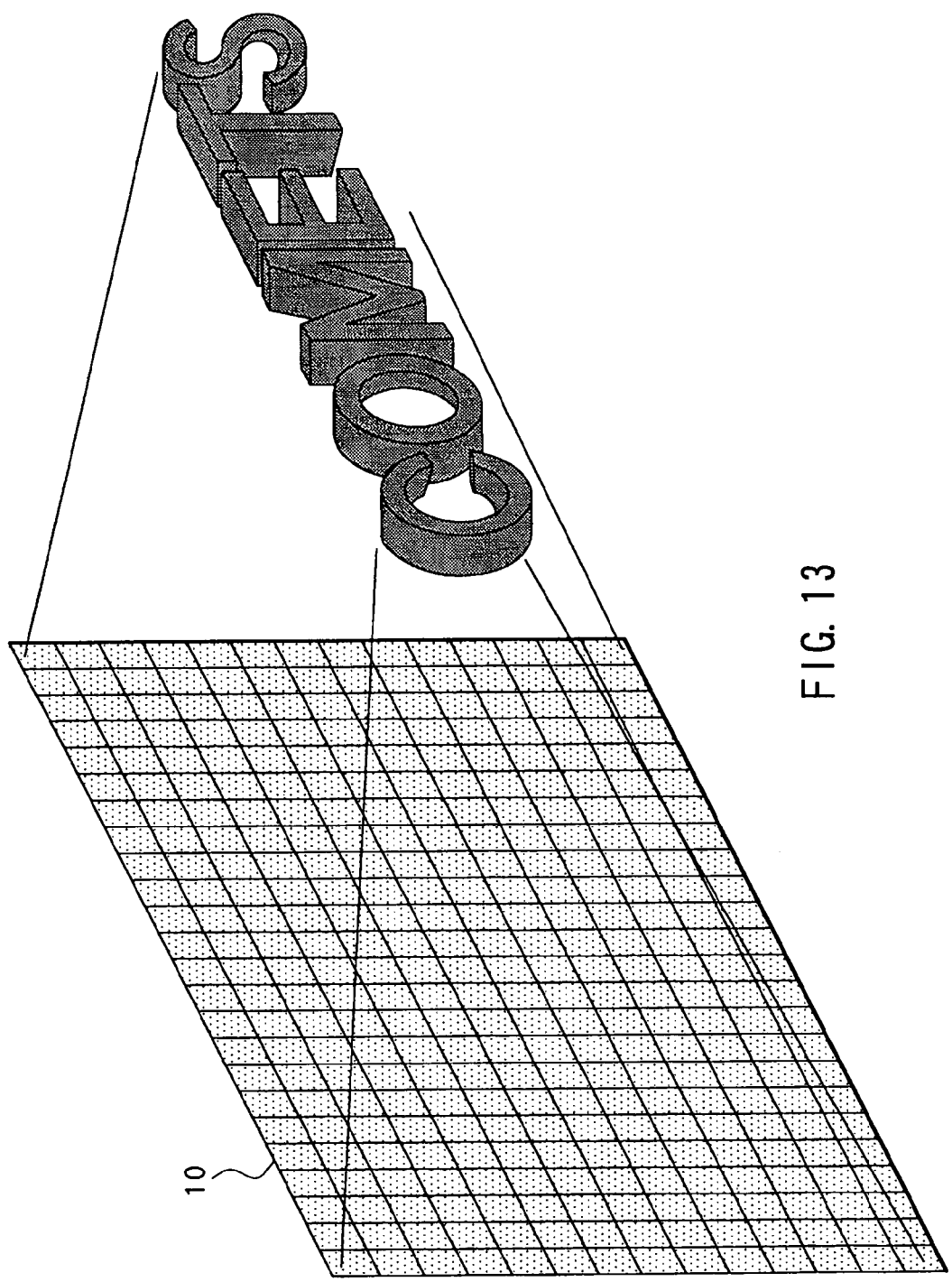
FIG. 13 shows a state in which a stereoscopic image is formed in a space by the three-dimensional image display.

FIG. 12 is an air view of a state in which planar characters "COMETS" have appeared in a space in front of the three-dimensional display screen 10. As shown in this figure, in this specific example, since the original image is a planar image of characters, the image displayed as if it were floating in the space also looks planar and has no depth. On the contrary, when the original image is stereoscopic characters "COMETS", as shown in FIG. 13, stereoscopic characters "COMETS" having a depth can be presented in the space in front of the three-dimensional display screen 10.

Figure 14:
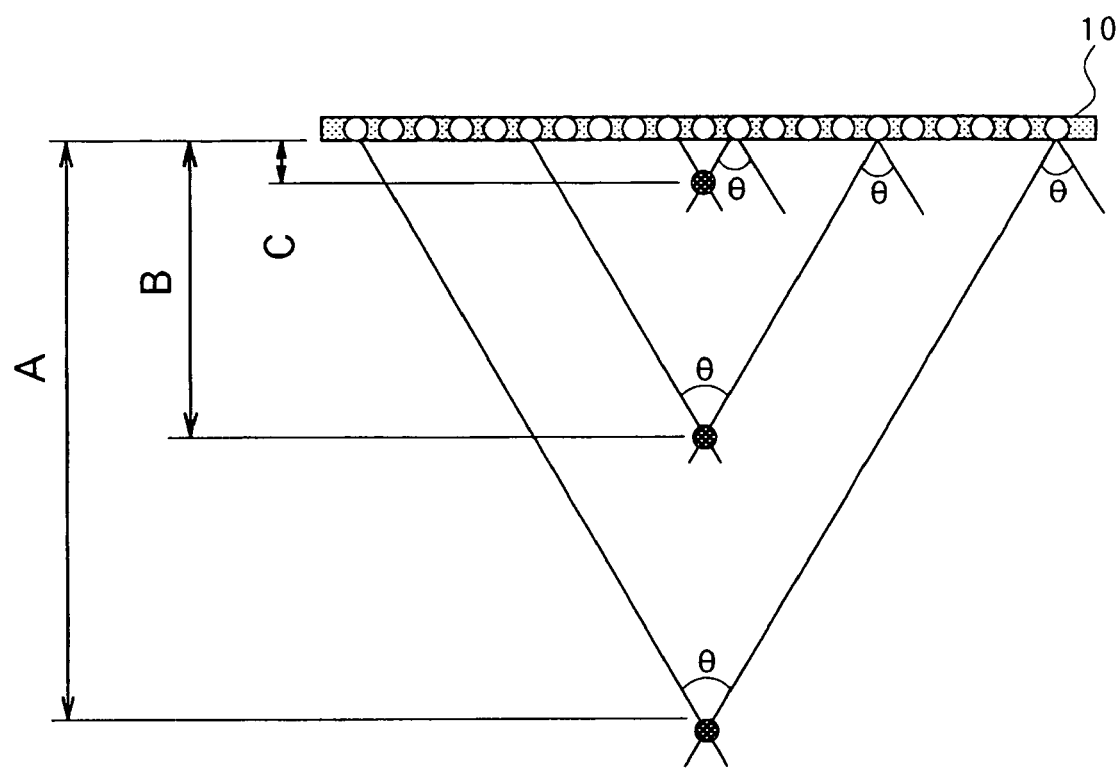
FIG. 14 shows a relationship between the distances of point light source images from a three-dimensional display screen and angular resolutions when the field angle is kept constant.

Normally, a configuration is employed in which all of the screen dots 11 of the three-dimensional display screen 10 are equal in the angle of diffusion therefrom, i.e., the field angle. In this case, as shown in FIG. 14, light exiting a greater number of screen dots 11 contributes to the formation of a spatial dot (point light source image), the further the spatial dot is from the three-dimensional display screen 10. For example, let us assume that a field angle θ is constant in all positions in the space in front of the three-dimensional display screen 10 as shown in the same figure. Then, while one spatial dot is formed by screen dots 11 in a quantity as great as 21 in a position at a great distance A from the three-dimensional display screen 10, one spatial dot is formed by screen dots 11 in a smaller quantity, i.e., 11 in a position at a smaller distance B from the three-dimensional display screen 10. Further, one spatial dot is formed by screen dots 11 in a quite small quantity, i.e., 3 in a position at a still smaller distance C from the three-dimensional display screen 10. Therefore, a viewer Q can view a stereoscopic image that appears in a space closer to him or her (a space further from the three-dimensional display screen 10) with an angular resolution higher than that of a stereoscopic image that appears in a space further from him or her (a space closer to the three-dimensional display screen 10). Here, an angular resolution indicates a cycle of an angle of movement of the view point of a viewer Q in which a point light source image P appears and disappears when the viewer moves the view point horizontally or vertically relative to the point light source image P.

While the data are sliced off by shifting them bit by bit as shown in FIG. 7 in the specific example illustrated here, the slicing may be carried out by shifting two or more bits at a time. In this case, the number of bits shifted at a time may be appropriately determined depending on the field angle and the pitch of the screen dots 11.

As described above, in the three-dimensional image display of the present embodiment, electrooptical elements, i.e., the LCDs 13 that allow an easy change of the contents of display are used to form object images, and the object images on the LCDs 13 are projected into a space to form a spatial image, instead of generating a spatial image using a multiplicity of small object images fixedly formed on a photographic dry plate as in the IP method in prior art. This makes it possible to significantly reduce or simplify complicated preparations such as development and installation of a photographic dry plate which have been required after an object is photographed. This is because it is required in the three-dimensional image display of the present embodiment only to generate image data by electrically processing an image obtained in advance through a photographic operation and to supply the data to the LCDs 13.

The three-dimensional image display of the present embodiment can perform display of a stereoscopic dynamic image which has been difficult with the IP method in prior art because the contents of an image supplied to the LCDs 13 can be changed at a high speed.

Further, the three-dimensional image display of the present embodiment is advantageous from the viewpoint of designing and cost because it can employ a non-coherent light source such as the above-described light emitting diode 31 without any need for coherent light as in prior-art apparatuses utilizing a hologram. However, a coherent light source such as a semiconductor laser may obviously be used.

Furthermore, in the three-dimensional image display of the present embodiment, light from the light source portion 30 is caused to impinge upon the LCDs 13 after being transformed into parallel beams of light, and light that has passed through the LCDs 13 is diffused after being temporarily converged at the light diffusing elements 12. Specifically, light from the light source portion 30 almost entirely passes through the LCDs 13 without being diffused and then exits the light diffusing elements 12. The converging points 12*d* of the light diffusing elements 12 can be regarded comparable to a pin hole in a pin hole camera and, consequently, light can be substantially entirely used by converging it at the pin holes except for losses attributable to absorption and reflection at the LCDs 13 and light diffusing elements 12. It is therefore possible to display a three-dimensional spatial image with increased luminance.

In the three-dimensional image display of the present embodiment, the size of the screen dots 11 tends to be relatively large because the size of the light diffusing elements 12 must be equivalent to the size of the LCDs 13. Therefore, the three-dimensional image display of the present embodiment is preferably used as a three-dimensional display with a large screen to be installed in the street, a movie theater, a stadium or the like rather than as a television receiver for home use when the possibility of display with a high luminance and spatial resolution as described above is taken into consideration.

The three-dimensional image display will now be described with reference to several modifications of the same.

Figure 15:
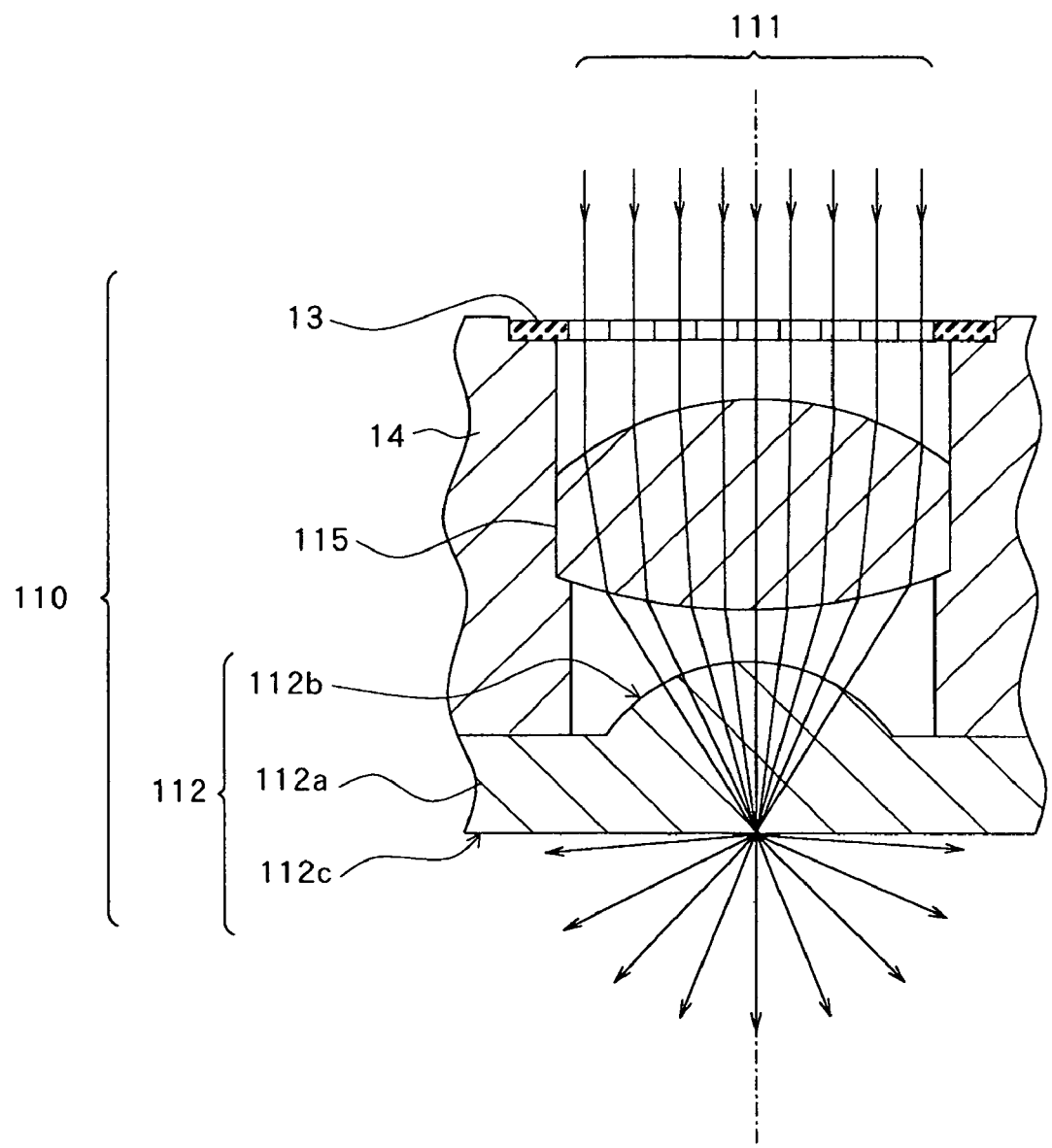
FIG. 15 is a sectional view of a modification of a light diffusing element.

While the entrance surfaces 12*b* of the light diffusing elements 12 are formed as aspherical surfaces such as parabolic surfaces in the example of the present embodiment shown in FIG. 3, the light diffusion elements may be formed as so-called SILs (solid immersion lenses). For example, as shown in FIG. 15, such an SIL is configured by forming an entrance surface 112*b* on a base portion 112*a* as a spherical surface and by providing a converging lens 115 between the entrance surface 112*b* and an LCD 13. In this case, a configuration is employed in which the base portion 112*a* is formed such that the center of curvature of the spherical surface which is the entrance surface 112*b* is located above an exit surface 112*c* of the base portion 112*a* and in which beams of light exiting a converging lens 115 straightly travel without being refracted by the entrance surface 112*b* of the base portion 112*a*. That is, the position of the focal point of the converging lens 115 is matched with the exit surface 112*c*. The configuration is otherwise the same as that of the light diffusing element 12 in FIG. 3, and like components are therefore indicated by like reference numbers.

Figure 16:
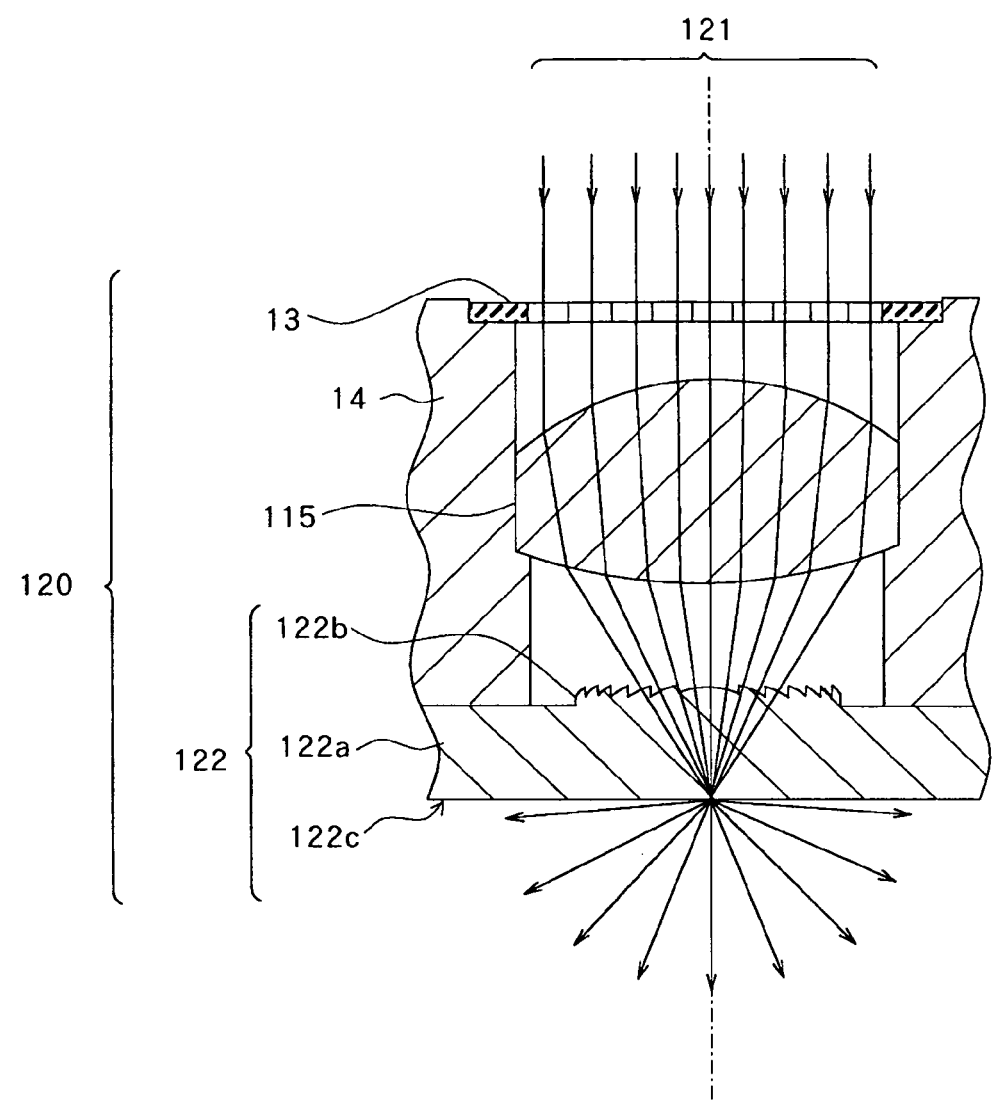
FIG. 16 is a sectional view of another modification of the light diffusing element.

As shown in FIG. 16, a light diffusing element 122 may be configured by providing a Fresnel lens 122*b* having effects equivalent to those of the entrance surface 112*b* instead of the entrance surface 112*b* constituted by a spherical surface in FIG. 15, and screen dots 121 utilizing such light diffusing elements 122 may be arranged on a three-dimensional display screen 120.

Figure 17:
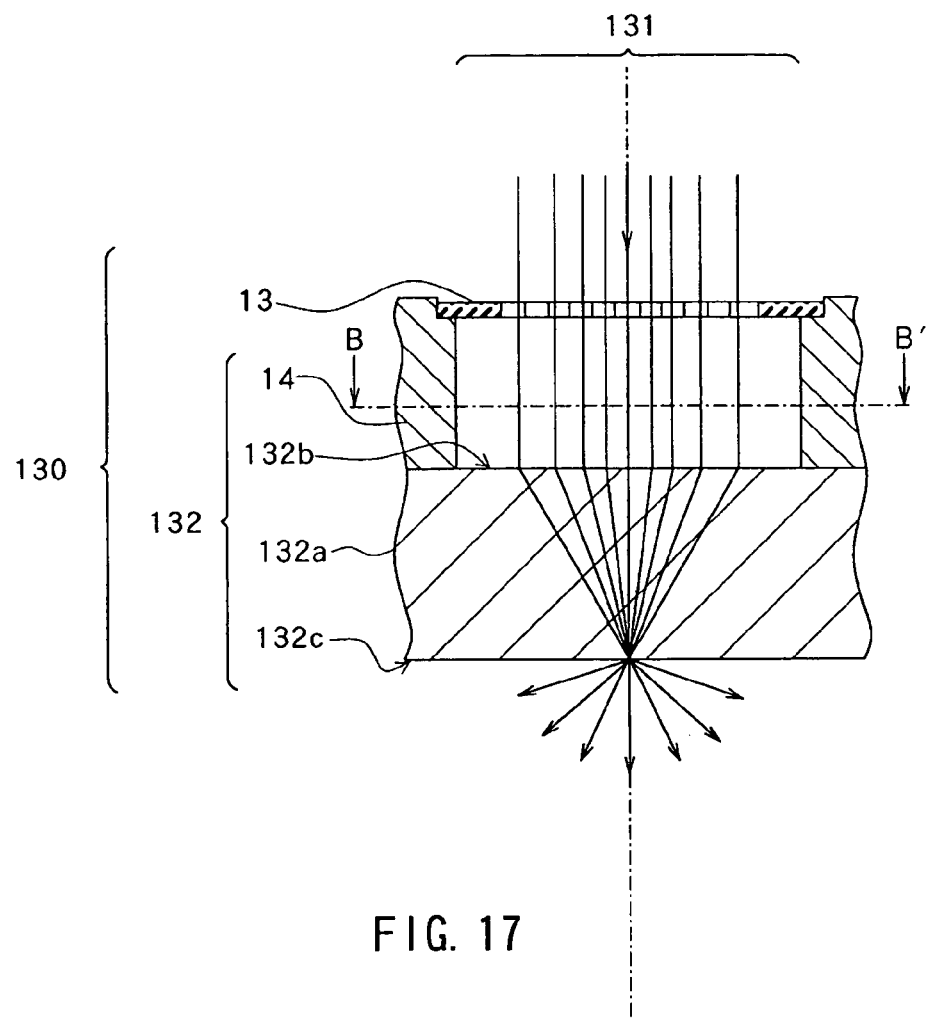
FIG. 17 is a sectional view of still another modification of the light diffusing element.
Figure 18:
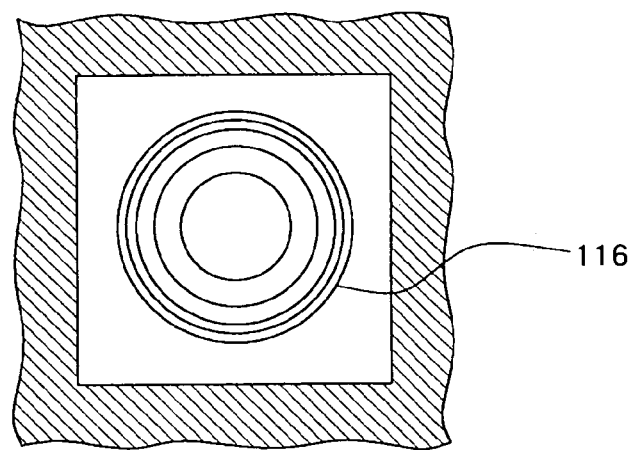
FIG. 18 shows an entrance surface of the light diffusing element shown in FIG. 17.

As shown in FIG. 17, a light diffusing element 132 may be formed with a flat entrance surface 132*b*; a pattern 116 of interference fringes in the form of concentric circles as shown in FIG. 18 may be formed on the entrance surface 132*b*; and screen dots 131 utilizing light diffusing elements 132 having such a configuration may be arranged on a three-dimensional display screen 130. FIG. 18 represents a section taken along the line B-B' in FIG. 17. The configuration is otherwise the same as that in FIG. 3, and like components are therefore indicated by like reference numbers. In a light diffusing element 132 having such a configuration, light incident upon a base portion 132*a* is diffracted by the pattern 116 of interference fringes on the entrance surface 132*b* to be converged on an exit surface 132*c* and is diffused thereby to exit into a space. For example, the pattern 116 of interference fringes on the entrance surface 132*b* may be generated as follows.

First, a three-dimensional interference pattern is calculated for generating desired reproduction light (that is, in this case, beams of light converged on the exit surface 132*c* of the base portion 132*a*) when a recording medium serving as a master is irradiated by reference light for reproduction; the three-dimensional interference pattern is divided into a plurality of partial interference patterns; and reference light for recording and information light for recording are calculated for each of the partial interference patterns. Next, a recording head capable of radiating the reference light for recording and information light for recording is moved with the recording medium transported to form partial holograms by irradiating the recording medium with the reference light for recording and information light for recording using the recording head while changing the relative positional relationship between the recording medium and the recording head, thereby creating a final master hologram recording medium. Next, a multiplicity of hologram replicas can be produced as follows based on the master hologram recording medium thus created. Specifically, both of the above-described master hologram recording medium and an unrecorded recording medium are irradiated by reference light with those recording media overlapped with each other such that reproduction light is generated by holograms in the master hologram recording medium, and an interference generated as a result of interference between the reproduction light generated by each hologram when irradiated by the reference light, and the reference light is recorded in the unrecorded recording medium. This completes a recording medium in which a hologram of an interference pattern that is the inversion of the hologram in the master hologram recording medium is recorded. The above-described replicating step can be performed using the recording medium thus created as a stamp to produce a multiplicity of replicas of the hologram in the original master hologram recording medium.

Any of the light diffusing elements described above as examples has a function of temporarily converging incident light on the exit surface and thereafter diffusing and causing it to exit into a space. For example, while the example in FIG. 3 has a configuration in which light is diffused from point light sources (converging points 12*d*) located on the exit surfaces 12*c* of the light diffusing elements 12 (i.e., the surface of the three-dimensional display screen 10), another configuration may be employed as described below in which light is diffused from point light sources (converging points) located, for example, behind the three-dimensional display screen 10.

Figure 19:
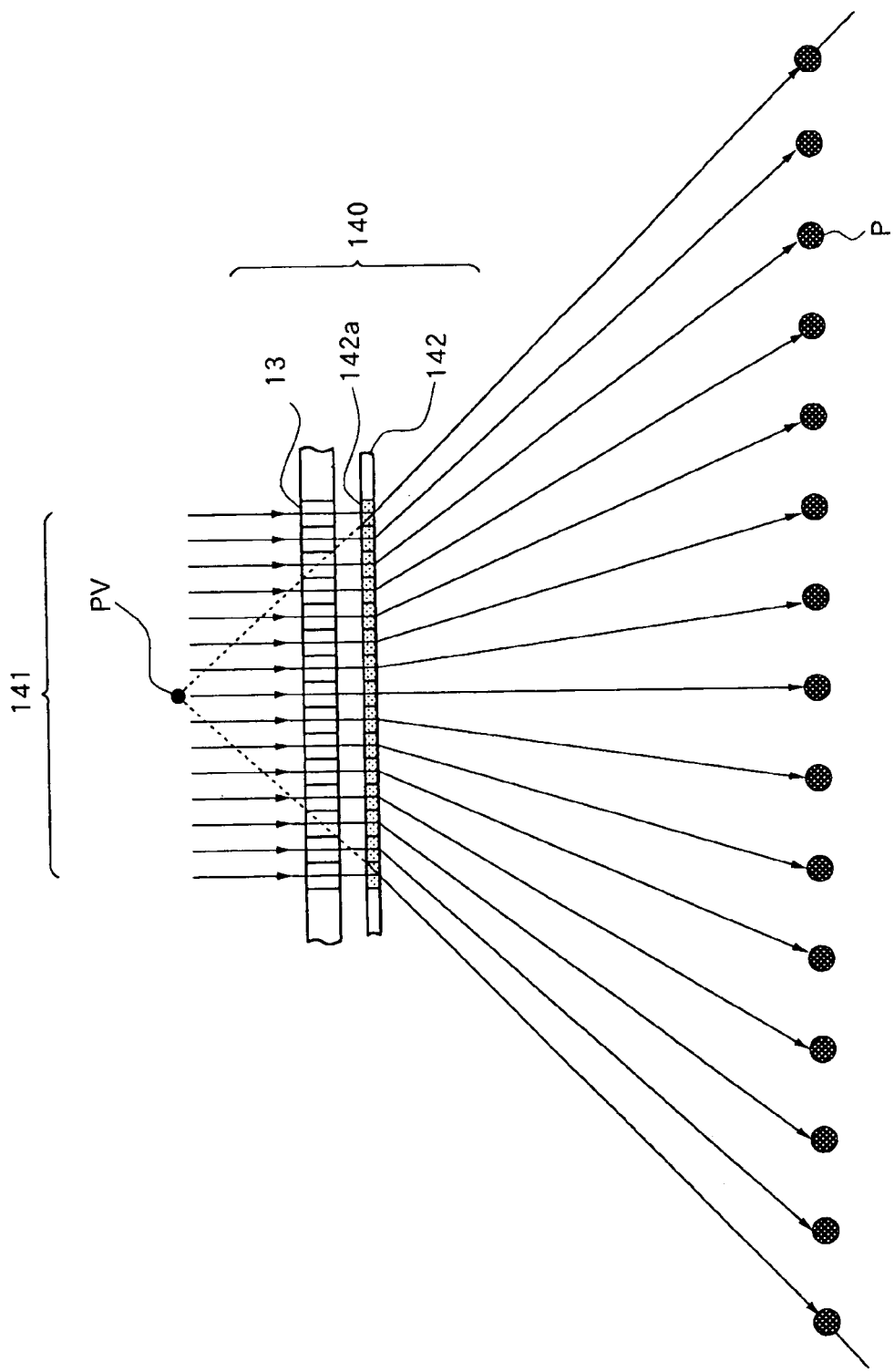
FIG. 19 is a sectional view of still another modification of the light diffusing element.

FIG. 19 schematically shows a sectional configuration of such a light diffusing element. The light diffusing element 142 shown in this figure is a space coordinates specifying element in the form of a sheet configured by arranging a space coordinates specifying cell 142*a* in a position associated with each of the pixels of an LCD 13, and one screen dot 141 is formed by the light diffusing element 142 and LCD 13. The space coordinates specifying cells 142*a* of the light diffusing element 142 have a function of diffracting a beam of light incident thereupon in a direction which is predetermined individually, and can be constituted by so-called volume holograms. The diffracting direction of light is different for each of the space coordinates specifying cells 142*a* and is set such that the light seems as if it were entirely emitted from a virtual point of emission Pv behind a three-dimensional display screen 140.

Specific examples will now be shown on numerical values associated with the light diffusing element 142 having the above-described configuration. Let us assume here that the number of pixels in the horizontal direction of each LCD 13 is set at a practical value (e.g., 1024 pixels) and the field angle is set at, for example, 90 deg. Then, the angular resolution of the light diffusing element 142 is 90 deg./1024 pixels=0.088 deg. The angular resolution of a space coordinates specifying element utilizing a volume hologram normally depends on the thickness of the same and, for example, thicknesses of 100 µm, 500 µm, 1000 µm and 5000 µm result in values of 0.25 deg., 0.05 deg., 0.025 deg. and 0.005 deg., respectively. Therefore, there is a good possibility of providing the light diffusing element 142 with an angular resolution of 0.088 deg. or less as described above by setting the thickness of the same at about 500 µm.

When the screen dot 141 is formed using such a light diffusing element 142, there is no need for the process of inverting (replacing high and low order bits) sliced data (FIG. 8) unlike the case wherein the light diffusing element 12 in FIG. 3 is used, which simplifies a pre-process. This is because light which has passed through the light diffusing element 142 shown in FIG. 19 forms an erected virtual image because it acts like a kind of concave lens, while light which has passed through the light diffusing element 12 in FIG. 3 forms an inverted real image because it acts like a kind of convex lens. Such a light diffusing element 142 constituted by a space coordinates specifying cell 142*a* can be produced and replicated using the same method as that described with reference to FIG. 17.

Figure 20:
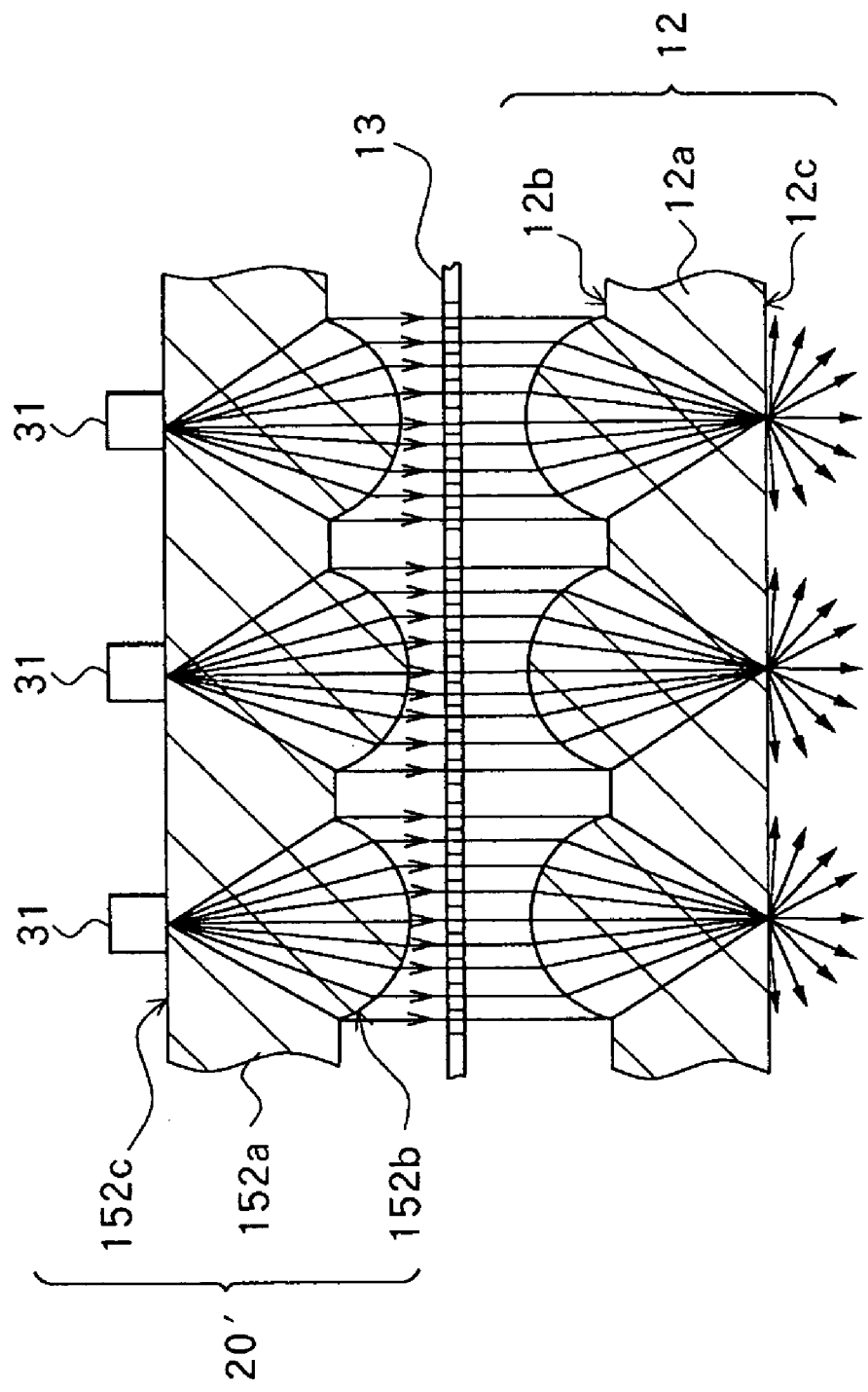
FIG. 20 is a sectional view of a modification of collimator lenses.

While the collimator lens 20 constituted by a Fresnel lens is provided in a face-to-face relationship with each of the plurality of screen dots 11 to transform divergent light from the light source portion 30 into parallel beams of light in FIG. 2 described above, this is not limiting the present invention, and parallel beams of light may be obtained using other configurations. For example, as shown in FIG. 20, a collimator lens 20' having a configuration similar to that of the light diffusing element 12 may be provided for each of the light diffusing elements 12 such that an exit surface 152*b* thereof faces an LCD 13. A base portion 152*a*, exit surface 152*b* and entrance surface 152*c* of the collimator lens 20' correspond to the base portion 12*a*, entrance surface 12*b* and exit surface 12*c* of a light diffusing element 12, respectively. The optical axes of the collimator lenses 20' and light diffusing elements 12 are aligned, and light emitting diodes 31 are provided at the points where the optical axes and the entrance surface 152*c* of the collimator lens 20' intersect. The illustration in the same figure omits the support member 14 which is shown in FIG. 2. In such a configuration, beams of light emitted by the light emitting diodes 31 and diverged in the base portions 152*a* of the collimator lenses 20' are refracted by the respective exit surfaces 152*b* into beams of light in parallel with the central optical axis which vertically impinge upon the LCDs 13. In this modification, a reduction is the number of parts can be achieved because common parts may be used for the light diffusing elements 12 and collimator lenses 20' which have the same configuration.

Second Embodiment

A second embodiment of the invention will now be described.

Figure 21:
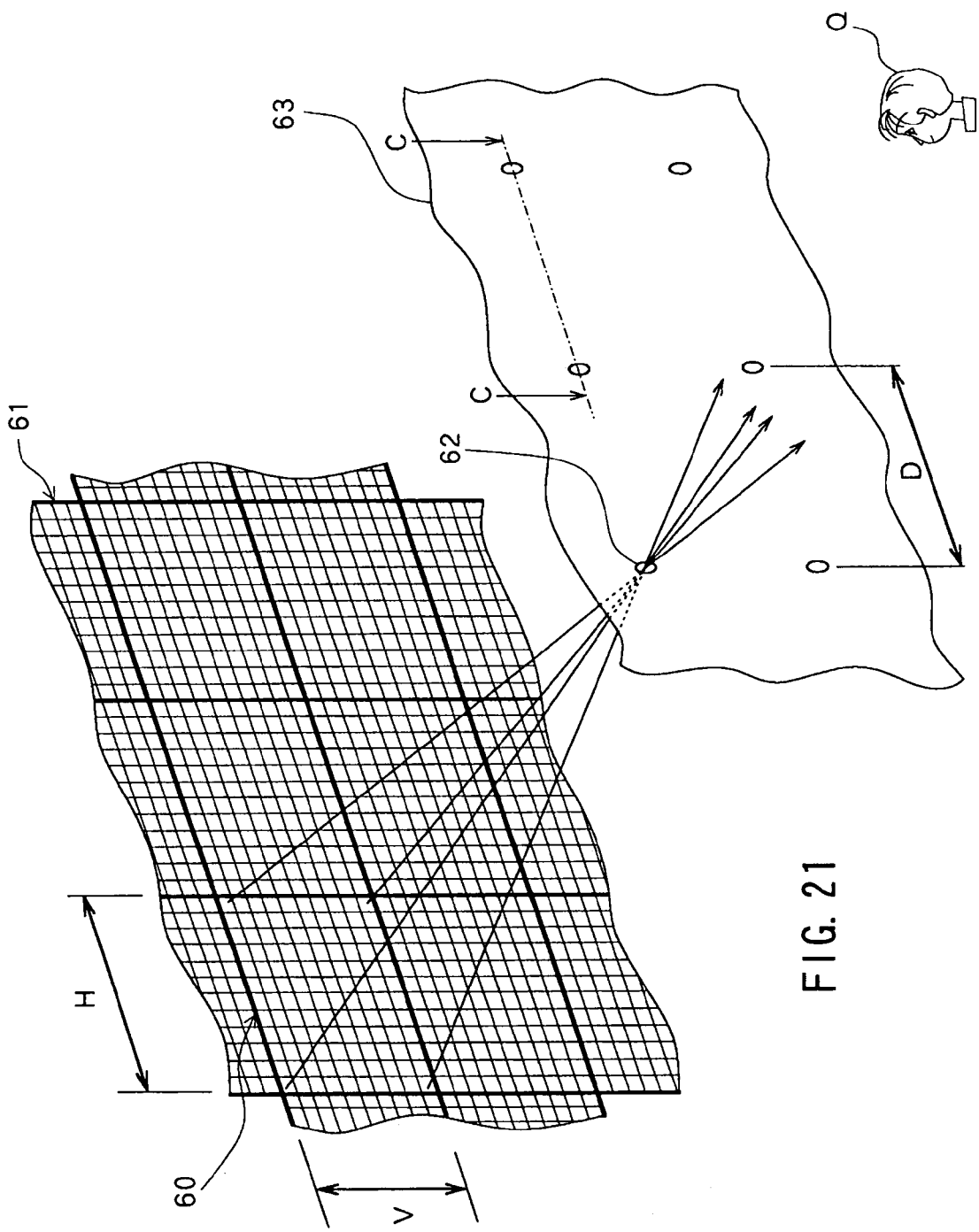
FIG. 21 is a perspective view of a three-dimensional image display according to a second embodiment of the invention showing a configuration thereof.

FIG. 21 shows a schematic configuration of a three-dimensional image display according to a second embodiment of the invention. The three-dimensional image display has an LCD panel 61 formed by arranging a plurality of LCDs 60 in each of the horizontal and vertical directions and has a three-dimensional display screen 63 which has a configuration including a plurality of pinhole elements 62 and which is provided in parallel with the LCD panel 61 in a face-to-face relationship with the same. A diffusing plate and a light source portion which are not shown are provided behind the LCD panel 61. Although FIG. 21 shows the LCD panel 61 and three-dimensional screen 63 as being spaced at a considerable interval for convenience, they may be provided closer. The LCD panel 61 corresponds to the "two-dimensional image forming element" of the invention.

Each of the LCDs 60 is formed by arranging H pixels in the horizontal direction and V pixels in the vertical direction in the form of a matrix and corresponds to the LCD 13 in the first embodiment (FIGS. 2 and 3). A two-dimensional still image may be formed by each of the LCDs 60 by supplying partial image data as described in the first embodiment thereto. The pinhole elements 62 of the three-dimensional display screen 63 are provided in a one-to-one relationship with the LCDs 60 in positions where they face the central portions of the respective LCDs 60.

Figure 22:
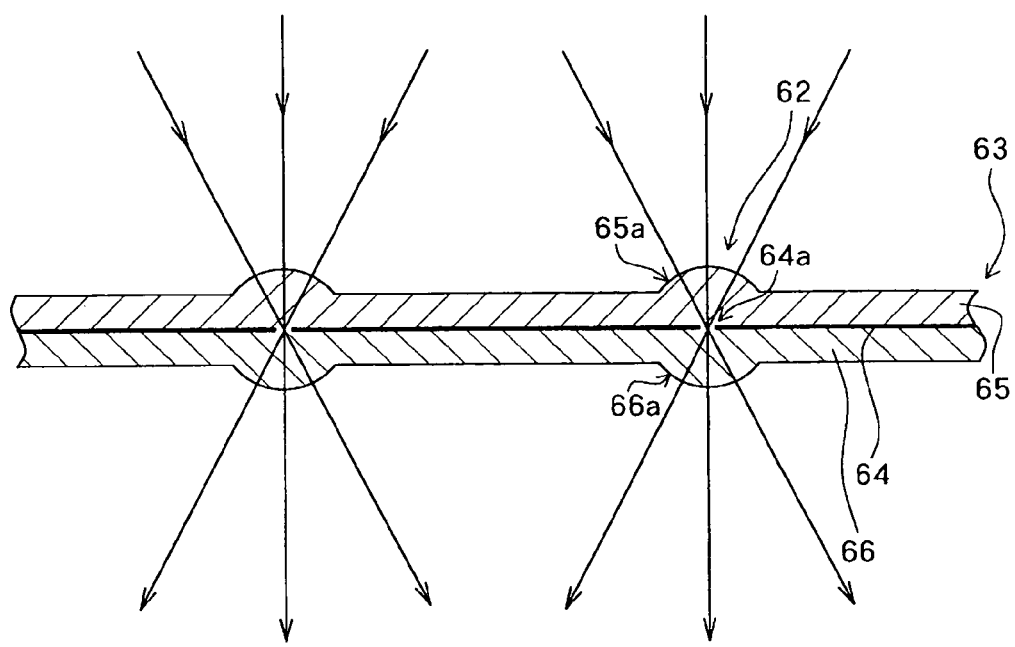
FIG. 22 is a sectional view of a major part of the three-dimensional image display showing a configuration of the same.
Figure 23:
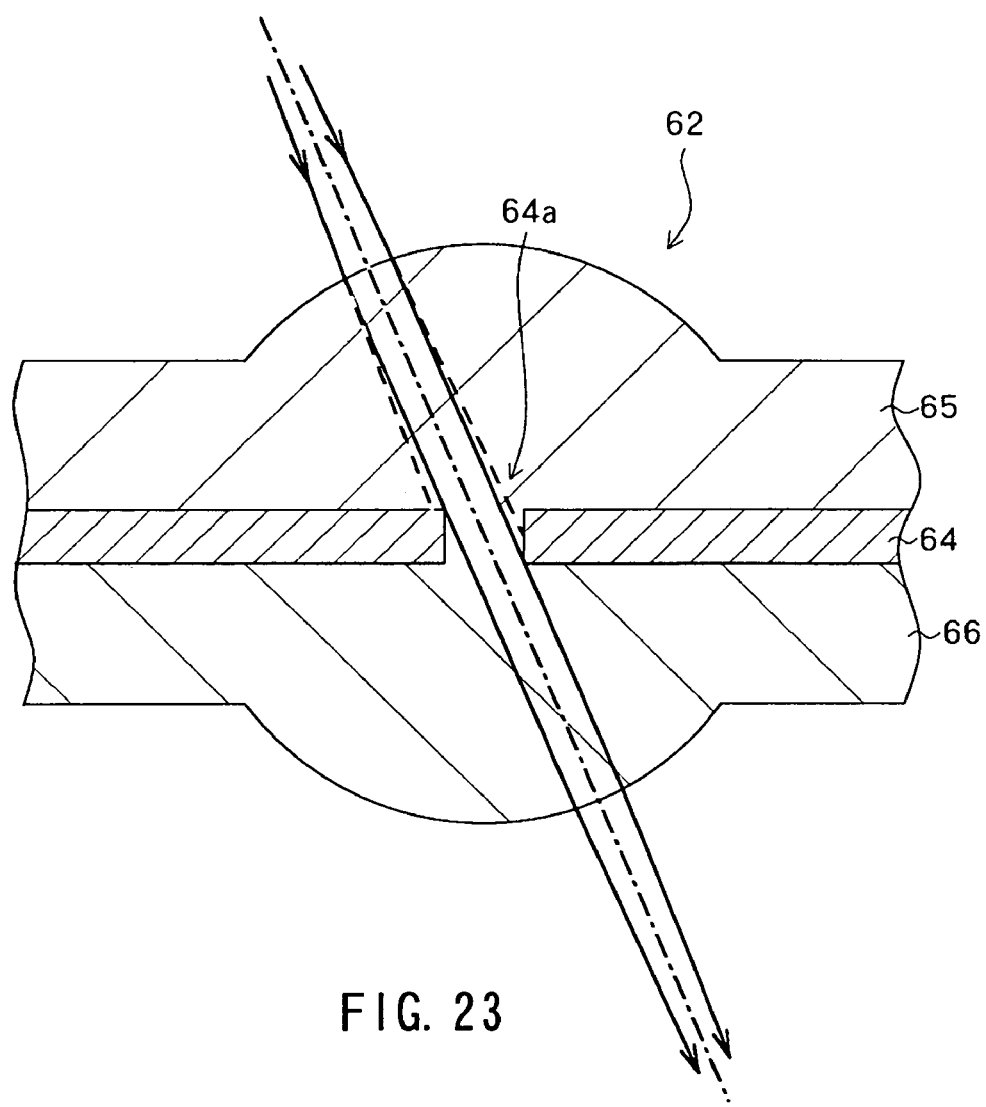
FIG. 23 is an enlarged sectional view of a major part of the three-dimensional image display showing a configuration of the same.

FIG. 22 is an enlarged view of a sectional structure of the three-dimensional display screen 63 in FIG. 21 taken along the line C-C'. As shown in the same figure, the three-dimensional display screen 63 has a configuration including a pinhole plate 64 and an entrance plate 65 and an exit plate 66 provided such that they sandwich the pinhole plate 64. The pinhole plate 64 is formed of a material having light blocking properties and has pinholes 64*a*. Both of the entrance plate 65 and exit plate 66 are formed of a material transparent to visible beams of light and have entrance surfaces 65*a* and exit surfaces 66*a* constituted by spherical surfaces centered at the pinholes 64*a* of the pinhole plate 64. One pinhole element 64 (FIG. 21) is formed by a pinhole 64*a*, an entrance surface 65*a* and an exit surface 66*a*. The pin hole 64*a* corresponds to the "microscopic opening" of the invention.

A circuit for driving the three-dimensional image display of the present embodiment is equivalent to a version of the display control circuit 40 described in the first embodiment (FIG. 4) in which the LCDs 13 are replaced with the LCDs 60. The following description will be made using FIG. 4.

The operation of the three-dimensional image display having such a configuration will now be described.

The method of driving the LCDs 60 in the present embodiment is similar to that in the first embodiment. Specifically, in an image processor which is not shown, a plurality of sets of partial image data are first generated by inverting image data that represent each part of a three-dimensional image to be displayed on a two-dimensional basis from each of view points different from each other, and are input to a data input portion 41 (FIG. 4) of a display control circuit 40 as two-dimensional still image data 48. Referring to how to generate the "partial image data", as described in the first embodiment, they may be images obtained by photographing an object actually or may be images obtained using computer graphics. To display a three-dimensional dynamic image, a plurality of sets of partial image data as described above are generated for each of three-dimensional images representing a continuous scene and are sequentially input to the data input portion 41.

The two-dimensional still image data 48 input to the data input portion 41 are temporarily stored in a data buffer 42 and are thereafter distributed and output by a distribution portion 43 to respective buffer memories 44 as partial image data to be temporarily stored respectively. The partial image data stored in those buffer memories 44 are simultaneously output to respective LCDs 60 in synchronism with an output timing signal from a main control portion 45.

Referring to FIG. 21, light emitted by a light source portion which is not shown is uniformly diffused by the diffusing plate which is not shown to impinge upon each of the LCDs 60 of the LCD panel 61. The light incident upon the pixels of each LCD 60 is subjected to intensity modulation in accordance with data of corresponding pixels in partial image data and then divergingly exits each of the pixels. In this case, the intensity modulation performed at each pixel may be modulation into two levels, i.e., "0" and "1" or may alternatively be multi-level modulation into three or more levels similarly to that in the first embodiment.

As shown in FIG. 21, among beams of light exiting the pixels of each LCD 60, beams of light toward the respective pinhole element 62 of the three-dimensional display screen 63 travel straightly without being refracted by the entrance surface 65*a* of the pinhole element 62 to pass through the pinhole 64*a* and further travel straightly without being refracted by the exit surface 66*a* to exit the three-dimensional display screen 63. As a result, a multiplicity of point light source images are formed by beams of light that have exited the respective pinhole elements 62 in the space in front of the three-dimensional display screen 63. Those point light source images are distributed not only in the horizontal and vertical directions of the three-dimensional display screen 63 but also in the direction of the depth thereof to form a three-dimensional still image as a whole. It is therefore possible for a viewer Q located in front of the three-dimensional display screen 63 to view a stereoscopic spatial image in that space. At this time, by varying the magnitude of modulation at pixels of the LCDs 60 associated with each other at each of the LCDs 60, it is possible to represent even variation of luminance depending on the movement of the view point and to represent a state of reflection of light on a metal surface faithfully.

The present embodiment also makes it possible to display a three-dimensional dynamic image by providing a plurality of sets of partial image data as described above for each of three-dimensional images representing a continuous scene and by supplying them to the LCDs 60 sequentially. Display of a three-dimensional dynamic image will now be described with reference to examples of specific numerical values.

Referring to FIG. 21, let us assume that the numbers H and V of the pixels in the horizontal and vertical directions forming an LCD 60 are, for example, 256 and 144 respectively; the driving speed of each pixel is, for example, 1 μsec. (microsecond); and display is performed using 3 dots simultaneous sampling. The 3 dots simultaneous sampling is to drive pixels in the horizontal direction for three dots simultaneously. In this case, the time required for displaying one partial image with the LCD 60 is about 12.3 msec. (milliseconds) because 256×144×1 μsec./3=12.288. That is, the time for displaying one two-dimensional still image with the three-dimensional display screen 63 as a whole can be sufficiently reduced to 30 msec. or less which is the frame period of a normal television. It is therefore possible to display a three-dimensional dynamic image which gives the viewer Q no feeling of wrongness.

Let us assume that the numbers H and V of the pixels in the horizontal and vertical directions forming an LCD 60 are, for example, 1024 and 576 respectively; the driving speed of each pixel is, for example, 1 μsec.; and display is performed using 24 dots simultaneous sampling. Then, the time required for displaying one partial image with the LCD 60 is about 24.6 msec. because 1024×576×1 μsec./24=24.576, and it is therefore possible to achieve representation of a three-dimensional image with higher definition.

In the first embodiment, the light diffusing elements 12 serving as pinholes and the LCDs 13 are provided relatively close to each other, and the LCDs are illuminated with parallel beams. Thus, the LCDs 13 and light diffusing elements 12 must be substantially equal in size and, therefore, the LCDs 13 cannot have so many pixels.

On the contrary, in the present embodiment, the pinhole elements 62 are provided relatively apart from the LCDs 60; the LCDs 60 are illuminated with diverging light from the light source; and a spatial image is represented using beams of light traveling toward the pinhole elements 62 of the three-dimensional screen 63 among beams of light diverging from each pixel of the LCDs 60. Thus, the size of the LCDs 60 can be considerably larger than that of the pinhole elements 62 of the three-dimensional display screen 63. That is, the LCDs 60 can have a great number of pixels as that in the above-described specific example. Therefore, the three-dimensional image display of the present embodiment achieves higher definition when it comes to representation of an image to be viewed by the viewer Q at each view point.

Third Embodiment

A third embodiment of the invention will now be described.

While the three-dimensional image display of the second embodiment can achieve high definition in representing an image to be viewed by the viewer Q at each view point, the angular resolution is lower than that in the first embodiment because the pinhole elements 62 of the three-dimensional display screen 63 must be arranged at a large pitch D (FIG. 21), which can result in a phenomenon that a stereoscopic image appears or disappears each time the viewer Q changes the view point. In order to eliminate such a problem, the present embodiment makes it possible to improve angular resolution. A detailed description on the embodiment will now be made with reference to FIGS. 24 through 28.

Figure 24:
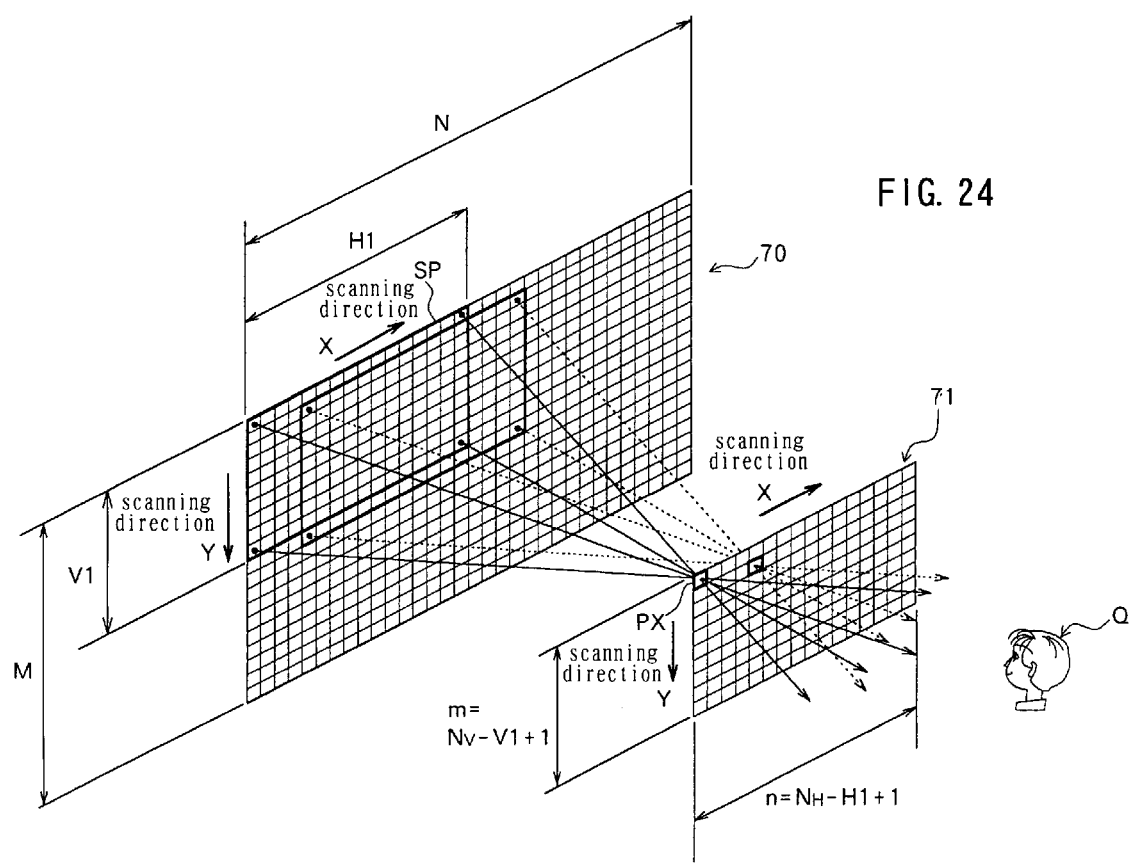
FIG. 24 is a perspective view of a three-dimensional image display according to a third embodiment of the invention showing a configuration thereof.

FIG. 24 shows a schematic configuration of a three-dimensional image display according to a third embodiment of the invention. The three-dimensional image display has: a picture LCD panel 70 including a multiplicity of pixels in the horizontal and vertical directions in the form of a matrix; and a pinhole LCD panel 71 provided in parallel with the picture LCD panel 70 in a face-to-face relationship. A diffusing plate and a light source portion which are not shown are provided behind the picture LCD panel 70. Although this figure shows the picture LCD panel 70 and pinhole LCD panel 71 as being spaced at a considerable interval for convenience, they may be provided closer. The picture LCD panel 70 corresponds to the "two-dimensional image display panel", and the pinhole LCD panel 71 corresponds to the "optically opening/closing cell array" of the invention.

The picture LCD panel 70 is configured such that partial image display regions SP including H1 pixels and V1 pixels in the horizontal direction X and vertical direction Y respectively are controlled to become active while being scanned and shifted in the horizontal direction X and vertical direction Y pixel by pixel at constant time intervals. Therefore, if the numbers of pixels of the picture LCD panel 70 in the horizontal and vertical directions are represented by N and M respectively, the number of partial image display regions SP scanned and shifted in the horizontal direction (in other words, the number of positions where the partial image display regions SP stop in the horizontal direction) is N−H1+1, and the number of the partial image display regions SP scanned and shifted in the vertical direction (in other words, the number of positions where the partial image display regions SP stop in the vertical direction) is M−V1+1. Here, the term "active" indicates a state in which data are supplied to each pixel in a region so as to form an image actually. The partial image display regions SP correspond to the LCDs 13 in the first embodiment (FIGS. 2 and 3) and the LCDs 60 in the second embodiment. Partial image data as described in the first embodiment are supplied to respective partial image display regions SP which are shifted every moment, such that partial still images from respective different view points are formed at the partial image display regions SP at each point in time.

Pinhole pixels PX of the pinhole LCD panel 71 are provided in positions in a face-to-face relationship with centers of the partial image display regions SP of the picture LCD panel 70 which sequentially become active. The numbers of pixels of the pinhole LCD panel 71 in the horizontal and vertical directions are equal to the numbers N−H1+1 and M−V1+1 of the partial image display regions SP in the horizontal and vertical directions. The pinhole pixels PX of the pinhole LCD panel 71 are controlled such that they sequentially enter an open state in synchronism with the scan and shift of the partial image display regions SP of the picture LCD panel 70. Therefore, among the pinhole pixels PX of the pinhole LCD panel 71, only pixels associated with active partial image display regions SP of the picture LCD panel 70 enter the open state. In consequence, pinhole pixels PX of the pinhole LCD panel 71 in the open state are scanned and shifted at the same speed as the scanning and shifting speed of the partial image display regions SP of the picture LCD panel 70.

Figure 25:
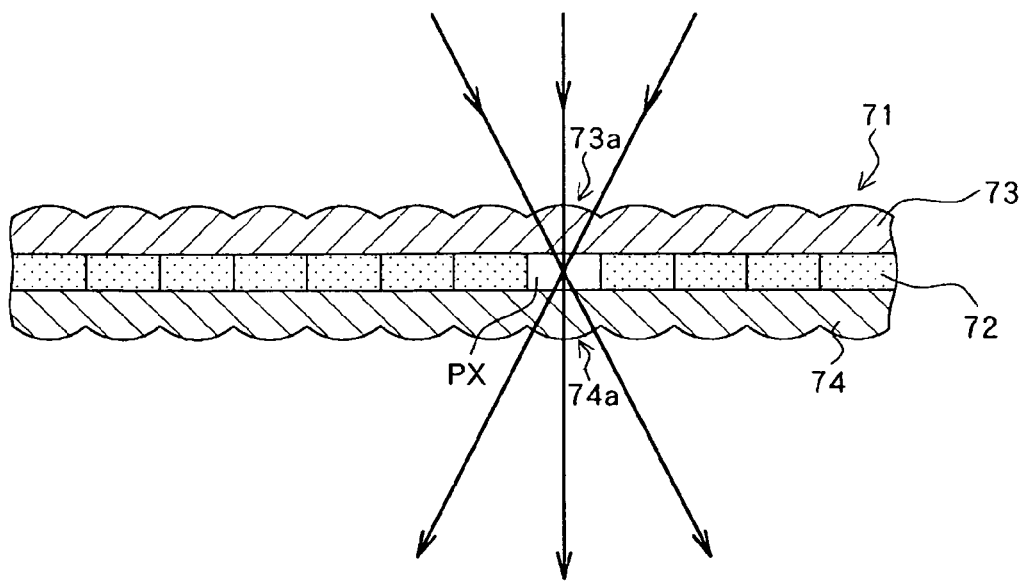
FIG. 25 is a sectional view of a major part of the three-dimensional image display showing a configuration of the same.

FIG. 25 is an enlarged view of a sectional structure of the pinhole LCD panel 71 shown in FIG. 24 in the horizontal direction thereof. As shown in the same figure, the pinhole LCD panel 71 has a configuration including: a pinhole LCD 72 functioning similarly to the pinhole plate 64 (FIG. 22) of the second embodiment; and an entrance plate 73 and an exit plate 74 provided such that they sandwich the pinhole LCD 72. Pinhole pixels PX of the pinhole LCD 72 are arranged at the same pitch as the pitch of the pixels of the picture LCD panel 70, and only specified pixels enter the open state to allow light incident thereupon to pass as it is. Both of the entrance plate 73 and exit plate 74 are formed of a material transparent to visible beams of light and have entrance surfaces 73a and exit surfaces 74a constituted by spherical surfaces centered at the pixels of the pinhole LCD 72. One pinhole pixel corresponding to the pinhole element 62 in the second embodiment (FIG. 21) is formed by a pinhole pixel PX in the open state of the pinhole LCD 72, an entrance surface 73a and an exit surface 74a. Each of the pinhole pixels PX of the pinhole LCD 72 corresponds to the "optical opening/closing cell" of the invention.

Figure 26:
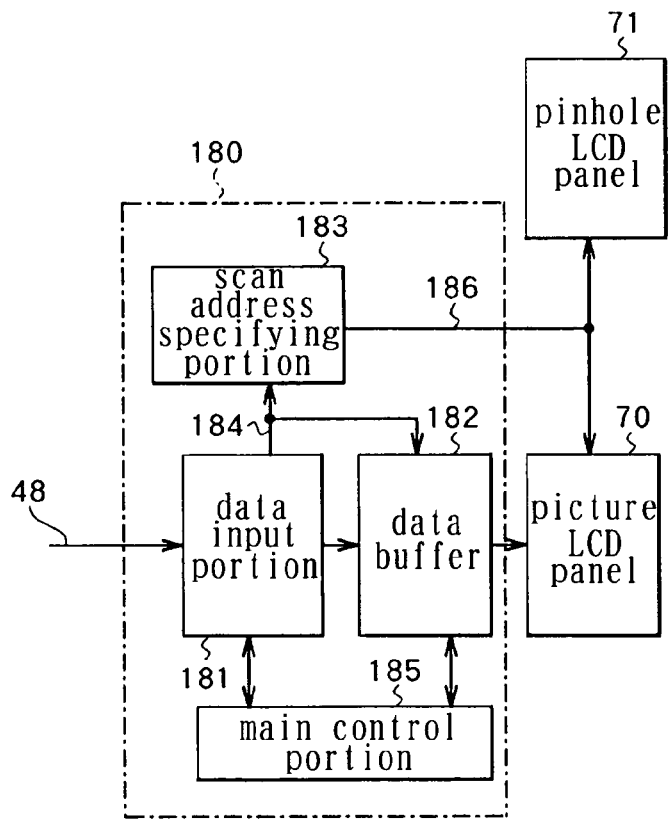
FIG. 26 is a block diagram of a display control circuit for controlling a display operation of the three-dimensional image display showing a schematic configuration of the same.

FIG. 26 shows a schematic configuration of a display control circuit 180 for controlling display of the three-dimensional image display of the present embodiment. The display control circuit 180 has: a data input portion 181 to which two-dimensional still image data 48 constituted by data of a plurality of partial images are input and which extracts a synchronizing signal 184 from the input two-dimensional still image data 48; a data buffer 82 for temporarily storing the input two-dimensional still image data 48, for extracting each of partial image data from the accumulated two-dimensional still image data 48 and for outputting the same at timing in synchronism with the synchronizing signal 184 from the data input portion 181; a scan address specifying portion 183 for outputting a scan address signal 186 to the picture LCD panel 70 and pinhole LCD 72 in synchronism with the synchronizing signal 184 from the data input portion 181; and a main control portion 185 for controlling the above-described portions. Similarly to the above-described embodiments, partial image data are data generated by inverting data which represent each part of a three-dimensional still image to be displayed on a two-dimensional basis from each of view points different from each other. The synchronizing signal 184 is a signal indicating timing for the beginning of each of partial image data forming the two-dimensional still image data 48, and the scan address signal 186 is a signal for specifying the positions of partial image display regions SP of the picture LCD panel 70 to be activated and the positions of pixels of the pinhole LCD panel 71 to be put in the open state. The display control circuit 180 corresponds to the "display control means" of the invention, and the scan address specifying portion 183 primarily corresponds to the "optically opening/closing cell control means" of the invention.

Figure 27:
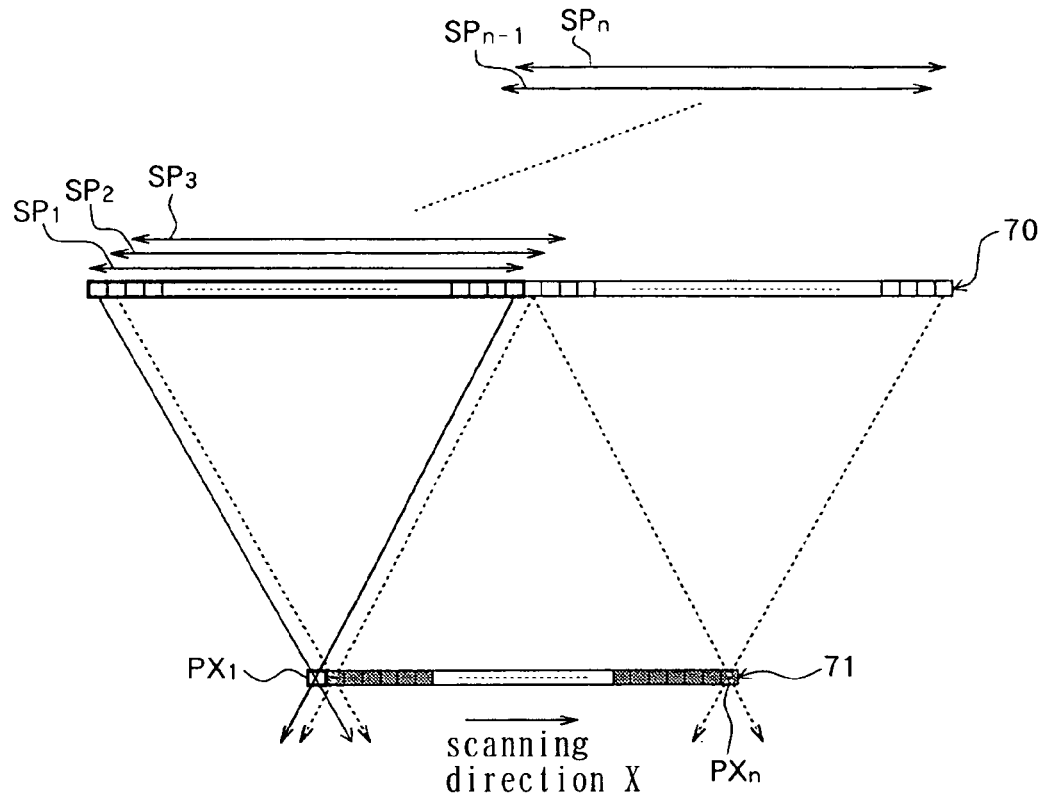
FIG. 27 is an illustration for explaining the operation of the three-dimensional image display.
Figure 28:
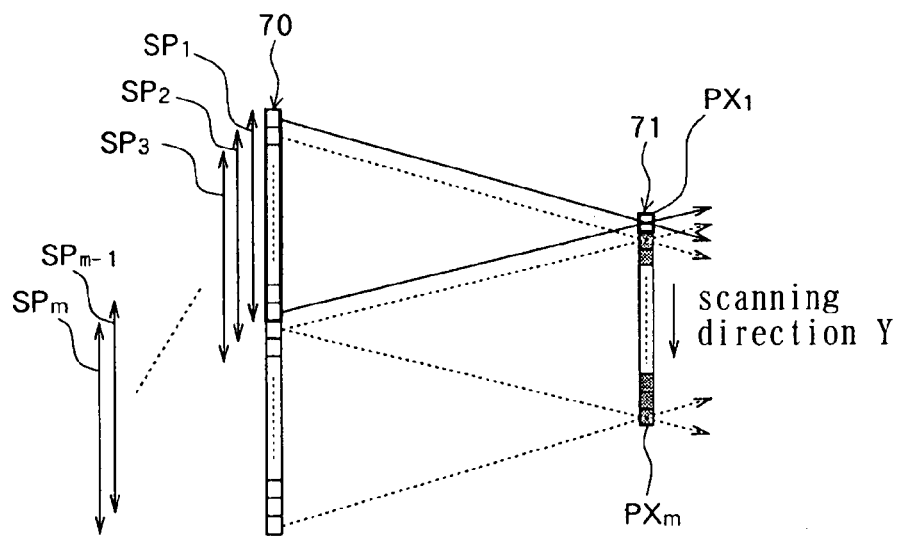
FIG. 28 is an illustration for explaining the operation of the three-dimensional image display.

A description will now be made with reference to FIGS. 24 through 26 and further FIGS. 27 and 28 on the operation of the three-dimensional image display having the above-described configuration. FIG. 27 shows the picture LCD panel 70 and pinhole LCD panel 71 as viewed from above, and FIG. 28 shows the same as viewed sideways. The illustrations of those figures omit the light source portion and diffusing plate.

Similarly to the above-described embodiments, in an image processor which is not shown, a plurality of sets of partial image data are generated by inverting image data that represent each part of a three-dimensional image to be displayed on a two-dimensional basis from each of view points different from each other and are input to the data input portion 181 (FIG. 26) of the display control circuit 180 as two-dimensional still image data 48. The method for generating the "partial image data" is as described in the above-described embodiments. To display a three-dimensional dynamic image, a plurality of sets of partial image data as described above are generated for each of three-dimensional images representing a continuous scene and are sequentially input to the data input portion 181.

The two-dimensional still image data 48 input to the data input portion 181 are temporarily stored in the data buffer 182. The data input portion 181 extracts a synchronizing signal 184 for each set of the partial image data from the two-dimensional still image data 48 and outputs it to the scan address specifying portion 183 and data buffer 182. Upon receipt of the same, the scan address specifying portion 183 outputs a scan address signal 186 to the pinhole LCD panel 71 and picture LCD panel 70 to specify the positions of partial image display regions SP of the picture LCD panel 70 to be activated and the positions of pinhole pixels PX of the pinhole LCD panel 71 to be put in the open state. The data buffer 182 extracts a set of partial image data from the accumulated two-dimensional still image data 48 and supplies the same to the picture LCD panel 70 at timing in synchronism with the synchronizing signal 184 from the data input portion 181. The partial image data supplied from the data buffer 182 are supplied to the specified partial image display regions SP of the picture LCD panel 70 to drive each pixel.

Referring to FIG. 24, light emitted by a light source portion which is not shown is uniformly diffused by the diffusing plate which is not shown to impinge upon each of the pixels of the picture LCD panel 70. The light incident upon each of the pixels is subjected to intensity modulation in accordance with data of the corresponding pixel in partial image data and then divergingly exits each of the pixels. In this case, the intensity modulation performed at each pixel may be modulation into two levels, i.e., "0" and "1" or may alternatively be multi-level modulation into three or more levels similarly to that in the above-described embodiments.

Among beams of light divergingly exiting the pixels of a partial image display region SP as shown in FIG. 24, beams of light toward a pinhole pixel PX in the open state of the pinhole LCD panel 71 travel straightly without being refracted by the entrance surface 73a of the entrance plate 73 to pass through the pinhole pixel PX in the open state of the pinhole LCD 72 and further travel straightly without being refracted by the exit surface 74a of the exit plate 74 to exit the pinhole LCD panel 71, as shown in FIG. 25.

Such an operation is performed for each set of the partial image data in synchronism with the synchronizing signal 84. Specifically, as shown in FIG. 27, an active partial image display region SP of the picture LCD panel 70 is shifted bit by bit in the horizontal direction to SP1 through SPn. In conjunction therewith, the pinhole pixel PX in the open state of the pinhole LCD 72 of the pinhole LCD panel 71 is shifted bit by bit in the horizontal direction to PX1 through PXn (n=N−H1+1) and, at the same time, one set of partial image data are read from the data buffer 82 and are supplied to the active (or selected) partial image display region SP of the picture LCD panel 70. When the scan and shift in the horizontal direction is terminated, as shown in FIG. 28, the partial image display region SP of the picture LCD panel 70 and the pinhole pixel PX of the pinhole LCD 72 are both shifted one bit in the vertical direction, and scan and shift as described above is performed at the positions in the vertical direction.

As the active partial image display region SP of the picture LCD panel 70 is scanned and shifted in the vertical direction to SP1 through SPm, the pinhole pixel PX in the open state of the pinhole. LCD 72 is scanned and shifted in the vertical direction to PX1 through PXm (m=M−V1+1). As a result, a beam of light exits from each of the pixels of the pinhole LCD 72 at a small time difference.

For example, when the picture LCD panel 70 and the pinhole LCD 72 are entirely scanned in a period of about 1/30 of a second, a viewer Q in front of the pinhole LCD panel 71 feels as if a multiplicity of point light source images were formed in the space in front of the pinhole LCD panel 71 by beams of light exiting the pixels of the pinhole LCD 72 because of an after-image phenomenon in his or her eyes. Those point light source images are distributed not only in horizontal and vertical directions but also in the direction of a depth to form a three-dimensional still image as a whole. Therefore, the viewer Q can view a stereoscopic spatial image in that space. At this time, by varying the magnitude of modulation at pixels of the partial image display regions SP associated with each other at each of the partial image display regions SP, it is possible to represent even variation of luminance depending on the movement of the view point and to represent a state of reflection of light on a metal surface. The present embodiment also makes it possible to display a three-dimensional dynamic image by providing a plurality of sets of partial image data as described above for each of three-dimensional images representing a continuous scene and by supplying them to the partial image display regions SP sequentially. Display of a three-dimensional dynamic image will now be described with reference to examples of specific numerical values.

Figure 29:
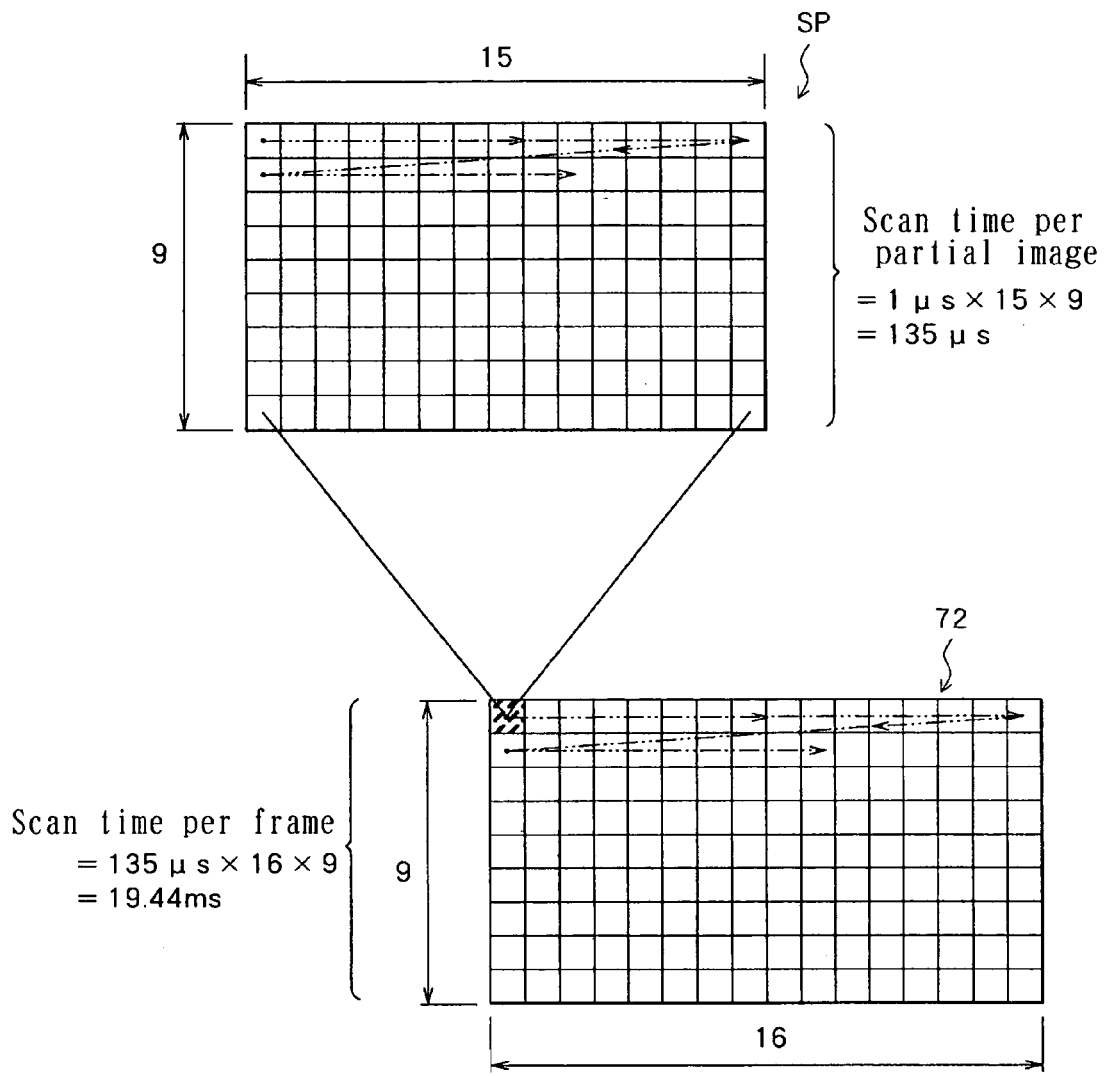
FIG. 29 is an illustration for explaining a specific example of the three-dimensional image display.

Let us assume here, as shown in FIG. 29, that a partial image display region SP of the picture LCD panel 70 in FIG. 24 is formed by, for example, 15×9 pixels and that the pinhole LCD 72 of the pinhole LCD panel 71 is formed by, for example, 16×9 pixels. It is assumed that the driving speed of the pixels of the picture LCD panel 70 is, for example, 1 μsec. Then, the time required for displaying one partial image at the partial image display region SP is 0.135 msec. because 15×9×1 μsec.=135. Therefore, the time required for scanning the entire pinhole LCD 72 (or the time required for displaying one three-dimensional still image) is about 20 msec. because 16×9×0.135 msec.=19.44. The time can thus be sufficiently reduced to 30 msec. or less which is the frame period of a normal television. It is therefore possible to display a three-dimensional dynamic image which gives the viewer Q no feeling of wrongness.

Let us assume here that the pinhole LCD 72 of the pinhole LCD panel 71 is formed by, for example, 16×9 pixels; a partial image display region SP of the picture LCD panel 70 is formed by 64×36 pixels; and 18 dots simultaneous sampling is performed at a driving speed of the pixels of the picture LCD panel 70 of, for example, 1 μsec. Then, the time required for displaying one partial image at the partial image display region SP is 0.128 msec. because 64×36×1 μsec./18=128. Therefore, the time required for scanning the entire pinhole LCD 72 (or the time required for displaying one three-dimensional still image) is about 18 msec. because 16×9×0.128 msec.=18.432. It is therefore possible to represent a three-dimensional dynamic image with higher definition.

As mentioned at the beginning of the description of the present embodiment, in the above-described second embodiment, a spatial stereoscopic image viewed by a viewer Q may have a low angular resolution because of relatively large intervals D between the pinhole elements 62 which are attributable to the fact that partial images are displayed by the LCDs 60 that are fixedly provided (FIG. 21) and that the pinhole elements 62 are fixedly provided in association with the LCDs 60. On the contrary, the three-dimensional image display of the present embodiment has an improved angular resolution because the pinhole pixels PX of the pinhole LCD 72 serving as pinholes are close to each other. Further, since the present embodiment has a configuration in which "pinhole pixels PX in the open state" are sequentially shifted to sequentially display two-dimensional images (partial images) in an overlapping relationship on a two-dimensional image display plate (the picture LCD panel 70) behind the same, the total number of pixels of the LCDs used in the display as a whole can be small even if displaying with higher definition is attempted.

Fourth Embodiment

A fourth embodiment of the invention will now be described.

In the third embodiment, as mentioned in the description of the specific example, even if the driving speed of the pixels of the picture LCD panel 70 is increased and multiple dot simultaneous sampling is performed, the number of pixels forming the picture LCD panel 70 and pinhole LCD panel 71 can not be very large in consideration to the fact that the time required for displaying one three-dimensional still image is to be equal or shorter than 30 msec. to allow display of a dynamic image. In order to achieve an improvement in this point, according to the present embodiment, a plurality of three-dimensional image displays having the configuration described in the third embodiment are arranged and are driven in parallel.

Figure 30:
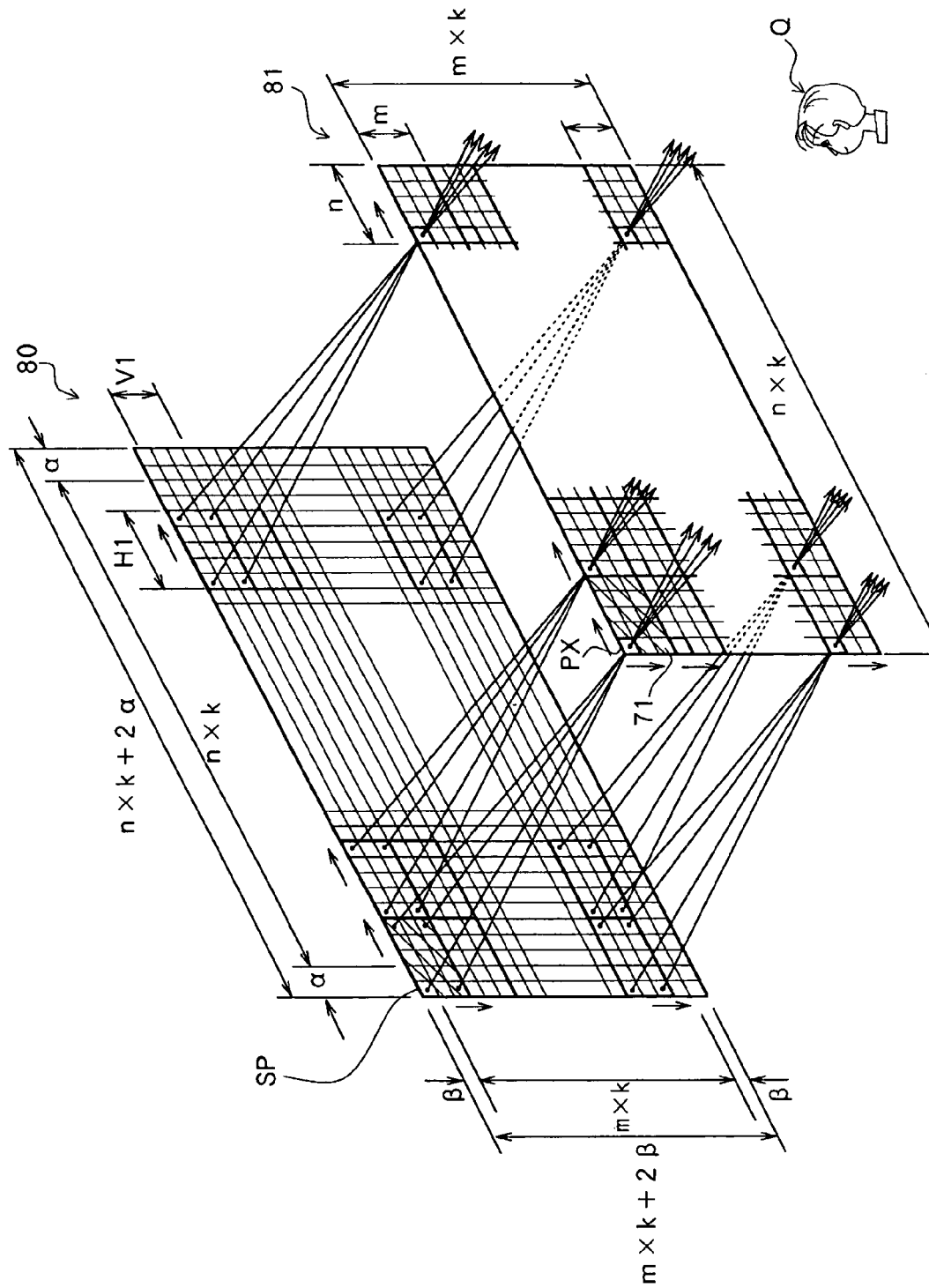
FIG. 30 is a perspective view of a three-dimensional image display according to a fourth embodiment of the invention showing a configuration of the same.

FIG. 30 shows a schematic configuration of a three-dimensional image display according to the fourth embodiment of the invention. As shown in the figure, the three-dimensional image display of the present embodiment has: a pinhole LCD assembly panel 81 formed by arranging k pinhole LCD panels 71 (hatched parts) having the same configuration (having an n×m pixel configuration) as that in the third embodiment (FIG. 24) in each of the horizontal and vertical directions; and a large picture LCD panel 80 formed by arranging pixels in a quantity greater than that of the picture LCD panel 70 shown in FIG. 24 described above. A combination of a part of the large picture LCD panel 80 and a pinhole LCD panel 71 corresponds to the "basic unit" of the present invention.

Let us assume that the total number of the pixels of the pinhole LCD assembly panel 81 is, for example, n×k in the horizontal direction and m×k in the vertical direction and that the total number of the pixels of the large picture LCD panel 80 is, for example, n×k+2α in the horizontal direction and m×k+2β in the vertical direction.

The large picture LCD panel 80 is controlled such that a plurality of partial image display regions SP including H1 and V1 pixels in the horizontal and vertical directions respectively are scanned and shifted pixel by pixel in the horizontal or vertical direction in parallel without overlapping with each other as pinhole pixels PX in the open state of the pinhole LCD assembly panel 81 are shifted. Therefore, referring to one of the pinhole LCD panels 71 of the pinhole LCD assembly panel 81, the number of partial image display regions SP scanned and shifted in the horizontal direction (or the number of positions where the partial image display regions SP stop) is n, and the number of partial image display regions SP scanned and shifted in the vertical direction is m. Partial image data as described in the above embodiments are respectively supplied to the plurality of partial image display regions SP which are shifted every moment to form partial still images from respective different view points at the partial image display regions SP at each point in time.

Pinhole pixels PX of the pinhole LCD panels 71 of the pinhole LCD assembly panel 81 are provided in positions in a face-to-face relationship with centers of the partial image display regions SP of the large picture LCD panel 80 which are sequentially shifted. The pinhole pixels PX of the pinhole LCD panels 71 are controlled such that they sequentially enter an open state in synchronism with the scan and shift of the partial image display regions SP of the large picture LCD panel 80. Therefore, among the pinhole pixels PX of the pinhole LCD assembly panel 81, only pixels in each of the pinhole LCD panels 71 which are associated with active partial image display regions SP of the large picture LCD panel 80 enter the open state. In consequence, a plurality of pinhole pixels PX of the pinhole LCD assembly panel 81 in the open state are scanned and shifted at the same speed as the scanning and shifting speed of a plurality of partial image display regions SP of the large picture LCD panel 80 with a constant pixel pitch maintained between each other.

Light which has exited the partial image display regions SP of the large picture LCD panel 80 travel toward pinhole pixels PX in the open state of the respective pinhole LCD panels 71 of the pinhole LCD assembly panel 81 and straightly pass through the same as it is. A microlens in a convex configuration (not shown) is formed on the side of an exit surface of the large picture LCD panel 80 in association with each pixel to prevent light exiting each pixel from being diffused more than needed. The reason is that light exiting a partial image display region SP can impinge not only upon pinhole pixels PX in the open state of the pinhole LCD panel 71 of the pinhole LCD assembly panel 81 associated therewith but also upon pinhole pixels PX in the open state of an adjacent pinhole LCD panel 71 when the diffusing angle of the exiting light is too large.

Other parts (e.g., a diffusing plate and a light source portion provided behind the large picture LCD panel 80, the section of the pinhole LCD assembly panel 81, etc.) have configurations similar to those in the third embodiment. Referring to a basic configuration of a display control circuit in the three-dimensional image display, it may be configured as a circuit formed by arranging a plurality of the display control circuits 180 described in the third embodiment, although not shown. The circuit formed by arranging a plurality of the display control circuits 180 corresponds to the "parallel display control means" of the invention, and a part formed by arranging a plurality of the scan address specifying portions 83 of the display control circuits 180 corresponds to the "optically opening/closing cell parallel control means" of the invention.

Figures 31A, 31B, 31C:
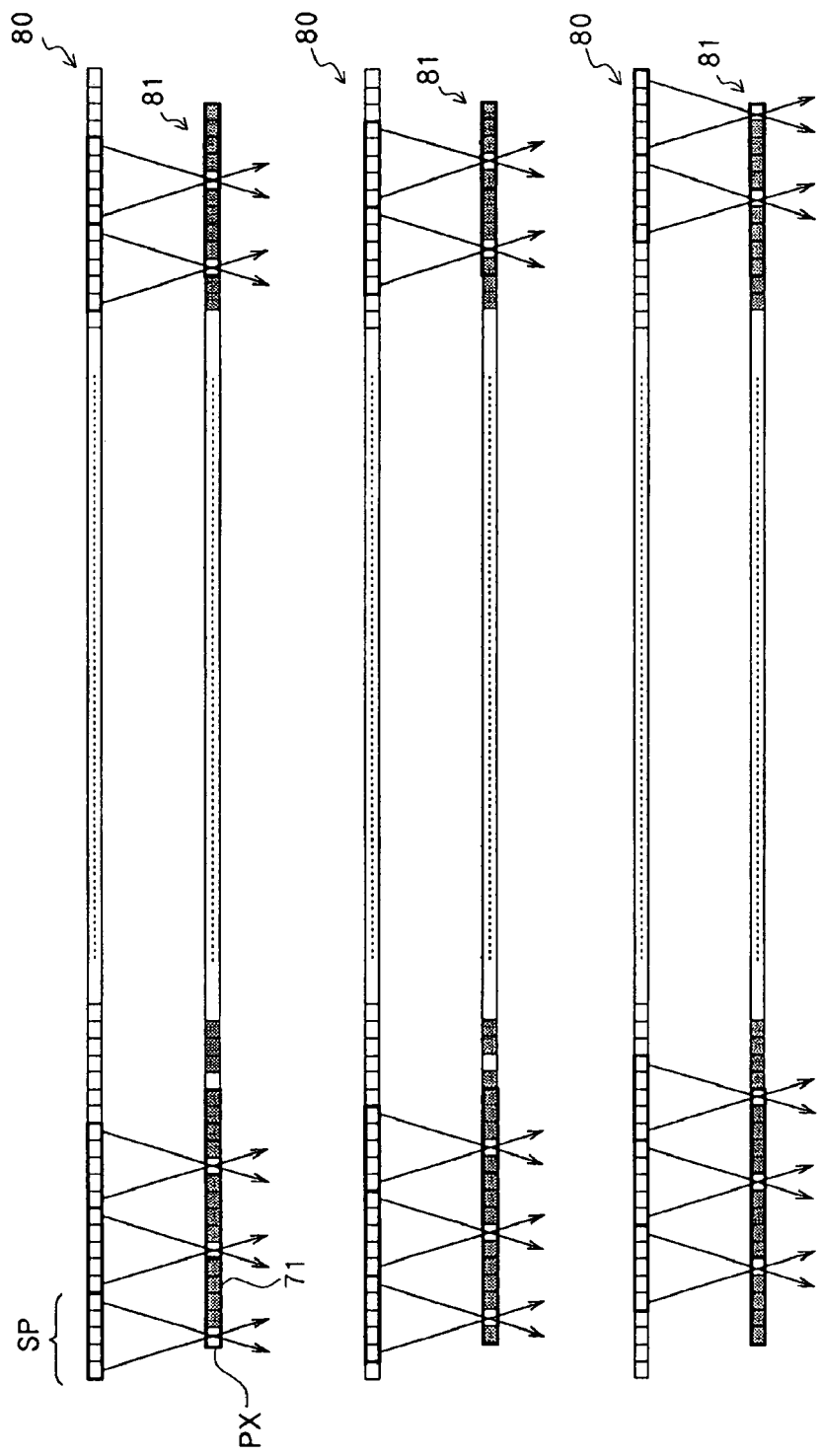
FIGS. 31A through 31C are illustrations for explaining the operation of the three-dimensional image display.
Figure 32A:
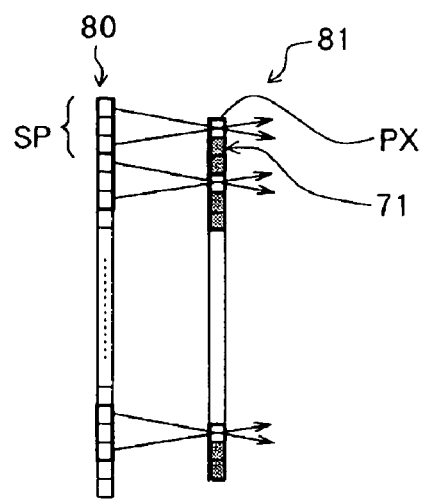
FIGS. 32A through 32C are illustrations for explaining the operation of the three-dimensional image display.
Figure 32B:
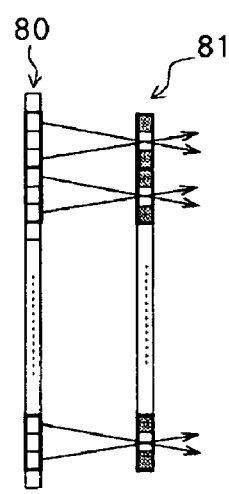
Figure 32C:
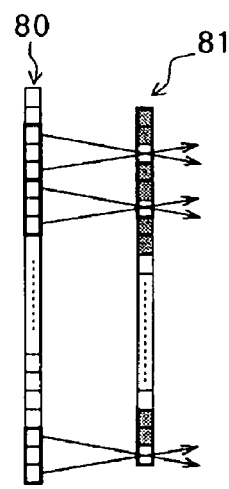

The operation of the three-dimensional image display having such a configuration will now be described with reference to FIGS. 30, 31A through 31C and 32A through 32C. FIGS. 31A through 31C show the large picture LCD panel 80 and pinhole LCD assembly panel 81 as viewed from above, and FIGS. 32A through 32C show the same as viewed sideways. The illustrations of those figures omit the light source portion and diffusing plate.

In the three-dimensional image display of the present embodiment, as shown in FIGS. 31A through 31C, in synchronism with bit by bit shifts of pinhole pixels PX in the open state of the pinhole LCD panels 71 of the pinhole LCD assembly panel 81 in the horizontal direction, the partial image display regions SP of the large picture LCD panel 80 are shifted bit by bit in the same direction. At this time, new partial image data are supplied to each of the partial image display regions SP of the large picture LCD panel 80 each time it is shifted. Light which has exited each of the partial image display regions SP travels toward the pinhole pixels PX in the open state of the associated pinhole LCD panel 71 of the pinhole LCD assembly panel 81 and straightly passes through the same as it is. FIG. 31A shows a state of each pinhole LCD panel 71 in which the pinhole pixel PX located on the left end thereof in the horizontal direction is in the open state. FIG. 31B shows a state of each pinhole LCD panel 71 in which the pinhole pixel PX located in the second place from the left end thereof in the horizontal direction is in the open state. FIG. 31C shows a state of each pinhole LCD panel 71 in which the pinhole pixel PX located on the right end thereof in the horizontal direction is in the open state.

In each pinhole LCD panel 71, when horizontal scan and shift of pinhole pixels PX in the open state for one line is terminated, as shown in FIGS. 32A through 32C, the partial image display regions SP and the pinhole pixels PX in the open state of each pinhole LCD panel 71 are both shifted one bit in the vertical direction, and scan and shift as described above is performed in the horizontal direction in the positions in the vertical direction. FIG. 32A shows a state of each pinhole LCD panel 71 in which the pinhole pixel PX located on the upper end thereof in the vertical direction is in the open state. FIG. 32B shows a state of each pinhole LCD panel 71 in which the pinhole pixel PX located in the second place from the upper end thereof in the vertical direction is in the open state. FIG. 32C shows a state of each pinhole LCD panel 71 in which the pinhole pixel PX located on the lower end thereof in the vertical direction is in the open state. Thus, pinhole pixels PX in the open state of the pinhole LCD panels 71 are scanned and shifted in the vertical direction in synchronism with the sequential scan and shift of the partial image display regions SP of the large picture LCD panel 80.

In such a manner, beams of light exit simultaneously (in parallel) from the pinhole pixels PX in the open state of each of the pinhole LCD panels 71 of the pinhole LCD assembly panel 81. Therefore, as described in the third embodiment, when the pixels throughout the pinhole LCD panels 71 are scanned in a period of about 1/30 sec., a viewer Q in front of the pinhole LCD assembly panel 81 feels as if a multiplicity of point light source images were formed in the space in front of the pinhole LCD assembly panel 81 by beams of light exiting the pixels of the same because of an after-image phenomenon in his or her eyes. That is, the viewer Q can view a stereoscopic spatial image in that space.

At this time, by varying the magnitude of modulation at pixels of the partial image display regions SP, it is possible to represent a state of reflection of light on a metal surface or the like. A three-dimensional dynamic image can be displayed by preparing a plurality of sets of partial image data as described above for each of three-dimensional images representing a continuous scene and by supplying them to the partial image display regions SP. Display of a three-dimensional dynamic image will now be described with reference to examples of specific numerical values.

Figure 33:
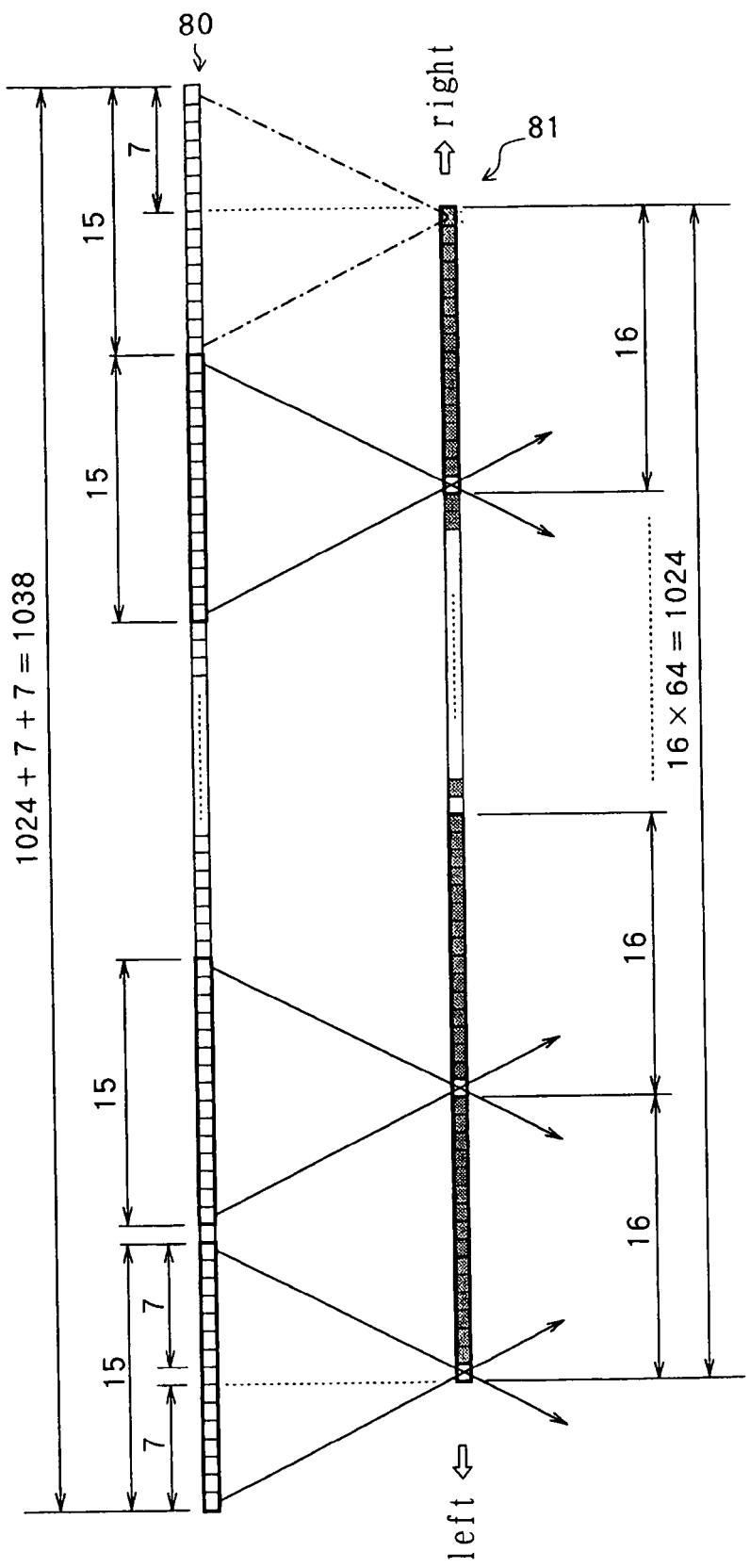
FIG. 33 is an illustration for explaining a specific example of the three-dimensional image display.
Figure 34:
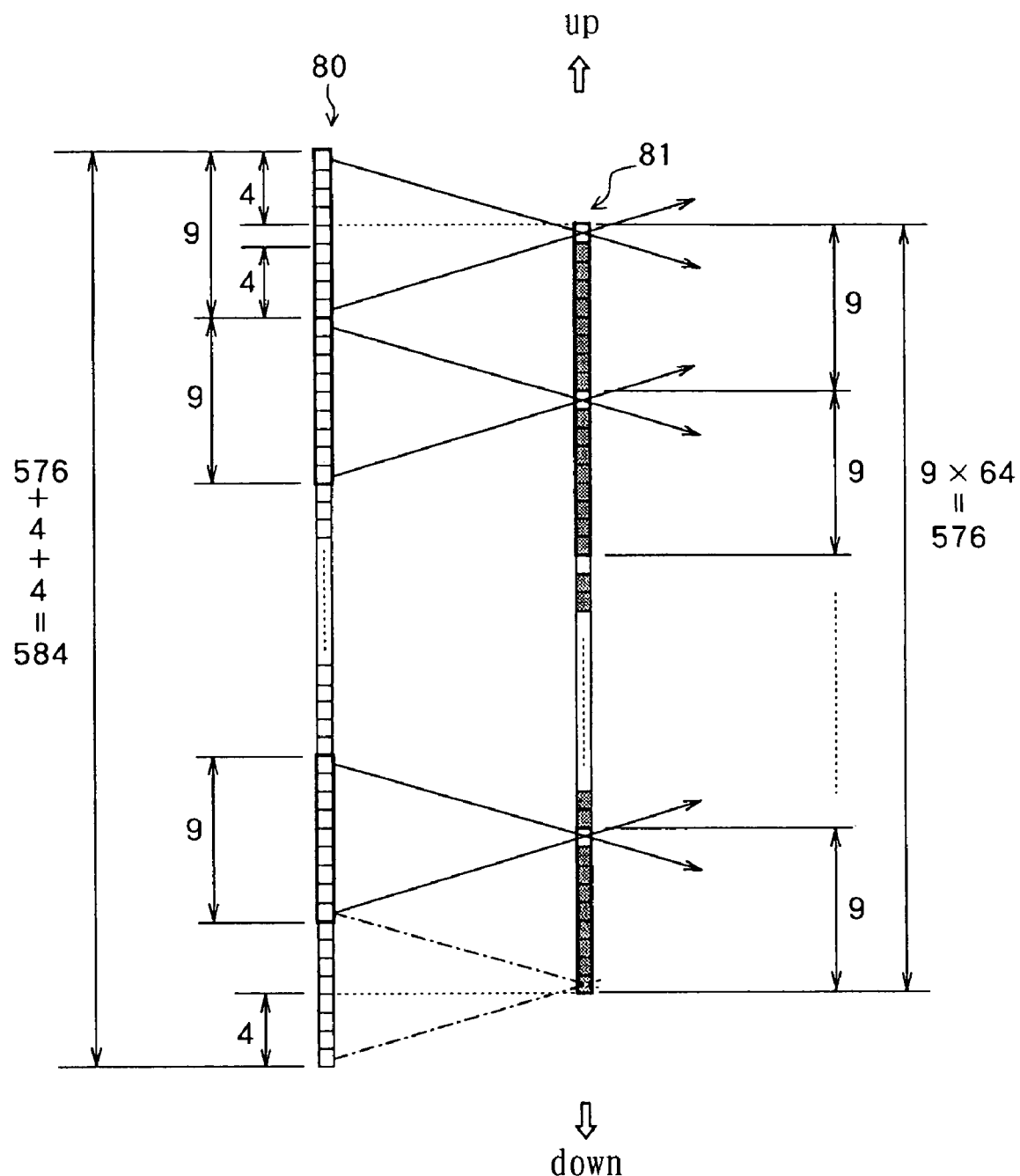
FIG. 34 is an illustration for explaining the specific example of the three-dimensional image display.

Similarly to the specific example of the third embodiment (FIG. 29), let us assume here that a partial image display region SP of the large picture LCD panel 80 is formed by, for example, 15×9 pixels; a pinhole LCD panel 71 of the pinhole LCD assembly panel 81 is formed by, for example, 16×9 pixels; and k, α and β in FIG. 30 are 64, 7 and 4, respectively. In this case, as shown in FIGS. 33 and 34, the size of the large picture LCD panel 80 is 1038×584 pixels, and the size of the pinhole LCD assembly panel 81 is 1024×576 pixels. FIG. 33 shows the large picture LCD panel 80 and pinhole LCD assembly panel 81 as viewed from above, and FIG. 34 shows the same as viewed sideways. The illustrations of those figures omit the light source portion and diffusing plate.

Let us assume here that the driving speed of the pixels of the large picture LCD panel 80 is, for example, 1 µsec. Then, the time required for displaying one partial image at a partial image display region SP is 0.135 msec. similarly to the specific example of the third embodiment. Therefore, the time required for displaying one three-dimensional still image is about 20 msec. The time can thus be sufficiently reduced to 30 msec. or less which is the frame period of a normal television, which makes it possible to display a three-dimensional dynamic image which gives the viewer Q no feeling of wrongness.

Thus, in the three-dimensional image display of the present embodiment, as apparent from FIGS. 33 and 34 showing a specific example, partial images formed in the respective partial image display regions SP of the large picture LCD panel 80 behind the pinhole LCD assembly panel 81 are projected in the space in front through each of a multiplicity of (here, 1024×576) pixels forming the panel 81, thereby displaying a three-dimensional image which has unity as a whole at high speed. It is therefore possible to display three-dimensional images including even dynamic images with high definition. In addition, since the pinhole pixels PX of the pinhole LCD assembly panel 81 functioning as pinholes are close to each other similarly to the third embodiment, a sufficient angular resolution can be achieved. That is, the three-dimensional image display of the present embodiment is capable of providing a three-dimensional dynamic image with quality which is good enough from any of viewpoints of the resolution of displayed images, angular resolution, naturalness of dynamic images.

Further, since the present embodiment has a configuration in which "pinhole pixels PX in the open state" are sequentially shifted to sequentially display two-dimensional images (partial images) in an overlapping relationship on a two-dimensional image display plate (the large picture LCD panel 80) behind the same, similar to that in the third embodiment, the total number of pixels of the LCDs used in the display as a whole can be small even if displaying with higher definition is attempted. Therefore, the three-dimensional image display can be very much compactly configured compared to that of the first or second embodiment and can be satisfactorily used in, for example, a stereoscopic television for home use or the like.

Fifth Embodiment

Figure 35:
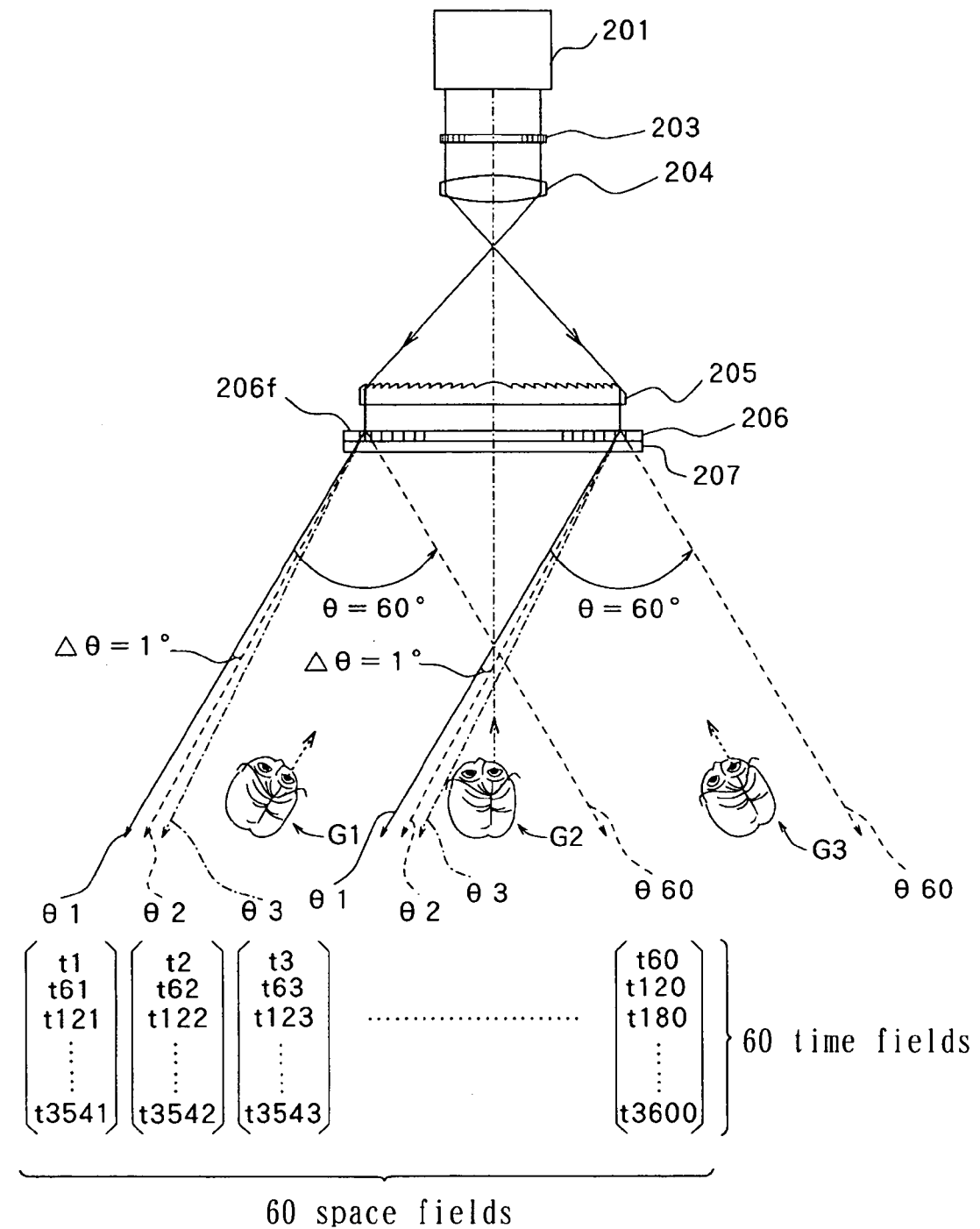
FIG. 35 is a plan view of a three-dimensional image display according to a fifth embodiment of the invention showing a configuration of the same.

A fifth embodiment of the invention will now be described.
FIG. 35 shows a schematic configuration of a three-dimensional image display according to a fifth embodiment of the invention. The same figure shows the display as viewed directly from above. This display has: a light source portion 201 capable of emitting parallel beams of white light, an LCD 203 for spatially modulating the light emitted by the light source portion 201 to form and output a two-dimensional color image; a beam expander formed by a condenser lens 204, a collimator lens 205 or the like sequentially provided behind (on the light emitting side of) the LCD 203; a deflecting plate 206 provided behind the collimator lens 205; and a lenticular plate 207 provided in tight contact with a rear surface of the deflecting plate 206. The LCD 203 along with a part of a control circuit 210 to be described later primarily corresponds to the "two-dimensional image forming means" of the invention, and the deflecting plate 206 primarily corresponds to the "deflecting means" of the invention.

The light source portion 201 is formed by, for example, a high luminance light-emitting body such as a halogen lamp and a reflecting mirror such as a rotary ellipsoidal mirror or the like and is capable of emitting parallel beams of white light.

The beam expander formed by the condenser lens 204 and collimator lens 205 is provided for expanding the width of parallel beams of light exiting the LCD 203. For example, a Fresnel lens as illustrated is used as the collimator lens 205.

The lenticular plate 207 is constituted by a multiplicity of very small semicylindrical lenses extending in the horizontal direction, arranged in the vertical direction, and it has a function of diffusing light exiting the deflecting plate 206 in the longitudinal direction (vertical direction or the direction orthogonal to the plane of the figure).

Figure 36:
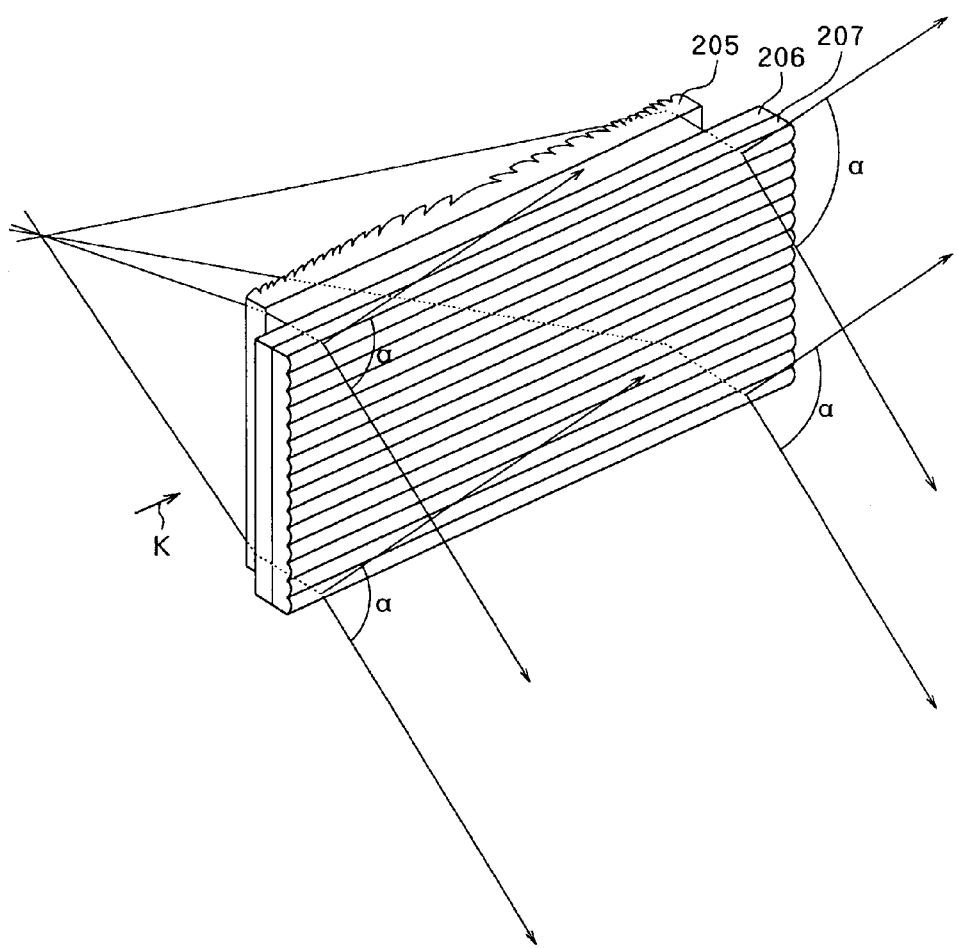
FIG. 36 is a perspective view of a major part of the three-dimensional image display shown in FIG. 35 showing a configuration of the same.
Figure 37:
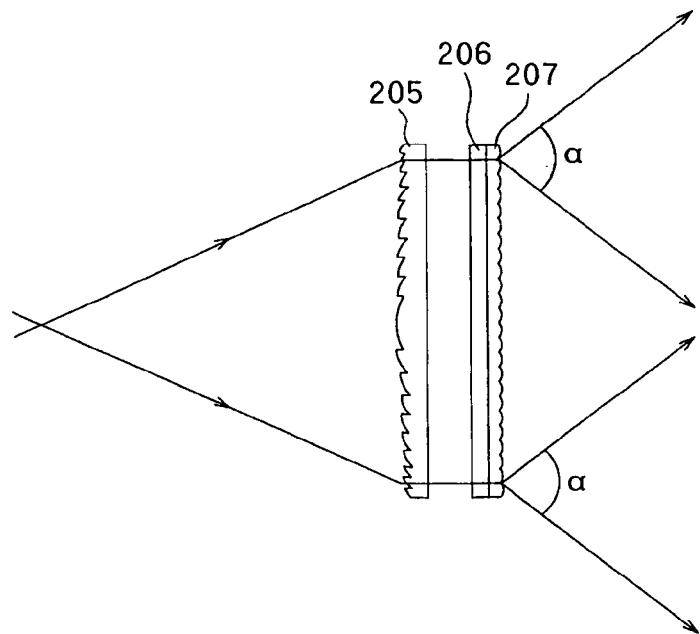
FIG. 37 is a side view of the major part of the three-dimensional image display shown in FIG. 35 showing a structure of the same.

FIG. 36 shows a major part of the three-dimensional image display shown in FIG. 35 as diagonally looked down, and FIG. 37 shows the major part of the three-dimensional image display as viewed sideways (in the direction of the arrow K in FIG. 36). As shown in those figures, light which has passed through the collimator lens 205 to be collimated is deflected when it passes through the deflecting plate 206 at an angle in accordance with the position of entrance in the lateral direction (or horizontal direction that is the direction orthogonal to the direction of entrance in the plane of the figure) and is thereafter diffused by the lenticular plate 207 in the vertical direction with an expansion at an angle $\alpha$. The lenticular plate 207 corresponds to the "diffusing means" of the invention.

For example, the LCD 203 is a single-plate color filter type liquid crystal display element having filters in colors R, G and B, and is configured such that it forms a two-dimensional dynamic image based on image data supplied by a control circuit 210 to be described later. For example, ferroelectric liquid crystal (FLC) which allows high speed operations are used in the liquid crystal portion. To provide a monochromatic image display, a monochromatic liquid crystal display element having no color filter may be used instead of the LCD 203. Instead of the light source portion 201 and LCD 203, a light source portion may be provided which has a configuration including color separating means such as a dichroic mirror or dichroic prism for each of the colors R, G and B and three monochromatic LCDs in total (not shown) provided for the respective colors R, G and B. In the present embodiment, for example, a liquid crystal display element having 600×400 pixels is used as the LCD 203 for convenience in explanation.

Figure 38:
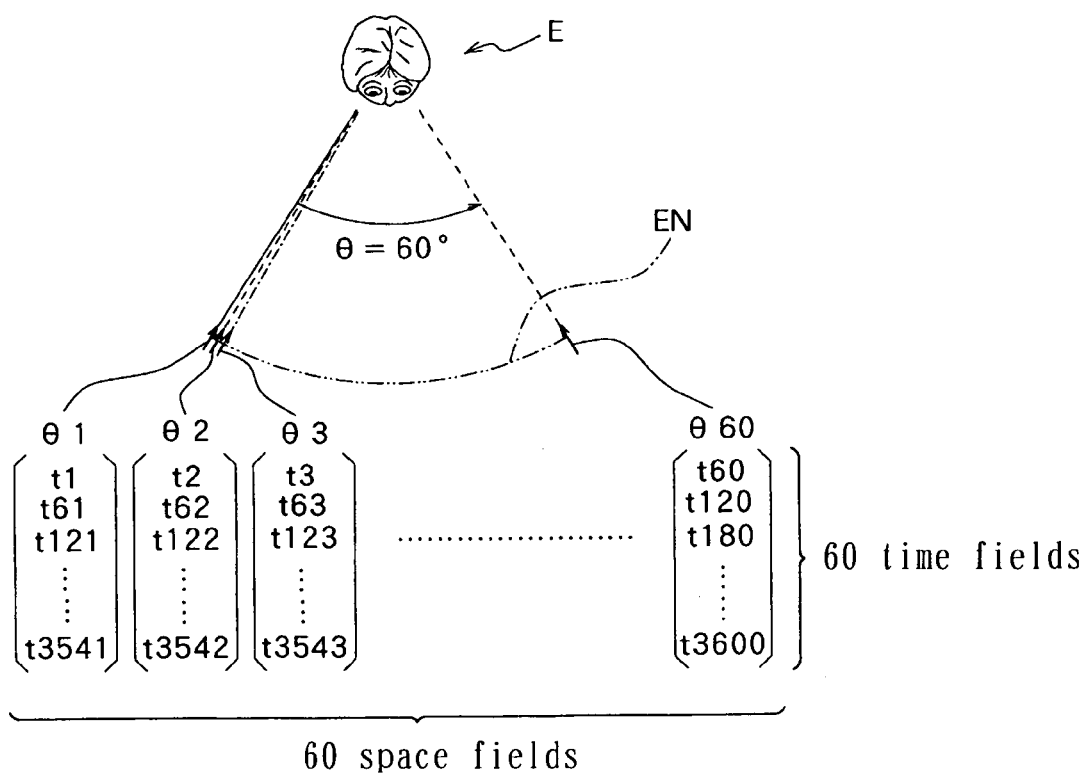
FIG. 38 is a plan view for explaining a photographic principle for acquiring two-dimensional image data to be supplied to the three-dimensional image display.

FIG. 38 illustrates a photographic principle for acquiring two-dimensional image data to be supplied to the LCD 203. In the present embodiment, a photographic camera (not shown) is moved stepwise along an arc EN about an object E from an angular direction $\theta 1$ to an angular direction $\theta 60$ at intervals of an angle $\Delta \theta$. A two-dimensional image of the object is photographed in each angular direction $\theta i$ (i=1, 2, . . . , 60) and is acquired as two-dimensional still image data. For example, the angle $\Delta \theta$ is set at one deg. If it is assumed that one two-dimensional still image thus acquired is referred to as "an image for one field", scan in the angular directions $\theta 1$ through $\theta 60$ provides two-dimensional still images for 60 fields. In the following description, the two-dimensional still images obtained by the scan in the angular directions $\theta 1$ through $\theta 60$ are referred to as "images for 60 space fields". The image acquisition in the angular directions $\theta 1$ through $\theta 60$ is controlled such that it is performed at respective points in time t1 through t60.

When the acquisition of the images for 60 space fields in the angular directions $\theta 1$ through $\theta 60$ is completed, further images for the 60 space fields in the angular directions $\theta 1$ through $\theta 60$ are acquired at subsequent points in time t61 through t120. Thereafter, the acquisition of images for 60 space fields each is similarly repeated. When this is repeated 60 times, images for 3600 fields are acquired in total. For a certain angular direction $\theta i$ of interest, images for 60 fields are acquired at points in time ti through t(i+60×59). In the following description, two-dimensional still images acquired at points in time ti through t(i+60×59) in each angular direction $\theta i$ is referred to as "images for 60 time fields".

If it is assumed here that images for the 60 space fields in the angular directions $\theta 1$ through $\theta 60$ are acquired in a period of 1/60 sec., an image acquisition period $\Delta t$ is 1/3600 sec., and images for 3600 fields are acquired in one sec.

A set of two-dimensional still images thus acquired can be regarded as a series of two-dimensional dynamic images. The two-dimensional dynamic images are subjected to a compression process according to the MPEG to be described later or the like and are recorded in a recording medium such as a video CD as compressed dynamic image data. Compressed dynamic image data reproduced from the recording medium are subjected to a decompression process to be described later and a predetermined modulation process and are thereafter supplied to the LCD 203 to form two-dimensional dynamic images on the same.

Figure 40:
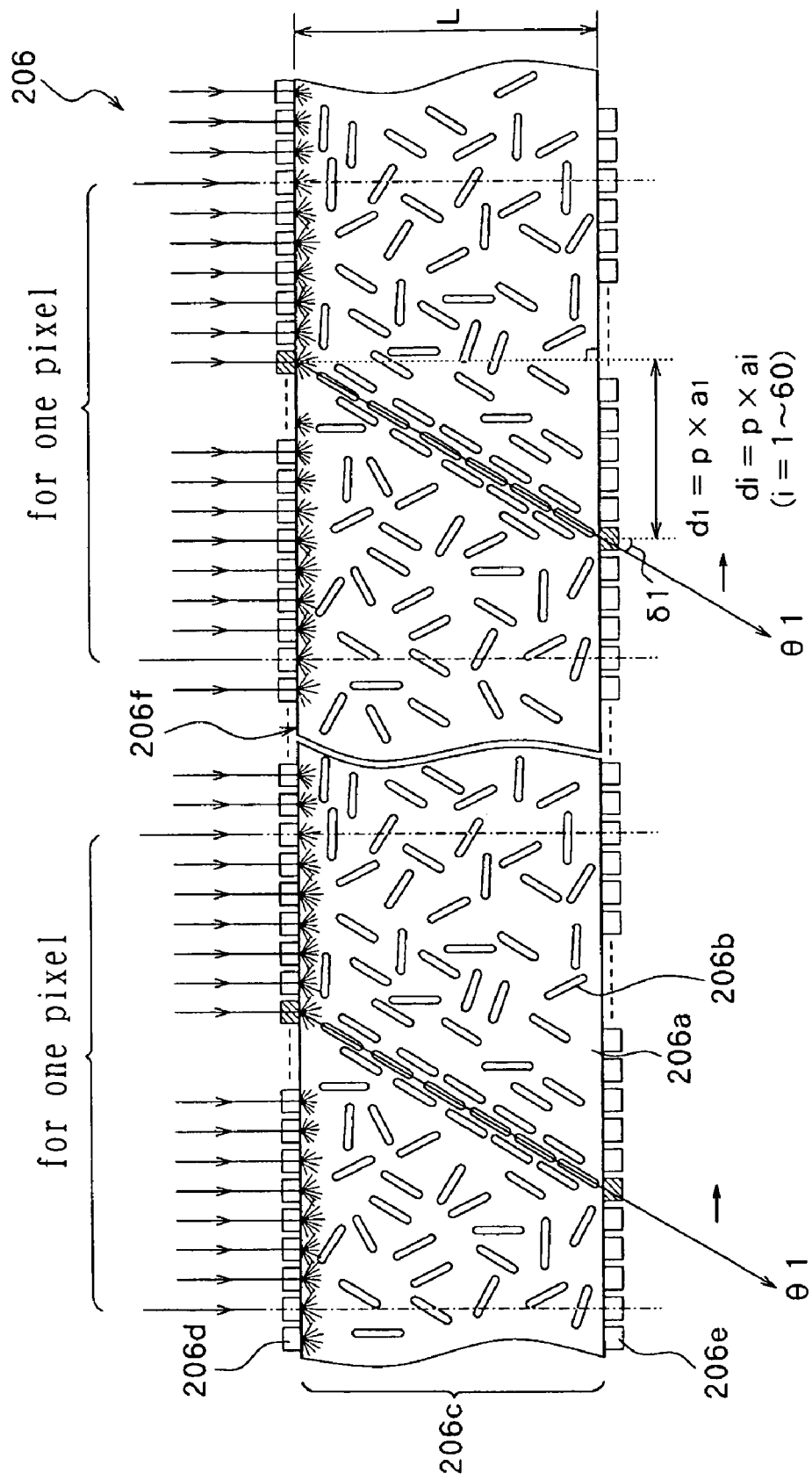
FIG. 40 is a sectional view of the deflecting plate shown in FIG. 35 showing a structure of the same.

The description continues with reference to FIG. 35 again. The deflecting plate 206 is provided for deflecting light that has exited the collimator lens 205 in the horizontal direction such that it will travel in different directions as time passes, and it is formed using an element referred to as "polymer dispersed liquid crystal (PDLC)" or "liquid crystal polymer composite" as shown in FIG. 40 to be described later. This polymer dispersed liquid crystal element has a function of allowing an opaque state and a transparent state to be switched depending on the viewing angle utilizing an effect of a match between the refractive indices of the polymer and liquid crystal which is achieved by applying a voltage to the composite of the polymer and liquid crystal to align the orientation of the liquid crystal molecules with the direction of the electric field.

Figures 39A, 39B, 39C:
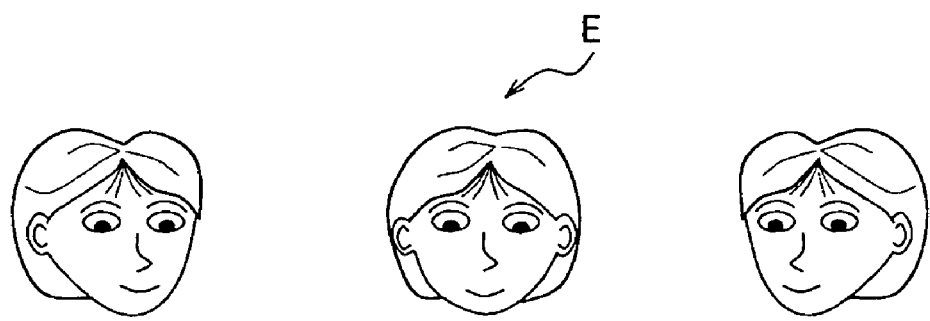
FIGS. 39A through 39C are illustrations showing how images from view points different from each other are viewed depending on the viewing direction.

For example, in accordance with the photographic conditions described with reference to FIG. 38, the present embodiment has a configuration as shown in FIG. 35 in which the field angle $\theta$ is 60 deg. and the angular resolution AO is one deg. In this case, the deflecting plate 206 has a function of causing a part of light vertically entering the same from the collimator lens 205 to sequentially exit in angular directions $\theta 1$ through $\theta 60$ with increments of one deg. In the present embodiment, angular scan at angles $\theta 1$ through $\theta 60$ (hereinafter referred to as "beam deflecting scan") is performed in a period of 1/60 sec. in synchronism with the above-described timing for image formation at the LCD 203, and the beam deflecting scan is performed 60 times to display a three-dimensional dynamic image. In this case, for example, a viewer G1 in the angular direction θ1 will see 60 two-dimensional still images in one sec., and those still images are viewed as a dynamic image for one sec. as a result of an after-image phenomenon in the eyes of the viewer G1. For example, a viewer G2 (or G3) in the angular direction θ30 (or θ60) will see 60 two-dimensional still images in one sec. from a view point different from that for the still images viewed in the angular direction θ1, and they are viewed as a dynamic image for one sec. For example, if it is assumed that two-dimensional image data supplied to the LCD 203 are obtained with the setting shown in FIG. 38, the viewers G1, G2 and G3 in the angular directions θ1, θ30 and θ60 will see images from view points different from each other, for example, as shown in FIGS. 39A through 39C.

The configuration of the deflecting plate 206 will be described in more detail.

FIG. 40 is an enlarged view of a sectional structure of the deflecting plate 206 in the horizontal direction. In order to avoid complexity of illustration, diagonal lines to indicate a section are omitted in FIG. 40 and FIGS. 41 and 42 to be described later. As shown in FIG. 40, the deflecting plate 206 in the present embodiment is constituted by a polymer dispersed liquid crystal element as described above, and it has a polymer/liquid crystal composite layer 206c formed by dispersing needle-shaped liquid crystal molecules 206b of a few microns or less in a polymeric material 206a and has stripe electrodes 206d and 206e with a microscopic width which are formed on an entrance surface and an exit surface of the polymer/liquid crystal composite layer 206c such that they face each other with the polymer/liquid crystal composite layer 206c interposed and such that they extend in the direction orthogonal to the plane of the figure. The polymer/liquid crystal composite layer 206c corresponds to the "variable transmitting direction type liquid crystal element" of the invention.

While the stripe electrodes 206d and 206e may be provided such that the directions of the stripes (the longitudinal directions of the electrodes) are in parallel with each other as described above, the so-called simple matrix arrangement may be employed. Alternatively, an active matrix arrangement configured using TFTs (thin film transistors) or the like may be employed. In those cases, the deflecting direction can be controlled on a two-dimensional basis.

A scattering surface 206f capable of uniformly scattering incident light is formed on the entrance side of the polymer/liquid crystal composite layer 206c. The stripe electrodes 206d and 206e are formed by transparent conductive films such as ITOs (indium tin oxides) or the like and extend in the direction orthogonal to the plane of the figure (longitudinal direction). A predetermined voltage is selectively applied between the stripe electrodes 206d and 206e. Light transmitted by one pixel of the LCD 203 (FIG. 35) vertically impinges upon the deflecting plate 206 such that it spans a plurality of stripe electrodes 206d. The stripe electrodes 206d and 206e are arranged at a pitch which is kept as small as possible provided that the 60 angular directions θ1 through θ60 can be accommodated.

Liquid crystal optical axes (longitudinal axes) of the liquid crystal molecules 206b are oriented in random directions in the polymeric material 206a when no voltage is applied thereto. In this state, the effective refractive index of the liquid crystal molecules 206b and the refractive index of the polymeric material 206a do not match, and the polymer/liquid crystal composite layer 206c as a whole is in an opaque and white state as a result of a light scattering effect at interfaces between the liquid crystal molecules 206b and polymeric material 206a. On the contrary, when a voltage is selectively applied between the stripe electrodes 206d and 206e, the direction of the optical axes of the liquid crystal molecules 206b are aligned in coincidence with the direction of the electric field within a small range of expansion of the resultant electric field. As a result, the apparent refractive index of the liquid crystal molecules 206b will have a value n0 which is a value of the liquid crystal molecule 206b associated with normal beams of light. Therefore, the use of a polymeric material 206a having a value substantially equal to n0 eliminates the difference between the refractive indices of the liquid crystal molecules 206b and polymeric material 206a at interfaces between them, which reduces the light scattering effect in the direction of the electric field to make the polymer/liquid crystal composite layer 206c transparent. Specifically, only light scattered at the scattering surface 206f in the direction of the electric field only exits.

The selective application of a voltage to the stripe electrodes 206d and 206e is controlled such that the application of the voltage to a pair of electrodes is sequentially shifted from left to right in the figure while keeping the direction of a straight line connecting a pair of electrodes to which the voltage is applied in alignment with the angular direction θ1. More specifically, scan for applying a pulse voltage to the stripe electrodes 206e arranged on the side of the exit surface sequentially (hereinafter referred to as "voltage application scan) is performed in synchronism with voltage application scan for applying a pulse voltage to the stripe electrodes 206d arranged on the side of the entrance surface sequentially at predetermined time intervals. At this time, control is performed to maintain a horizontal offset distance associated with the angular direction θi between a stripe electrode 206d on the side of the entrance surface to which the voltage is applied and a stripe electrode 206e on the side of the exit surface to which the voltage is applied.

Figure 41:
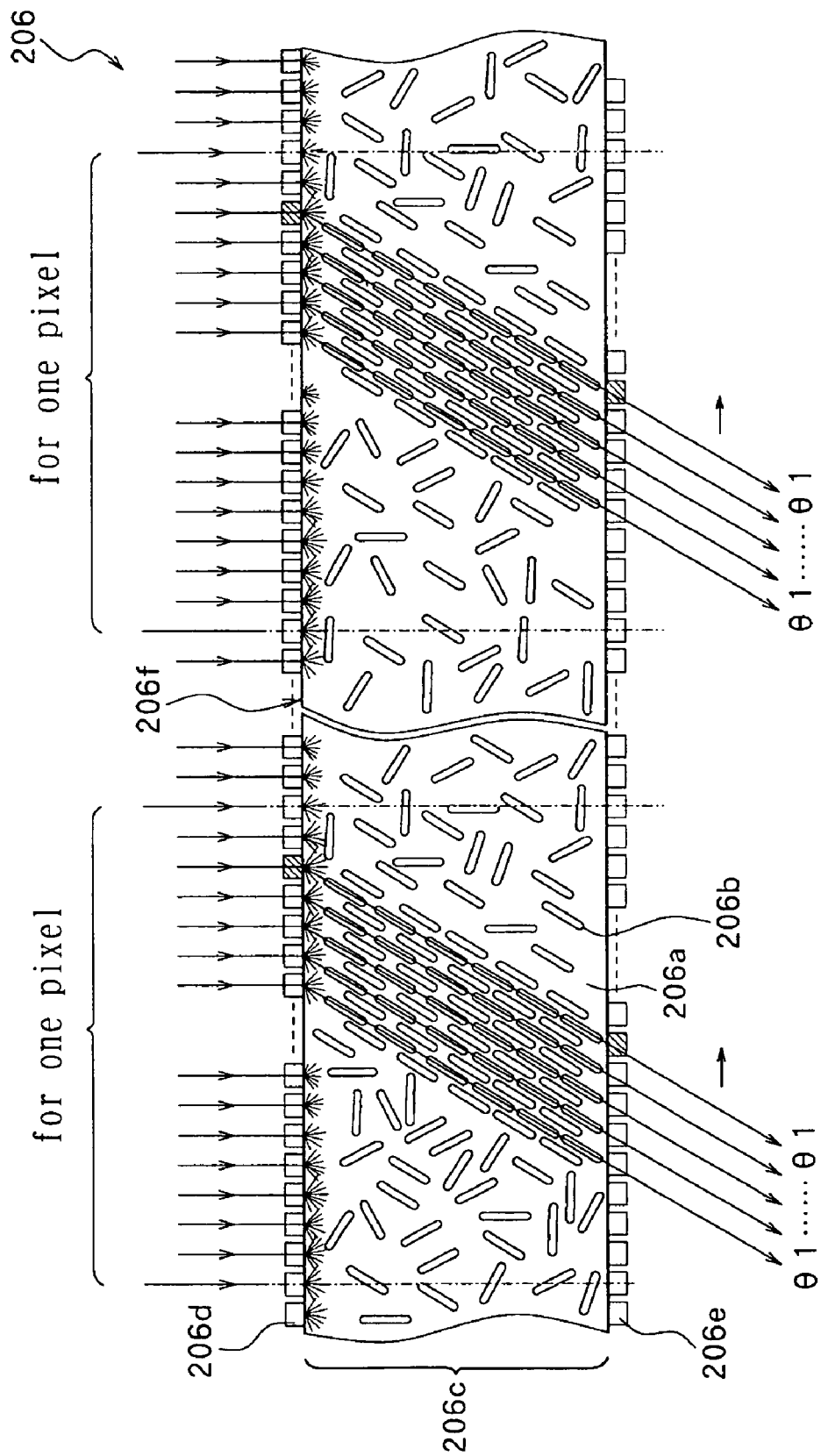
FIG. 41 is a sectional view of the deflecting plate shown in FIG. 35 showing a state of operation of the same.

For example, FIG. 40 shows a state at a certain moment during voltage application scan such that the direction of a straight line connecting a pair of electrodes to which a voltage is applied coincides with the angular direction θ1. FIG. 41 shows a state at a moment when the electrodes to which a voltage is applied are shifted four places from those in the state shown in FIG. 40. Those figures show a case in which voltage application scan is performed on two pairs of stripe electrodes 206d and 206e in parallel in order to reduce the time required for voltage application scan in each angular direction θi. In order to achieve a further reduction of the time required for voltage application scan, voltage application scan may be performed on three or more pairs of stripe electrodes 206d and 206e in parallel. When such parallel scan is performed, however, the plurality of pairs of stripe electrodes 206d and 206e must be sufficiently spaced from each other in order to prevent electrical fields generated by them from interfering with each other. Obviously, scan may be performed such that a voltage is applied to only a pair of stripe electrodes 206d and 206e at a time.

For example, let us assume here that L represents the thickness of the polymer/liquid crystal composite layer 206; p represents the pitch at which the stripe electrodes 206d and 206e are arranged; ni represents the number of horizontal offset pitches between the stripe electrodes 206d and 206e associated with the direction of an exit angle δi (angular direction θi); and di represents a horizontal offset distance di between both electrodes associated with the angular direction θi. Then, the number of horizontal offset pitches between the stripe electrodes 206d and 206e associated with an angular direction θi is expressed by the following Equation (1) where i=1, 2, ..., n because tan δi=di/L=p×ni/L.

$$ni = L \times \tan \delta / p \quad (1)$$

When voltage application scan on pairs of the stripe electrodes 206d and 206e is performed such that the number of horizontal offset pitch given by the Equation (1) is maintained, only light in an angular direction θi is selected to exit the deflecting plate 206.

Figure 42:
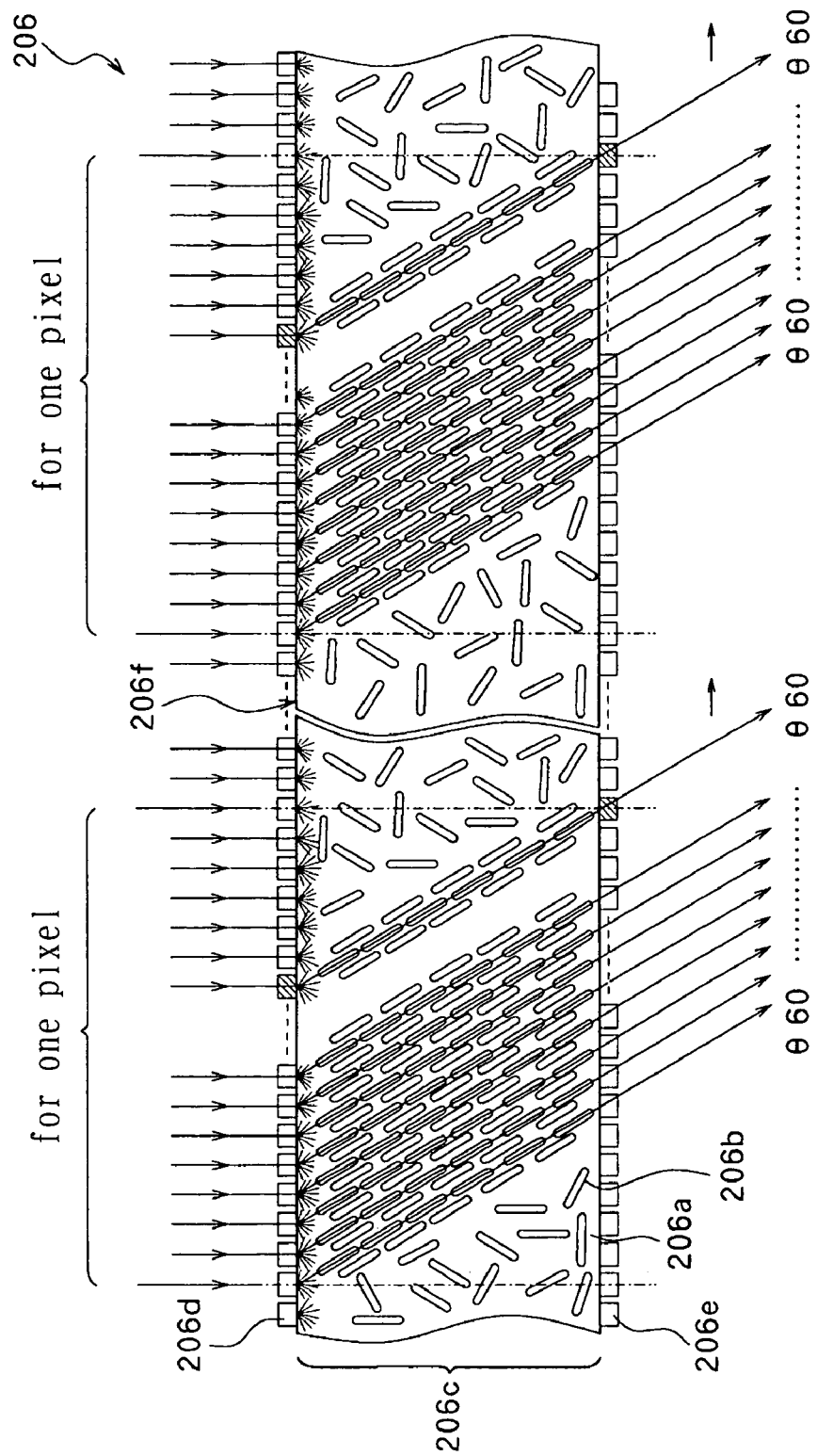
FIG. 42 is a sectional view of the deflecting plate shown in FIG. 35 showing another state of operation of the same.

When the scan in the angular direction θi is terminated, scan in an angular direction θ(i+1) will follow. Such voltage application scan in the horizontal direction is performed for each of the angular directions θ1 through θ60. FIG. 42 shows a state at a certain moment during voltage application scan in the angular direction θ60. In the present embodiment, voltage application scan for one angular direction θi is performed in a time period of 1/3600 sec. Therefore, the time required for voltage application scan for all of the angular directions θ1 through θ60 is 1/60 sec. Since the orientation of the liquid crystal molecules 206b has hysteresis, the oriented state is maintained for a certain even after the electric field moves away from the molecules. Therefore, the LCD 203 may be caused to display an image in a period of 1/3600 sec. after such orientation scan is performed throughout the deflecting plate 206. More specifically, let us assume that a scan duty ratio defined as the ratio of actual time required for voltage application scan to the period of the voltage application scan (=1/3600 sec.) is 50% or less and that a display duty ratio defined as the ratio of an actual display time to the display period of the LCD 203 (=1/3600 sec.) is also 50% or less. Then, one cycle of voltage application scan and display of one image on the LCD 203 is performed in a period of 1/3600 sec. When matrix electrodes are used instead of the stripe electrodes 206d and 206e as described above, halftones can be displayed by temporarily disturbing the orientation of the liquid crystal molecules 206 and by orienting only a part of the liquid crystal molecules 206 in one pixel in an angular direction θi.

For example, the polymer/liquid crystal composite layer 206c is formed using a method wherein a solution of a polymer and a liquid crystal is applied to a substrate and the solvent is evaporated thereafter or a method utilizing an effect of formation of small liquid crystal droplets as a result of deposition of the liquid crystal that occurs when monomers of a polymeric material is polymerized and hardened. However, it may be formed using other methods. For example, it may have a structure in which a nematic liquid crystal is dispersed in an aqueous solution of polyvinyl alcohol (PVA) or the like to form microcapsules of liquid crystal droplets or a structure in which a small amount of a gelatine polymeric material is dispersed in a liquid crystal. While spherical liquid crystal molecules are used in a conventional polymer dispersed liquid crystal, it is desirable that liquid crystal molecules have a needle-like shape for applications like the present embodiment in which they must have directivity. For example, methods for forming such a needle-shaped liquid crystal includes a method in which a liquid crystal is deposited in a uniform magnetic field to form microcapsules. According to this method, needle-shaped liquid crystal molecules 206b are formed as a result of a tidal effect in the direction of a magnetic field.

Figure 43:
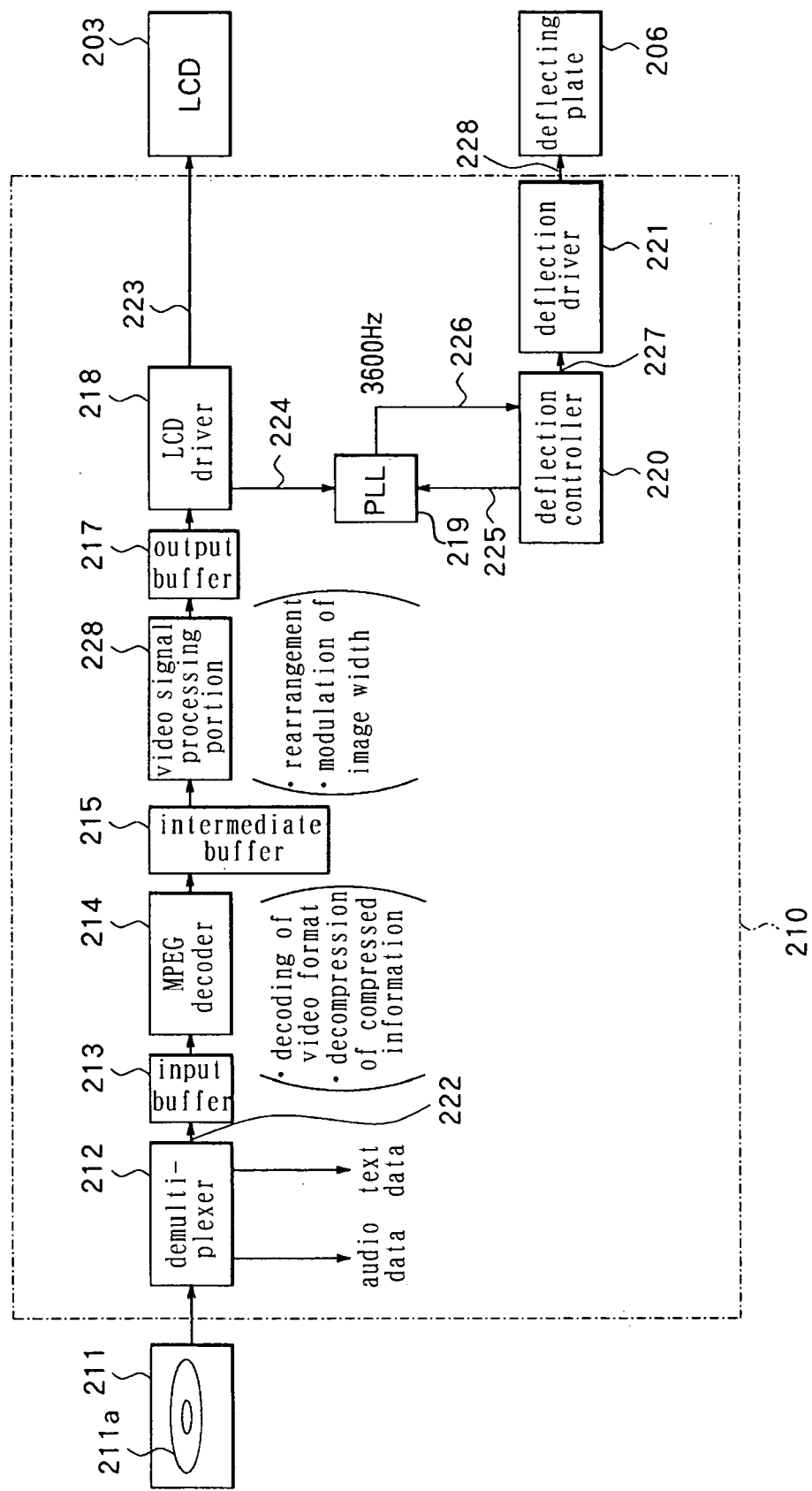
FIG. 43 is a block diagram showing a configuration of a control circuit for controlling the operation of the three-dimensional image display.

FIG. 43 shows a schematic configuration of a control circuit of the three-dimensional image display according to the present embodiment. The control circuit 210 performs a predetermined signal process on two-dimensional image data reproduced by an image reproducer 211 from a recording medium 211a such as a video CD (compact disk) or DVD (digital video disk), supplies the resultant data to the LCD 203 and controls deflection at the deflecting plate 206 in synchronism with the timing at which the two-dimensional image data are supplied to the LCD 203. For example, the two-dimensional image data recorded in the recording medium 211a are acquired based on the photographic principle illustrated in FIG. 38. The two-dimensional image data supplied to the control circuit 210 are not limited to data reproduced by the image reproducer 211 and may alternatively be data transmitted over a transmission channel such as a communication network.

The control circuit 210 has: a demultiplexer 212 for separating data read by the image reproducer 211 from the recording medium 211a into two-dimensional image data, audio data and text data; an input buffer 213 constituted by a frame memory or the like connected to an output end of the demultiplexer 212; and an MPEG (Moving Picture Experts Group) decoder 214 connected to an output end of the input buffer 213. The control circuit 210 also has: an intermediate buffer 215 connected to an output end of the MPEG decoder 214; a video signal processing portion 228 connected to an output end of the intermediate buffer 215; an output buffer 217 connected to an output end of the video signal processing portion 228; and an LCD driver 218 connected to an output end of the output buffer 217 and connected to the input side of the LCD 203 (FIG. 35). The control circuit 210 further has: a deflection controller 220 for controlling the deflecting operation of the deflecting plate 206 (FIG. 35); a deflection driver 221 connected to an output end of the deflection controller 220 and connected to the input side of the deflecting plate 206; and a PLL (phased locked loop) circuit 219 for performing control to synchronize the deflection controller 220 and LCD driver 218. The circuit formed by components from the demultiplexer 212 up to the LCD driver 218 primarily corresponds to the "image formation control means" of the invention. The PLL circuit 219, deflection controller 220 and deflection driver 221, along with the above-described deflecting plate 206, primarily correspond to the "three-dimensional image forming means" of the invention. The input buffer 213 and MPEG decoder 214 correspond to the "receiving means" and "decoding means" of the invention, respectively.

The demultiplexer 212 separates compressed image data from data reproduced by the image reproducer 211 and inputs the same to the input buffer 213. The MPEG decoder 214 is provided for performing a decompression process on the compressed image data input from the input buffer 213, a decoding process on a video format and the like. The video signal processing portion 228 is provided for performing a video signal modulation process and the like on two-dimensional image data input from the intermediate buffer 215 depending on a deflecting direction. The video signal modulation process is performed to change the width of an image to be displayed on the LCD 203 in the horizontal direction (a display magnification) depending on a deflecting direction, and a description on this process will follow. The LCD driver 218 generates a drive signal 223 having a frequency and a voltage waveform suitable for the driving of the LCD 203 based on a video signal from the output buffer 217 and supplies the same to the LCD 203.

In the present embodiment, a video signal supplying frequency for the LCD 203 is 3600 fields/sec. Therefore, if the LCD 203 is adapted for color display with, for example, 600×400 pixels, the frequency of the drive signal 223 or the switching frequency of the pixels of the LCD 203 is 3600×

600×400×3=2592 MHz. This frequency is a value which can be readily achieved by normal LCD drivers arranged in parallel.

The LCD driver 218 also transmits a basic clock signal 224 at 360 Hz serving as the basis of timing for supplying a video signal to the PLL circuit 219.

The PLL circuit 219 performs control to achieve a phase lock between the basic clock signal 224 from the deflection controller 220 and a clock signal 225 from the LCD driver 218 to feed back a locked clock signal 226 to the deflection controller 220.

The deflection controller 220 outputs a deflection control signal 227 for controlling timing for deflection at the deflecting plate 206 in synchronism with the clock signal 226 locked by the PLL circuit 219. In the present embodiment, the frequency of the deflection control signal 227 is 3600 Hz. The deflection driver 221 generates a drive signal suitable for the driving of the deflecting plate 206, i.e., a drive signal 229 having a voltage waveform and a frequency which can be applied to the stripe electrodes 206*d* and 206*e* of the deflecting plate 206 based on the deflection control signal 227 from the deflection controller 220, and supplies the same to the deflecting plate 206. One scan across the deflecting plate 206 is to be performed in association with an image for one field (1/3600 sec.) of the LCD 203. For this purpose, the frequency of the drive signal 229 applied to the stripe electrodes 206*d* and 206*e* of the deflecting plate 206 may be set at about 3600×10 Hz, for example, if the number of electrodes per pixel is 10, although it depends on the pitch (or the number) of the stripe electrodes 206*d* and 206*e*.

The operation of the three-dimensional image display having the above-described configuration will now be described.

First, the operation of the control circuit 210 will be described with reference to FIG. 43.

The image reproducer 211 reproduces data recorded in the recording medium 211*a* in a compressed form and supplies the same to the demultiplexer 212. The demultiplexer 212 separates the received data into two-dimensional dynamic image data, audio data and text data. The dynamic image data thus separated are input to the MPEG decoder 214 through the input buffer 213.

The MPEG decoder 214 performs a decompression process on the compressed image data input from the input buffer 213 and a decoding process and the like on the video format thereof and outputs the result. The video signal output by the MPEG decoder 214 is input to the video signal processing portion 228 through the intermediate buffer 215.

The video signal processing portion 228 performs a magnification modulating process (hereinafter referred to as "image width modulating process") and the like on the video signal input from the intermediate buffer 215 such that an image width in accordance with a deflecting direction is achieved. A detailed description will be made below on the image width modulating process with reference to FIGS. 44 and 45 and FIGS. 46A through 46C.

FIG. 44 schematically illustrates the relationship between the deflecting direction of light exiting the deflecting plate 206 (the projecting direction of a two-dimensional image) and the width of an image as viewed in the projecting direction. The width W1 of the image as viewed by a viewer in the projecting direction is expressed by the following Equation (2) where W represents the width of beams of light representing the two-dimensional image which have exited the LCD 203 (not shown in the figure) and have impinged upon the deflecting plate 206, and δ represents an angle defined between the projecting direction of the image and a perpendicular through the deflecting plate 206, i.e., the exit angle, as shown in the same figure.

$$W1 = W \times \cos \delta \quad (2)$$

Therefore, in order to make the width of the image as viewed by a viewer located in the direction at the exit angle δ equal to the intrinsic (original) value, the width W1 of the original image must be subjected to modulation expressed by the following Equation (3) to form an image with a corrected width W at the LCD 203.

$$W = W1 / \cos \delta \quad (3)$$

FIG. 45 is a graphical representation of the modulation function shown in the above Equation (2). This figure shows a case wherein the field angle is 60 deg. As shown in the figure, as the angle defined by the projecting direction and the perpendicular through the deflecting plate 206, i.e., the exit angle δ changes from "−30 deg." to "0 deg." and then to "+30 deg.", the value of the modulation function changes from "2/(3$^{1/2}$)" to "1" and then to "2/(3$^{1/2}$)" again. Therefore, if it is assumed, for example, that an image viewed by a viewer G2 (FIG. 35) in the frontal direction of the deflecting plate 206 (δ=0 deg.) is as shown in FIG. 46B, while an image to be formed on the LCD 203 in association with this direction (δ=0 deg.) (for example, an image at a point in time t30) may be the same in width as the image in FIG. 46B, an image to be formed on the LCD 203 in association with the direction of a viewer G1 (δ=−30 deg.) (for example, an image at a point in time t1) must be an image which is expanded in the lateral direction like that shown in FIG. 46A. Such image width modulation allows correct images as shown in FIGS. 39A through 39C to be viewed from all directions.

Referring again to the FIG. 43, the operation of the control circuit 210 will be described. A video signal output by the video signal processing portion 228 is input to the LCD driver 218 through the output buffer 217. The LCD driver 218 generates a drive signal 223 having a frequency and a voltage waveform suitable for the driving of the LCD 203 based on the video signal from the output buffer 217 and supplies it to the LCD 203. As a result, a two-dimensional image whose contents change at a speed as high as 3600 Hz, i.e., a dynamic image is formed at the LCD 203.

The deflection controller 220 outputs a deflection control signal 227 for controlling the timing for deflection at the deflecting plate 206 in synchronism with a clock signal 226 locked by the PLL circuit 219. The deflection driver 221 generates a drive signal 229 based on the deflection control signal 227 from the deflection controller 220 and supplies it to the deflecting plate 206. As a result, the deflecting plate 206 deflects the projecting direction of the two-dimensional image in synchronism with changes in the two-dimensional image formed at the LCD 203.

More specifically, as shown in FIGS. 40 through 42, the drive signal 229 is sequentially and selectively applied between the stripe electrodes 206*d* and 206*e* to achieve a uniform orientation of the liquid crystal molecules 206*b* in the direction of connecting those electrodes, which causes light to exit only in that direction. Such voltage application scan is performed at a rate of one cycle per 1/3600 sec. A two-dimensional image for one field is maintained on the LCD 203 during that period. Therefore, one two-dimensional still image is formed at each point in time tj (j=1, 2, . . . , 3600), and the two-dimensional still image is projected by the deflecting plate 206 in one projecting direction associated with the two-dimensional still image. Then, as shown in FIG. 35, deflecting scan at points in time t1 through t60 causes two-dimensional still images for 60 space fields to be projected in respective angular directions θ1 through θ60. Thereafter, deflecting scan at points in time t61 through t120 causes two-dimensional still images for 60 space fields to be projected in respective angular directions θ1 through θ60. Thereafter, the projection of images for 60 space fields are similarly repeated with the angle varied. This is repeated 60 times to project images for 3600 fields in total.

In this case, for a certain angular direction θi of interest, two-dimensional still images for 60 time fields are viewed at points in time ti, t(i+60), t(i+60×2), . . . , t(i+60×59). For example, a viewer G1 located in the angular direction θ1 (FIG. 35) views two-dimensional still images for 60 time fields in total having contents associated with the angular direction θ1 at points in time t1, t61, t121, . . . , t3541. That is, the viewer G1 views images for 60 fields per second, and the viewer feels as if a dynamic image similar to a dynamic image displayed by a normal television receiver were displayed because of the effect of an after-image phenomenon in his or her eyes as long as the positions of the viewer's eyes are fixed.

If the viewer G1 moves to the right to face the display, for example, in the angular direction θ10, the viewer G1 views two-dimensional still images for 60 time fields in total having contents associated with the angular direction θ10 at points in time t10, t70, t80, . . . , t3550. The view point for the contents of the two-dimensional still images associated with the angular direction θ10 is different from the view point for the contents of the two-dimensional still images associated with the angular direction θ1. As a result, the viewer G1 views a set of two-dimensional images from different view points projected by the deflecting plate 206 as a stereoscopic dynamic image or three-dimensional dynamic image.

A description will now be made with reference to FIGS. 47 and 48 on a method of compressing image data supplied to the three-dimensional image display.

While image data to serve as a basis of an image formed by the LCD 203 of the three-dimensional image display is obtained, for example, using the photographic method shown in FIG. 38 as described above, the image data are similar to normal dynamic image data in that the contents of the image continuously change as time passes. It is therefore possible and preferable to perform image compression according to the MPEG which is commonly used for dynamic images on the image data.

FIG. 47 illustrates a method of applying the dynamic image compression method according to the MPEG to the three-dimensional image display according to the present embodiment. As described above, image data supplied to the LCD 203 in the present embodiment can be regarded as dynamic image data with 3600 fields/sec. As shown in FIG. 47, three types of compressed images (which are simply referred to as "pictures" in the figure), i.e., I-pictures, B-pictures and P-pictures are generated based on images at points in time tj. The I-pictures correspond to the "first compressed encoded data" of the invention, and the B-pictures and P-pictures correspond to the "second compressed encoded data" of the invention.

Figure 48:
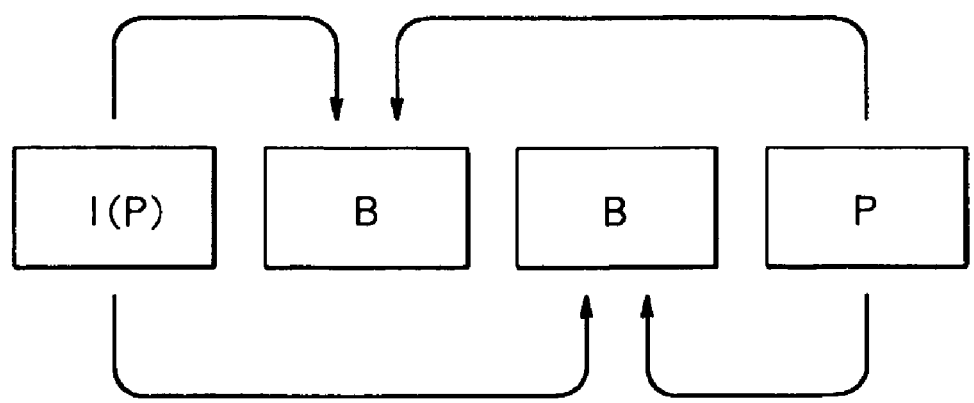
FIG. 48 illustrates the method of compressing image data according to the MPEG.

As shown in FIG. 48, an I-picture is referred to as "in-frame encoded image" or "intra encoded image" and is a picture formed by compressing an original still image for one field as it is independently of other fields. The description is based on an assumption that the terms "frame" and "field" mean the same thing. A P-picture is referred to as "inter-frame forward predictive encoded image" or "predictive encoded image" and is a picture which is formed by motion vectors representing the amounts of changes from the previous (preceding) field. A B-picture is referred to as "bidirectionally predictive encoded image" and is a picture formed by using motion vectors representing the amounts of changes from not only the previous (preceding) field but also future (the succeeding) field.

Such I-pictures, B-pictures and P-pictures are arranged in the order of "I, B, B, P" or "P, B, B, P" as shown in FIG. 47 to form one GOP (group of pictures) from 60 pictures. Such a GOP serves as a unit for random access, and GOPs are formed such that I-pictures are always placed at the respective leading positions, i.e., the positions of the points in time t1, t61, t121, . . . , t3541.

Dynamic image compression using such a method makes it possible to compress image data in a tremendous quantity of 3600 fields/sec. efficiently. This makes it possible to reduce the amount of consumption of a recording area of the recording medium 211a in FIG. 43 and to substantially achieve high speed data transfer and band compression.

As described above, in the three-dimensional image display according to the present embodiment, a two-dimensional image that changes depending on time (that is, a kind of two-dimensional dynamic image) is formed by the LCD 203, and beam deflecting scan is performed to deflect the projecting direction of the two-dimensional image with the deflecting plate 206 such that the two-dimensional image thus formed is sequentially projected in different directions in accordance with the time-dependent changes of the two-dimensional image. Thus, the two-dimensional image that changes depending on time is converted into a set of two-dimensional images from view points different from each other and, as a result, the set of those two-dimensional images can be viewed as a three-dimensional image. The three-dimensional image thus viewed is a stereoscopic image which is more realistic in that lateral surfaces of the object can be viewed by moving the view point laterally instead of being a quasi-stereoscopic display image according to prior art that utilizes parallax between the left and right eyes of a person. That is, the three-dimensional image display of the present embodiment makes it possible to display a stereoscopic image without using holography according to prior art or parallax of the eyes.

In the present embodiment, since a two-dimensional image formed by the LCD 203 is simply deflected and projected with the deflecting plate 206, light is utilized more efficiently than in the first through fourth embodiments to allow an image to be displayed with higher luminance.

The present embodiment makes it possible to view a three-dimensional dynamic image by performing beam deflecting scan for deflecting the projecting direction of a two-dimensional image repeatedly in short periods and by making a difference between the contents of a two-dimensional image projected in a particular direction in a certain deflecting scan period and the contents of a two-dimensional image projected in the particular direction in the next deflecting scan period. That is, the three-dimensional image display of the present embodiment makes it possible to achieve display of a three-dimensional dynamic image which has been difficult with lens plate three-dimensional image display techniques based on the IP method and holographic techniques in prior art.

Figure 49:
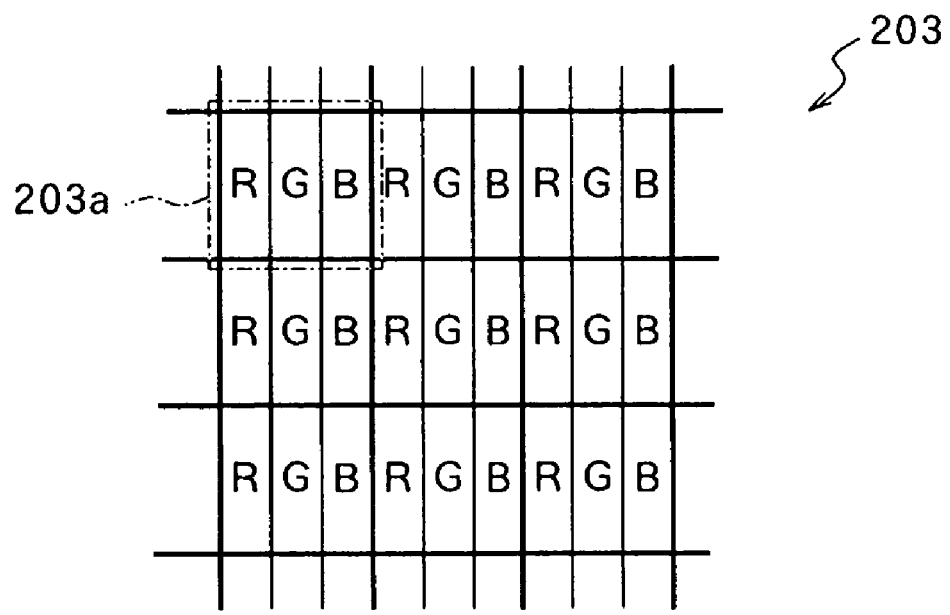
FIG. 49 illustrates an example of an arrangement of pixels of the LCD shown in FIG. 35.

In the present embodiment, while high speed display characteristics can be guaranteed by using, for example, a ferroelectric liquid crystal as the LCD 203, it is however difficult to represent a halftone with a single pixel in the present situation of the art. In this case, for example, a halftone may be achieved by driving each pixel 203a of an LCD 203 shown in FIG. 49 on a time division basis. The example in the figure shows a stripe type LCD in which color filters for R, G and B are respectively formed on three pixel electrodes that constitute one pixel.

Figure 50:
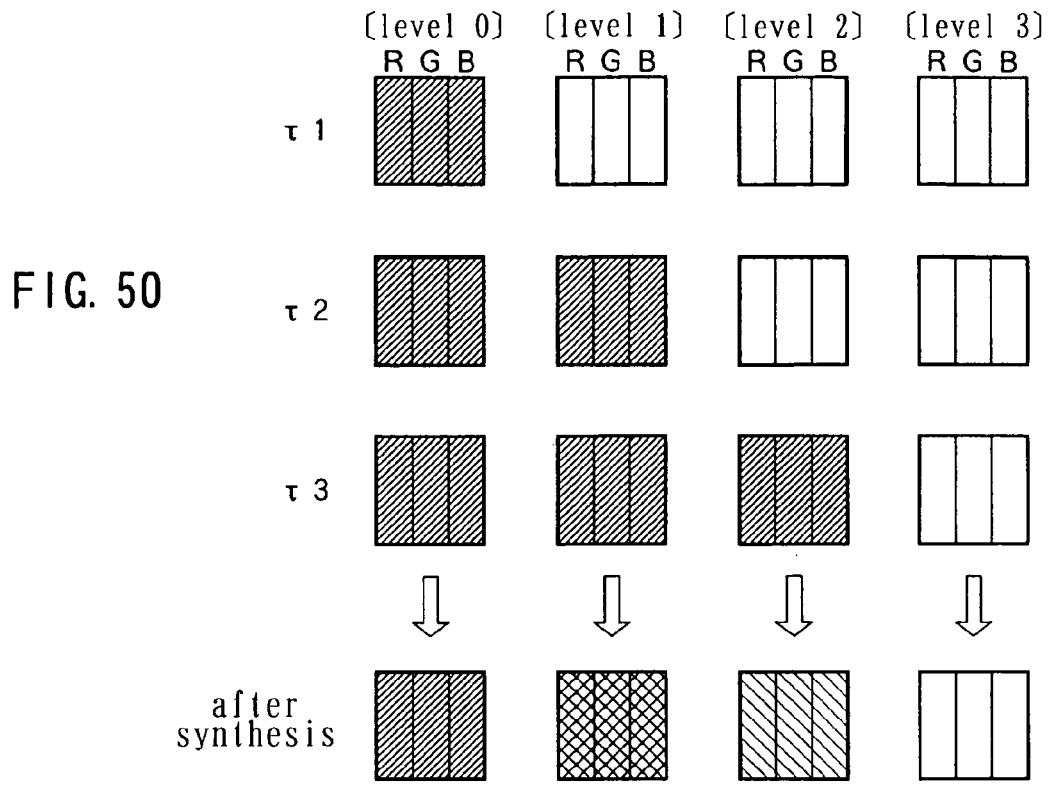
FIG. 50 illustrates a method of representing halftones using a technique on a time division basis.

In order to represent halftones, as shown in FIG. 50, a period for one field (that is 1/3600 sec. in this case) is divided into, for example, three periods τ1 through τ3, and pixels are selectively driven in each period. In the figure, the hatched parts represent undriven electrodes, and the parts which are not hatched represent driven electrodes. A pixel driven in none of the three periods τ1 through τ3 has a composite luminance at [level 0], and a pixel driven in all of the three periods 11 through T3 has a composite luminance at [level 3]. A pixel driven in only one of the periods has a composite luminance at [level 1], and a pixel driven in two periods has a composite luminance at [level 2]. In this case, consequently, a single pixel can represent tones at four levels. While R, G and B pixels are driven simultaneously (at a time) in the example of the figure in order to simplify the explanation and facilitate understanding, it is obvious that each of R, G and B pixels may be independently driven to provide halftones of each arbitrary color.

Figure 51:
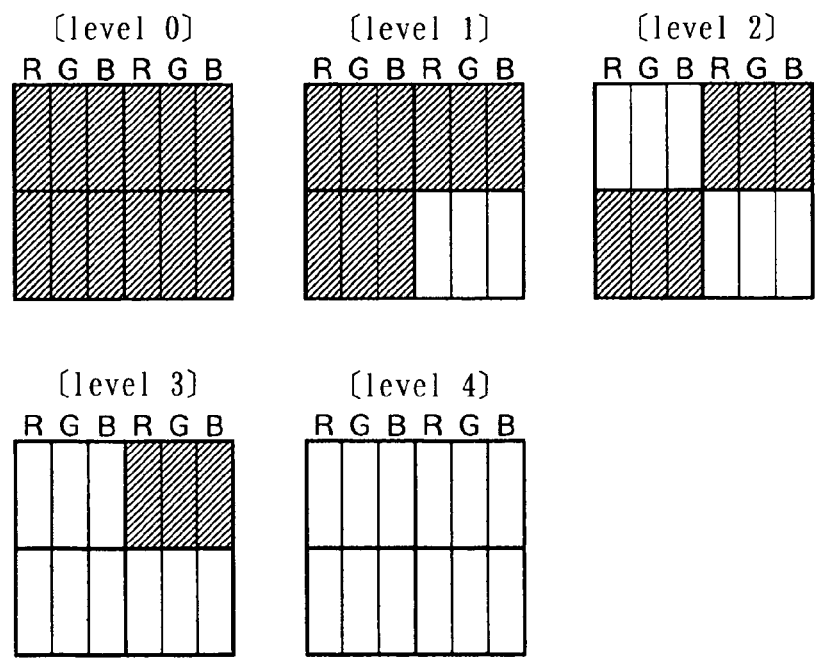
FIG. 51 illustrates a method of representing halftones using a technique on a space division basis.

For example, as shown in FIG. 51, halftones can be represented by driving four pixels adjacent to each other on a space division basis. The parts in the figure which are not hatched represent driven pixels. In this case, none, one, two, three or all of the four pixels may be selected and driven. This makes it possible to represent tones at 5 levels from [level 0] up to [level 4]. In the case of such a spatial synthetic technique, it is also possible to provide halftones of each arbitrary color by driving each of R, G and B pixels independently. Further, a combination of time division and space division makes it possible to represent a greater number of tones.

Figure 52:
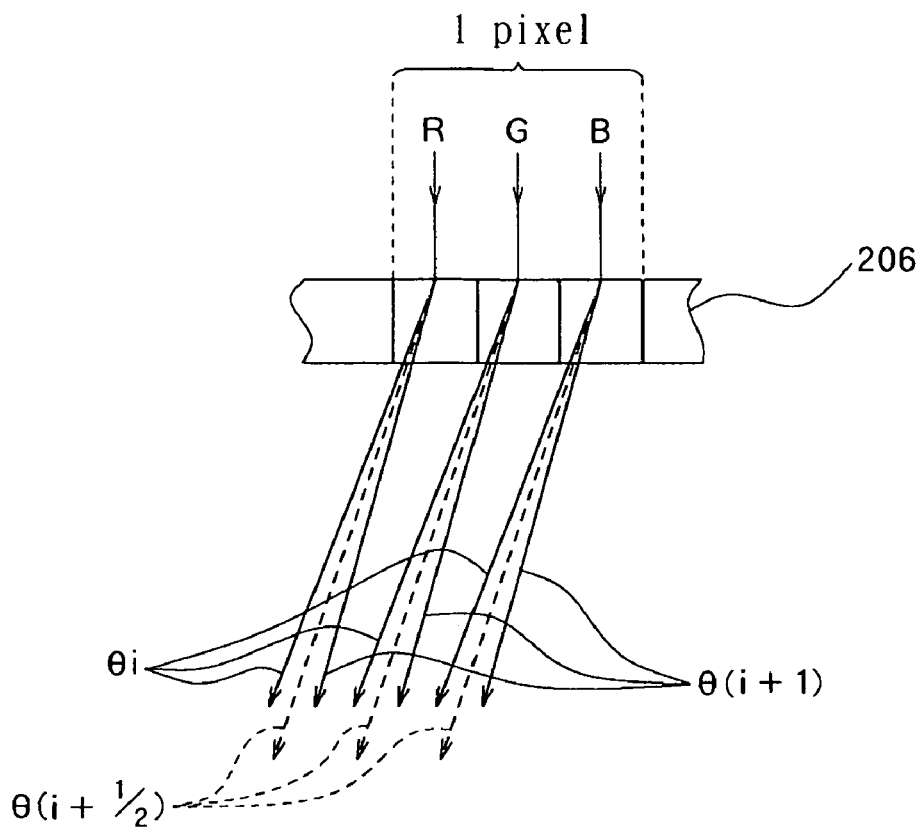
FIG. 52 illustrates a method of improving the definition of an image.
Figure 53:
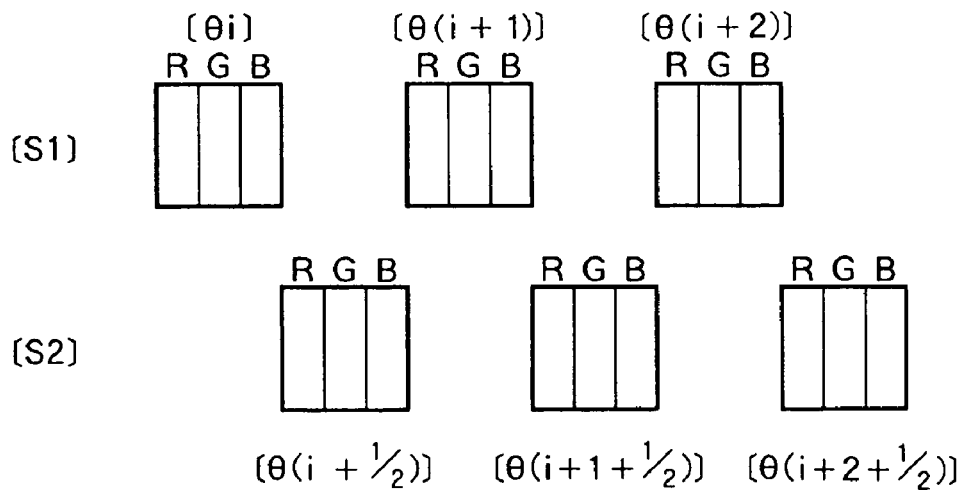
FIG. 53 illustrates a method of improving the definition of an image.

While the present embodiment has been described on an assumption that the angular resolution or the intervals of deflecting angles provided by the deflecting plate 206 are 1 deg. by way of example, a three-dimensional image with higher definition can be obtained by defining deflecting angles at smaller intervals. In this case, as shown in FIGS. 52 and 53, for example, a new angular direction θ(i+½) may be provided between angular directions θi and θ(i+1). For this purpose, an image for one field is projected and displayed by performing voltage application scan twice, for example, as shown in FIG. 53. Specifically, voltage application scan is performed with a deflecting direction initial value of θ1 and an incremental angle of 1 deg. at the first scan [s1], and voltage application scan at the second scan [s2] may be performed with the deflecting direction initial value shifted 0.5 deg. and with an incremental angle of 1 deg. similar to that for the first scan. In this case, it is possible to achieve a spatial resolution which is twice that in the above-described embodiments.

In addition, when an image for one field is projected and displayed by performing voltage application scan twice, projection and display can be performed in 120 angular directions in spite of the fact that the frequency is 60 angular directions×60 fields/sec.=3600 fields/sec. For example, while driving must normally be performed at a frequency as high as 120 angular directions×60 fields=7200 fields/sec. to project and display an image for one field in one cycle of voltage application scan with an incremental angle of 0.5 deg., driving is facilitated when an image for one field is projected and displayed by performing voltage application scan twice as described above because there is no need for increasing the frequency.

Similarly, each of the angular direction intervals of 60 angular directions may be divided into five directions to project and display an image for one field through five cycles of scan. In this case, projection occurs in angular directions of 1 deg., 2 deg., 3 deg., . . . , 60 deg. at the first scan; projection occurs in angular directions of 1.2 deg., 2.2 deg., 3.2 deg., . . . , 60.2 deg. at the second scan; projection occurs in angular directions of 1.4 deg., 2.4 deg., 3.4 deg., . . . , 60.4 deg. at the third scan; projection occurs in angular directions of 1.6 deg., 2.6 deg., 3.6 deg., . . . , 60.6 deg. at the fourth scan; and projection occurs in angular directions of 1.8 deg., 2.8 deg., 3.8 deg., . . . , 60.8 deg. at the fifth scan. Then, projection occurs again in angular directions of 1 deg., 2 deg., 3 deg., . . . , 60 deg. at the sixth scan. By repeating this thereafter, steps of 0.2 deg. can be introduced to the spatial resolution. In addition, the frequency of 60 angular directions×60 fields/sec.=3600 fields/sec. may be kept unchanged in this case. Consequently, an effect can be achieved which is equivalent to a five-fold increase of the spatial frequency to 60×60×5=18000 fields/sec.

The deflecting angle intervals may conversely be set at 1 deg., and an image for one field may be projected and displayed through two cycles of scan. Specifically, projection occurs in odd angular directions of 1 deg., 3 deg., 5 deg., . . . , 59 deg. at the first scan, and projection occurs in even angular directions of 2 deg., 4 deg., 6 deg., . . . , 60 deg. at the second scan. In this case, a spatial resolution similar to that in the above-described embodiment can be achieved in spite of a lower frequency of 30 angular directions×60 fields=1800 fields/sec.

Further, the deflecting angle intervals may be set at 1 deg., and an image for one field may be projected and displayed through five cycles of scan. Specifically, projection occurs in angular directions of 1 deg., 6 deg., 11 deg., . . . , 56 deg. at the first scan; projection occurs in angular directions of 2 deg., 7 deg., 12 deg., . . . , 57 deg. at the second scan; projection occurs in angular directions of 3 deg., 8 deg., 13 deg., . . . , 58 deg. at the third scan; projection occurs in angular directions of 4 deg., 9 deg., 14 deg., . . . , 59 deg. at the fourth scan; and projection occurs in angular directions of 5 deg., 10 deg., 15 deg., . . . , 60 deg. at the fifth scan. Then, projection occurs again in angular directions of 1 deg., 6 deg., 11 deg., . . . , 56 deg. at the sixth scan. This is repeated thereafter. Although the frequency is further reduced to 12 angular directions×60 fields=720 fields/sec. in this case, a substantial spatial resolution will be similar to that in the above-described embodiment because the resolving power of human eyes is not so high. That is, a sufficient reduction of the driving frequency can be achieved without reducing the spatial resolution. This makes it possible to configure a driver at a relatively low cost.

A modification of the present embodiment will now be described.

Figure 54:
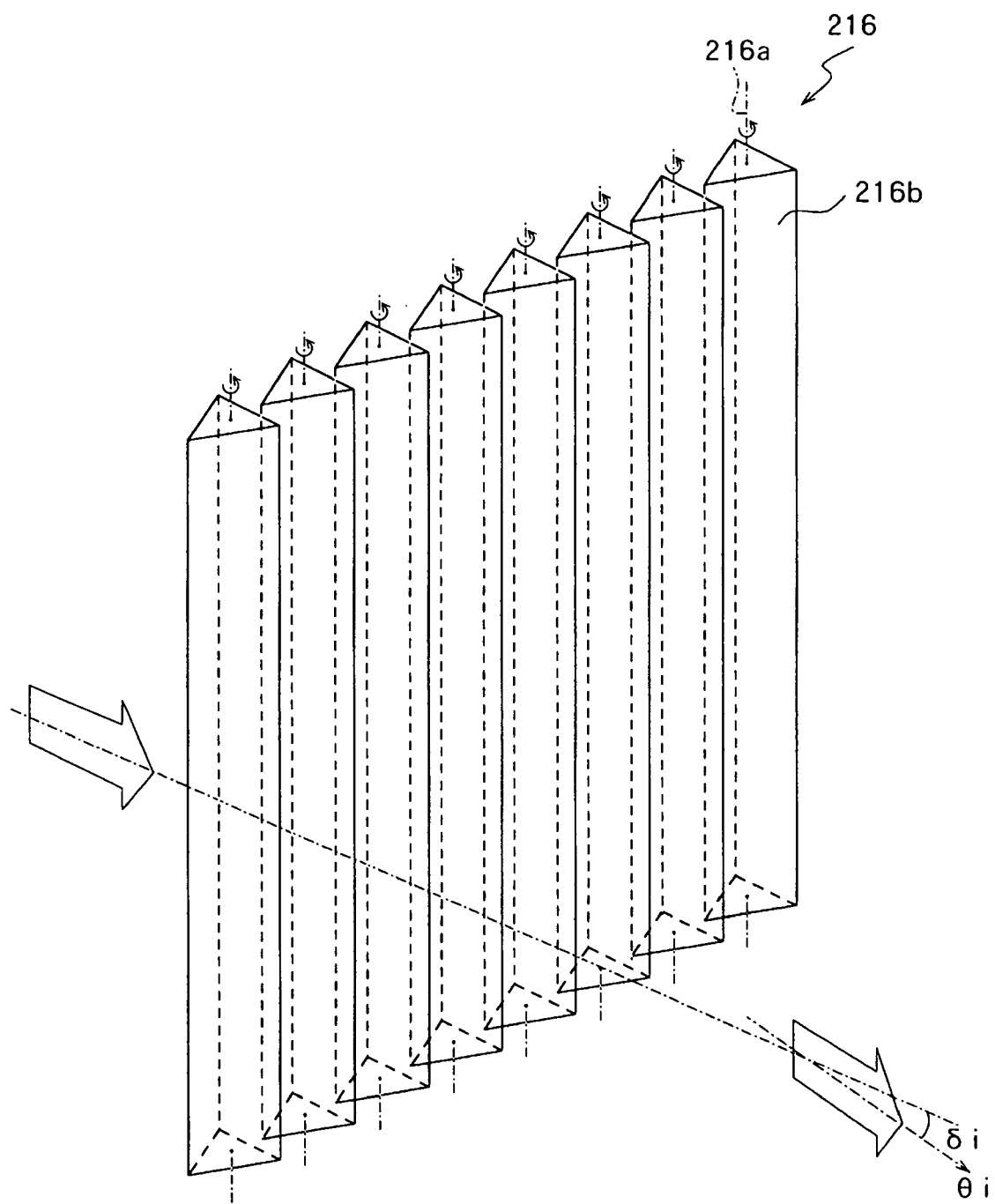
FIG. 54 is a perspective view showing a configuration of a deflecting prism array as a modification of the deflecting plate in FIG. 35.
Figures 55A, 55B, 55C, 55D, 55E:
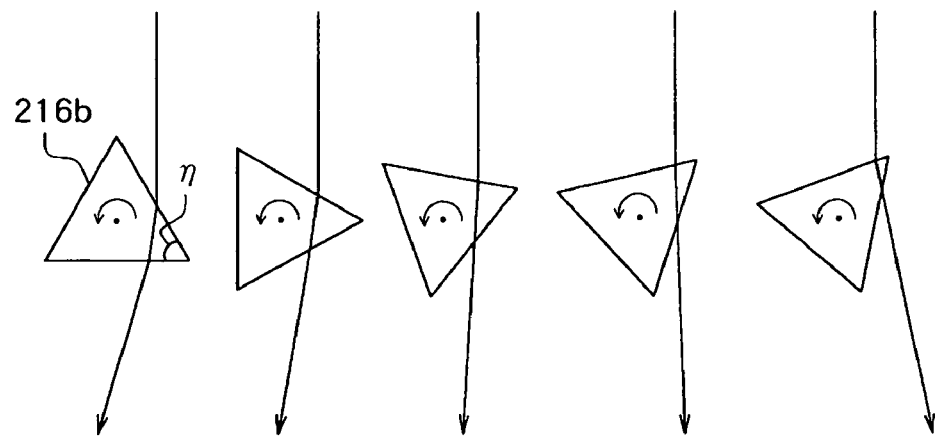
FIGS. 55A through 55E illustrate an action of the deflecting prism array shown in FIG. 54.

FIG. 54 shows an external configuration of a deflecting prism array 216 as deflecting means to replace the deflecting plate 206 in FIG. 35 and shows a state of the same as looked down diagonally. The deflecting prism array 216 has a plurality of microscopic rotary prisms 216b provided such that each of them can rotate about a rotational axis 216a. All of the rotary prisms 216b have the same configuration and are arranged such that the rotational axes 216a positioned in parallel at constant intervals. For example, the rotary prisms 216b are formed as triangular columns as illustrated. For example, the sectional configuration of them may be in the form of an equilateral triangle, an isosceles triangle or any other triangle. Those rotary prisms 216b rotate in the same direction in synchronism with each other at the same rotating speed. The rotary prisms 216b correspond to the "rotatably disposed prisms" of the invention.

FIGS. 55A through 55E show how the deflecting direction of light exiting a certain rotary prism 216 of interest changes as the rotary prism 216b rotates. As shown in those figures, incident light exits the rotary prism 216b after being deflected as a result of a refracting action in a quantity in accordance with the angle of rotation of the same. Therefore, by rotating all of the rotary prisms 216b in synchronism as described above, it is possible to cause incident light to exit with deflection at angular directions θ1 through θ60 simultaneously. FIG. 54 shows a state in which exiting light is deflected by δi relative to the direction of incident light to exit in an angular direction θi.

Figure 56:
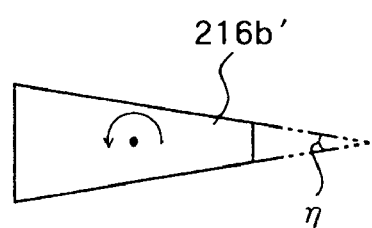
FIG. 56 illustrates another example of a rotary prism that forms a part of the deflecting prism array shown in FIG. 54.

The rotary prisms 216b are not limited to triangular columns and, for example, square column rotary prisms 216b' having a sectional configuration as shown in FIG. 56 may be employed. The apical angle η of the rotary prisms 216b and 216b' may be determined in accordance with the required maximum deflecting angle. Specifically, the greater the apical angle η, the greater the maximum deflecting angle.

A plurality of rotatable microscopic reflecting mirrors may be disposed instead of the rotary prisms 216b to deflect light by reflecting the light with those reflecting mirrors. In this case, the reflecting mirrors correspond to the "rotatably disposed reflecting mirrors" of the invention. The rotary prisms or rotary mirrors are not limited to those rotating only in the same direction, and they may perform a swinging operation which is bidirectional rotation, i.e., a swinging rotary operation.

Sixth Embodiment

A sixth embodiment of the invention will now be described.

Figure 57:
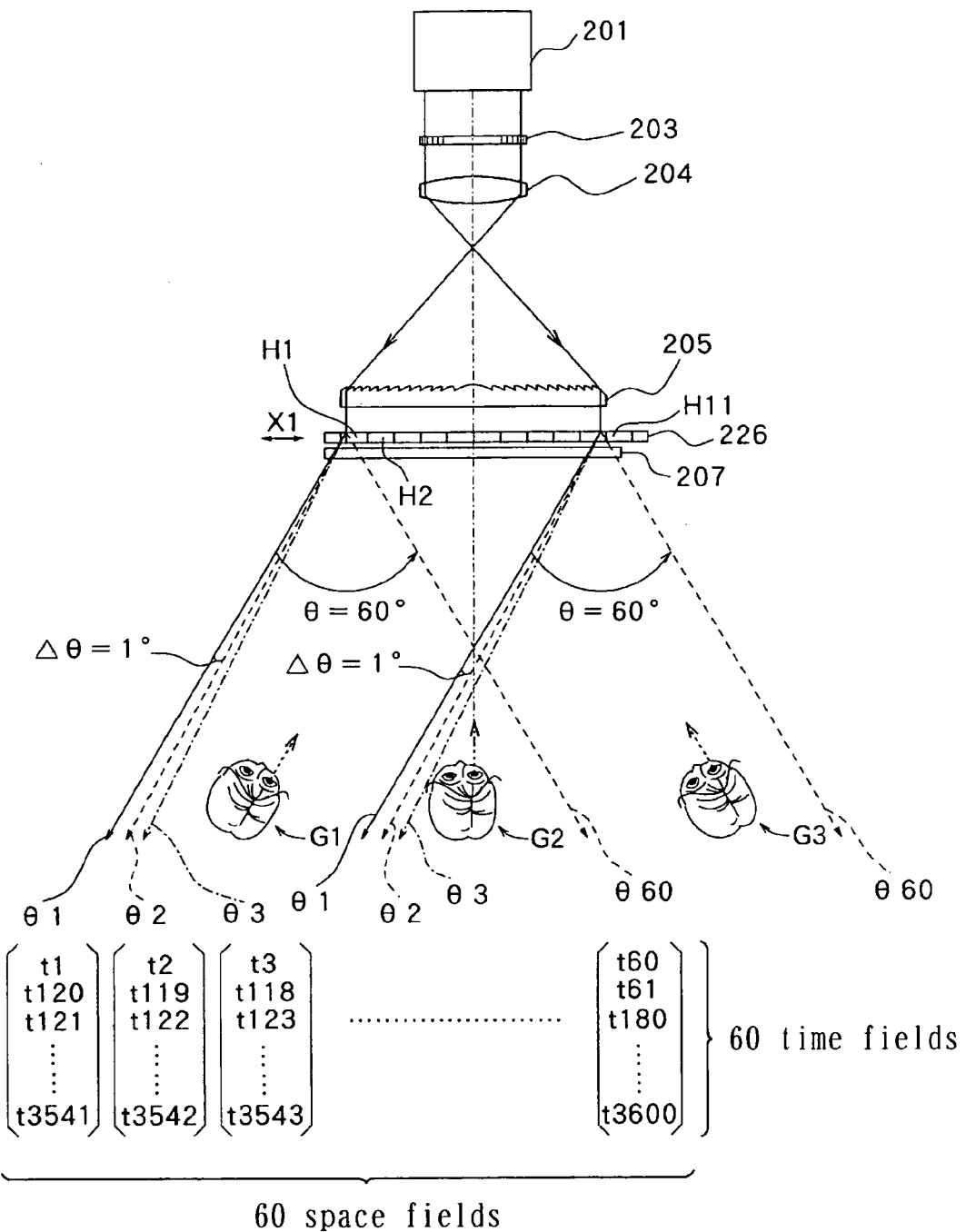
FIG. 57 is a plan view of a three-dimensional image display according to a sixth embodiment of the invention showing a configuration of the same.

FIG. 57 shows a schematic configuration of a three-dimensional image display according to a sixth embodiment of the invention. The same figure shows a state of the display as viewed directly from above. In the figure, components which are identical to components shown in FIG. 35 are indicated by like reference numbers, and the description will omit them appropriately.

The three-dimensional image display of the present embodiment has a deflecting plate 226 which is formed using a hologram instead of the deflecting plate 206 in the fifth embodiment. The deflecting plate 226 can reciprocate a predetermined stroke in a direction orthogonal to the direction of incident light (the direction of the arrow X1). The optical configuration and arrangement of the same are otherwise similar to those in FIG. 35. The present embodiment is also based on an assumption that the number of pixels of an LCD 203 in the horizontal direction is also 600 for convenience in explanation and understanding.

Figure 58:
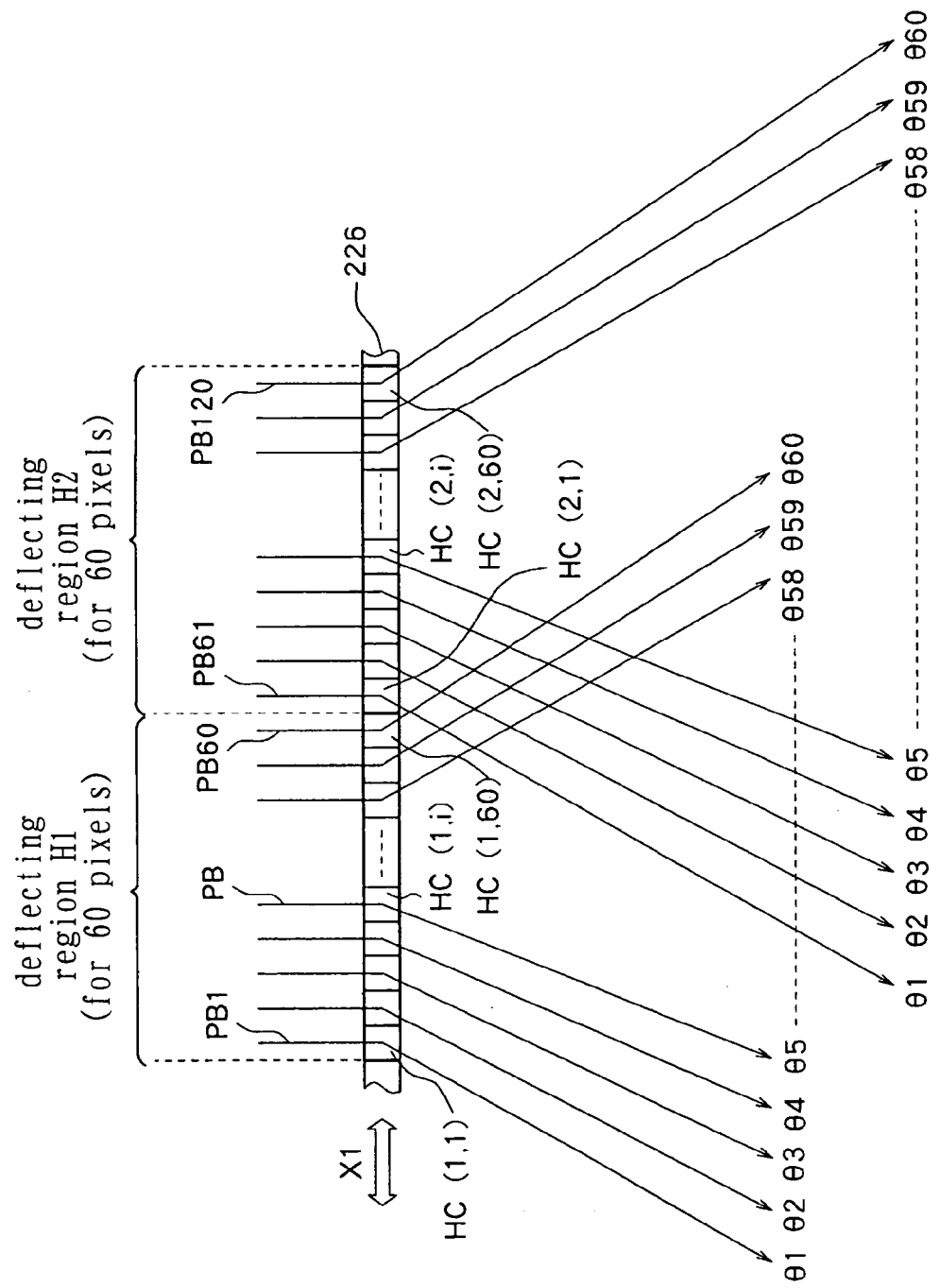
FIG. 58 is a sectional view of the deflecting plate in FIG. 57 showing a structure and action of the same.

FIG. 58 is an enlarged view of a part of a section of the deflecting plate 226 in the horizontal direction. The figure omits hatching at the sectional region. The deflecting plate 226 has eleven deflecting regions Hr (r=1, 2, . . . , 11) having the same structure. Each of the deflecting regions Hr has a width corresponding to the total width of 60 beams of incident light which have entered after being transmitted by 60 respective pixels (not shown) provided in the horizontal direction of the LCD 203. Each of the deflecting regions Hr includes 60 deflecting cells HC(r,i) (r=1, 2, . . . , 11 and i=1, 2, . . . , 60). Therefore, the deflecting plate 226 as a whole has 660 deflecting cells HC(r,i). However, as described later, there are only 600 simultaneously used deflecting cells, i.e., deflecting cells upon which incident beams of light impinge at a certain moment among those 660 deflecting cells HC(r,i). The deflecting plate 226 reciprocates a stroke corresponding to 60 deflecting cells HC(r,i) (the above-described predetermined stroke).

The deflecting cells HC(r,i) are in the form of stripes elongate in the vertical direction (the direction orthogonal to the plane of the drawing in FIG. 58) and are capable of deflecting incident beams of light in respective unique horizontal directions θi (i=1, 2, . . . , 60). Specifically, a deflecting region Hr deflects an incident beam of light at a certain point in time tj (j=1, 2, . . . , 3600) in a direction which is uniquely defined in accordance with the position of incidence of the incident beam of light. In other word, an incident beam of light PBv (v=1, 2, . . . , 600) for 60 pixels incident upon a certain single deflecting region Hr is deflected in 60 angular directions θ1 through θ60 different from each other. If it is assumed here that the field angle θ is 60 deg., the angle Δθ of the interval between adjoining angular directions is 1 deg. similarly to that in the fifth embodiment.

One deflecting region Hr corresponds to a screen dot 141 forming a part of the above-described three-dimensional screen 140 shown in FIG. 19, and one deflecting cell HC(r,i) corresponds to a space coordinate specifying cell 142a. The deflecting plate 226 having a plurality of such deflecting regions Hr may be formed using, for example, a hologram as described later.

Figure 59:
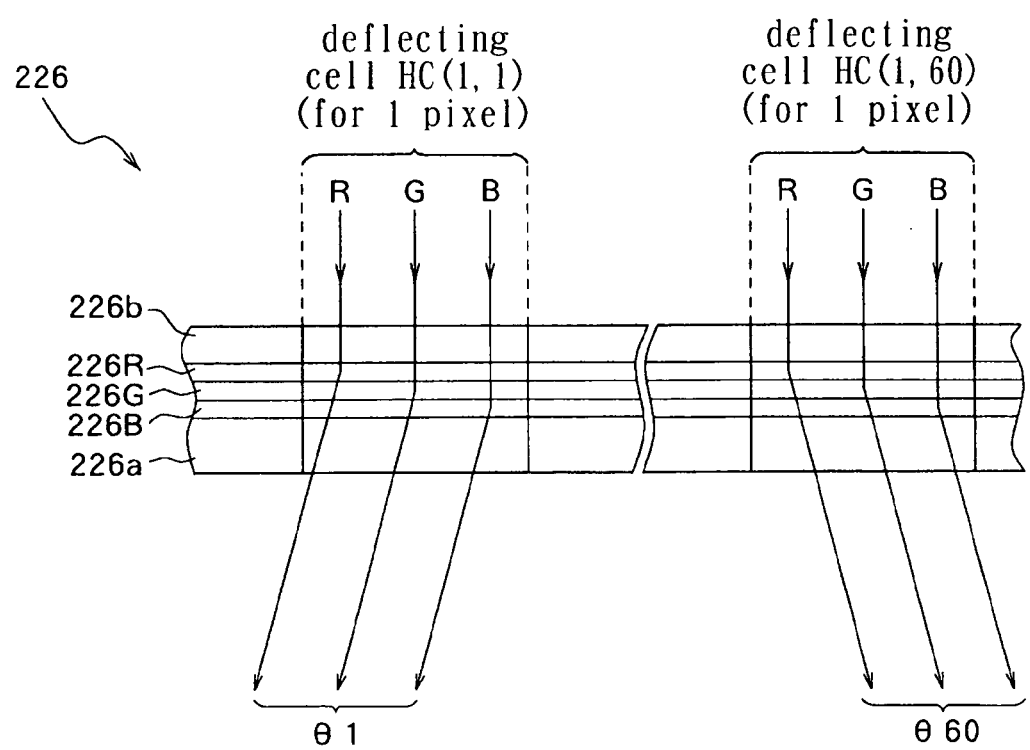
FIG. 59 is an enlarged sectional view of a part of the deflecting plate in FIG. 57 showing a structure and action of the same.

FIG. 59 shows a part of the section of the deflecting plate 226 at a higher magnification. This figure also omits hatching at the sectional region. As shown in this figure, the deflecting plate 226 is formed by sequentially stacking deflecting layers 226B, 226G and 226R and a protective layer 226b on a base material 226a. Each of the deflecting layers 226B, 226G and 226R is a hologram layer in which information is recorded in the form of a three-dimensional interference pattern utilizing volume holography. Those hologram layers are formed of hologram materials whose optical characteristics such as the refractive index, dielectric constant and reflectivity change depending on the intensity of light when irradiated by the light. However, the optical characteristics of the deflecting layer 226R are changed only by red (R) light; the optical characteristics of the deflecting layer 226G are changed only by green (G) light; and the optical characteristics of the deflecting layer 226B are changed only by blue (B) light. For example, photopolymers or the like may be used as such hologram materials. All of R-, G- and B-light included in light incident upon one deflecting cell HC(r,i) of a certain deflecting region Hr are deflected in the same direction θi. For example, FIG. 59 shows a state in which all of R-, G- and B-incident light incident upon the deflecting cell HC(1,1) of the deflecting region H1 are deflected in the direction θ1 and in which all of R-, G- and B-incident light incident upon the deflecting cell HC(1,60) are deflected in the direction θ60.

Figure 60:
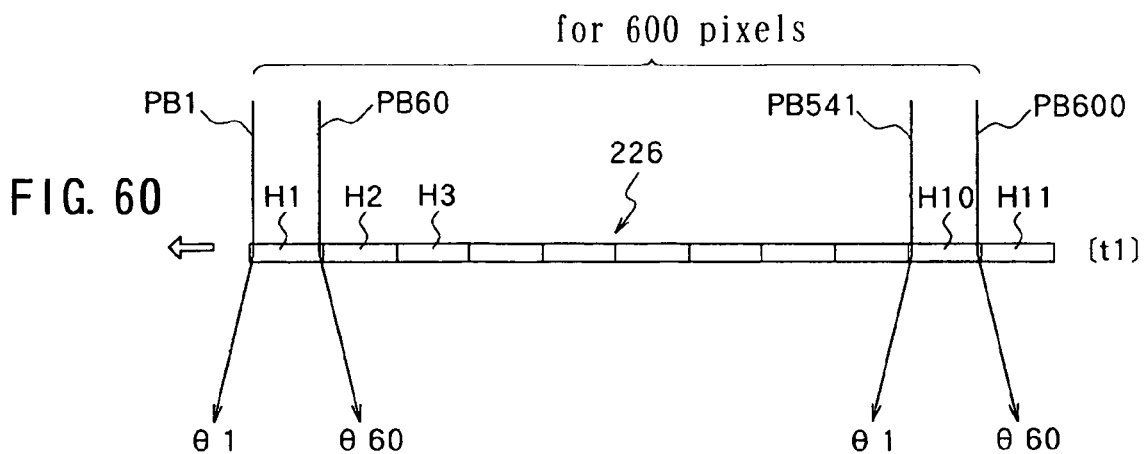
FIG. 60 illustrates the operation of the three-dimensional image display shown in FIG. 57.
Figure 61:
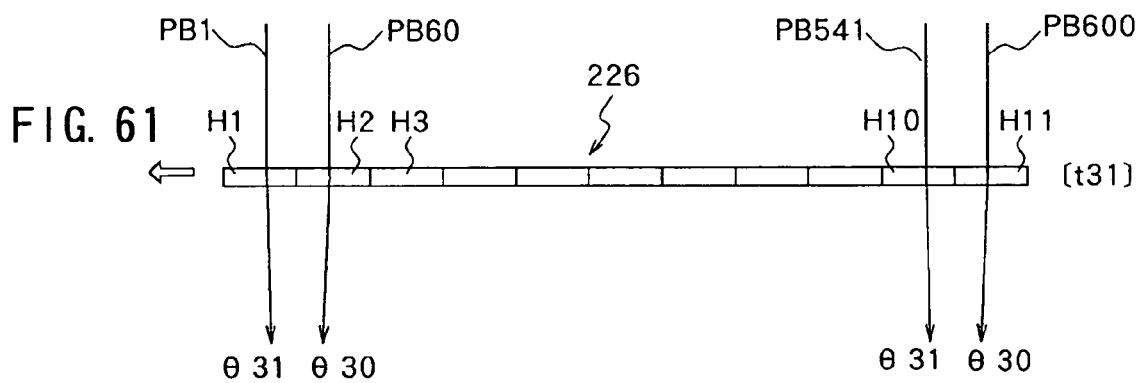
FIG. 61 illustrates the operation of the three-dimensional image display shown in FIG. 57.
Figure 62:
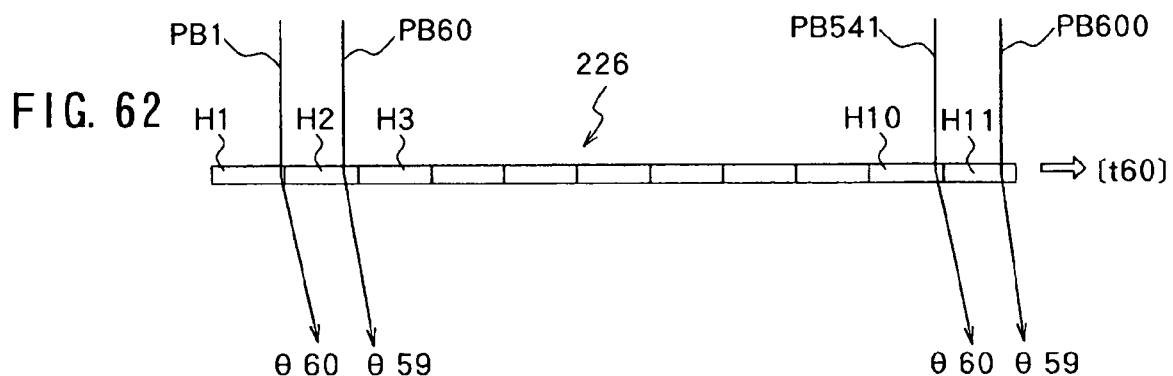
FIG. 62 illustrates the operation of the three-dimensional image display shown in FIG. 57.

Next, a description will be made with reference to FIGS. 60 through 63 and 64A through 64F on the operation of the three-dimensional image display according to the present embodiment. FIGS. 60 through 62 show how incident beams of light exit the deflecting plate 226 in FIG. 57 under deflection thereby as the plate 226 reciprocates in the direction of the arrow X1, and FIG. 63 specifically shows how the exiting directions of the incident beams of light under deflection sequentially change in the range from θ1 to θ60 as time passes.

As shown in FIGS. 60 through 62, 600 beams of incident light PBv (v=1, 2, 3, . . . , 600) which have entered through respective 600 pixels in the horizontal direction of the LCD 203 impinge upon the deflecting plate 226.

Figure 63:
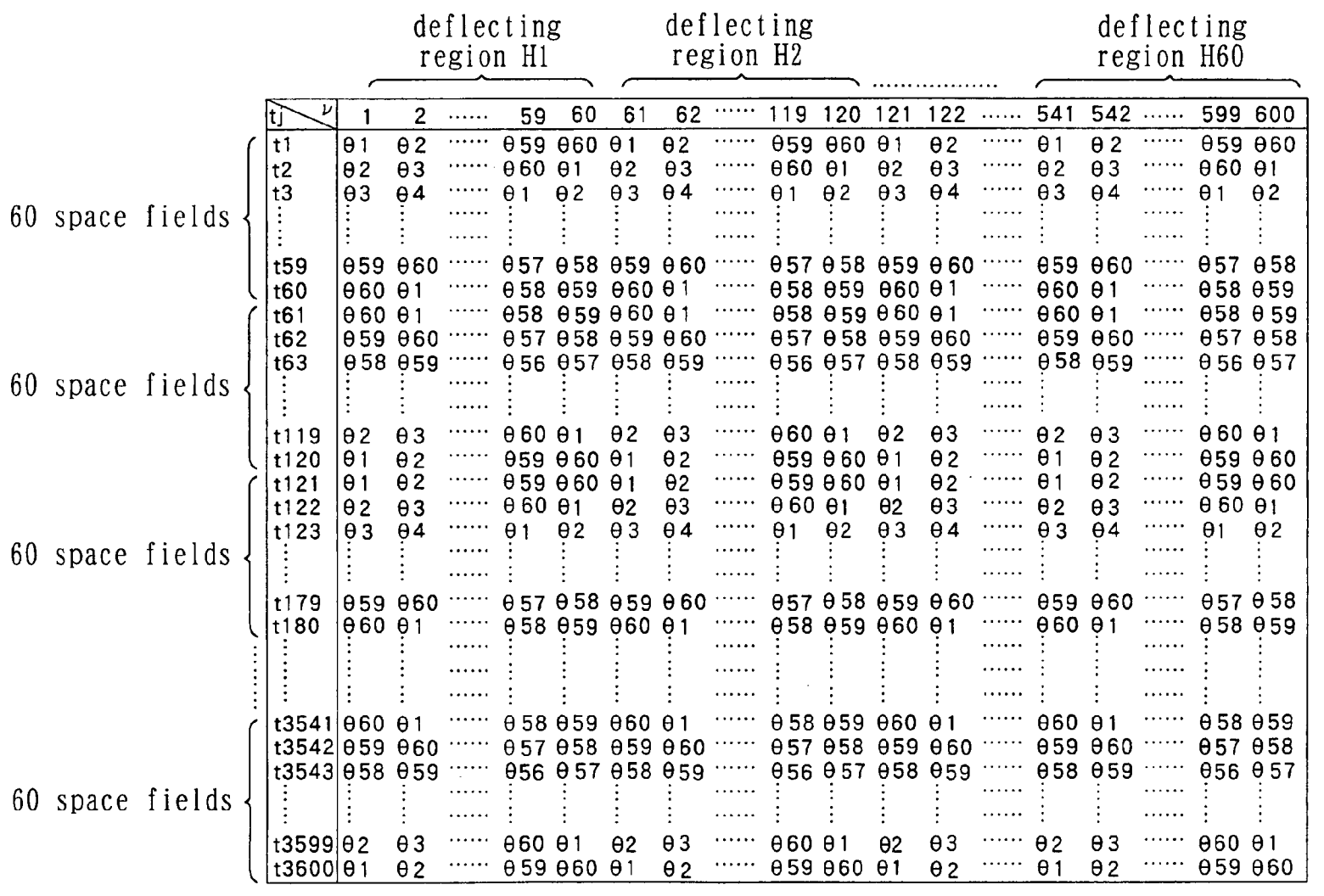

At the first point in time t1, the deflecting plate 226 is located at the right end of its stroke as shown in FIG. 60, and the 600 beams of incident light PBv respectively impinge upon the deflecting cells HC(1,1) through HC(10, 60) in the deflecting regions H1 through H10. Specifically, the beams of incident light PB1 through PB60 respectively impinge upon the deflecting cells HC(1,1) through HC(1,60) in the deflecting region H1, and the beams of incident light PB61 through PB120 respectively impinge upon the deflecting cells HC(2, 1) through HC(2,60) in the deflecting region H2. Similar actions follow, and the beams of incident light PB541 through PB600 respectively impinge upon the deflecting cells HC(10, 1) through HC(10,60) in the deflecting region H10. As shown in FIGS. 60 and 63, at the point in time t1, 60 beams of incident light incident upon each deflecting region Hr exit the same while being respectively deflected by the deflecting cells into the angular directions θ1 through θ60 in the left-to-right order shown in the figures. The vertical direction of FIG. 63 represents the direction in which time passes from the point in time t1 to the point in time t3600, and the beams of incident light PBv (v=1, 2, ..., 600) are shown in the lateral direction. The angular directions θi of deflected exiting light are shown at intersections of the vertical and lateral direction.

At the next point in time t2, the deflecting plate 226 is shifted to the left in an amount corresponding to one deflecting cell, although not shown. As a result, the 600 beams of incident light PBv respectively impinge upon the deflecting cells HC(1,2) through HC(11,1) in the deflecting regions H1 through H11. Specifically, the beams of incident light PB1 through PB60 respectively impinge upon the deflecting cells HC(1,2) through HC(2,1) in the deflecting regions H1 and H2, and the beams of incident light PB61 through PB120 respectively impinge upon the deflecting cells HC(2,2) through HC(3,1) in the deflecting regions H2 and H3. Similar actions follow, and the beams of incident light PB541 through PB600 respectively impinge upon the deflecting cells HC(10, 2) through HC(11,1) in the deflecting regions H10 and H11. As shown in FIG. 63, at the point in time t2, 60 beams of incident light incident upon each deflecting region Hr exit the same while being respectively deflected by the deflecting cells into the angular directions θ2 through θ60 and θ1 in the left-to-right order shown in the figures.

FIG. 61 shows a state at the point in time t31. At this time, the deflecting plate 226 is shifted to the left by a distance corresponding to 30 deflecting cells from the initial position (FIG. 60). Therefore, the 600 beams of incident light PBv respectively impinge upon the deflecting cells HC(1,31) through HC(11,30) in the deflecting regions H1 through H11. Specifically, the beams of incident light PB1 through PB60 respectively impinge upon the deflecting cells HC(1,31) through HC(2,30) in the deflecting regions H1 and H2, and the beams of incident light PB61 through PB120 respectively impinge upon the deflecting cells HC(2,31) through HC(3, 30) in the deflecting regions H2 and H3. Similar actions follow, and the beams of incident light PB541 through PB600 respectively impinge upon the deflecting cells HC(10,31) through HC(11,30) in the deflecting regions H10 and H11. As shown in FIG. 61 and also assumed from FIG. 63, at the point in time t31, 60 beams of incident light incident upon each deflecting region Hr exit the same while being respectively deflected by the deflecting cells into the angular directions θ31, ..., θ60, ..., θ30 in the left-to-right order shown in the figures.

FIG. 62 shows a state at the point in time t60. At this time, the deflecting plate 226 is shifted to the left by a distance corresponding to 59 deflecting cells from the initial position (FIG. 60) to be located at the left end of its stroke. At this time, the 600 beams of incident light PBv respectively impinge upon the deflecting cells HC(1,60) through HC(11,59) in the deflecting regions H1 through H11. Specifically, the beams of incident light PB1 through PB60 respectively impinge upon the deflecting cells HC(1,60) through HC(2,59) in the deflecting regions H1 and H2, and the beams of incident light PB61 through PB120 respectively impinge upon the deflecting cells HC(2,60) through HC(3,59) in the deflecting regions H2 and H3. Similar actions follow, and the beams of incident light PB541 through PB600 respectively impinge upon the deflecting cells HC(10,60) through HC(11,59) in the deflecting regions H10 and H11. As shown in FIGS. 62 and 63, at the point in time t60, 60 beams of incident light incident upon each deflecting region Hr exit the same while being respectively deflected by the deflecting cells into the angular directions θ60, θ1, ..., θ59 in the left-to-right order shown in the figures.

For example, referring to the beams of incident light PB1, PB61, PB121, ..., PB541 in FIG. 63, the angular direction of each exiting light sequentially changes from θ1 to θ60 during the period between the points in time t1 and t60 and sequentially changes from θ60 to θ1 during the period between the points in time t61 and t120 to return to the initial direction. The angular direction of the exiting light sequentially changes again from θ1 to θ60 during the period between the points in time t121 and t180, and sequentially changes from θ60 to θ1 during the period between the points in time t181 and t240 to return to the initial direction. Thereafter, the sequential change from θ1 to θ60 and from θ60 to θ1 is similarly repeated on a cycle of 120 points in time (120 space fields). In consequence, 30 strokes (3600/120) of beam deflecting scan are performed during 3600 space fields from the point in time t1 up to the point in time t3600.

For example, referring to the beams of incident light PB2, PB62, PB122, ..., PB542 in FIG. 63, the angular direction of each exiting light sequentially changes from θ2 to θ60 and then to θ1 during the period between the points in time t1 and t60, and sequentially changes from θ1 to θ60 and then to θ2 during the period between the points in time t61 and t120 to return to the initial direction. Thereafter, the sequential change from θ2 to θ60 and then to θ1 and from θ1 to θ60 and then to θ2 is similarly repeated on a cycle of 120 space fields. In consequence, 30 strokes of beam deflecting scan are also performed during 3600 space fields from the point in time t1 up to the point in time t3600.

The same applies to the beams of incident light PB3, PB63, PB 123, ..., PB543 through PB60, PB120, PB180, ..., PB600. In consequence, 30 strokes of beam deflecting scan are performed during 3600 space fields for each of the beams of incident light PBv. If it is assumed that the time interval (i.e., one space field) is 1/3600 sec., 30 strokes of beam deflecting scan are performed per second. For this purpose, the deflecting plate 226 may be reciprocated 30 times per second in a stroke corresponding to 60 deflecting cells.

As shown in FIG. 57, for example, a viewer G1 located in the angular direction θ1 views two-dimensional images projected from the deflecting plate 226 in the angular direction θ1 in 60 time fields in total, i.e., points in time t1, t120, t121, t240, ..., t3541. A viewer G3 located in the angular direction θ60 views two-dimensional images projected from the deflecting plate 226 in the angular direction θ60 in 60 time fields in total, i.e., points in time t60, t61, t180, t181, ..., t3600. In each of other angular directions θi, two-dimensional images projected from the deflecting plate 226 are viewed.

Consequently, the viewer G1 views images for 60 fields per second similarly to the fifth embodiment (FIG. 35), and the viewer feels as if a dynamic image similar to a dynamic image displayed by a normal television receiver were displayed as long as the positions of the his or her eyes are fixed. If the viewer G1 moves to the right to face the display, for example, in the angular direction θ10, the viewer G1 views two-dimensional still images for 60 time fields in total having contents associated with the angular direction θ10 at points in times associated with the angular direction θ10. The view point for the contents of the two-dimensional still images associated with the angular direction θ10 is different from the view point for the contents of the two-dimensional still images associated with the first angular direction θ1. As a result, the viewer G1 views a set of two-dimensional images from different view points projected by the deflecting plate 226 as a stereoscopic dynamic image or three-dimensional dynamic image.

In the present embodiment, however, since beam deflecting scan at the deflecting plate 226 is performed bidirectionally (back and forth), if two-dimensional image data supplied to the LCD 203 are acquired using the photographic method shown in FIG. 38 in the fifth embodiment, it is necessary to change the order in which the two-dimensional image data are supplied to the LCD 203. Alternatively, the order in which the picture-taking direction is switched during the photographic operation (i.e., switching of photographic cameras) may be matched to the order of the bidirectional beam deflecting scan at the deflecting plate 226 of the three-dimensional image display in advance.

Figure 64A:
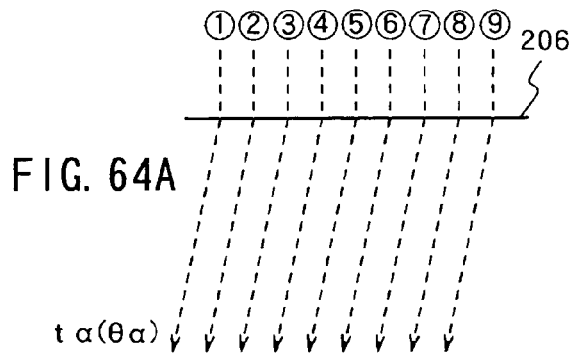
FIGS. 64A through 64F show a comparison between the principles of deflecting operations of the three-dimensional image display shown in FIG. 35 and the three-dimensional image display shown in FIG. 57.
Figure 64D:
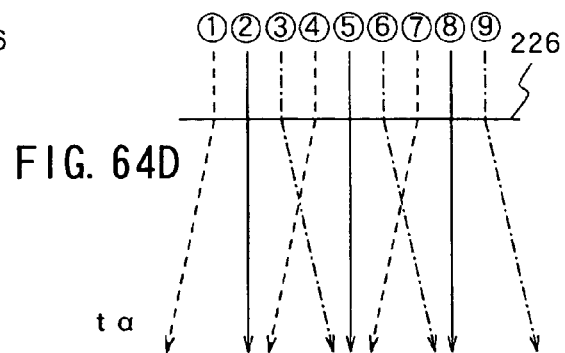
Figure 64B:
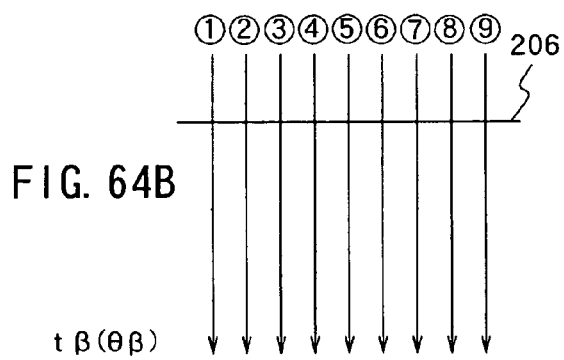
Figure 64E:
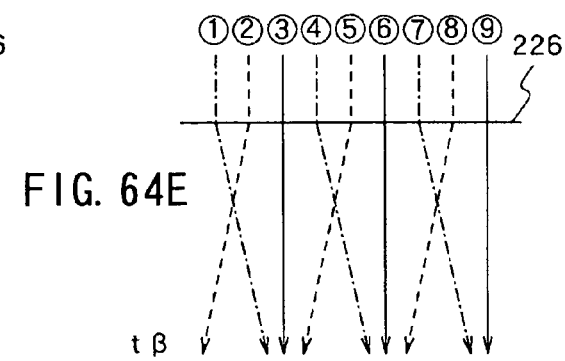
Figure 64C:
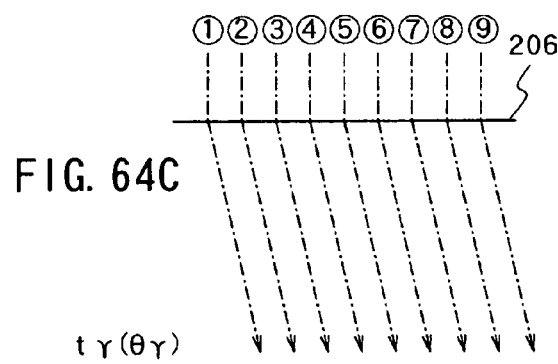
Figure 64F:
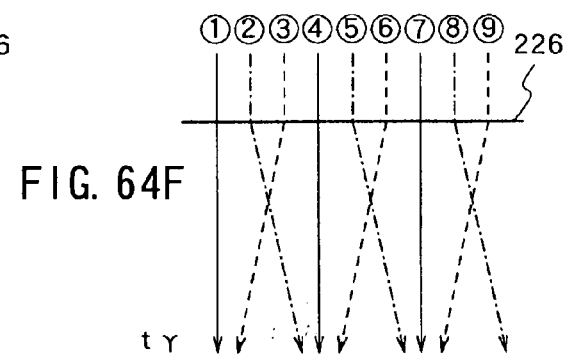

A description will now be made with reference to FIGS. 64A through 64F on differences and similarities between principles behind beam deflecting scan using a deflecting plate in the present embodiment and the fifth embodiment. FIGS. 64A through 64C schematically illustrate the principle behind beam deflecting scan in the fifth embodiment, and FIGS. 64D through 64F schematically illustrate the principle behind beam deflecting scan in the present embodiment. In those figures, nine beams of incident light that constitute a two-dimensional image formed by the LCD 203 (which is not shown in those figures) are indicated by respective reference numbers ① through ⑨ for convenience in explanation.

In the fifth embodiment, as shown in FIGS. 64A through 64C, the beams of incident light ① through ⑨ are simultaneously deflected by the deflecting plate 206 in the same direction at each time. Strictly speaking, there is slight time differences in the timing of deflection between the beams of light, but it may be thought that the beams of light are deflected simultaneously because the time differences are quite small.

Specifically, the two-dimensional image formed by the LCD 203 is projected only in a direction θα at the point in time tα shown in FIG. 64A; the two-dimensional image formed by the LCD 203 is projected only in a direction θβ at the point in time tβ shown in FIG. 64B; and the two-dimensional image formed by the LCD 203 is projected only in a direction θγ at the point in time tγ shown in FIG. 64C. In addition, the two-dimensional images projected by the deflecting plate 206 at points in time tα, tβ and tγ are images photographed from view points associated with the respective projecting directions. As a result, a viewer will see a three-dimensional image in the space as described with reference to FIG. 35.

In the present embodiment, as shown in FIGS. 64D through 64F, the beams of light ① through ⑨ are not simultaneously deflected by the deflecting plate 206 in the same direction. Specifically, a part of the two-dimensional images formed by the LCD 203 at the points in time tα, tβ and tγ are projected in different directions θα, θβ and θγ, respectively.

Specifically, at the timing tα shown in FIG. 64D, a part of the two-dimensional image formed by the LCD 203 represented by three beams of incident light ①, ④ and ⑦ is projected in the direction θα; a part of the same represented by three beams of incident light ①, ⑤ and ⑧ is projected in the direction θβ; and a part of the same represented by three beams of incident light ③, ⑥ and ⑨ is projected in the direction θγ. At the timing tβ shown in FIG. 64E, a part of the two-dimensional image formed by the LCD 203 represented by the three beams of incident light ②, ⑤ and ⑧ is projected in the direction θα; a part of the same represented by the three beams of incident light ③, ⑥ and ⑨ is projected in the direction θβ; and a part of the same represented by the three beams of incident light ①, ④ and ⑦ is projected in the direction θγ. At the timing tγ shown in FIG. 64F, a part of the two-dimensional image formed by the LCD 203 represented by the three beams of incident light ③, ⑥ and ⑨ is projected in the direction θα; a part of the same represented by the three beams of incident light ①, ④ and ⑦ is projected in the direction θβ; and a part of the same represented by the three beams of incident light ②, ⑤ and ⑧ is projected in the direction θγ.

It is apparent from FIGS. 64D through 64F that, for a certain direction θα of interest, the projection of a two-dimensional image in the direction θα occurs in three steps at points in time tα, tβ and tγ. Specifically, the beams of light ①, ④ and ⑦ are projected in the direction θα at the point in time tα; the beams of light ②, ⑤ and ⑧ are projected in the direction θα at the point in time tβ; and the beams of light ③, ⑥ and ⑨ are projected in the direction θα at the point in time tγ. If we take up the direction θβ, the projection of a two-dimensional image in the direction θβ also occurs in three steps at points in time tα, tβ and tγ. This also applies to the direction θγ.

When one space field is 1/3600 sec. as described above, the maximum time difference between the points in time tα, tβ and tγ is 1/60 sec. Therefore, a viewer can not distinguish in practice a view of one two-dimensional image projected on a time division basis as shown in FIGS. 64D through 64F and a view of one two-dimensional image projected at a time as shown in FIGS. 64A through 64C. That is, a three-dimensional image similar to that in the fifth embodiment is viewed even when deflecting scan on a time division basis as in the present embodiment is carried out.

As described above, in the three-dimensional image display according to the present embodiment, the deflecting plate 226 is formed using a hologram capable of deflecting incident light in a predetermined direction in accordance with the position of incidence, which makes it possible to replicate the same part easily and to manufacture the deflecting plate 226 on a mass production basis at a low manufacturing cost. In the present embodiment, the deflecting plate 226 is only required to reciprocate in a direction orthogonal to the direction of incident light in synchronism with time-dependent changes in a two-dimensional image formed by the LCD 203, which involves a relatively simple mechanism and control.

Figure 65:
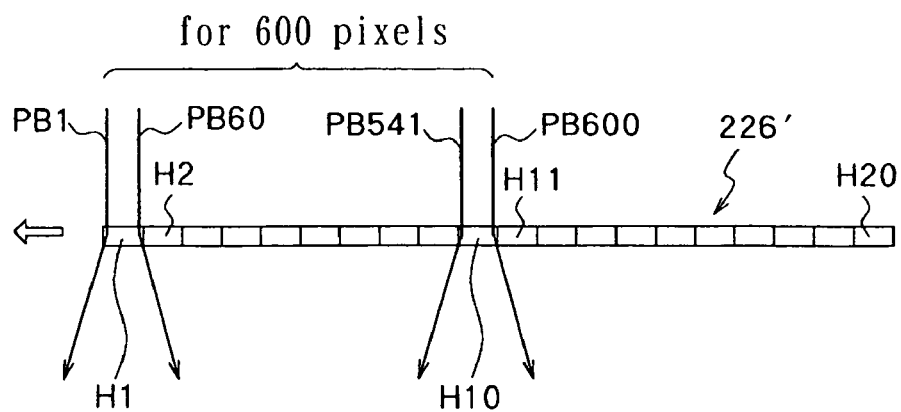
FIG. 65 is an illustration for explaining the operation of a three-dimensional image display according to a modification of the three-dimensional image display shown in FIG. 57.
Figure 66:
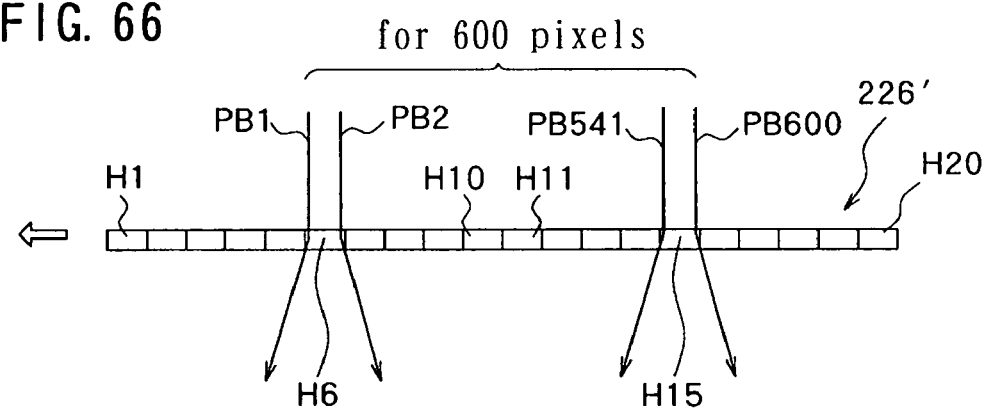
FIG. 66 is an illustration for explaining the operation of the three-dimensional image display according to the modification of the three-dimensional image display shown in FIG. 57.
Figure 67:
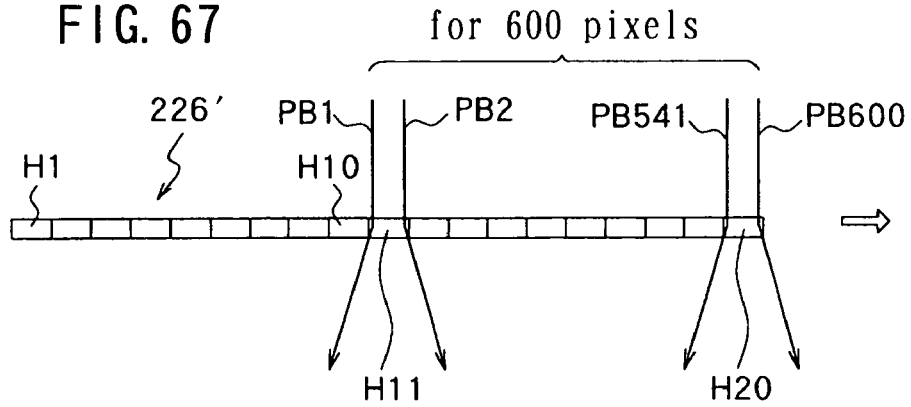
FIG. 67 is an illustration for explaining the operation of the three-dimensional image display according to the modification of the three-dimensional image display shown in FIG. 57.

While the deflecting plate 226 has a configuration including one deflecting region Hr corresponding to the stroke of the reciprocation in addition to ten deflecting regions Hr associated with the number of pixels of the LCD 203 in the present embodiment, this is not limiting the invention. For example, as shown in FIG. 65, a deflecting plate 226' may be configured which has ten deflecting regions Hr associated with the number of pixels and has, for example, the same number of (ten) additional deflecting regions Hr. In this case, deflecting scan for 600 space fields is performed only by moving the deflecting plate 226' from an initial position (the position of the right end of the reciprocation stroke thereof) shown in FIG. 65 to an end position (the position of the left end of the reciprocation stroke thereof) shown in FIG. 67. FIG. 66 shows a state in which the deflecting plate 226' has been moved a distance corresponding to six deflecting regions or 300 space fields. In this case, deflecting scan for 3600 space fields is performed by causing the deflecting plate 226' to make six one-way movements or three reciprocating movements. That is, the deflecting plate 226' is to be moved at a speed to make three round trips per second. Therefore, according to the present modification, the deflecting plate 226' requires a simpler moving mechanism and provides high accuracy with improved facility compared to the deflecting plate 226 which is moved at a relatively high frequency of 30 round trips per second as described with reference to FIGS. 60 through 62.

Seventh Embodiment

A seventh embodiment of the invention will now be described.

Figure 68:
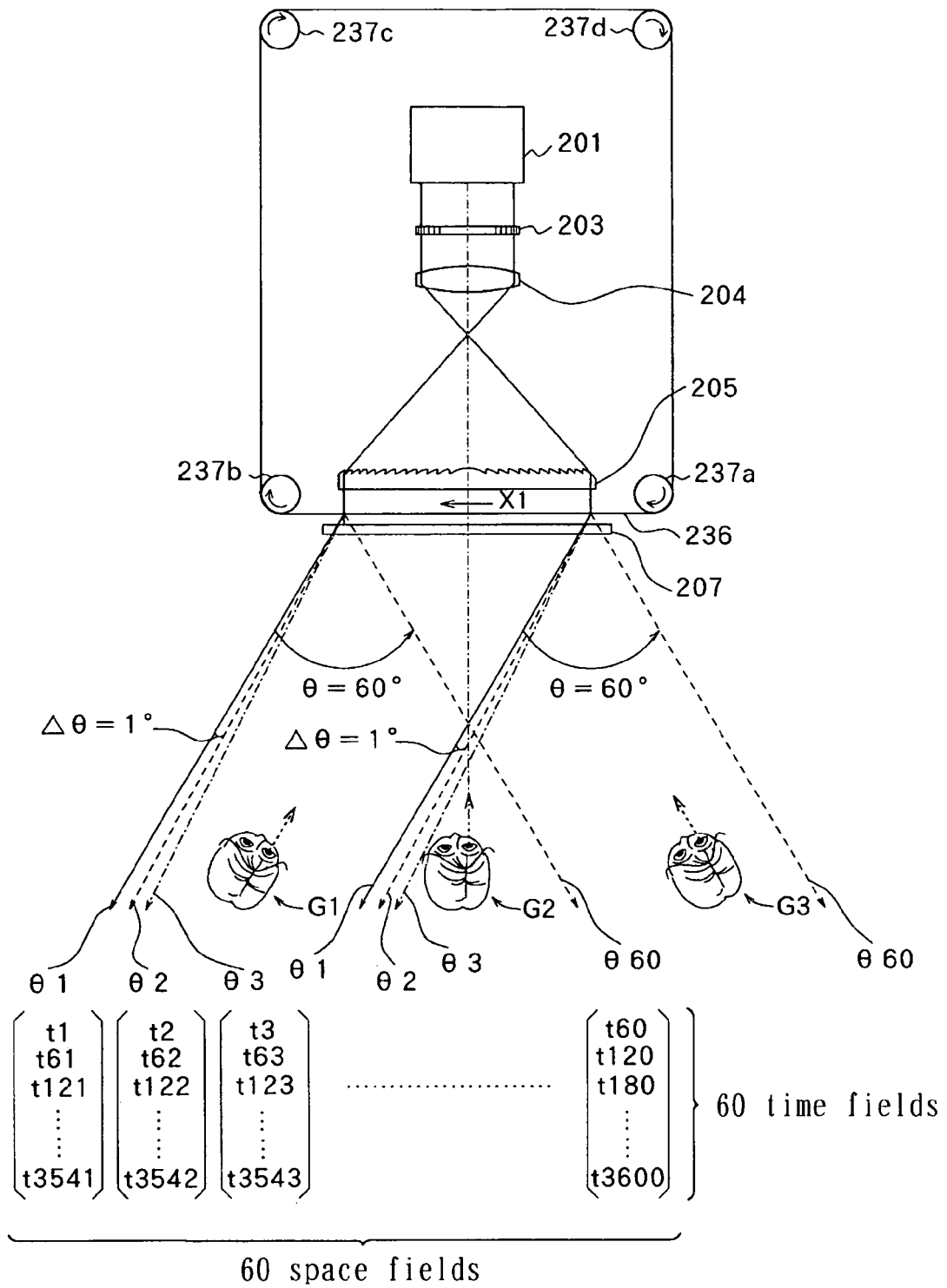
FIG. 68 is a plan view of a three-dimensional image display according to a seventh embodiment of the invention showing a configuration of the same.

FIG. 68 shows a schematic configuration of a three-dimensional image display according to a seventh embodiment of the invention. The same figure shows the display as viewed directly from above. In the figure, components which are identical to components shown in FIG. 57 are indicated by like reference numbers, and the description will omit them appropriately.

The three-dimensional image display of the present embodiment has a deflecting film 236 instead of the deflecting plate 226 in the sixth embodiment (FIG. 57). The deflecting film 236 is formed in a closed configuration like an endless tape and has a sectional structure including a multiplicity of deflecting regions Hr each of which includes 60 deflecting cells HC(r,i) similarly to the deflecting plate 226 shown in FIGS. 59 and 60. However, the deflecting regions Hr of this deflecting film 236 are continuously formed without any separation unlike the above-described deflecting plate 226. Therefore, the number of the deflecting regions Hr may be regarded substantially infinite.

The deflecting film 236 is stretched between a plurality of transport rollers 237a through 237d (four rollers, in this case). For example, the transport roller 237b among those transport rollers is driven for rotation by a motor which is not shown to move the deflecting film 236 in one direction (the direction of the arrow X1) at a constant speed. Each of the transport rollers 237a through 237d has a plurality of sprockets (not shown) which engage perforations (transport holes) which are not shown on the deflecting film 236 to allow the deflecting film 236 to be transported with high accuracy. The basic configuration is otherwise similar to that in FIG. 57 and will not therefore be described.

In the three-dimensional image display of the present embodiment, the deflecting regions Hr are always moved in a constant direction by transporting the deflecting film 236 in one direction similarly to an endless tape. As a result, deflecting scan of a single beam of incident light PBv by a deflecting cell HC(r,i) is always performed in one direction (i.e., in the direction from the angular direction θ1 toward the angular direction θ60) on a cycle of 60 space fields similarly to the fifth embodiment. For example, referring to a beam of incident light PB1 of interest, this beam of light is deflected in the angular directions θ1 through θ60 during 60 space fields from a point in time t1 to a point in time t60 as shown in FIG. 68, and is further deflected in the angular directions θ1 through θ60 during 60 space fields from a next point in time t61 to a point in time t120. Thereafter, beam deflecting scan is similarly performed always in the angular directions θ1 through θ60 on a cycle of 60 space fields.

In the present embodiment, there is no need for the relatively complicated mechanism for reciprocating the deflecting plate 226 or deflecting plate 226' in the sixth embodiment, and a mechanism to transport the deflecting film 236 in a constant direction is sufficient. Therefore, the three-dimensional image display of the present embodiment is simple in structure and is suitable especially for applications in which a large screen is required as in the case of, for example, a movie theater.

While the deflecting film 236 functions as transmission type deflecting means in the three-dimensional image display of the present embodiment, this is not limiting the invention, and a reflection type deflecting film may be used as deflecting means as in the embodiment described below.

Eighth Embodiment

A three-dimensional image display according to an eighth embodiment of the invention will now be described.

Figure 69:
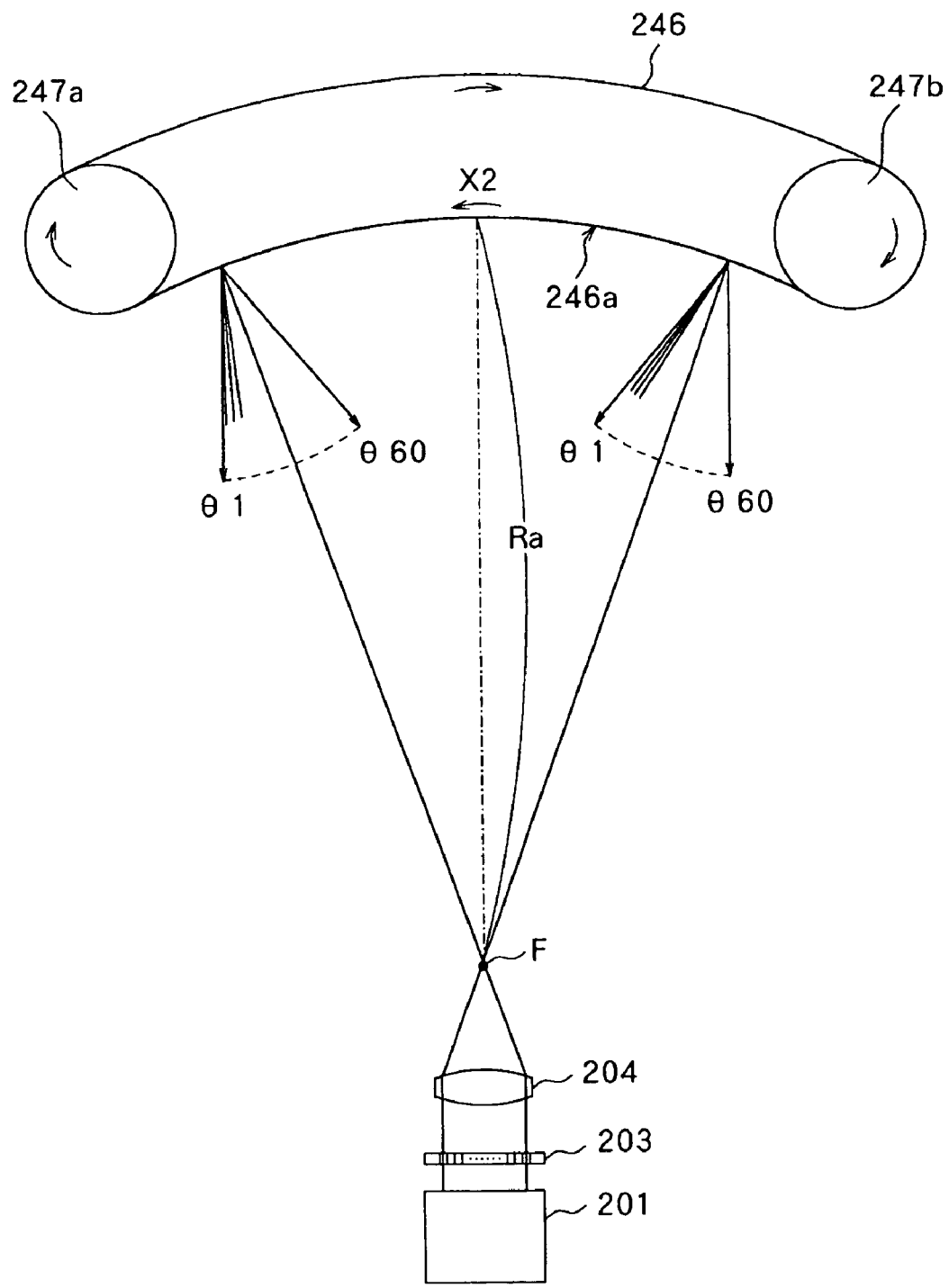
FIG. 69 is a plan view of a three-dimensional image display according to an eighth embodiment of the invention showing a configuration of the same.

FIG. 69 shows a schematic configuration of the three-dimensional image display according to the eighth embodiment of the invention. The same figure shows the display as viewed directly from above. In the figure, components which are identical to components shown in FIG. 68 are indicated by like reference numbers, and the description will omit them appropriately.

The three-dimensional image display is configured using a reflection type deflecting film 246. The deflecting film 246 is configured such that it is moved in one direction along a surface forming a part of a cylinder having a radius Ra when transport rollers 247a and 247b are driven for rotation. In order to cause the deflecting film 246 to extend along the surface forming a part of the cylinder, for example, film guides (not shown) that extend along the surface forming a part of the cylinder may be provided in marginal areas at upper and lower ends of a deflecting screen surface 246a upon which no light impinges, to guide the deflecting film 246.

A projecting optical system constituted by a light source portion 201, an LCD 203, a condenser lens 204, etc. is provided such that the focal point F of the condenser lens 204 is located on a central axis of the above-described cylindrical surface. The projecting optical system is provided in a position higher than the center of the deflecting screen surface 246a of the deflecting film 246 (a position on this side of the plane of the drawing), and the optical axis of the same extends diagonally downward toward the center of the deflecting screen surface 246a. That is, light that has exited the LCD 203 irradiates the deflecting screen surface 246a of the deflecting film 246 diagonally from above, as shown in FIG. 71.

Light transmitted by the LCD 203 and collected by the condenser lens 204 spreads after focusing at the focal point F to impinge upon the screen surface 246a of the deflecting film 246 perpendicularly. As a result, a two-dimensional image formed by the LCD 203 is projected upon the screen surface 246a of the deflecting film 246. The term "perpendicularly" in this context means perpendicularity in the horizontal plane shown in FIG. 69 (in the plane of the drawing).

Figure 70:
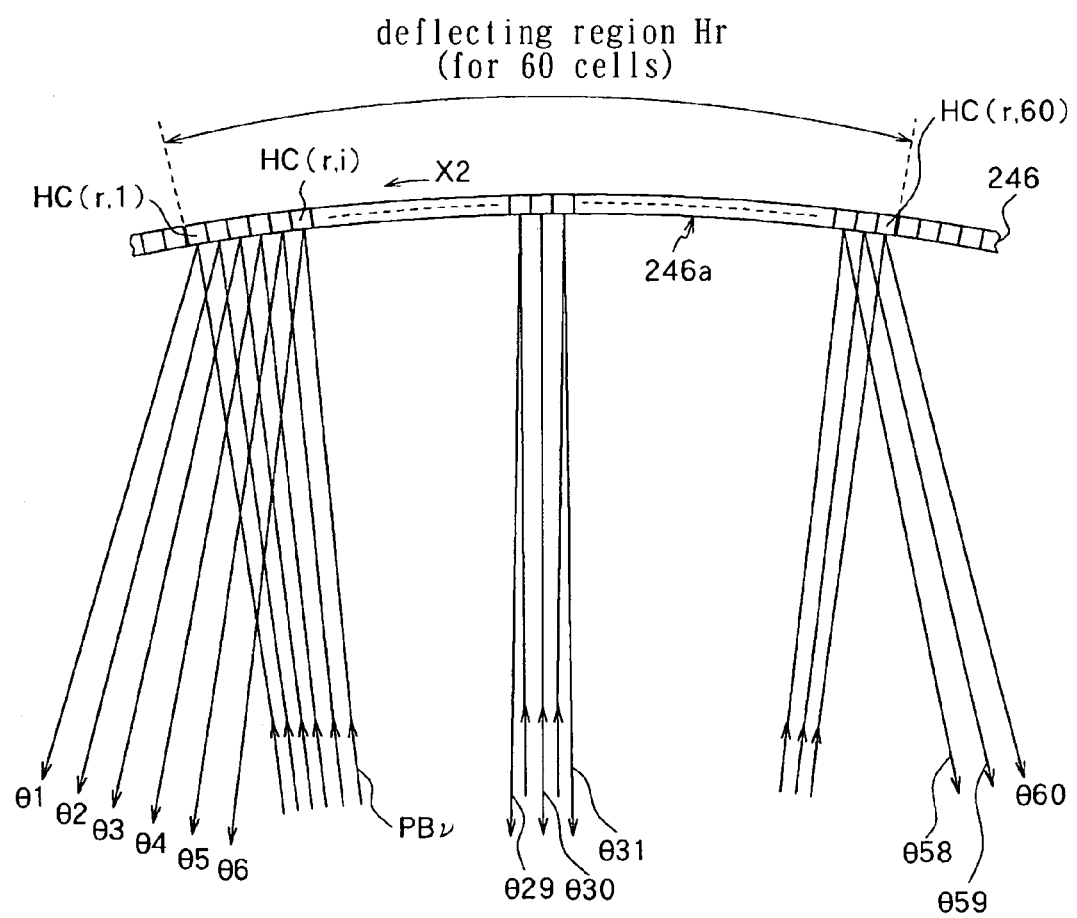
FIG. 70 is a plan view of a deflecting film of the three-dimensional image display shown in FIG. 69 showing a configuration and action of the same.
Figure 71:
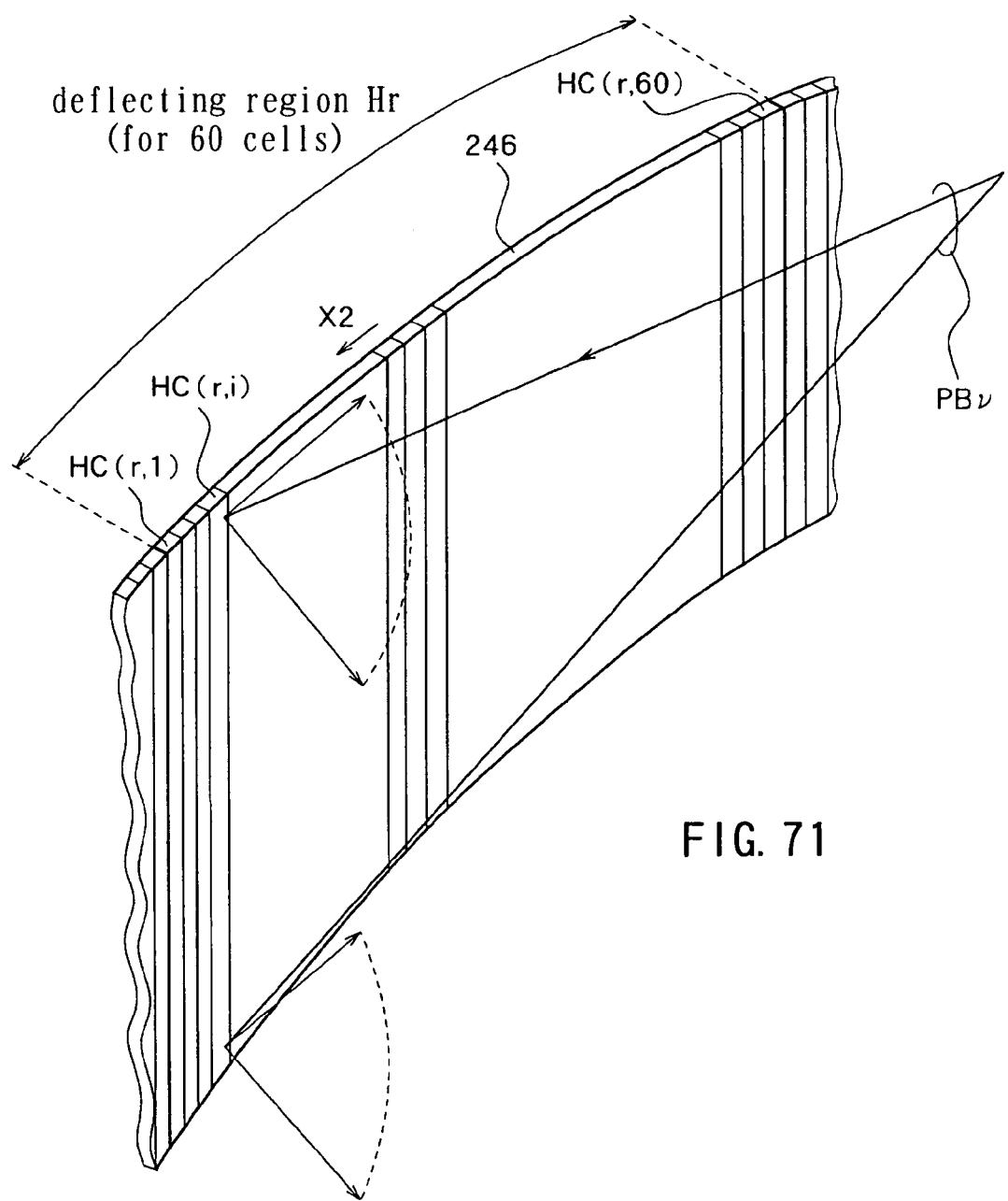
FIG. 71 is a perspective view of the deflecting film of the three-dimensional image display shown in FIG. 69 showing the action of the same.
Figure 72:
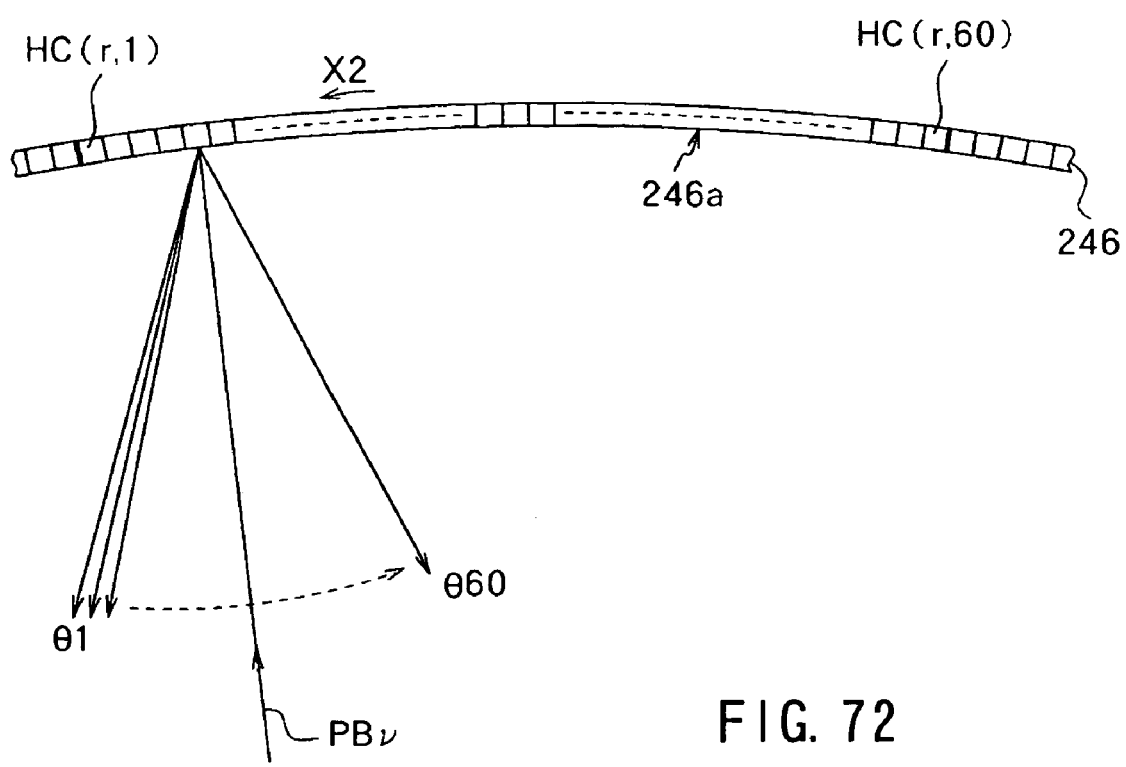
FIG. 72 is a plan view of the deflecting film of the three-dimensional image display shown in FIG. 69 showing an action of a deflecting cell thereof.

FIGS. 70 through 72 illustrate how the light incident upon the deflecting film 246 shown in FIG. 69 is reflected while being deflected. Among those figures, FIG. 70 is a horizontal sectional view showing deflection and reflection at deflecting cells HC(r,i) included in a single deflecting region Hr, and FIG. 71 is a bird's-eye view of the same state. FIG. 72 is a horizontal sectional view showing time-dependent changes of the direction of deflection and reflection at a single deflecting cell HC(r,i) in a deflecting region Hr.

As shown in those figures, in the present modification, the deflecting regions Hr are continuously formed on the deflecting film 246 similarly to that in the seventh embodiment. Each of the deflecting regions Hr includes 60 deflecting cells HC(r, i) formed like stripes. A beam of light transmitted by a certain pixel of the LCD 203 perpendicularly impinges upon a deflecting cell HC(r,i) in a corresponding position of the deflecting film 246. The term "perpendicularly" in this context means perpendicularity in the horizontal plane shown in FIG. 70 (in the plane of the drawing). Sixty beams of incident light PBv impinge upon one deflecting region Hr to be reflected by the respective deflecting cells HC(r,i) while being deflected in the angular directions θ1 through θ60 in the horizontal section. On the other hand, in a vertical section (in a plane that extends through the axis of the cylindrical surface forming the deflecting screen surface 246a of the deflecting film 246 and that is perpendicular to the plane of FIG. 70), beams of incident light PBv incident upon the deflecting regions Hr diagonally from above are reflected such that they are diffused substantially uniformly upward and downward in the vertical section, as shown in FIG. 71. Such reflection resulting in upward and downward diffusion can be caused by, for example, forming a lenticular layer (not shown) having a function similar to the lenticular plate shown in FIG. 35 for example, on the deflecting film 246.

The basic principle and action of beam deflecting scan utilizing the deflecting film 246 of the three-dimensional image display of the present embodiment are similar to those in the seventh embodiment (FIG. 68). For example, as shown in FIG. 72, if we take up a certain beam of incident light PBv of interest, this beam of light is reflected by deflecting cells HC(r,i) which sequentially move in the direction of the arrow X2 while being deflected in the angular directions θ1 through θ60. As a result, a viewer will view two-dimensional images from different view points depending on the direction of his or her own line of sight, and those images are recognized as a three-dimensional image.

In the seventh embodiment (FIG. 68), light which has exited the LCD 203 impinges upon the deflecting film 236 as parallel beams of light. In other words, a two-dimensional image formed by the LCD 203 is carried by a plane wave to reach the deflecting film 236 in the form of a plane. On the contrary, in the three-dimensional image display of the present embodiment, a two-dimensional image formed by the LCD 203 is carried by a spherical wave to reach the deflecting film 246 in the form of a cylindrical surface. That is, there is no need for the collimator lens 205 (FIG. 68) for transforming diffused beams of light into parallel beams of light. This makes it possible to reduce the number of parts required for the configuration of the display.

In the present embodiment, since the reflection type deflecting film 246 is used, the projecting optical system can be provided on the side of a viewer. Therefore, the display substantially requires a smaller space for installation compared to that in the seventh embodiment (FIG. 68) in which the transmission type deflecting film 236 is used, which is advantageous especially when the display is used in a movie theater or the like where a large screen is required.

Figure 73:
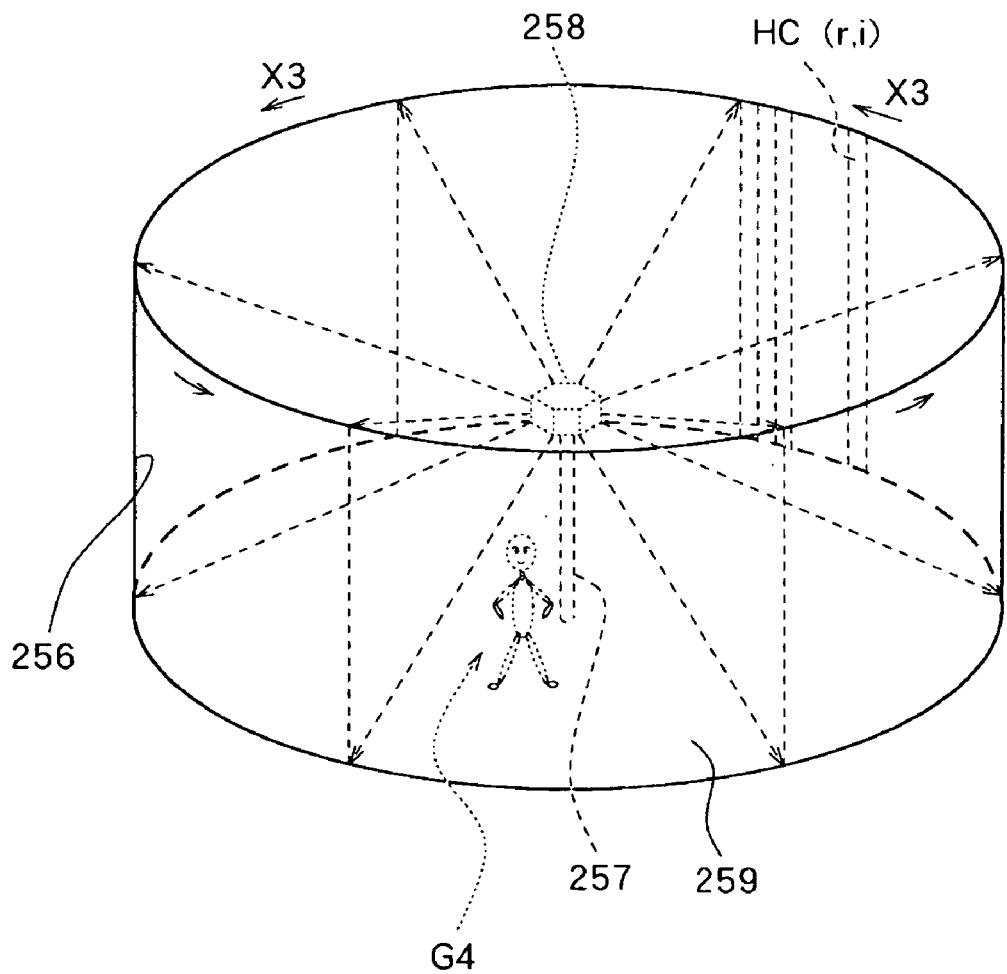
FIG. 73 is a perspective view of a three-dimensional image display as a modification of the three-dimensional image display shown in FIG. 69 showing a schematic configuration of the same.
Figure 74:
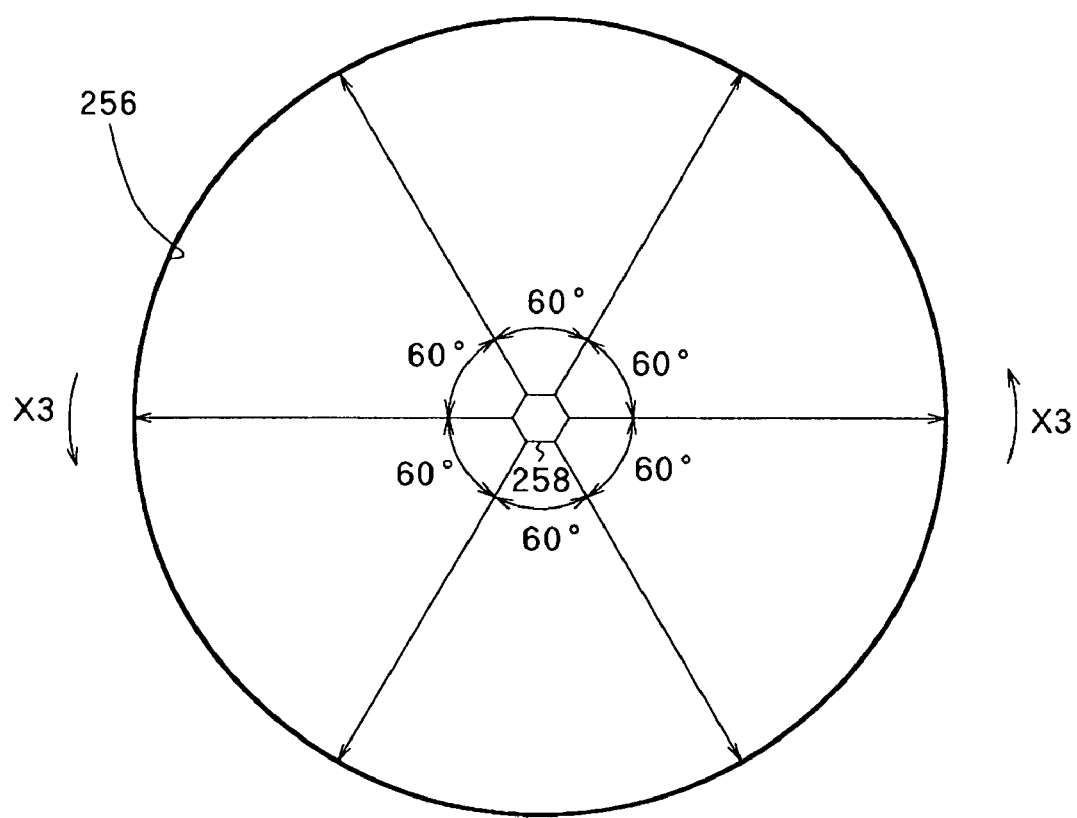
FIG. 74 is a plan view of the three-dimensional image display shown in FIG. 73.

While a part of the deflecting film 246 is formed like a cylindrical surface to perform beam deflecting scan using the same part in the present embodiment, this is not limiting the invention. For example, as shown in FIGS. 73 and 74, a panorama type three-dimensional image display can be provided in which an inner surface of a deflecting screen 256 in the form of a cylinder is entirely used to perform beam deflecting scan. FIG. 73 is a bird's-eye view of the display as a whole, and FIG. 74 shows a horizontal section of the display.

In the modification, deflecting regions Hr are continuously formed on the entire inner surface of the cylindrical deflecting screen 256 in the circumferential direction thereof without any separation in the form of vertically extending stripes. The cylindrical deflecting screen 256 is configured such that it can rotate in one direction as a whole. In the middle of the cylindrical deflecting screen 256, a projecting optical system 258 is disposed which can form six two-dimensional images independent of each other in parallel and which can project them around itself. The projecting optical system 258 is secured to a bottom portion 259, for example, with a post 257. For example, the projecting optical system 258 is configured with six sets of projecting optical systems each of which is constituted by the light source portion 201, LCD 203, condenser lens 204, etc. shown in FIG. 69.

In the present embodiment, the inner circumferential surface of the cylindrical deflecting screen 256 is equally divided into six partial screen surfaces such that they have a central angle of, for example, 60 deg. to provide a configuration in which two-dimensional images are projected upon respective partial screen surfaces from respective parts of the projecting optical system 258. The deflecting screen 256 is rotated in the direction of the arrow X3 at a constant speed in synchronism with the timing of projection of the two-dimensional images. As a result, a three-dimensional image is formed on each partial screen based on the same principle as described with reference to FIG. 72 to collectively provide a three-dimensional image. Therefore, a viewer G4 who is located, for example, near the center of the cylinder views a three-dimensional image on the entire surfaces surrounding him- or herself, which allows the viewer to experience a view with so much presence. Therefore, the three-dimensional image display will provide people with a quite enjoyable attraction when introduced to, for example, various kinds of theme parks.

In the three-dimensional image display shown in FIG. 73, a ceiling surface may be provided on top of the cylindrical chamber in addition to the inner circumferential surface of the cylindrical deflecting screen 256. A deflecting screen may be disposed on the bottom surface of the ceiling and may be rotated integrally with the cylindrical deflecting screen 256, and a two-dimensional image may be projected upon the deflecting screen on the ceiling.

Further, a similar deflecting screen may be disposed also on the floor of the cylindrical chamber. The deflecting screen may be rotated integrally with the deflecting screen 256 on the cylindrical surface, and a two-dimensional image may be projected upon the deflecting screen on the floor. In this case, however, since there is a need for preventing a viewer from being rotated, the floor may be divided into, for example, a floor in the part on which a viewer stands and a rotating floor. Alternatively, a double floor structure may be employed, an upper floor thereof on which a viewer stands being a fixed transparent floor, a lower floor under the same being provided with a rotatable deflecting screen thereon.

Ninth Embodiment

A three-dimensional image display according to a ninth embodiment of the invention will now be described.

Figure 75:
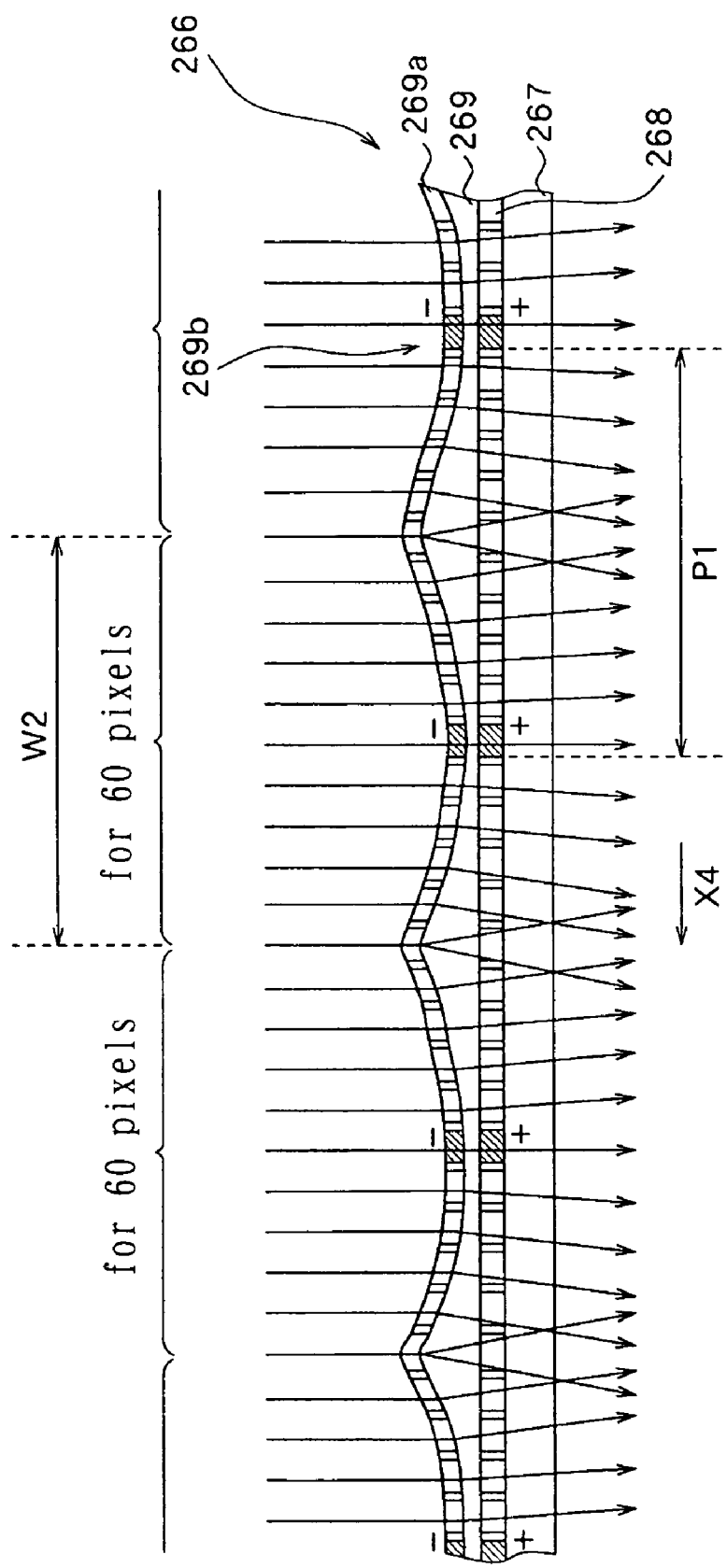
FIG. 75 is a sectional view of a deflecting plate used in the three-dimensional image display according to the ninth embodiment of the invention showing structures and actions of major parts of the same.

FIG. 75 shows major parts of a three-dimensional image display according to the ninth embodiment of the invention. Specifically, this figure shows a sectional structure of a deflecting plate 266 which is used, for example, instead of the deflecting plate 226 of the three-dimensional image display shown in FIG. 57. However, the same figure omits hatching on the sectional region in order to prevent it from confusing beams of light.

As shown in FIG. 75, the deflecting plate 266 has a configuration including a base material 267, a multiplicity of electrodes 268 in the form of stripes arranged on the base material 267 such that they extend in a direction orthogonal to the plane of the drawing, and a deformation layer 269 having insulation properties formed to cover the array of the electrodes 268. The base material 267 is formed of a transparent insulating material, and the electrodes 268 are formed of a transparent conductive material such as ITO. The deformation layer 269 is a soft layer which is in a rubbery state or gelatine state at room temperature and which has the property of being deforming easily when subjected to an external force. The deformation layer 269 is preferably formed of a material having a high dielectric constant. Counter electrodes 269a in the form of stripes arranged in a face-to-face relationship with the electrodes 268 are formed on a surface of the deformation layer 269. The counter electrodes 269a are also formed of a transparent conductive material, e.g., ITO. The deflecting plate 266 corresponds to the "deflecting means" of the invention, and the deformation layer 269 corresponds to the "light-transmitting member".

An action of the deflecting plate 266 having such a configuration will now be described.

The surfaces of the deflecting plate 266 and deformation layer 269 are substantially flat in a non-operating state. When electric potentials with different polarities are applied to any of the electrodes 268 and the counter electrode 269a in a face-to-face relationship therewith, the electrode 268 and counter electrode 269a attract and approach each other. The thickness of the deformation layer 269 is minimized in that part, and the thickness of the deformation layer 269 gradually increases as that part becomes apart. When the same electric potential is applied to any of the electrodes 268 and the counter electrode 269a in a face-to-face relationship therewith, a repulsion force is generated between the electrode 268 and counter electrode 269a. The thickness of the deformation layer 269 is maximized in that part, and the thickness of the deformation layer 269 gradually decreases as that part becomes apart. Therefore, a gentle cylindrical concave portion 269b can be formed by appropriately controlling the electric potentials applied to the electrode 268 and counter electrode 269a. A span width W2 of the concave portion 269b is set equal to the total width of beams of incident light for 60 pixels which have been transmitted by the LCD 203.

Figure 76:
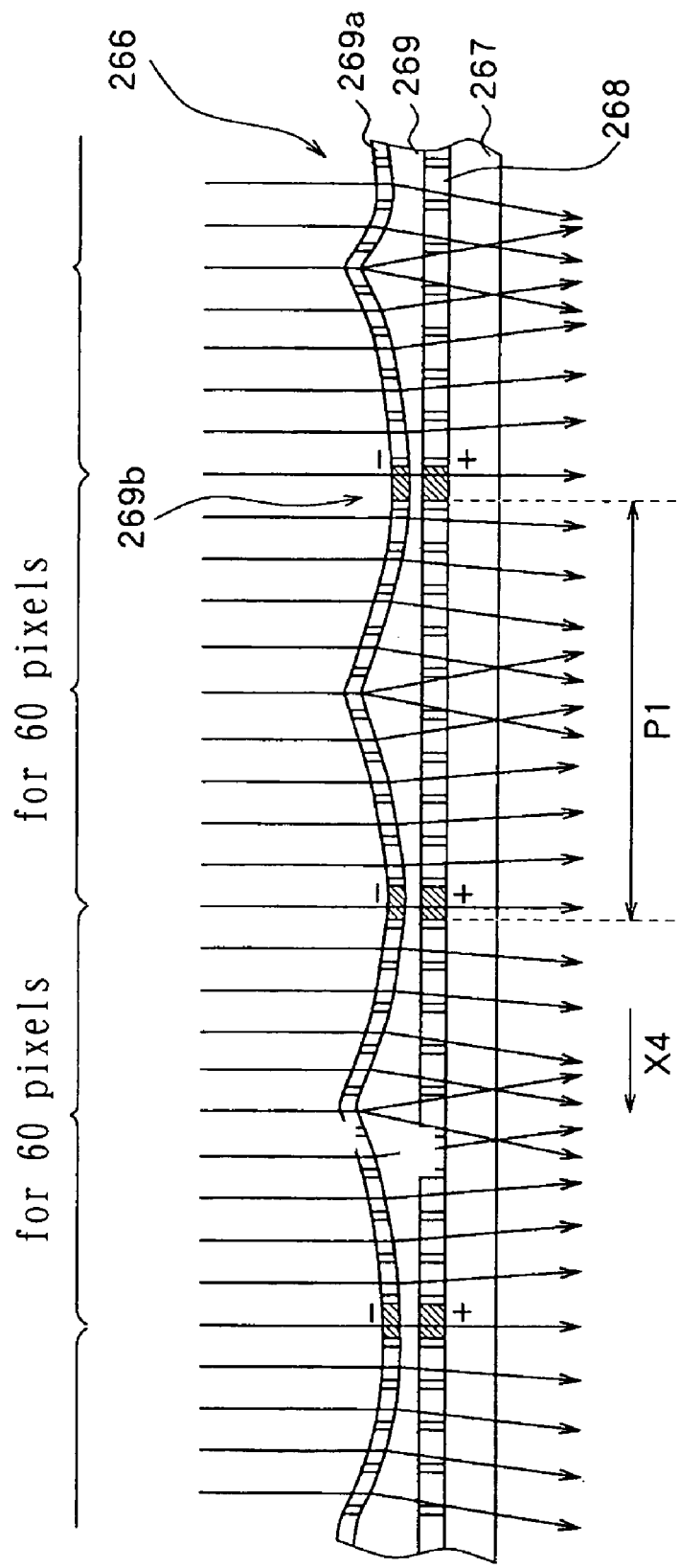
FIG. 76 is a sectional view of the deflecting plate shown in FIG. 75 showing an action of the same.

When the position of the pair of the electrode 268 and counter electrode 269a to which the voltages are to be applied is gradually shifted, for example, in the right-to-left direction (the direction of the arrow X4) in FIG. 75, the deformation layer 269 is accordingly subjected to sequential deformations, and the concave portion 269b moves from right to left. In addition, when a negative voltage is simultaneously applied to a plurality of the electrodes 268 at a pitch p1 which is equal to the span width W2 of the concave portion 269b instead of applying the voltage to only one pair of electrodes, concave portions 269b are periodically generated at the deformation layer 269 as shown in FIGS. 75 and 76, and those concave portions 269b sequentially move from right to left like a travel of a wave. FIG. 76 shows a state observed when a certain period of time has passed since the time of the state shown in FIG. 75. Since one concave portion 269b acts similarly to a cylindrical concave lens, all of beams of incident light PBv for 60 pixels incident upon the concave portion 269b are deflected in different directions. Sixty beams of incident light PBv incident upon one concave portion 269b can be deflected in 60 directions, i.e., angular directions θ1 through θ60 by appropriately setting the concave configuration of the concave portion 269b, the refractive index of the deformation layer 269, etc.

In conclusion, the deflecting plate 266 has a function similar to that of the deflecting plate 226, deflecting film 246 or deflecting screen 256 used in the sixth, seventh or eighth embodiment (FIG. 57, 68 or 69). Therefore, the deflecting plate 266 shown in FIG. 75 may be used instead of the deflecting plate 226, deflecting film 246 or deflecting screen 256 used in the sixth, seventh or eighth embodiment.

When the deflecting means is formed using a hologram as in the sixth through eighth embodiments, since a deflecting region Hr is fixed, it is not possible to freely change the deflecting angle of each of the 60 beams of light incident upon the deflecting region Hr and the size of the deflecting region Hr. On the contrary, in the case of the deflecting plate 266 shown in FIG. 75, since the span width W2 and the depth of a concave portion 269b corresponding to a deflecting region Hr can be changed by changing the number of electrodes 268 to be driven simultaneously, the magnitudes of the applied voltages, etc., the deflecting angle of each beam of light and the size of the concave portion 269b can be appropriately changed.

While the counter electrodes 269a of the present embodiment are divided electrodes in the form of stripes, this is not limiting the invention. For example, a counter electrode may be formed as a single film covering the deformation layer 269 entirely, which is shared by the plurality of electrodes 268 and which is fixed at a constant electric potential (e.g., a ground potential). In the case of divided counter electrodes as shown in FIG. 75, however, the polarity of the voltages applied to the electrodes 268 and counter electrodes 269a can be varied from electrode to electrode. In this case, electric potentials having different polarities may be applied to an electrode 268 and a counter electrode 269a, and electric potentials having the same polarity may be applied to those electrodes thereafter to cause mutual repulsion between the electrodes. This makes it possible to perform more active control, i.e., control for removing deformation of the deformation layer 269 to restore the initial state by force, which allows an operation at a high speed. Further, the waveform of the applied voltages may be a sine wave, a saw-tooth-wave or the like, which makes it possible to control the direction of refraction of light freely. For example, the deformation layer 269 may be adapted to function as a set of cylindrical lenses in which the positions and curvatures of curved surfaces thereof change as time passes.

Instead of arranging the electrodes 268 and counter electrodes 269a such that they have the same longitudinal direction (extending direction), a so-called simple matrix type arrangement may be employed in which they extend in directions orthogonal to each other. In this case, since intersection points between the electrodes 268 and counter electrodes 269a can be selected one by one, the deformation layer 269 can be deformed point by point to provide the concave portions 269b with a spherical configuration or a configuration similar thereto. This increases freedom of control. Specifically, refraction can be caused not only in the horizontal direction but also in the vertical direction.

The deformation layer 269 can be deformed point by point with increased freedom if both of the electrodes 268 and counter electrodes 269a are formed like points (or islands) instead of stripes to provide a so-called active matrix arrangement. Therefore, the deformation layer 269 can function like, for example, a set of a multiplicity of microlenses having curved surfaces with variable positions and curvatures. Since the attracting force and repulsion force originating from electric charges can be freely controlled, one of the groups of electrodes can be used also as electrodes for driving the LCD.

A charge storage film may be formed in place of the counter electrodes 269a and may be charged by applying thereto electric charges with one polarity through corona discharge or the like, and a voltage with the other polarity may be applied to the electrodes 268. Alternatively, the liquid crystal itself may be used as the deformation layer 269 the thickness of which may therefore be controlled utilizing fluidity of the same.

Figure 77:
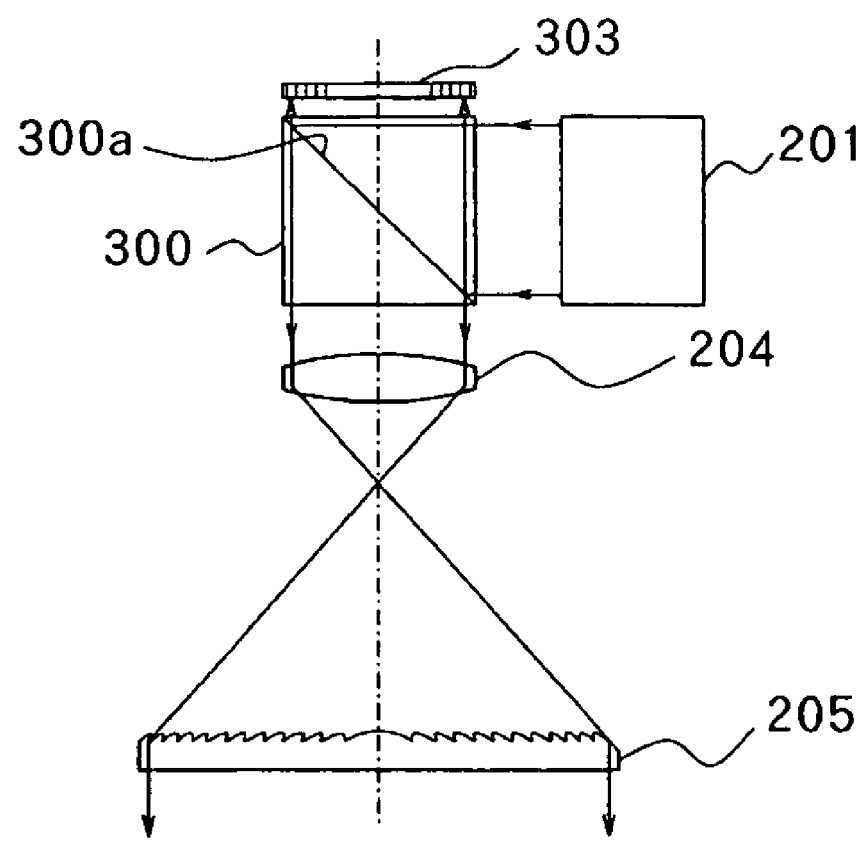
FIG. 77 is a plan view of a modification of a projecting optical system used in the three-dimensional image displays in the fifth through ninth embodiments of the invention.

While a transmission type liquid crystal element is used as the LCD 203 in any of the above-described fifth through ninth embodiments, this is not limiting the invention, and the projecting optical system may be configured using a reflection type liquid crystal, for example, as shown in FIG. 77. Parts in this figure identical to components shown in FIG. 35 and so on are indicated by like reference numbers.

The projecting optical system has a configuration including a reflection type LCD 303 and a polarization beam splitter (hereinafter referred to as "PBS") 300 instead of the transmission type LCD 203 in FIG. 35. The PBS 300 has a polarized light splitting surface 300a which reflects s-polarized components of light in light incident thereupon and transmits p-polarized components of light in the same. In this projecting optical system, only s-polarized components of light in light coming from the light source portion 201 are reflected by the polarized light splitting surface 300a to reach the LCD 203 at which they are selectively subjected to modulation of the polarizing direction on the basis of pixels and are reflected. The polarizing direction of light reflected at modulated pixels is rotated 90 deg. to provide p-polarized light which is in turn transmitted by the polarized light splitting surface 300a of the PBS 300 to impinge upon the condenser lens 204. The polarizing direction of light reflected at unmodulated pixels is not changed, and the s-polarized light impinges upon the polarized light splitting surface 300a of the PBS 300 as it is. The light is therefore reflected there and does not travel toward the condenser lens 204.

Tenth Embodiment

A three-dimensional image display according to a tenth embodiment of the invention will now be described.

In any of the above-described fifth through ninth embodiments and modifications thereof, a two-dimensional image is formed by the LCD 203 or the like, and the projecting direction of the two-dimensional image is deflected using the deflecting means. The present invention is not limited thereto, and a configuration may be employed in which a two-dimensional image is formed using light deflected by the deflecting means and the two-dimensional image is projected as it is. An example of such a configuration will be described below.

Figure 78:
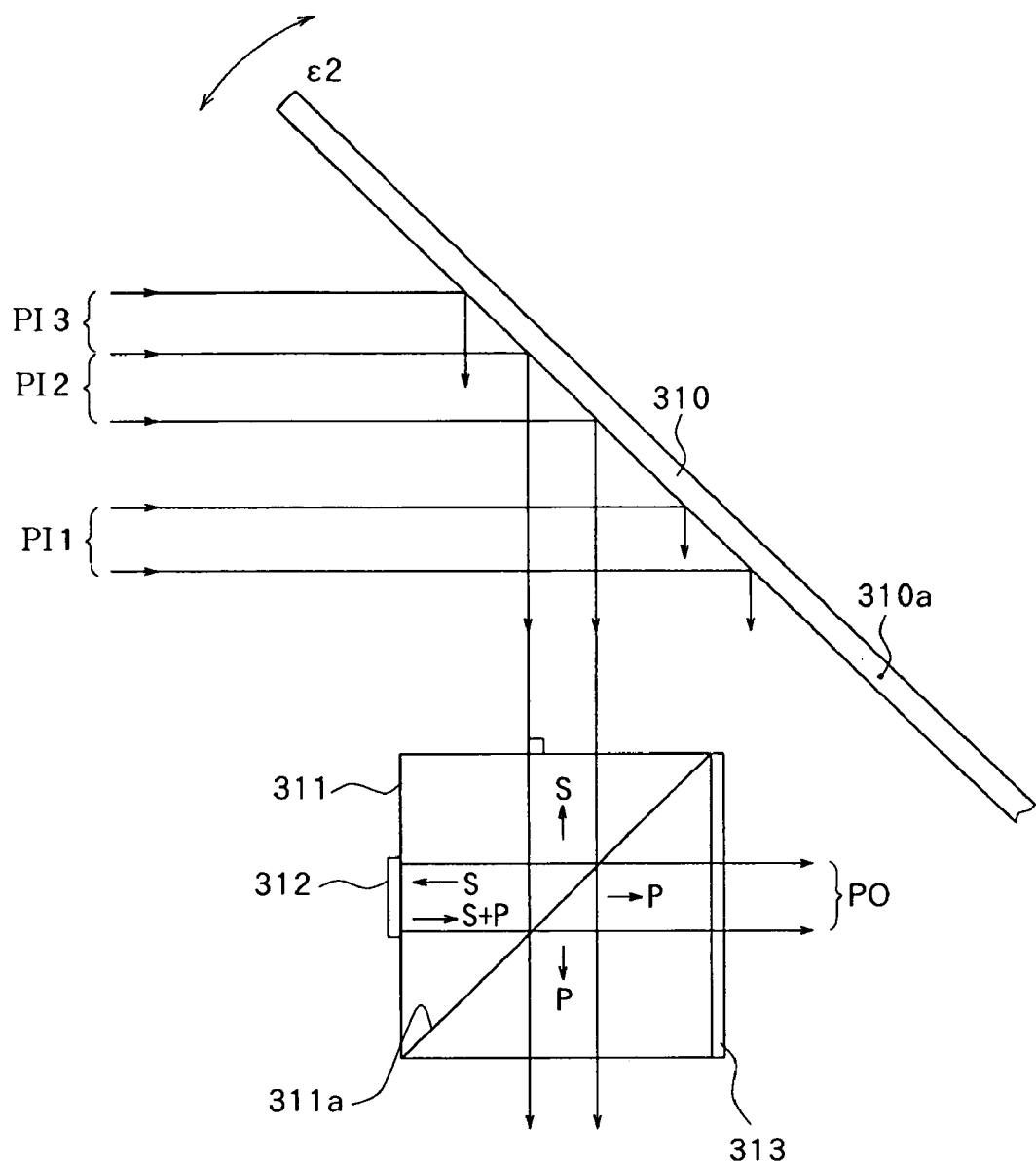
FIG. 78 is a plan view of a three-dimensional image display according to a tenth embodiment of the invention showing a structure and action of the same.

FIG. 78 shows major parts of a three-dimensional image display according to a tenth embodiment of the invention. The three-dimensional image display has: a rotational vibration mirror 310 which makes a rotational vibration at a predetermined angle of rotation about a rotational axis 310a; a PBS 311 provided in the traveling direction of light reflected by the rotational vibration mirror 310; a reflection type LCD 312 provided close to or in contact with one surface of the PBS 311 and a lenticular plate 313 provided close to or in contact with a surface of the PBS 311 facing the surface on which the LCD 312 is provided. The rotational vibration mirror 310 corresponds to the "deflecting means" of the invention.

The PBS 311 has a polarized light splitting surface 311a which reflects s-polarized components of light and transmits p-polarized components of light. For example, a reflection type ferroelectric liquid crystal is used as the LCD 312. The lenticular plate 313 is an integral array of very small semicylindrical lenses extending in a direction parallel with the plane of the drawing similar to the lenticular plate 207 in FIG. 35, and it has a function of diffusing light exiting the PBS 311 in a direction orthogonal to the plane of the drawing.

The operation of the three-dimensional image display having such a configuration will now be described.

As shown in FIG. 78, when the rotational vibration mirror 310 is in an intermediate position $\epsilon 2$, only a beam of light PI2 which is a part of beams of incident light contributes to formation of a two-dimensional image by the LCD 312. In this case, the beam of light PI2 vertically impinges upon the PBS 311, and only s-polarized components thereof are reflected by the polarized light splitting surface 311a to reach the LCD 312 at which they are selectively subjected to modulation of the polarizing direction on the basis of pixels and are reflected. The polarizing direction of the light reflected at modulated pixels of the LCD 312 is rotated 90 deg. to provide p-polarized light which is in turn transmitted by the polarized light splitting surface 311a of the PBS 311 to exit in the direction of the normal plane of the exit surface through the lenticular plate 313. The polarizing direction of the light reflected at unmodulated pixels of the LCD 312 is not changed, and the s-polarized light impinges upon the polarized light splitting surface 311a of the PBS 311 as it is. The light is therefore reflected there and does not exit the lenticular plate 313.

Figure 79:
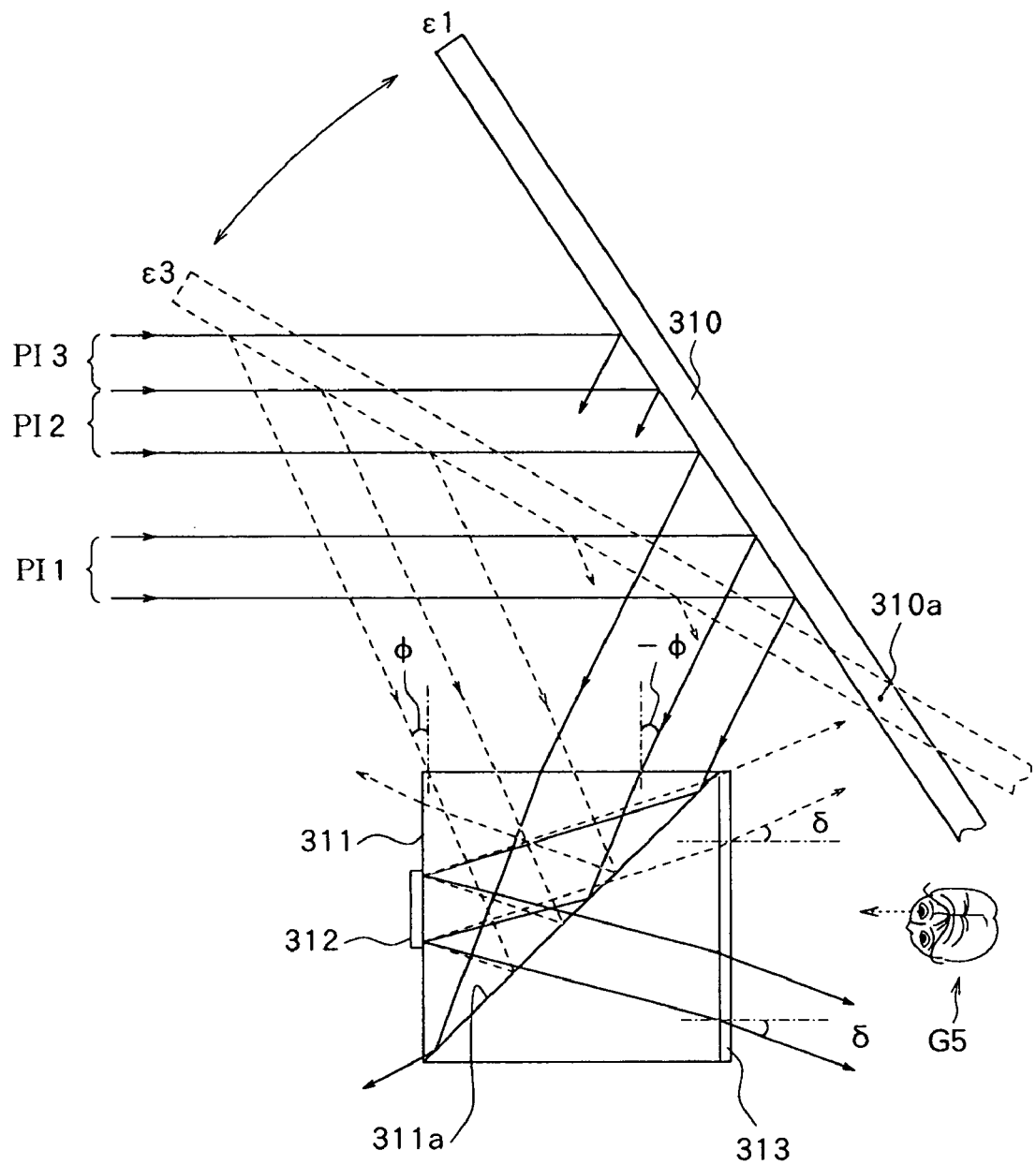
FIG. 79 is a plan view of the three-dimensional image display shown in FIG. 78 showing the action of the same.

As shown in FIG. 79, when the rotational vibration mirror 310 is in a position $\epsilon 1$ which is furthest from the PBS 311, only a beam of light PI1 which is a part of beams of incident light contributes to formation of a two-dimensional image by the LCD 312. In this case, the beam of light P1 impinges upon the PBS 311 at an angle of incidence $(-\phi)$ and, thereafter, only s-polarized components thereof are reflected by the polarized light splitting surface 311a to reach the LCD 312 at which they are selectively subjected to modulation of the polarizing direction on the basis of pixels and are reflected. The light reflected at modulated pixels of the LCD 312 exits through the PBS 311 and lenticular plate 313 in a direction which is at an angle $(-\delta)$ to the normal plane of the exit surface.

As shown in FIG. 79, when the rotational vibration mirror 310 is in a position $\epsilon 3$ closest to the PBS 311, only a beam of light PI3 which is a part of beams of incident light contributes to formation of a two-dimensional image by the LCD 312. In this case, the beam of light PI3 impinges upon the PBS 311 at an angle of incidence $(\phi)$ and, thereafter, only s-polarized components thereof are reflected by the polarized light splitting surface 311a to reach the LCD 312 at which they are selectively subjected to modulation of the polarizing direction on the basis of pixels and are reflected. The light reflected at modulated pixels of the LCD 312 exits through the PBS 311 and lenticular plate 313 in a direction which is at an angle $(\delta)$ to the normal plane of the exit surface.

In consequence, the two-dimensional image formed by the LCD 312 exits the exit surface of the PBS 311 at exit angles ranging from $(-\delta)$ to $(\delta)$ in accordance with the rotational vibration of the rotational vibration mirror 310. As a result, a viewer G5 will view a three-dimensional image inside the PBS 311.

While the present embodiment employs a configuration in which light which has been deflected as a result of reflection at the rotational vibration mirror 310 impinges upon the LCD 312, this is not limiting the invention. For example, the rotational vibration mirror 310 may be replaced with a cylindrical prism rotatable about an axis or a deflecting prism array 216 formed by a plurality of microscopic rotary prisms 216b each of which is rotatable about a rotational axis 216a, for example, as shown in FIG. 54. Light deflected by a refracting action when transmitted by the cylindrical prism or deflecting prism array may be projected upon the LCD 312. The rotational vibration mirror 310 corresponds to the "rotary reflecting body" of the invention, and the cylindrical prism or deflecting prism array 216 corresponds to the "rotary refracting body" of the invention.

Figure 80:
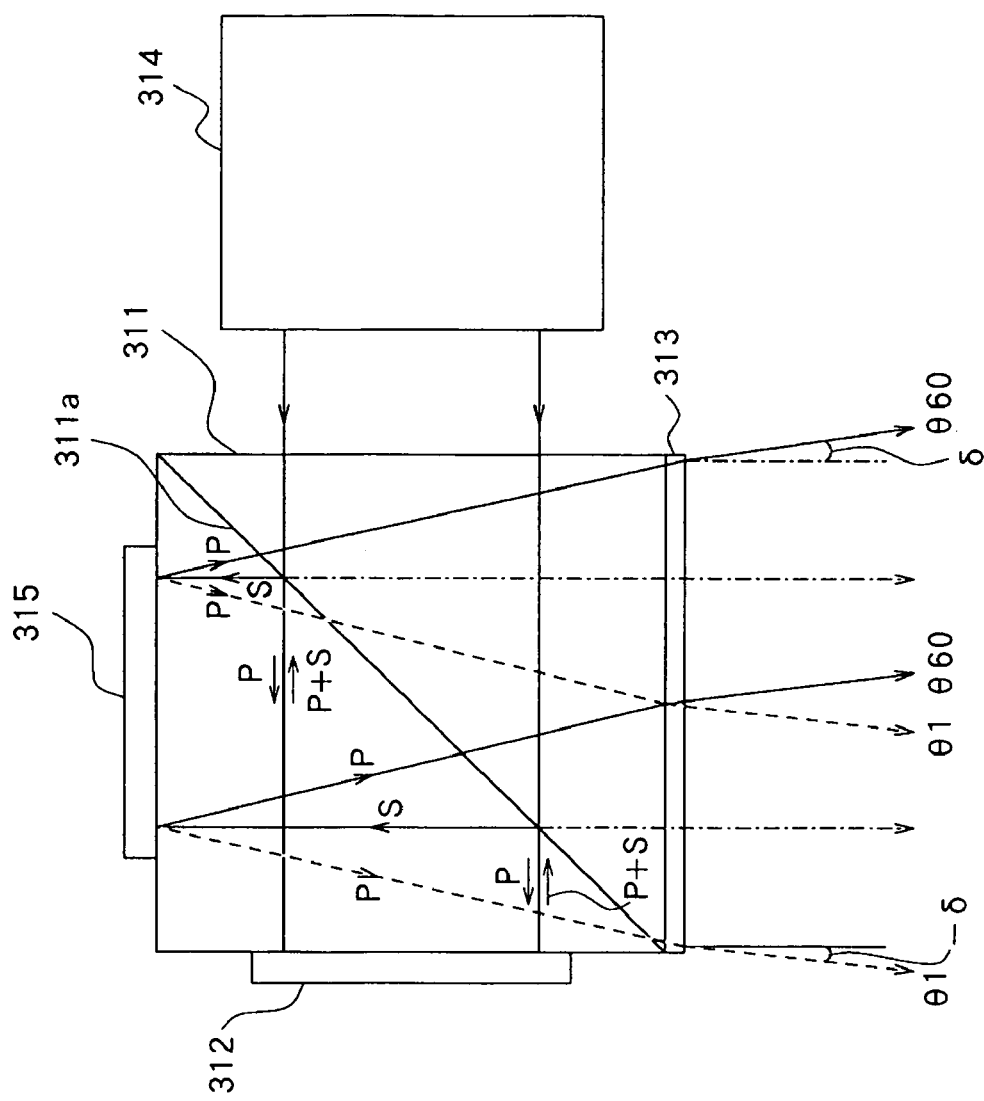
FIG. 80 is a plan view of a three-dimensional image display as a modification according to the tenth embodiment of the invention showing a structure and action of the same.

A deflecting reflection mirror array 315 capable of sequentially reflecting incident light in different directions as time passes may be provided, for example, as shown in FIG. 80, and light deflected by the deflecting reflection mirror array 315 may be projected upon the LCD 312. A modification shown in the same figure will now be briefly described.

FIG. 80 shows a schematic plan configuration of a three-dimensional image display according to a modification of the present embodiment. In the figure, components identical to components shown in FIG. 78 are indicated by like reference numbers and will not be described appropriately. The three-dimensional image display has: a light source portion 314 for emitting parallel beams of light; a PBS 311 upon which the light emitted by the light source portion 314 impinges; a reflection type LCD 312 provided close to or in contact with a surface of the PBS 311 opposite to the light entrance surface; a deflecting reflection mirror array 315 provided close to or in contact with a surface of the PBS 311 orthogonal to the surface on which the LCD 312 is provided; and a lenticular plate 313 provided close to or in contact with a surface of the PBS 311 facing the surface on which the deflecting reflection mirror array 315 is provided. The deflecting reflection mirror array 315 corresponds to the "deflecting means" of the invention.

The PBS 311 has a polarized light splitting surface 311a which reflects s-polarized components of light and transmits p-polarized components of light. The deflecting reflection mirror array 315 is formed by, for example, coating the rotary prisms 216b forming the deflecting prism array 216 shown in FIG. 54 with a polarized light reflecting film, and it is capable of so-called polarized light deflecting scan for transforming incident s-polarized light into p-polarized light and for reflecting it in different directions sequentially as time passes. The configurations and functions of the LCD 312 and lenticular plate 313 are the same as those in FIGS. 78 and 79.

In the three-dimensional image display having such a configuration, only p-polarized components of light among parallel beams of light which vertically impinge upon the PBS 311 from the light source portion 314 are transmitted by the polarized light splitting surface 311a to reach the LCD 312 at which they are selectively subjected to modulation of the polarizing direction on the basis of pixels and are vertically reflected. The polarizing direction of the light reflected at modulated pixels of the LCD 312 is polarized 90 deg. to provide s-polarized light which is in turn reflected by the polarized light splitting surface 311a of the PBS 311 to impinge upon the deflecting reflection mirror array 315. The s-polarized light incident upon the deflecting reflection mirror array 315 is transformed into p-polarized light as a result of reflection at the polarized light reflecting film on the rotary prisms 216b (not shown in FIG. 80) that constitute the same. The light is also reflected sequentially in different directions in accordance with the rotation of the rotary prisms 216b, which results in deflection in the horizontal direction. The p-polarized light reflected by the deflecting reflection mirror array 315 exits through the lenticular plate 313. As a result, light exits the lenticular plate 313 at exit angles ranging from (−δ) to δ. That is, an image formed by the LCD 312 is projected in angular directions θ1 through θ60. The polarizing direction of the light reflected at unmodulated pixels of the LCD 312 is not changed, and the p-polarized light is transmitted by the polarized light splitting surface 311a as it is. Therefore, the light will not exit the lenticular plate 314.

Figure 81:
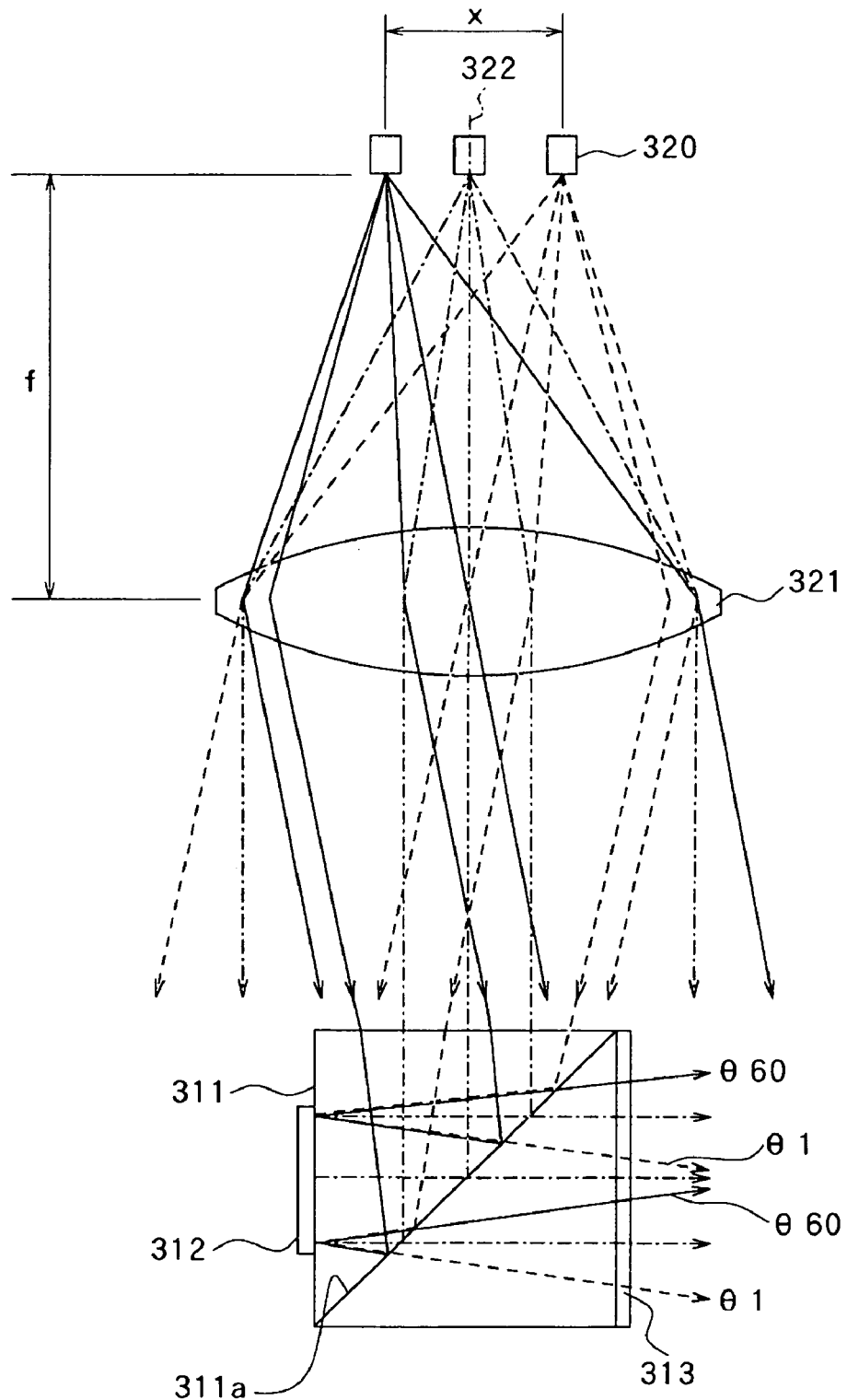
FIG. 81 is a plan view of a three-dimensional image display as another modification according to the tenth embodiment of the invention showing a structure and action of the same.

While the direction of incidence of light upon the LCD is deflected by the deflecting means interposed between the fixed light source and PBS in the above-described modifications (FIGS. 78 and 80), for example, the light source 320 itself may alternatively be moved to deflect beams of light incident upon the LCD 312, as shown in FIG. 81. A modification shown in the same figure will be described below.

FIG. 81 shows a schematic plan configuration of a three-dimensional image display according to a modification of the present embodiment. In the same figure, components identical to components shown in FIG. 78 are indicated by like reference numbers, and the description will omit them appropriately. The three-dimensional image display has: a light source 320 which is a semiconductor laser, a light-emitting diode or the like; a collimator lens 321 having a focal length f; a PBS 311; an LCD 312 and; a lenticular plate 313. The light source 320 is provided on the focal point of the collimator lens 321 and is configured such that it vibrates with a constant amplitude in a direction orthogonal to an optical axis 322 on the focal plane. If the amplitude is represented by x, the angle of deflection caused by the lens 321 is x/(2f). Therefore, a large deflecting angle can be achieved by making the focal length f sufficiently small and making the amplitude x as large as possible. The light source 320 corresponds to the "reciprocating light source" of the invention, and the collimator lens 321 corresponds to the "optical system" of the invention.

Figure 82:
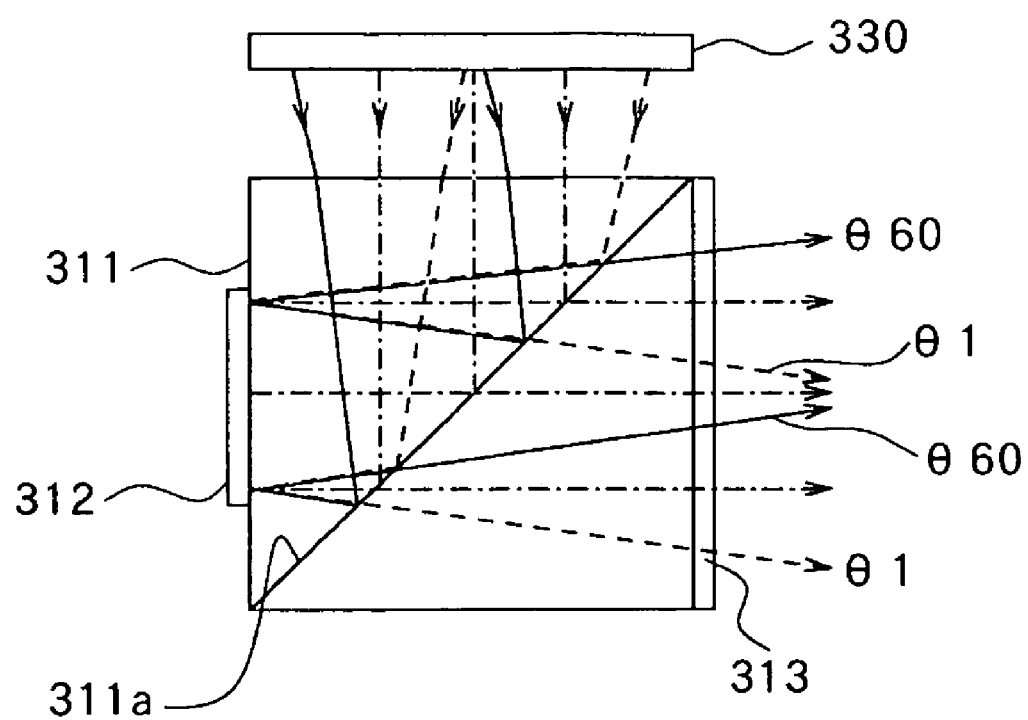
FIG. 82 is a plan view of a three-dimensional image display as still another modification according to the tenth embodiment of the invention showing a structure and action of the same.

For example, a directive deflection light-emitting panel 330 whose light emitting direction changes as time passes may be used as the light source, as shown in FIG. 82. A modification shown in the same figure will be briefly described below.

Figure 83:
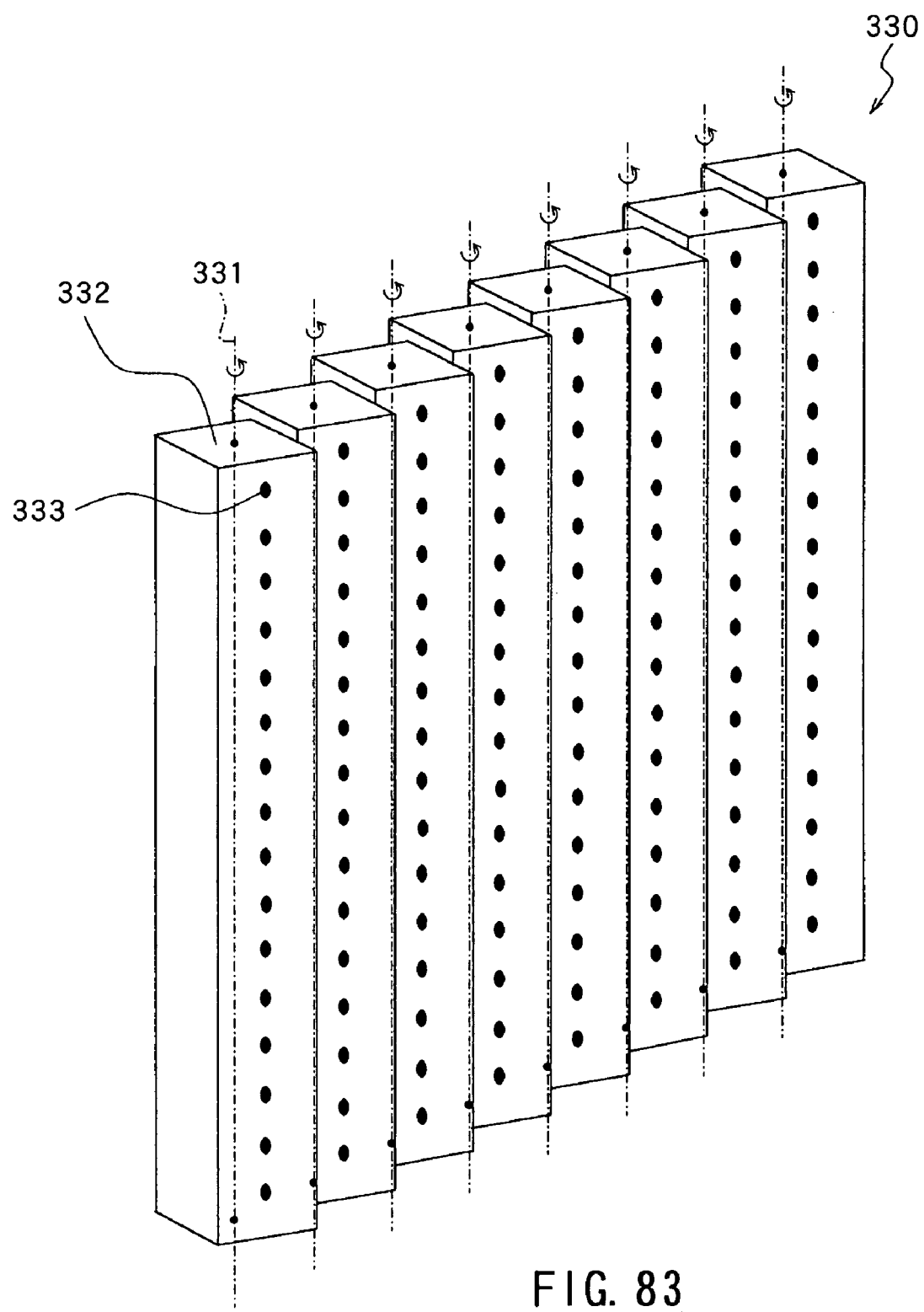
FIG. 83 is an external perspective view of the directive deflection light-emitting panel shown in FIG. 82 showing a configuration of the same.

FIG. 82 shows a schematic plan configuration of a three-dimensional image display according to a modification of the present embodiment. In the same figure, components identical to components shown in FIG. 78 are indicated by like reference numbers, and the description will omit them appropriately. The three-dimensional image display has a directive deflection light-emitting panel 330, a PBS 311, an LCD 312 and a lenticular plate 313. For example, the directive deflection light-emitting panel 330 has a plurality of very small rotary members 332 each of which is provided such that it can rotate about a rotational axis 331 and a plurality of directive light-emitting bodies 333 disposed on a surface of each of the rotary members 332, as shown in FIG. 83. FIG. 83 is a diagonal bird's-eye view of the directive deflection light-emitting panel 330 in a diagonal direction. The rotary members 332 rotate in the same direction in synchronism with each other at the same rotational speed. For example, the directive light-emitting bodies 333 are constituted by light-emitting diodes (LED), semiconductor lasers or the like having high directivity. A single directive light-emitting body 333 is constituted by three light-emitting bodies for lights in colors R, G and B. The directive deflection light-emitting panel 330 corresponds to the "light source capable of changing the projecting direction of light in accordance with time-dependent changes of a two-dimensional image formed by the two-dimensional image forming means".

In the three-dimensional image display having such a configuration, the projecting direction of light from the directive deflection light-emitting panel 330 changes as time passes, and the direction of incidence of light incident upon the LCD 312 is thus deflected. Accordingly, the projecting direction of an image which is formed by the LCD 312 and which exits the lenticular plate 313 also changes.

The three-dimensional image display of this modification is advantageous in that the display can be compactly configured because the light source itself also serves as deflecting means.

Display can be presented without the PBS and LCD by employing a configuration in which the directive light-emitting bodies shown in FIG. 83 are used as independent pixels and in which those pixels are independently subjected to time modulation. This is because the pixels which are directive light-emitting bodies are directly driven to eliminate the need for wave detection (light detection) by the PBS. This configuration is especially suitable for screens in large sizes on the order of several meters by several meters. In this case, such a configuration may be extended to cover not only the front side of the deflecting plate (deflecting directions from 0 deg. to 180 deg.) but also the rear side thereof (deflecting directions from 180 deg. to 360 deg.) to project an image in all directions (from 0 deg. to 360 deg.), which makes it possible to create images which do not rely upon flat surfaces.

While the present invention has been described above with reference to several embodiments thereof, the invention is not limited to those embodiments and may be modified in various ways. For example, beam deflecting scan is performed only in the lateral direction (horizontal direction) in the fifth through tenth embodiments and the modifications thereof. This is not limiting the invention, and beam deflecting scan may be performed not only in the lateral direction but also in the vertical direction to allow three-dimensional display also in the vertical direction. In this case, a viewer can view not only the lateral surfaces of an object but also the top and bottom surfaces thereof by moving the view points to the left and right and up and down, which makes it to display a quite realistic stereoscopic image.

Figure 84:
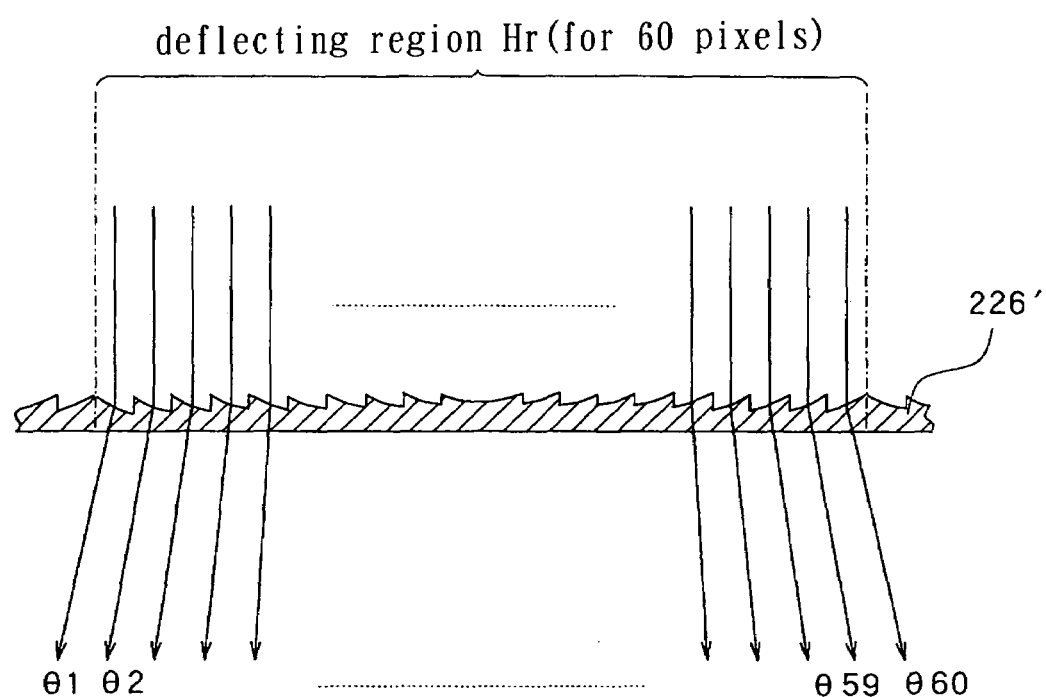
FIG. 84 is a sectional view of a modification of the deflecting plate used in the three-dimensional image display according to the sixth through eighth embodiments.

While a hologram is used to form the deflecting plate 226 and the like in the sixth through eighth embodiments, this is not limiting the invention and, for example, a deflecting plate 226' formed using a linear Fresnel lens in the form of a brazed prism as shown in FIG. 84 may be used. FIG. 84 shows a horizontal section of the deflecting plate 226'. The deflecting plate 226' is a band-shaped Fresnel lens whose horizontal section has the same configuration wherever it is taken, and it is formed by repetitive deflecting regions Hr having the same configuration upon which light for 60 pixels will impinge. Beams of light incident upon the pixels are refracted (deflected) in respective different directions (angular directions $\theta 1$ through $\theta 60$) before they exit.

The numbers of pixels of the LCDs used in the above embodiments are merely examples and may be appropriately changed. For example, while the number of pixels of the LCD 203 in the horizontal direction in the fifth embodiment is 600, it may be a different number. For example, the number of the deflecting cells HC(r,i) included in one deflecting region Hr, i.e., the number of directions in which deflection can occur in one deflecting region Hr is not limited to 60, and it may be a different number. The angular interval between the deflecting directions is not limited to 1 deg., and it may be a different value.

Liquid crystal display elements which are passive elements that require back-light or illuminating light as booster light are used in the above embodiments. This is not limiting the invention, and active display elements which can display an image by emitting light by themselves, e.g., PD (plasma display) elements and EL (electro-luminescence) elements and, further, FED (field emission display) elements and the like may be used except in cases where the projecting optical system is formed using a reflection type liquid crystal (the cases shown in FIGS. 77, 78, 80, 81 and 82). An FED is an element in which a multiplicity of microscopic electron sources are arranged as cathodes in the form of an array; a high voltage is applied to the cathodes to extract electrons from the cathodes; and the electrons are caused to collide with a fluorescent body applied to anodes to cause emission.

Eleventh Embodiment

A three-dimensional image display according to an eleventh embodiment of the invention will now be described.

Figure 85:
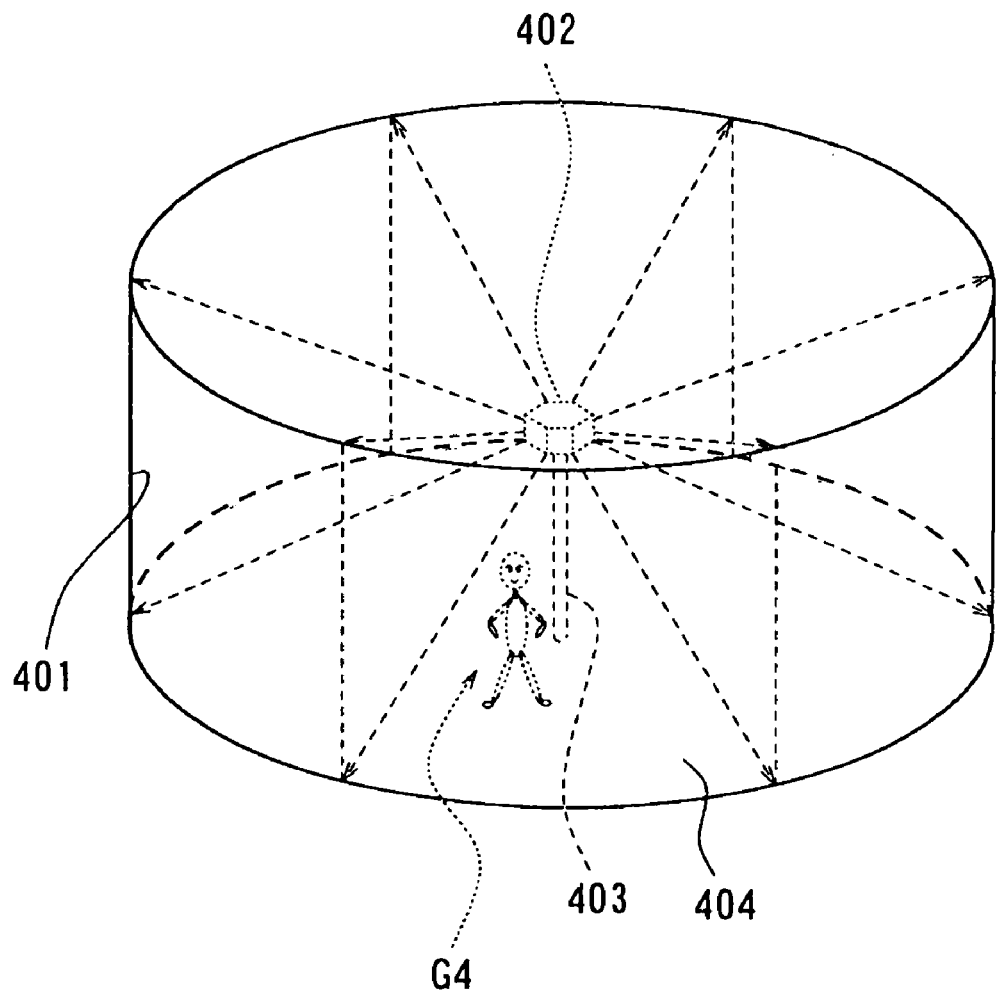
FIG. 85 is a perspective view of a three-dimensional image display according to an eleventh embodiment of the invention showing a schematic configuration of the same.

FIG. 85 shows a schematic configuration of the three-dimensional image display according to the present embodiment. The three-dimensional image display has a cylindrical deflecting screen 401 and a projecting portion 402 provided in the middle of the deflecting screen 401. As will be described in detail later, an inner circumferential surface of the deflecting screen 401 is a reflecting surface which reflects light in different directions in accordance with positions of incidence of the light. Unlike the eighth embodiment, the deflecting screen 401 is fixed. The inner circumferential surface of the deflecting screen 401 is virtually divided at equal intervals in the circumferential direction into six regions. For example, the projecting portion 402 is secured to a bottom portion 404 with a post 403.

The projecting portion 402 emits six laser beams toward the six regions of the deflecting screen 401 and shifts the laser beams in the circumferential direction of the deflecting screen 401 (hereinafter referred to as "main scanning direction") and in the vertical direction of the deflecting screen 401 (hereinafter referred to as "sub scanning direction") to scan those regions with the laser beams. More specifically, for example, a laser beam moves from the left end to the right end of one region of the deflecting screen 401. In the same period, the laser beam slightly moves also downward. Therefore, the locus of the laser beam is at a slight angle to the horizontal direction. When the laser beam reaches the right end of the region of the deflecting screen 401, it returns to the left end and then moves to the right end again.

In the three-dimensional image display of the present embodiment, a three-dimensional image is formed inside the deflecting screen 401. A viewer G4 can view the three-dimensional image by standing inside the deflecting screen 401.

Figure 86:
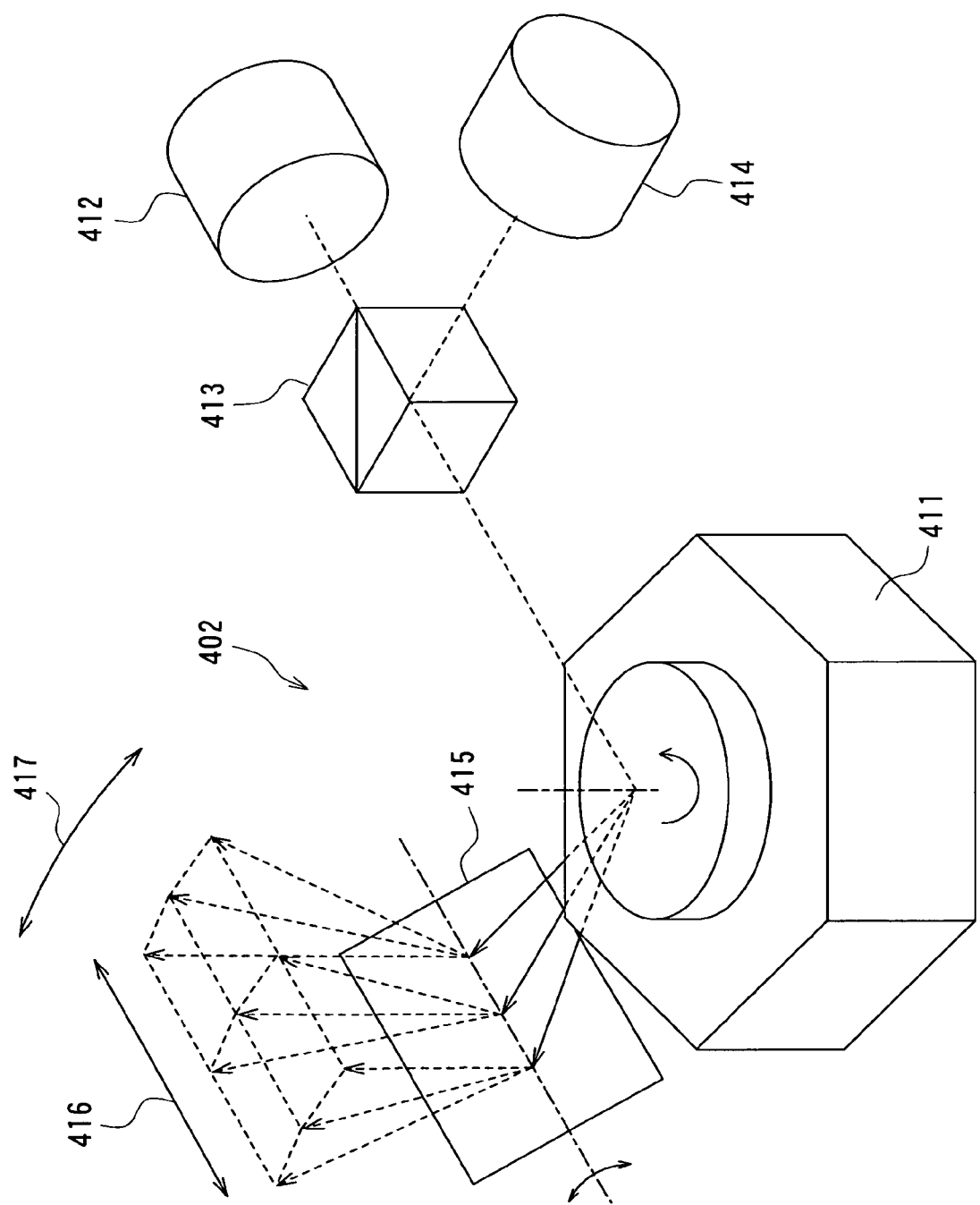
FIG. 86 is a perspective view of a part of the projecting portion in FIG. 85.

FIG. 86 is a perspective view of a part of the projecting portion 402. The deflecting portion 402 has a polygon mirror 411. The polygon mirror 411 has a rotary body in the form of a hexagonal column and a motor which is not shown to rotate the rotary body. A reflecting surface is formed on the six lateral surfaces of the rotary body.

The projecting portion 402 further has a light source portion 412 which emits laser beams toward the reflecting surfaces of the polygon mirror 411, a beam splitter 413 provided between the light source portion 412 and the polygon mirror 411, and a photo-detector 414 provided on one side of the beam splitter 413.

Although not shown, the light source portion 412 has three semiconductor laser devices (hereafter referred to as "LD") for emitting laser beams in red, green and blue and an optical system for synthesizing the beams emitted by the LDs into emission in one direction. The light emitted by the light source portion 412 passes through the beam splitter 413 and is reflected by one reflecting surface of the polygon mirror 411.

The projecting portion 402 further has a galvano mirror 415 provided in the traveling direction of the light reflected by the polygon mirror 411. The galvano mirror 415 has a plate-shaped mirror and a driving portion which is not shown for driving the mirror for reciprocal rotation about an axis along the surface of the mirror.

The light emitted by the light source portion 412 and reflected by the polygon mirror 411 and galvano mirror 415 is further reflected by a mirror which is not shown to be projected toward one region of the deflecting screen 401. This light is shifted by the polygon mirror 411 in a main scanning direction 416 and shifted by the galvano mirror 415 in a sub scanning direction 417.

The light projected upon the deflecting screen 401 and returned to the projecting portion 402 by being reflected by the deflecting screen 401 is reflected by the galvano mirror 415 and polygon mirror 411 in that order, reflected by the beam splitter 413 to impinge upon the photo-detector 414 and detected by the photo-detector 414.

The three-dimensional image display according to the present embodiment has six sets of the light source portions 412, beam splitters 413, photo-detectors 414 and galvano mirrors 415 shown in FIG. 86. Beams of light emitted by the light source portions 412 of those sets respectively impinge upon different surfaces of the polygon mirror 411 to be reflected. They are reflected by the different galvano mirrors 415 to be projected upon the six regions of the deflecting screen 401.

Figure 87:
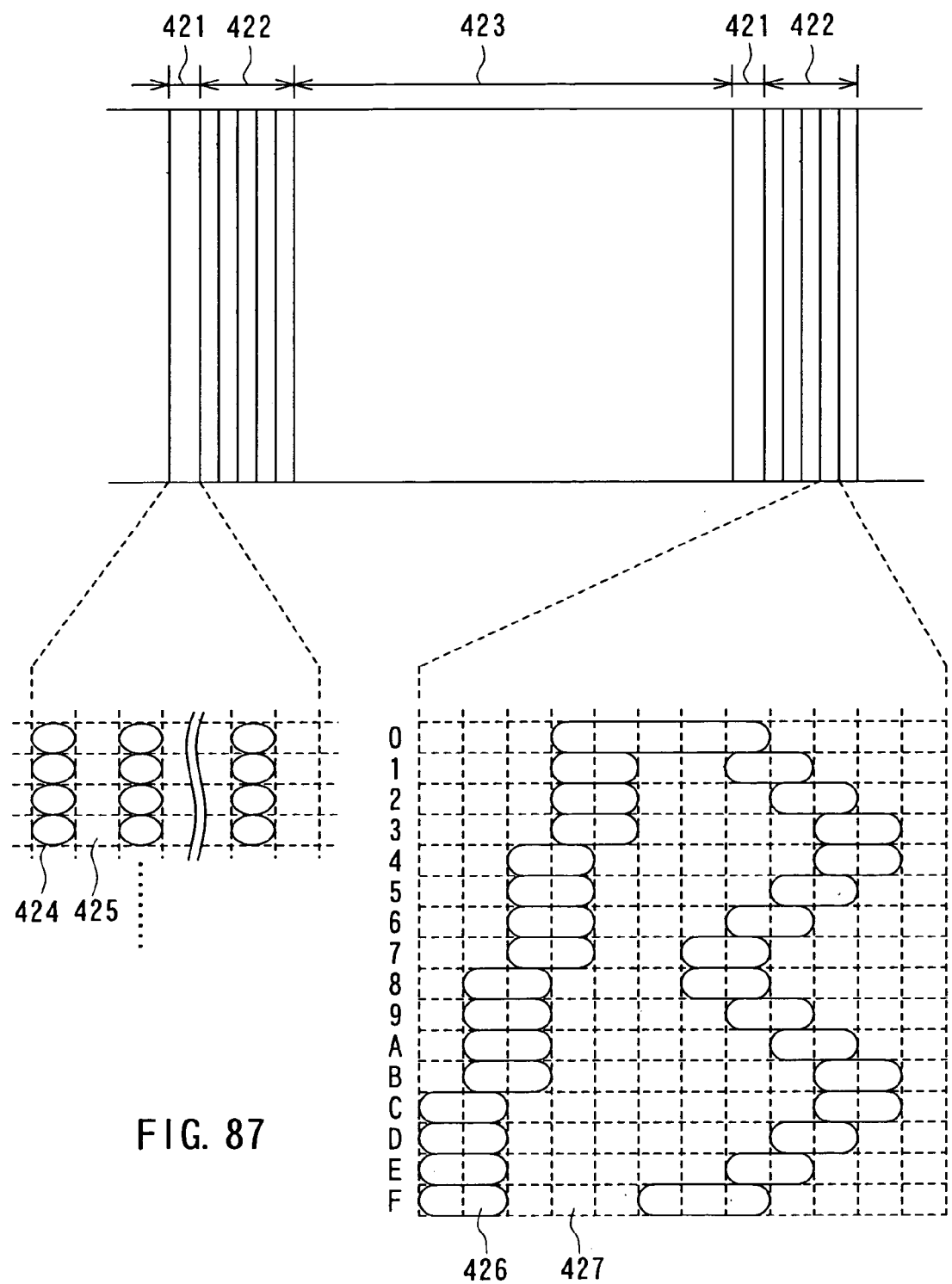
FIG. 87 is an illustration of an inner circumferential surface of the deflecting screen in FIG. 85 showing a configuration of the same.

A configuration of the inner circumferential surface of the deflecting screen 401 will now be described with reference to FIG. 87. Clock regions 421 and address servo regions 422 are provided on the inner circumferential surface of the deflecting screen 401 at predetermined intervals in the circumferential direction. Deflecting regions 423 are provided in parts of the inner circumferential surface of the deflecting screen 401 other than the clock regions 421 and servo regions 422.

Synchronization information for synchronized control of the display as a whole is recorded in the clock regions 421. Specifically, the clock regions 421 are formed with, for example, a pattern in which reflecting portions 424 and non-reflecting portions 425 having predetermined widths are alternately provided in the main scanning direction (the circumferential direction of the deflecting screen 401). Such patterns are provided in the same quantity as the number of scan lines in the sub scanning direction (the vertical direction of the deflecting screen 401). The non-reflecting portions 425 are required to have a small reflectivity such that the quantity of light reflected by the reflecting portions 424 can be distinguished from the quantity of light reflected by the non-reflecting portions 425. While FIG. 87 shows the reflecting portions 424 as having an elliptic configuration, the reflecting portions 424 may be formed like bands extending in the sub scanning direction.

Position information used for controlling the position of incidence of light upon the deflecting screen 401 is recorded in the address servo regions 422. Specifically, for example, a 16-bit address representing a position on the deflecting screen 401 is recorded in an address servo region 422. The address servo region 422 has four areas in each of which four bits of the 16-bit address are recorded and one area in which parity data are recorded. As illustrated, for example, hexadecimal data (0 through F) determined by the pattern of the arrangement of reflecting portions 426 and non-reflecting portions 427 are recorded in such regions. The non-reflecting portions 427 are required to have a small reflectivity such that the quantity of light reflected by the reflecting portions 426 can be distinguished from the quantity of light reflected by the non-reflecting portions 427.

The reflecting portions 426 of the address servo regions 422 have a configuration like an arc that protrudes toward the front surface when viewed sideways. Therefore, when light from the projecting portion 402 impinges upon the center in the vertical direction of a reflecting portion 426, the light is reflected in the direction opposite to the direction of incidence. When the light impinges upon a position of the reflecting portion 426 which deviates from the center in the vertical direction, the light is reflected in a direction at an angle to the direction opposite to the direction of incidence. This angle is positively or negatively polarized depending on the direction, i.e., the upward or downward direction, in which the position of incidence of the light deviates from the center in the vertical direction. The absolute value of this angle becomes greater, the greater the upward or downward deviation from the center. Therefore, servo information for positioning the position of incidence of light on the center of the reflecting portion 426 in the vertical direction can be generated by detecting a signal that is in accordance with the position of return light with the photo-detector 414 of the projecting portion 402. For example, a photo-detector having a double light-receiving area may be used as the photo-detector 414 for detecting the signal in accordance with the position of return light.

Light projected upon the inner circumferential surface of the deflecting screen 401 moves across the clock regions 421, address servo regions 422 and deflecting regions 423. However, the light will be at a slight angle to the horizontal direction as described above. As a result, a plurality of patterns representing addresses associated with the same scan line located in the plurality of discretely provided address servo regions 422 are in positions which are shifted in the vertical direction in accordance with the locus of the light.

Figure 88:
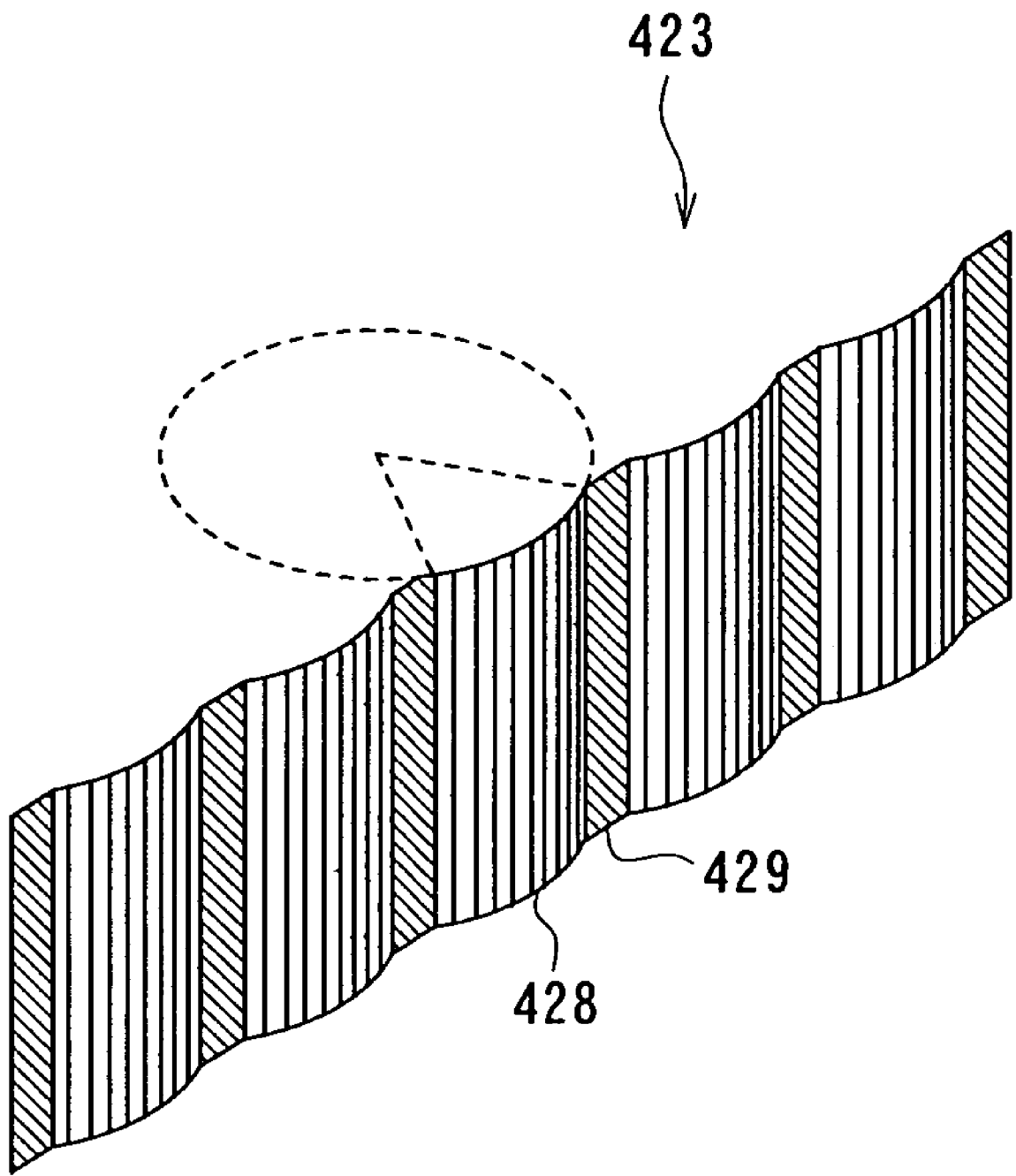
FIG. 88 is a perspective view of the deflecting region in FIG. 87 showing a configuration of the same.

A configuration of the deflecting regions 423 will now be described with reference to FIG. 88. FIG. 88 is an enlarged perspective view of a part of a deflecting region 423. Reflecting portions 428 in the form of vertically elongate bands and non-reflecting portions 429 in the form of vertically elongate bands are alternately provided in the deflecting region 423. The pitch of the reflecting portions 428 corresponds to the pitch of horizontal pixels of a two-dimensional image projected upon the deflecting screen 401. Preferably, the reflectivity of the non-reflecting portions 429 is kept as small as possible. The surface of the reflecting portions 428 is a cylindrical surface that is a part of a cylinder whose central axis extends in the vertical direction.

Figure 89:
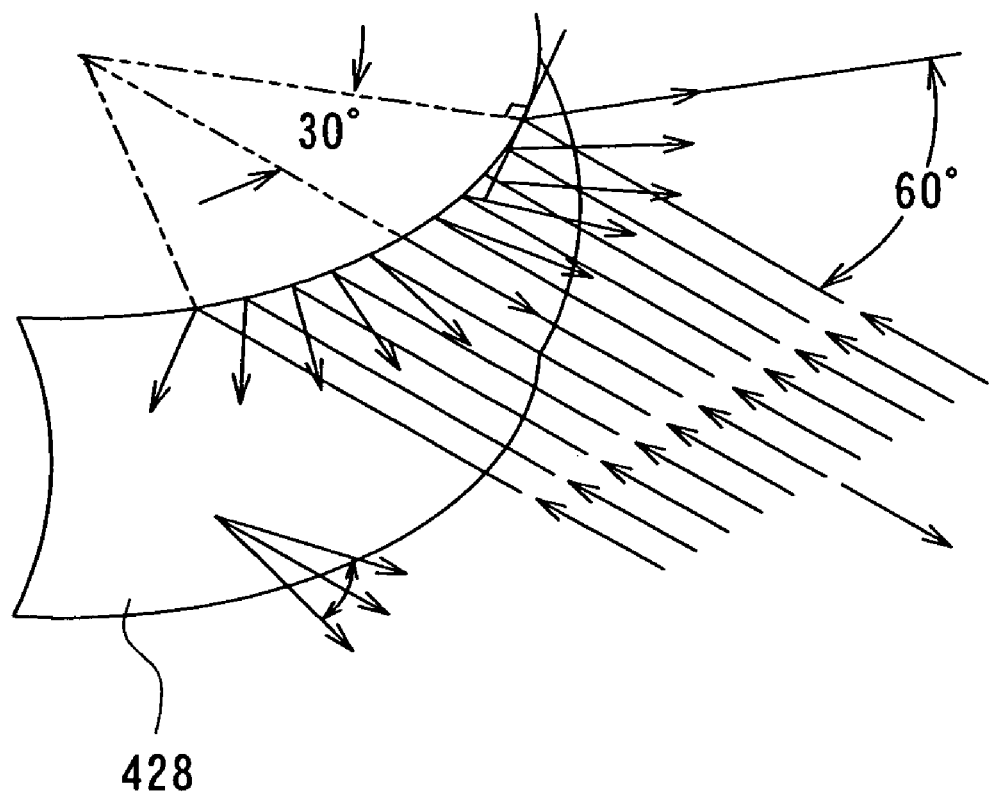
FIG. 89 is an enlarged perspective view of the reflecting portion in FIG. 88.

FIG. 89 is an enlarged perspective view of a part of a reflecting portion 428. Light from the projecting portion 402 perpendicularly impinges upon a virtual plane which is tangent to the center of the reflecting portion 428 in the lateral direction thereof. Therefore, the light from the projecting portion 402 is reflected in the direction opposite to the direction of incidence when it impinges upon the center of the reflecting portion 428 in the lateral direction thereof, and it is reflected in a direction at an angle 2×θa to the direction opposite to the direction of incidence when it impinges upon a position whose normal direction is at a deviation of θa from that of the center of the reflecting portion 428 in the lateral direction thereof. For example, as shown in FIG. 89, light incident upon a position whose normal direction is 30 deg. apart from the center of the reflecting portion 428 in the lateral direction thereof is reflected in a direction at an angle of 60 deg. to the direction opposite to the direction of incidence. When the light from the projecting portion 402 moves across the reflecting portion 428 having such a configuration, reflected light from the reflecting portion 428 is deflected such that its direction is sequentially changed.

As shown in FIG. 89, convex portions which are in the form of arcs protruding toward the front surface when viewed sideways are periodically formed in the vertical direction on the surface of the reflecting portion 428. As a result, light incident upon the reflecting portion 428 is diffused at a predetermined angle in the vertical direction.

In the present embodiment, light projected upon the deflecting regions 423 of the deflecting screen 401 is modulated to project a plurality of two-dimensional images in different directions, thereby forming a three-dimensional image. For example, let us assume that one three-dimensional still image is formed by 60 two-dimensional still images projected in angular directions θ1 through θ60. In this case, when light from the projecting portion 402 passes through one of the reflecting portions 428 of the deflecting region 423, the intensity of the light is controlled based on information of one pixel of the two-dimensional images associated with the angular directions θ1 through θ60 in accordance with the timing of projection of the reflected light in the angular directions θ1 through θ60. Therefore, when one cycle of scan of the light from the projecting portion 402 is completed, 60 two-dimensional still images are projected in the 60 angular directions θ1 through θ60 and, as a result, one three-dimensional still image is formed.

For example, let us assume that the number of pixels of a two-dimensional image is 640 (horizontal pixels)×480 (vertical pixels); halftones are represented by data having ten bits; and 60 three-dimensional still images are formed per second to display a three-dimensional dynamic image. Then, the frequency of modulation applied to light projected upon the deflecting screen 401 must be equal to or greater than a value which is given by the following equation:

640(pixels)×480(pixels)×60(angular directions)×10 (bits)×60≈11 GHz.

This frequency is a frequency which can be modulated by a semiconductor laser. The modulation frequency may be decreased by performing thinned display utilizing means such as spatial interlace.

Figure 90:
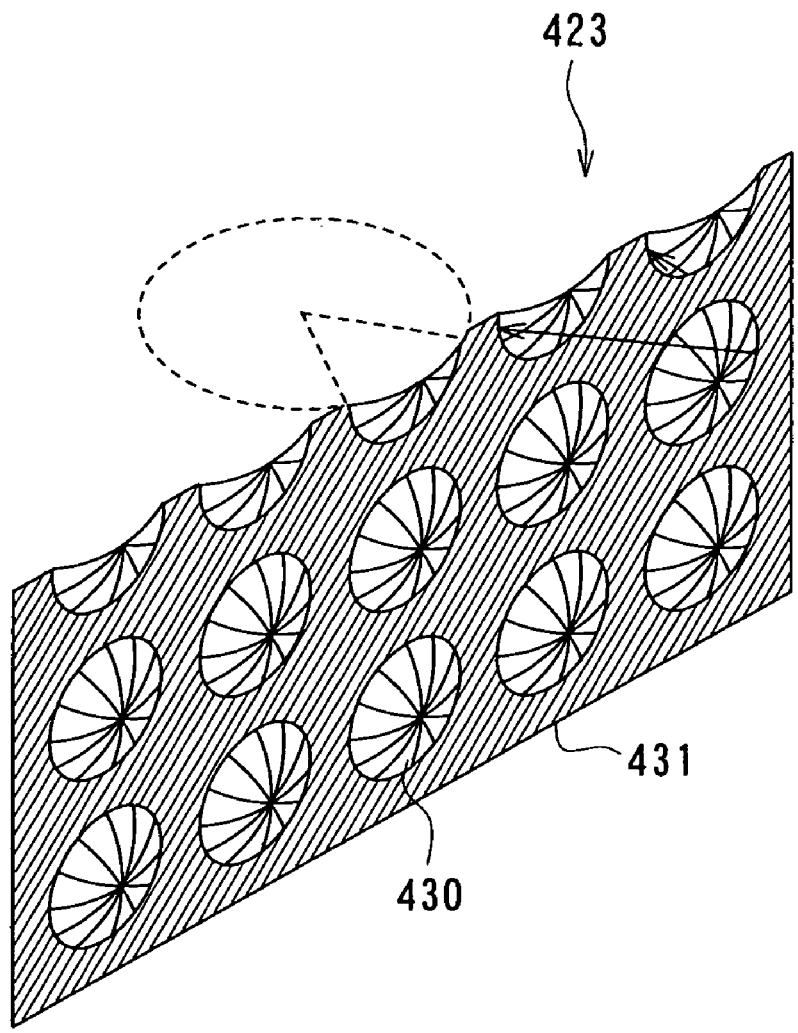
FIG. 90 is a perspective view of another example of the configuration of the deflecting region in FIG. 87.

FIG. 90 shows another example of the configuration of the deflecting regions 423. In this example, the deflecting region 423 has a plurality of reflecting portions 430 which are regularly arranged in the main scanning direction and sub scanning direction. The surface of the reflecting portions 430 is formed like a spherical surface protruding toward the front surface. The area of the deflecting region 423 except the reflecting portions 430 is a non-reflecting portion 431. The positions of the reflecting portions 430 correspond to the positions of pixels of a two-dimensional image projected upon the deflecting screen 401. The deflecting regions 423 having the configuration shown in FIG. 90 also make it possible to deflect reflected light and to diffuse the same in the vertical direction.

A circuit configuration of the three-dimensional image display according to the present embodiment will now be described with reference to the block diagram in FIG. 93. The three-dimensional image display according to the present embodiment has: a video data processing circuit 441 to which video data of two-dimensional images associated with the angular directions θ1 through θ60 are input and which performs processes such as rearrangement of data to sequentially output the data associated with the angular directions θ1 through θ60 for each pixel; and an LD driving circuit 442 which drives the LDs of the light source portion 412 based on the data output by the video data processing circuit 441 such that the light emitted by the light source portion 412 is modulated.

The three-dimensional image display further has: a signal detection circuit 443 to which the signal output by the photodetector 414 is input and which detects and outputs a position deviation signal representing a deviation between a signal associated with the total amount of received light and the position illuminated with the light; and a position information/clock detection circuit 444 which detects position information and an external clock based on the signal output by the signal detection circuit 443. The position information includes address information and servo information.

The three-dimensional image display further has an automatic gain control (hereinafter referred to as "AGC") circuit 449 to which the signal associated with the total amount of received light output by the signal detection circuit 443 is input. The AGC circuit 449 samples the optical intensity of return light and controls the LD driving circuit 442 to keep the quantity of the light emitted by the light source portion 412 constant based on the sampled optical intensity.

The three-dimensional image display further has a polygon mirror driving circuit 446 which drives the polygon mirror 411, a galvano mirror driving circuit 447 which drives the galvano mirror 415, and a system clock generation circuit 445. The system clock generation circuit 445 has a phase-locked loop (hereinafter referred to as "PLL") circuit and generates and outputs a system clock in synchronism with the external clock detected by the position information/clock detection circuit 444 using the PLL circuit. The video data processing circuit 441, polygon mirror driving circuit 446, galvano mirror driving circuit 447 and AGC circuit 449 operate based on the system clock generated by the system clock generation circuit 445.

The three-dimensional image display further has a control portion 448 which controls the video data processing circuit 441, polygon mirror driving circuit 446 and galvano mirror driving circuit 447. The position information or address information and servo information detected by the position information/clock detection circuit 444 is input to the control portion 448. The control portion 448 recognizes the position on the deflecting screen 401 illuminated with light based on the address information and controls the video data processing circuit 441, polygon mirror driving circuit 446 and galvano mirror driving circuit 447 such that a desired position is illuminated with light carrying desired information. Further, the control portion 448 controls the polygon mirror driving circuit 446 and galvano mirror driving circuit 447 based on the servo information to correct any deviation of the position on the deflecting screen 401 illuminated with light.

Figure 92:
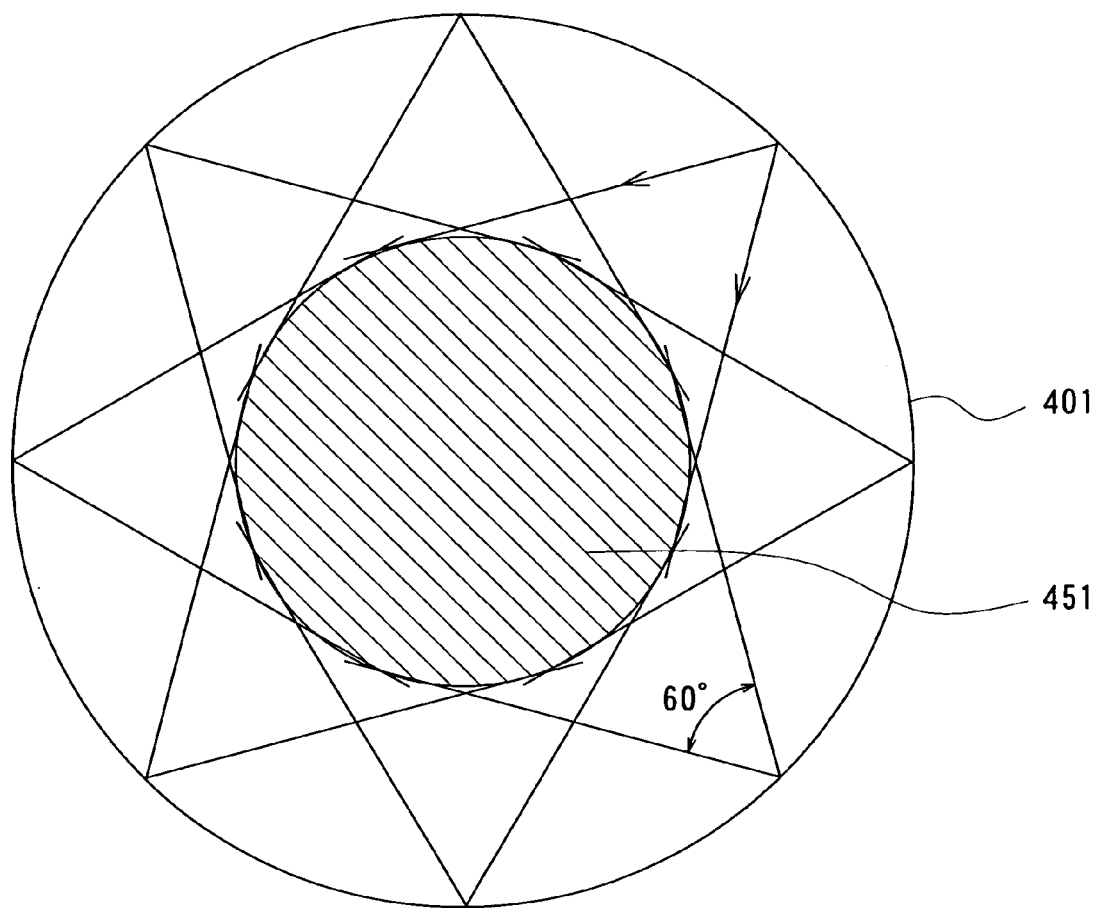
FIG. 92 is an illustration of the relationship between an angular range for the deflection of light at a reflecting portion of a deflecting region of a deflecting screen and a region in which a three-dimensional image is formed in the eleventh embodiment of the invention.

A description will now be made with reference to FIGS. 92 and 93 on the relationship between the range of angles in which light is deflected by the reflecting portions 428 in the reflecting regions 423 of the deflecting screen 401 and a region in which a three-dimensional image is formed. In FIG. 92, a reference number 451 represents a region in which a three-dimensional image is formed when light is deflected by the reflecting portions 428 in the deflecting regions 423 of the deflecting screen 401 in an angular range of 60 deg. In FIG. 93, a reference number 452 represents a region in which a three-dimensional image is formed when light is deflected by the reflecting portions 428 in the deflecting regions 423 of the deflecting screen 401 in an angular range of 30 deg. The regions 451 and 452 are regions in which deflecting ranges in a plurality of positions of the deflecting screen 401 overlap each other.

Figure 93:
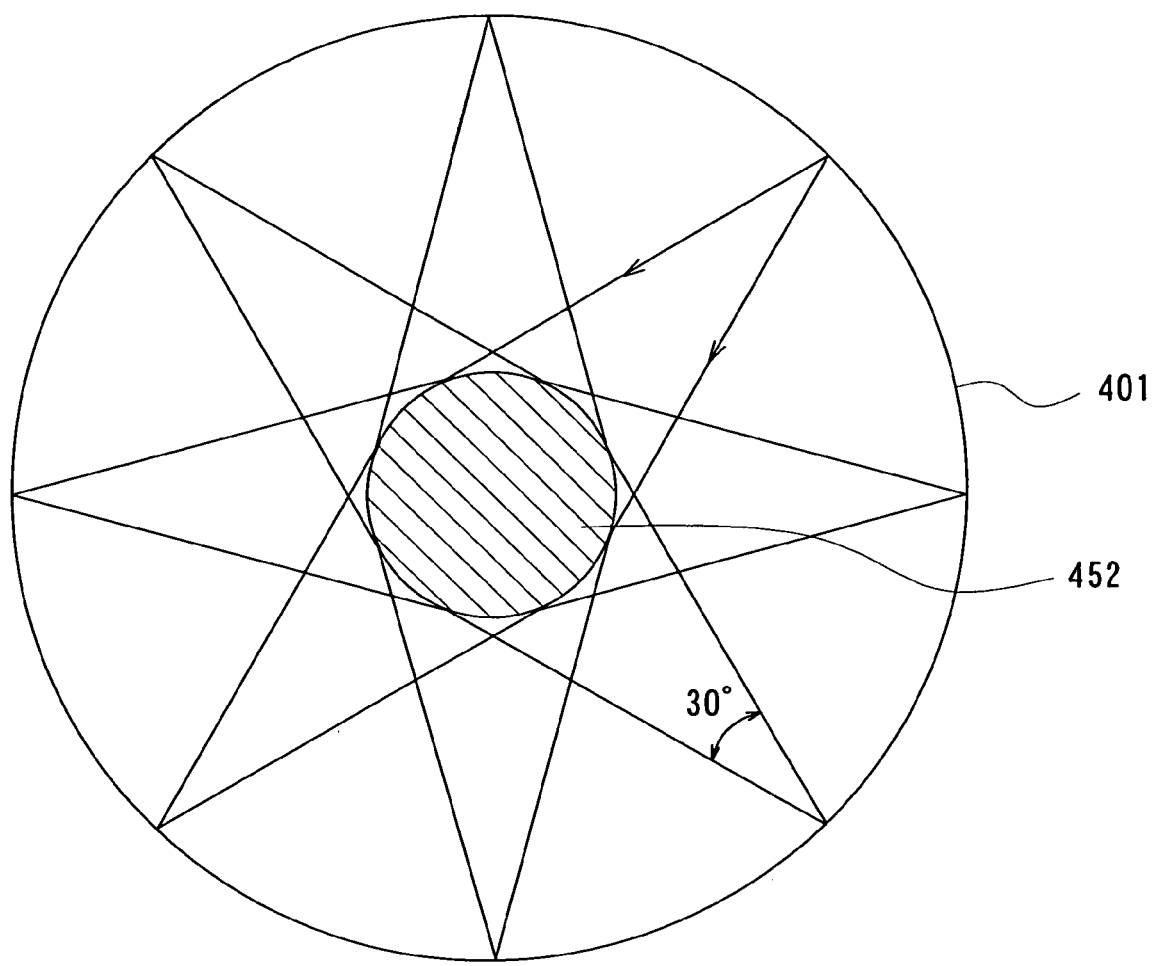
FIG. 93 is an illustration of the relationship between an angular range for the deflection of light at a reflecting portion of the deflecting region of the deflecting screen and a region in which a three-dimensional image is formed in the eleventh embodiment of the invention.

As apparent from FIGS. 92 and 93, a three-dimensional image is formed in a greater region, the greater the angular range in which light is deflected by the reflecting portions 428 in the deflecting regions 423 of the deflecting screen 401.

Figure 94:
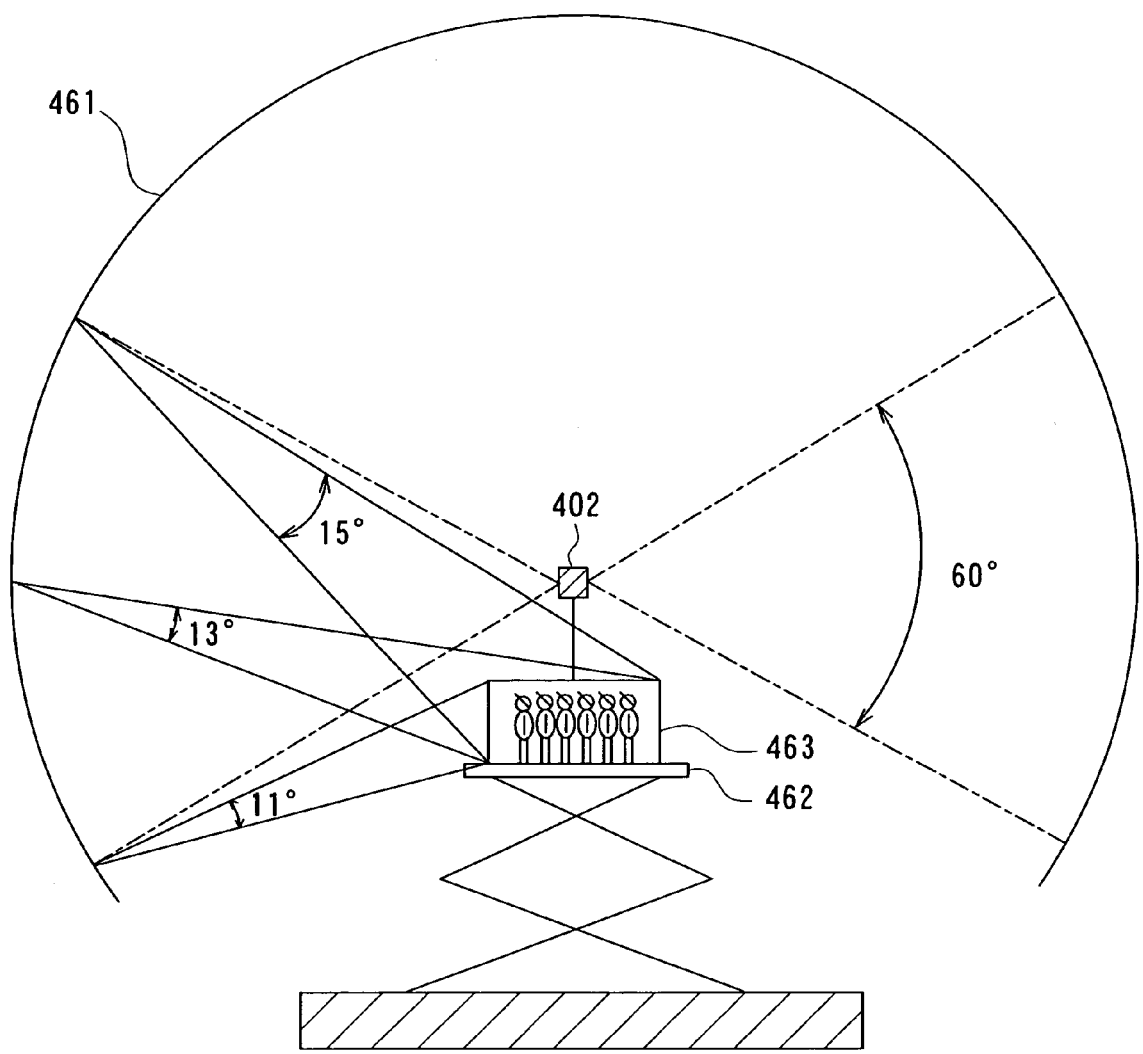
FIG. 94 is an illustration of a modification of the three-dimensional image display according to the eleventh embodiment of the invention.

FIG. 94 shows a modification of the three-dimensional image display according to the present embodiment. In this modification, a dome-shaped deflecting screen 461 is provided instead of the cylindrical deflecting screen 401 shown in FIG. 85. In this example, a platform 462 which can be elevated is provided below the center of the deflecting screen 461. A viewing room 463 to accommodate viewers is provided on the platform 462. A projecting portion 402 is provided above the viewing room 463. The scan range of the projecting portion 402 in the vertical direction is, for example, an angular range of 60 deg. about the horizontal direction.

The configuration of the deflecting screen 461 is basically similar to that of the deflecting screen 401. In this example, however, the center of the reflecting direction of light and the diffusing range of the light in the vertical direction are varied depending on the position of the light on the deflecting screen 461 in the vertical direction. The center of the reflecting direction of light in the vertical direction is the direction from each position on the deflecting screen 461 toward the center of the viewing room 463. The diffusing range of light is a range which covers the viewing room 463. Specifically, for example, the diffusing range at the upper end of the scan range of the projecting portion 402 is 15 deg.; and the diffusing range in the middle in the vertical direction of the scan range is 13 deg.; and the diffusing range at the lower end of the scan range is 11 deg., as illustrated.

The operation of the three-dimensional image display according to the present embodiment will now be described. As shown in FIG. 86, the light source portion 412 of the projecting portion 402 emits light which has been modulated based on information on 60 two-dimensional images in different projecting directions. The light is reflected by the polygon mirror 411 and galvano mirror 415 to be projected upon the deflecting screen 401. The light is shifted in the main scanning direction 416 by the polygon mirror 411 and is shifted in the sub scanning direction by the galvano mirror 415.

The light projected upon the deflecting regions 423 of the deflecting screen 401 is reflected in different directions in accordance with positions of incidence upon the reflecting portions 428. When one cycle of scan with the light from the projecting portion 402 is completed, 60 two-dimensional still images are projected in 60 angular directions, i.e., angular directions θ1 through θ60 to form one three-dimensional still image.

When the light projected upon the deflecting screen 401 passes through the clock regions 421 of the deflecting screen 401, light reflected by the reflecting portions 424 returns to the projecting portion 402. The return light is detected by the photo-detector 414.

Only when the light projected upon the deflecting screen 401 impinges upon the centers of the reflecting portions 428 in the lateral direction thereof during passage of the light through the deflecting regions 423 of the deflecting screen 401, only light reflected by the reflecting portions 428, i.e., light in the direction θ30 returns to the projecting portion 402. The light is detected by the photo-detector 414.

Figure 91:
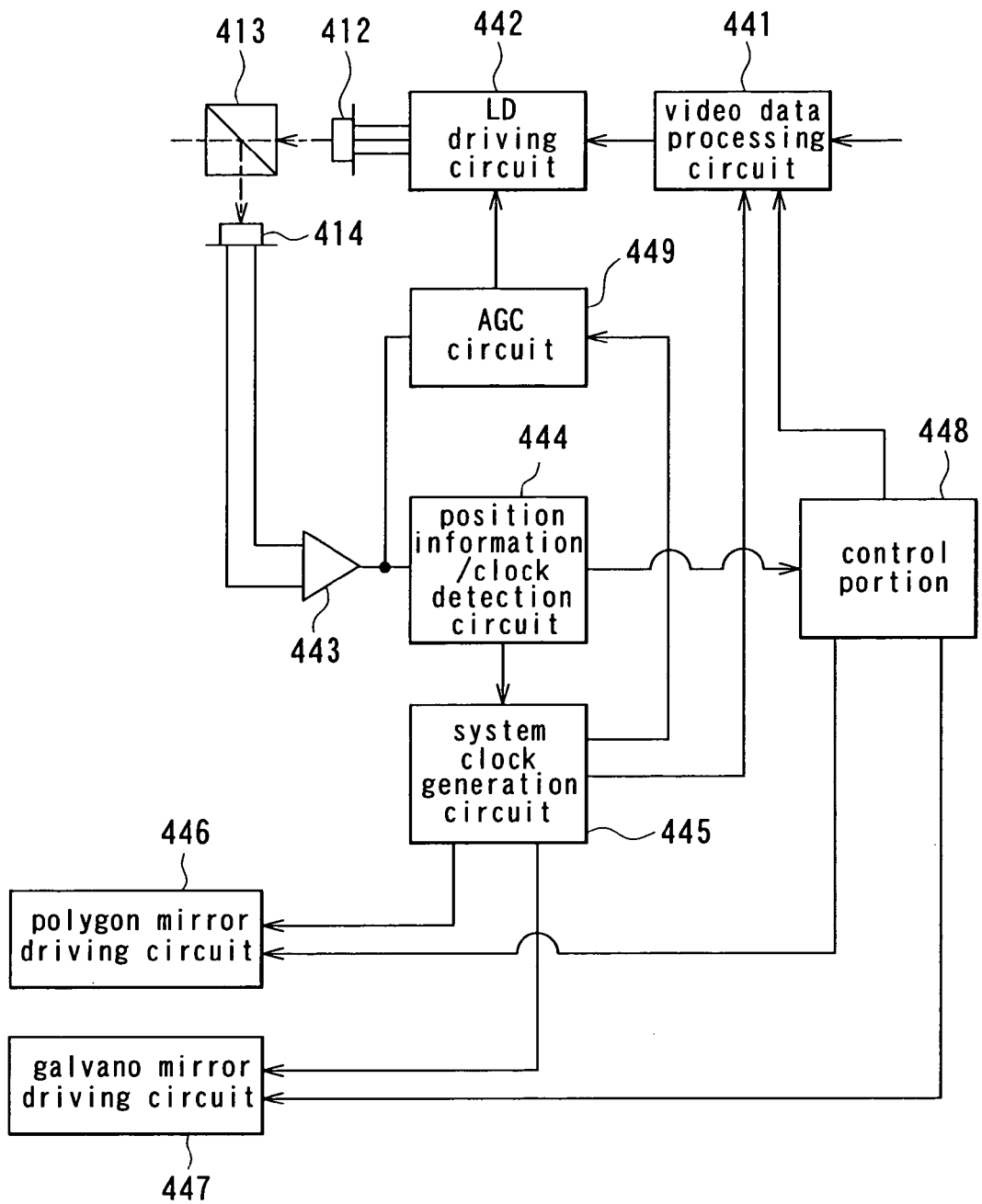
FIG. 91 is a block diagram of the three-dimensional image display according to the eleventh embodiment of the invention showing a circuit configuration of the same.

The position information/clock detection circuit 444 shown in FIG. 91 detects an external clock based on signals output by the photo-detector 414 when the light passes through the clock regions 421 and deflecting portions 423. A system clock is generated by the system clock generation circuit 445 based on the external clock. The external clock is detected based on a signal associated with the total amount of received light among the signals output by the photo-detector 414.

When the light projected upon the deflecting screen 401 passes through the address servo regions 422 of the deflecting screen 401, position information including address information and servo information is detected by the position information/clock detection circuit 444 based on signals output by the photo-detector 414. The address information is detected based on the signal associated with the total amount of received light among the signals output by the photo-detector 414, and the servo information is detected based on a position deviation signal representing any deviation of the position illuminated with light among the signals output by the photo-detector 414.

The control portion 448 shown in FIG. 91 recognizes the position on the deflecting screen 401 illuminated with light based on the address information, and controls the video data processing circuit 441, polygon mirror driving circuit 446 and galvano mirror driving circuit 447 such that a desired position is illuminated with light carrying desired information. The control portion 448 controls the polygon mirror driving circuit 446 and galvano mirror driving circuit 447 based on the servo information to correct the deviation of the position of the deflecting screen 401 illuminated with light.

As described above, the three-dimensional image display according to the present embodiment can be implemented with simple facility because there is no need for moving the deflecting screen 401 unlike the eighth embodiment.

In the present embodiment, since the address servo regions 422 are provided on the deflecting screen 401, a position illuminated with light can be accurately controlled, which makes it possible to form a three-dimensional image accurately.

In the present embodiment, synchronized control of the display as a whole is possible because the clock regions 421 are provided on the deflecting screen 401.

In the present embodiment, the AGC circuit 449 samples the optical intensity of return light, and the LD driving circuit 442 is controlled to keep the quantity of light emitted by the light source portion 412 constant based on the sampled optical intensity. Therefore, according to the present embodiment, it is possible to correct variations of the reflectivity of the deflecting screen 401, fluctuations of the output of the LDs of the light source portion 412 attributable to temperature, and fluctuations of the output of the LDs of the light source portion and changes in the reflectivity of the deflecting screen 401 attributable to aging, and is thereby possible to always present pictures with consistent quality to viewers.

The configuration, operation and effects of the present embodiment are otherwise similar to those of the eighth embodiment.

The eighth embodiment may be modified by providing the clock regions 421 and address servo regions 422 on the deflecting film 246 shown in FIG. 69 or the deflecting screen 256 shown in FIG. 73 and by providing means for detecting return light similar to that in the present embodiment. Further, in the eighth embodiment, return light from the deflecting film 246 or deflecting screen 256 in the direction θ30 may be detected to detect an external clock as in the present embodiment. Those arrangements make it possible for the eighth embodiment to achieve the same effects as those in the present embodiment.

Twelfth Embodiment

A three-dimensional image display according to a twelfth embodiment of the invention will now be described.

Figure 95:
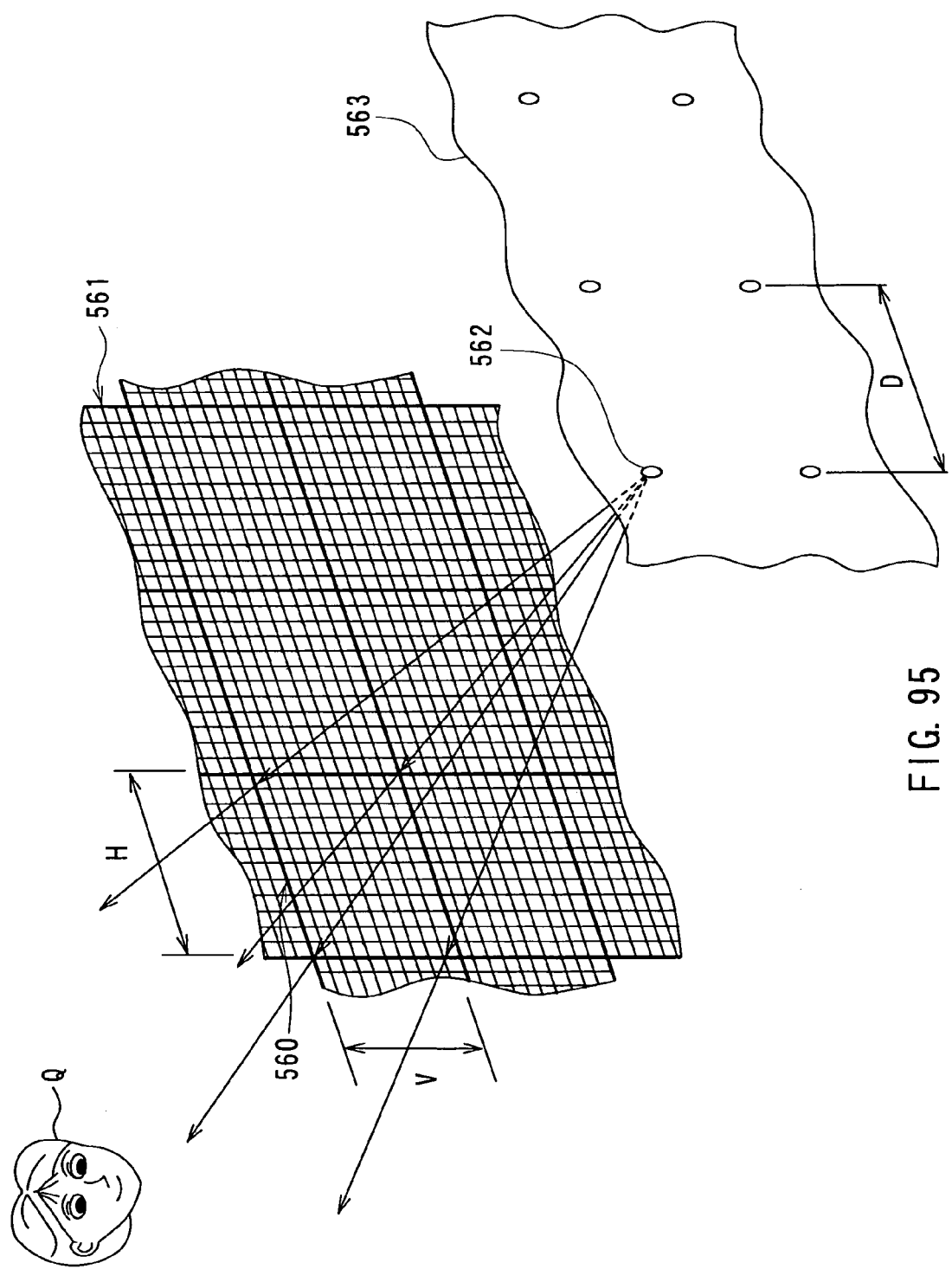
FIG. 95 is a perspective view of a three-dimensional image display according to a twelfth embodiment of the invention showing a schematic configuration of the same.

FIG. 95 shows a schematic configuration of the three-dimensional image display according to the present embodiment. The three-dimensional image display has an LCD panel 561 which is similar to the LCD panel 61 in FIG. 21. The LCD panel 561 includes a plurality of LCDs 560 similar to the LCDs 60 in FIG. 21. The present embodiment is unlike the second embodiment in that neither diffusing plate nor light source portion is provided behind the LCD panel 561.

The three-dimensional image display further has a point light source array 563 provided in a position corresponding to that of the three-dimensional display screen 63 in FIG. 21. A plurality of directive point light source elements 562 are provided at the point light source array 563 in positions corresponding to those of the pinhole elements 62 in FIG. 21. The directive point light source elements 562 emit directional light such that the respective LCDs 560 are illuminated with light which is diffused from one point. The point light source array 563 is also adapted to allow any of the directive point light source elements 562 to be selectively caused to emit light. For example, light luminance LEDs may be used as the directive point light source elements 562.

The operation of the three-dimensional image display according to the present embodiment will now be described. The operation of the LCD panel 561 is similar to that of the LCD panel 61 in FIG. 21. In the present embodiment, at the timing of the formation of a two-dimensional image at each of the LCDs 560 of the LCD panel 561, the directive point light source element 562 associated with the LCD 560 is selectively caused to emit light. The light emitted by the directive point light source element 562 is spatially modulated when it passes through the respective LCDs 560 and is projected in a space. A three-dimensional image is formed by the light which has passed through each of the LCDs 560 on the side of the LCD panel 561 opposite to the point light source array 563. A viewer Q can view this three-dimensional image on the side of the LCD panel 561 opposite to the point light source array 563.

According to the present embodiment, light emitted by the light source can be utilized more effectively than in the second embodiment, which makes it possible to display a brighter three-dimensional image.

According to the present embodiment, three-dimensional display can be achieved with the relatively simple configuration having the LCD panel 561 including the plurality of LCDs 560 and the point light source array 563 including the plurality of directive point light source elements 562.

The configuration, operation and effects of the present embodiment are otherwise similar to those of the second embodiment.

Thirteenth Embodiment

A three-dimensional image display according to a thirteenth embodiment of the invention will now be described.

Figure 96:
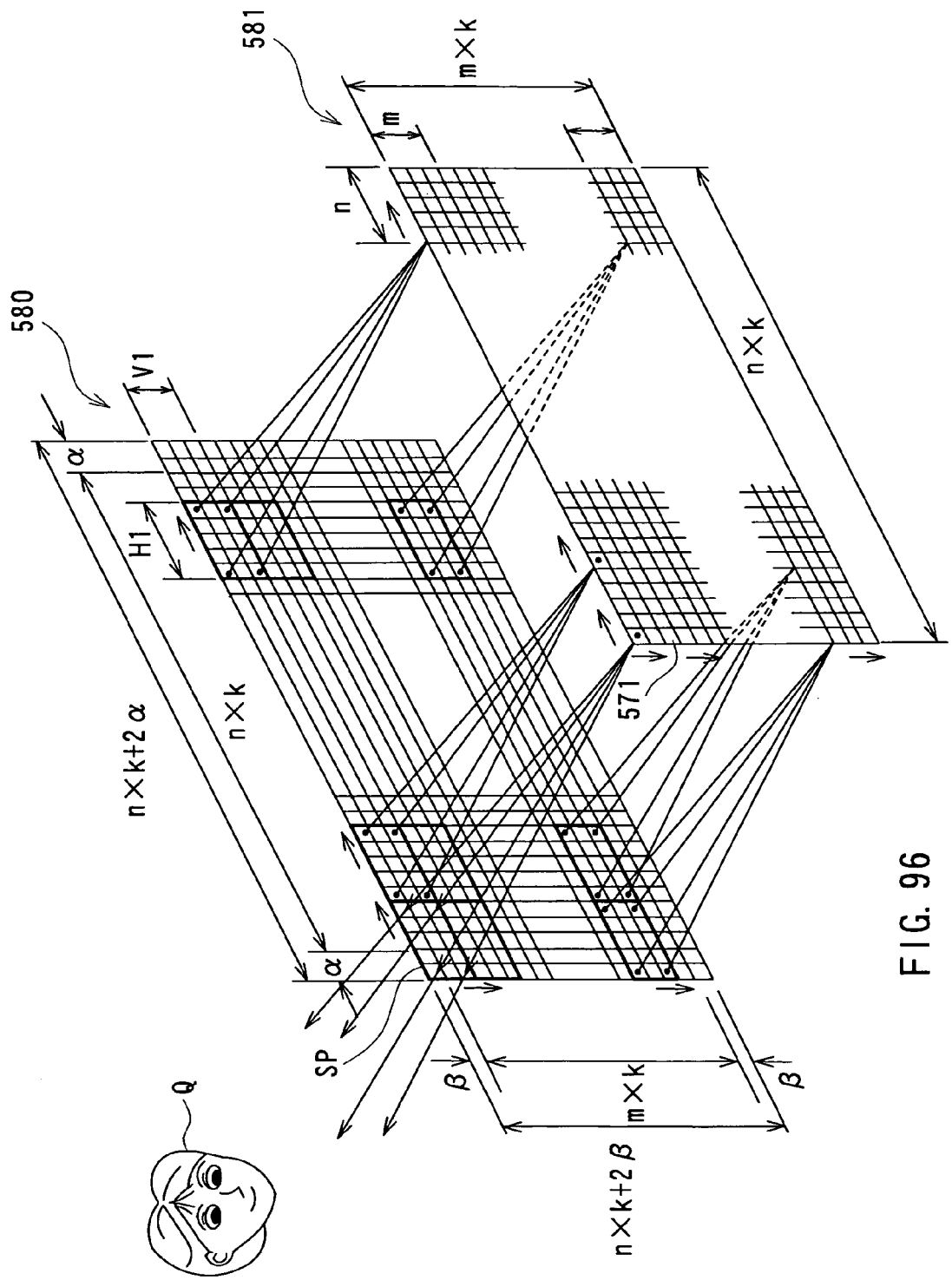
FIG. 96 is a perspective view of a three-dimensional image display according to a thirteenth embodiment of the invention showing a schematic configuration of the same.

FIG. 96 shows a schematic configuration of the three-dimensional image display according to the present embodiment. The three-dimensional image display has a large picture LCD panel 580 similar to the large picture LCD panel 80 in FIG. 30. The present embodiment is unlike the fourth embodiment in that neither diffusing plate nor light source portion is provided behind the large picture LCD panel 580. No microlens is provided on an end face of the large picture LCD panel 580.

The three-dimensional image display further has a directive point light source assembly panel 581 provided in a position corresponding to that of the pinhole LCD assembly panel 81 in FIG. 30. The directive point light source assembly panel 581 has a plurality of directive point light source portions 571 provided in positions corresponding to those of the pinhole pixels PX in FIG. 30. The directive point light source portions 571 emit directional light such that partial image display regions SP are illuminated with light which is diffused from one point. The point light source assembly panel 581 is also adapted to allow any of the directive point light source portions 571 to be selectively caused to emit light. Referring to the directive point light source assembly panel 581, for example, it is possible to use a part in which high luminance LEDs are used as the directive point light source portions 571, a plasma display or a liquid crystal panel which has a back-light.

The operation of the three-dimensional image display according to the present embodiment will now be described. The operation of the large picture LCD panel 580 is similar to that of the large picture LCD panel 80 in FIG. 30. In the present embodiment, at the timing of the formation of partial still images at a plurality of the partial image display regions SP of the large picture LCD panel 580, the directive point light source portions 571 associated with the partial image display regions SP are selectively caused to emit light. The light emitted by the directive point light source portions 571 is spatially modulated when it passes through the respective partial image display regions SP and is projected in a space. Three-dimensional images are formed by the light which has passed through the partial image display regions SP on the side of the large picture LCD panel 580 opposite to the directive point light source assembly panel 581. A viewer Q can view the three-dimensional images on the side of the large picture LCD panel 580 opposite to the directive point light source assembly panel 581.

According to the present embodiment, light emitted by the light source can be utilized more effectively than in the fourth embodiment, which makes it possible to display a brighter three-dimensional image.

According to the present embodiment, three-dimensional display can be achieved with the relatively simple configuration having the large picture LCD panel 580 and the directive point light source assembly panel 581.

The configuration, operation and effects of the present embodiment are otherwise similar to those of the fourth embodiment.

As described above, in the three-dimensional image display according to the first aspect of the invention, a three-dimensional image is formed in a space based on a two-dimensional image formed by driving a plurality of pixels of the two-dimensional image forming means. This is advantageous in that the contents of the two-dimensional image formed by the two-dimensional image forming means can be easily changed and, therefore, the contents of the three-dimensional image formed in the space can be also changed easily. Therefore, there is an advantage in that a dynamic image can be also stereoscopically displayed by changing the contents in a shorter time. An advantage also arises in that stereoscopic display in a true sense can be achieved without any need for dedicated eyeglasses or coherent light.

Especially, in the three-dimensional image display in the first or second mode according to the first aspect of the invention, there is provided the plurality of two-dimensional image forming elements capable of forming a two-dimensional image by driving a plurality of pixels; and the light diffusing element that is provided in a face-to-face relationship with each of the plurality of two-dimensional image forming elements and allows light that has exited the respective two-dimensional image forming elements to exit to the space in a diffused state or the microscopic opening which allows light that has exited the respective two-dimensional image forming elements and has impinged thereupon to pass therethrough as it is. The display operation of the two-dimensional image forming elements is controlled such that the light which has exited the light diffusing elements or the microscopic openings forms a multiplicity of point light source images that form a three-dimensional image to be displayed in the space. This is advantageous in that three-dimensional display can be achieved with the relatively simple configuration which is a combination of the two-dimensional image forming elements and the light diffusing elements or microscopic openings.

In the three-dimensional image display in the third mode according to the first aspect of the invention, there is provided the two-dimensional image forming panel capable of forming a two-dimensional image by driving pixels; and an optically opening/closing cell array formed by arranging a plurality of optically opening/closing cells, the optically opening/closing cell array being provided in a face-to-face relationship with the two dimensional image forming panel and allowing light which has exited the pixels of the two-dimensional image forming panel to pass through as it is or blocking the same. The scan of the optically opening/closing cell array is controlled such that the optically opening/closing cells sequentially enter an open state. Control is performed such that the image forming range of the two-dimensional image forming panel is sequentially shifted in synchronism with the scan. The light which has exited pixels in the sequentially shifted image forming range and has entered optically opening/closing cells in the open state of the optically opening/closing cell array forms a multiplicity of point light source images that form a three-dimensional image to be displayed in the space. Therefore, the optically opening/closing cells functioning as pinholes can be provided close to each other. This is advantageous in that the displayed three-dimensional image has an improved angular resolution and improved image quality.

In the three-dimensional image display in the third mode, the plurality of basic units having the two-dimensional image forming panel and the optically opening/closing cell array are arranged. The optically opening/closing cell arrays of the plurality of basic units are scanned in parallel to perform control such that optically opening/closing cells in positions associated with each other enter the open state in synchronism with each other. Control is performed such that the image forming ranges of the two-dimensional image forming panels of the plurality of basic units are shifted in parallel (simultaneously) in synchronism with the parallel scan of the plurality of optically opening/closing cell arrays. As a result, light which has exited the pixels in the image forming ranges passes through the optically opening/closing cells in the open state of the respective optically opening/closing cell arrays to form a multiplicity of point light source images that form a three-dimensional image to be displayed in the space.

This is advantageous in that a three-dimensional dynamic image with quality which is good enough from any of viewpoints of the resolution of the displayed image, angular resolution, naturalness of the dynamic image and the like.

In the three-dimensional image display in the fourth mode according to the first aspect, the projecting direction of a two-dimensional image changing with time formed by the two-dimensional image forming means is deflected such that the projecting direction changes in accordance with the time-dependent changes of the two-dimensional image. This is advantageous in that a three-dimensional image is synthesized in the space as a result of an after-image effect in the eyes of a viewer who views the two-dimensional image projected in various directions every moment, and the viewer can therefore view the same as a stereoscopic image.

Especially, when the deflecting means is formed using a transmission direction variable type liquid crystal element in which liquid crystal molecules are aligned in the direction of an electric field to achieve a function of allowing light to be transmitted only in the direction of the electric field, an advantage is provided in that deflection control and maintenance can be simplified because no mechanically movable mechanism is included.

In the three-dimensional image display in the fourth mode, when the three-dimensional image forming means is further equipped with the diffusing means for diffusing the projecting direction of a two-dimensional image in a direction which is different from the direction of deflection by the deflecting means, an advantage is provided in that a viewer can view a three-dimensional image even when he or she moves the view point to a direction different from the direction of deflection by the deflecting means.

In the three-dimensional image display in the fourth mode, when the image formation control means controls the image forming operation such that the magnification of a two-dimensional image in the deflecting direction thereof in accordance with the projecting direction of the two-dimensional image deflected by the deflecting means, an advantage is provided in that a viewer can view a three-dimensional image having a correct aspect ratio regardless of the viewing direction.

In the three-dimensional image display in the fourth mode, when the two-dimensional image forming means further includes receiving means for receiving encoded two-dimensional image data and decoding means for decoding the two-dimensional image data received by the receiving means, an enormous amount of two-dimensional image data required for three-dimensional display can be received in an encoded state. This is advantageous in that the consumption of a recording area of a recording medium for recording the image data can be reduced and in that the speed of data transmission can be substantially increased.

In this case, especially when a set of two-dimensional still image data in different points in time are compressed and encoded as a dynamic image, there is an advantage in that a common technique for compressing a dynamic image can be used.

In the three-dimensional image display in the fourth mode, when the deflecting means is formed utilizing a hologram which can deflect incident light in a direction associated with the position of incidence, an advantage is achieved in that the deflecting means can be manufactured on a replication basis to improve the productivity on a mass production basis.

In this case, especially when a film-like member on which a hologram is formed is moved in one direction different from the direction of incidence of light to sequentially deflect the incident light, there is an advantage in that a mechanism for moving the film-like member required for the deflecting operation can be relatively easily formed.

In the three-dimensional image display in the fourth mode, when the deflecting means is formed using a light transmitting member whose thickness is locally changed in accordance with a signal voltage applied thereto to produce irregularities on the surface thereof, the state of deflection and conditions for deflection can be relatively easily changed only by changing the setting of the signal voltage.

In the three-dimensional image display in the fourth mode, when the deflecting means includes a light source which can change the emitting direction of light in accordance with time-dependent change of a two-dimensional image formed by the two-dimensional image forming means, an advantage is achieved in that the display can be compact.

The three-dimensional image display in the fifth mode according to the first aspect of the invention is advantageous in that three-dimensional display can be achieved with a relatively simple configuration having the plurality of two-dimensional image forming elements and the plurality of point light sources.

The three-dimensional image display in the sixth mode according to the first aspect of the invention is advantageous in that three-dimensional display can be achieved with a relatively simple configuration having the two-dimensional image forming panel and the plurality of point light sources.

In the three-dimensional image display according to the second aspect of the invention, a plurality of two-dimensional images are formed by light which has been subjected to time modulation by the two-dimensional image forming means based on information on a plurality of two-dimensional images, and a three-dimensional image is formed by projecting the plurality of two-dimensional images formed by the two-dimensional image forming means in directions different from each other. This is advantageous in that the contents of the two-dimensional image formed by the two-dimensional image forming means can be changed easily and the contents of the three-dimensional image formed in the space can therefore be also changed easily. Therefore, an advantage arises in that a dynamic image can be also stereoscopically displayed by changing the contents in shorter time. There is another advantage in that stereoscopic display in a true sense can be achieved without any need for dedicated eyeglasses or coherent light.

In the three-dimensional image display according to the second aspect of the invention, when the three-dimensional image forming means has the region in which position information used for controlling the positions of incidence of the light scanned by the two-dimensional image forming means is recorded, an advantage is achieved in that the positions of incidence of light upon the three-dimensional image forming means can be controlled to allow a three-dimensional image to be formed with high accuracy.

In the three-dimensional image display according to the second aspect of the invention, when there is further provided the region in which synchronization information for synchronized control of the display as a whole is recorded, an advantage is achieved in that synchronized control of the display as a whole can be performed.

The three-dimensional image display according to the third aspect of the invention has: the two-dimensional image forming means for forming a plurality of two-dimensional images by emitting light carrying information on the plurality of two-dimensional images; and the three-dimensional image forming means for forming a three-dimensional image by projecting the light emitted by the two-dimensional image forming means in different directions in accordance with positions of incidence to project the plurality of two-dimensional images in directions different from each other. The three-dimensional image forming means has the region in which position information used for controlling the positions of incidence of the light emitted by the two-dimensional image forming means is recorded. This is advantageous in that the positions of incidence of light upon the three-dimensional image forming means can be controlled to form a three-dimensional image with high accuracy.

In the three-dimensional image display according to the third aspect of the invention, when the three-dimensional image forming means further has the region in which synchronization information for synchronized control of the display as a whole is recorded, an advantage is achieved in that synchronized control of the display as a whole can be performed.

It is apparent from the above description that the present invention can be carried out in various modes and modifications. The present invention can be carried out in modes other than the above-described best modes for carrying out the invention within the scope of equivalence of the appended claims.

The invention claimed is:

1. A three-dimensional image display comprising:
   two-dimensional image forming means for forming a plurality of two-dimensional images by scanning light which has been subjected to time-modulation based on information on rearrangement of data of each pixel of the plurality of two-dimensional images, such that the scanning light projects the plurality of two-dimensional images pixel-by-pixel by cyclically projecting one pixel from each of the plurality of two-dimensional images, before projecting another pixel from each of the plurality of two-dimensional images; and
   three-dimensional image forming means for forming a three-dimensional image by projecting the plurality of two-dimensional images formed by the two-dimensional image forming means in directions different from each other.

2. A three-dimensional image display according to claim 1, wherein the three-dimensional image forming means projects the plurality of two-dimensional images in directions different from each other by reflecting the light scanned by the two-dimensional image forming means in different directions in accordance with positions of incidence.

3. A three-dimensional image display according to claim 2, wherein the three-dimensional image forming means has a region in which position information used for controlling the positions of incidence of the light scanned by the two-dimensional image forming means is recorded.

4. A three-dimensional image display according to claim 2, wherein the three-dimensional image forming means has a region in which synchronization information for synchronized control of the display as a whole is recorded.

5. A three-dimensional image display according to claim 1, wherein the three-dimensional image forming means is fixed.

6. A three-dimensional image display comprising:
   two-dimensional image forming means for forming a plurality of two-dimensional images by emitting light carrying information on a plurality of two-dimensional images; and
   three-dimensional image forming means for forming a three-dimensional image by projecting the light emitted by the two-dimensional image forming means in different directions in accordance with positions of incidence to project the plurality of two-dimensional images in directions different from each other, wherein the three-dimensional image forming means has a region in which position information used for controlling the positions of incidence of the light emitted by the two-dimensional image forming means is recorded.

7. A three-dimensional image display according to claim 6, wherein the three-dimensional image forming means further has a region in which synchronization information for synchronized control of the display as a whole is recorded.

8. A three-dimensional image display according to claim 6, wherein the position information recorded in the region of the three-dimensional image forming means is optically readable information.

* * * * *